US011461707B2

(12) United States Patent
Petroulas

(10) Patent No.: US 11,461,707 B2
(45) Date of Patent: Oct. 4, 2022

(54) AUTONOMOUS AND INTEGRATED SYSTEM, METHOD AND COMPUTER PROGRAM FOR DYNAMIC OPTIMISATION AND ALLOCATION OF RESOURCES FOR DEFINED SPACES AND TIME PERIODS

(71) Applicant: GRAND PERFORMANCE ONLINE PTY LTD, Sydney (AU)

(72) Inventor: Peter Petroulas, Sydney (AU)

(73) Assignee: GRAND PERFORMANCE ONLINE PTY LTD, Sydney (AU)

( * ) Notice: Subject to any disclaimer, the term of this patent is extended or adjusted under 35 U.S.C. 154(b) by 0 days.

(21) Appl. No.: 16/754,136

(22) PCT Filed: Oct. 30, 2018

(86) PCT No.: PCT/AU2018/051170
§ 371 (c)(1),
(2) Date: Apr. 7, 2020

(87) PCT Pub. No.: WO2019/084606
PCT Pub. Date: May 9, 2019

(65) Prior Publication Data

US 2020/0334585 A1 Oct. 22, 2020

(30) Foreign Application Priority Data

Oct. 31, 2017 (AU) ................................ 2017904431
Dec. 22, 2017 (AU) ................................ 2017905188
(Continued)

(51) Int. Cl.
*G06Q 10/02* (2012.01)
*G06Q 20/18* (2012.01)
(Continued)

(52) U.S. Cl.
CPC ......... *G06Q 10/02* (2013.01); *G06F 16/2282* (2019.01); *G06F 16/24565* (2019.01);
(Continued)

(58) Field of Classification Search
None
See application file for complete search history.

(56) References Cited

U.S. PATENT DOCUMENTS 5,953,707 A 9/1999 Huang et al.
6,876,973 B1 4/2005 Visconti
(Continued)

FOREIGN PATENT DOCUMENTS

CN 107833339 A 3/2018
EP 0122193 A 10/1984
(Continued)

OTHER PUBLICATIONS

Abdelmohsen, S., et al. in "A Heuristic Approach for the Automated Generation of Furniture Layout Schemes in Residential Spaces," from Design Computing and Cognition, pp. 459-475, 2017 (Year: 2017).*

(Continued)

*Primary Examiner* — Mike Anderson
*Assistant Examiner* — Brandon M Duck
(74) *Attorney, Agent, or Firm* — Finnegan, Henderson, Farabow, Garrett & Dunner, LLP

(57) ABSTRACT

In one aspect, the present invention provides a computing system for effecting an optimised condition for one or more booking requests in a venue having one or more spaces, comprising an allocation module executing on a processor and arranged to retrieve the booking requests from a database containing a plurality of booking requests, the booking requests including requestor constraint information regarding one or more constraints provided by the booking
(Continued)

requestor including a predefined service period, and retrieve venue constraint information from a database, the venue constraint information including venue spatial information and furniture spatial information, wherein the allocation module executes an allocation algorithm that utilises the booking information and the venue constraint information to assess the capacity of the one or more venues and allocate a portion of space for each booking request to satisfy the optimised condition utilising the assessment, to derive an optimised allocation instruction set.

21 Claims, 104 Drawing Sheets

(30) Foreign Application Priority Data

Dec. 22, 2017 (AU) ................................ 2017905189
Dec. 22, 2017 (AU) ................................ 2017905190
Apr. 19, 2018 (AU) ................................ 2018202759
May 21, 2018 (AU) ................................ 2018203575

(51) Int. Cl.

| | |
|---|---|
| ***G06Q 20/20*** | (2012.01) |
| ***G06Q 50/12*** | (2012.01) |
| ***G06Q 10/04*** | (2012.01) |
| ***G06N 5/04*** | (2006.01) |
| ***G06Q 30/02*** | (2012.01) |
| ***G06F 16/22*** | (2019.01) |
| ***G06F 16/2457*** | (2019.01) |
| ***G06F 16/957*** | (2019.01) |
| ***H04L 47/70*** | (2022.01) |
| ***G06F 16/2455*** | (2019.01) |
| ***G06F 16/9537*** | (2019.01) |
| ***G06Q 10/06*** | (2012.01) |
| ***G06Q 10/08*** | (2012.01) |

(52) U.S. Cl.

CPC .... *G06F 16/24578* (2019.01); *G06F 16/9537* (2019.01); *G06F 16/9577* (2019.01); *G06N 5/04* (2013.01); *G06Q 10/04* (2013.01); *G06Q 10/06314* (2013.01); *G06Q 10/06315* (2013.01); *G06Q 10/087* (2013.01); *G06Q 20/18* (2013.01); *G06Q 20/20* (2013.01); *G06Q 30/0206* (2013.01); *G06Q 30/0207* (2013.01); *G06Q 50/12* (2013.01); *H04L 47/827* (2013.01); *H04L 47/828* (2013.01)

(56) References Cited

U.S. PATENT DOCUMENTS

| | | | | |
|---|---|---|---|---|
| 6,973,437 | B1 | 12/2005 | Olewicz et al. | |
| 7,849,133 | B2 | 12/2010 | Denker et al. | |
| 8,856,117 | B2 | 10/2014 | McCullough et al. | |
| 9,766,079 | B1 | 9/2017 | Poel et al. | |
| 10,395,186 | B1 | 8/2019 | McCullough et al. | |
| 2002/0082878 | A1 | 6/2002 | Boies et al. | |
| 2002/0149239 | A1 | 10/2002 | Koljonen | |
| 2004/0158494 | A1 | 8/2004 | Suthar | |
| 2004/0181438 | A1 | 9/2004 | Hoene et al. | |
| 2004/0210621 | A1 | 10/2004 | Antonellis | |
| 2007/0168347 | A1 | 7/2007 | Childress et al. | |
| 2007/0185731 | A1 | 8/2007 | Reynolds et al. | |
| 2007/0250355 | A1 | 10/2007 | Leet et al. | |
| 2007/0282476 | A1 | 12/2007 | Song et al. | |
| 2008/0167911 | A1 | 7/2008 | Hatakeda | |
| 2008/0183483 | A1 | 7/2008 | Hart | |
| 2008/0270230 | A1 | 10/2008 | Hendrickson et al. | |
| 2009/0048878 | A1 | 2/2009 | Metcalf | |
| 2009/0098935 | A1 | 4/2009 | Jack | |
| 2009/0292566 | A1 | 11/2009 | Bossert | |
| 2010/0109413 | A1 | 5/2010 | Kneller et al. | |
| 2010/0153160 | A1 | 6/2010 | Bezemer et al. | |
| 2010/0235201 | A1 | 9/2010 | McEvoy | |
| 2010/0324867 | A1 | 12/2010 | Mital et al. | |
| 2011/0125539 | A1 | 5/2011 | Bollapragada et al. | |
| 2011/0223990 | A1 | 9/2011 | Burke et al. | |
| 2011/0246247 | A1 | 10/2011 | McCullough et al. | |
| 2012/0005043 | A1 | 1/2012 | Bushinsky | |
| 2012/0040751 | A1 | 2/2012 | Peters | |
| 2012/0053968 | A1 | 3/2012 | Debarge et al. | |
| 2012/0072079 | A1 | 3/2012 | Schliwa et al. | |
| 2012/0316911 | A1 | 12/2012 | Schwarz | |
| 2013/0013350 | A1 | 1/2013 | Mcculloough et al. | |
| 2013/0024509 | A1 | 1/2013 | Clouse | |
| 2013/0046642 | A1 | 2/2013 | Jacobus | |
| 2013/0090959 | A1 | 4/2013 | Kvamme et al. | |
| 2013/0144660 | A1 | 6/2013 | Martin | |
| 2013/0173317 | A1* | 7/2013 | Higgy .................... | G06Q 10/02 705/5 |
| 2013/0031131 | A1 | 11/2013 | Zell | |
| 2013/0325526 | A1 | 12/2013 | Tyler | |
| 2013/0332208 | A1 | 12/2013 | Mehta | |
| 2013/0339067 | A1 | 12/2013 | Krell | |
| 2014/0025407 | A1 | 1/2014 | Hayek | |
| 2014/0156320 | A1 | 6/2014 | Levin | |
| 2014/0229390 | A1 | 8/2014 | Morris et al. | |
| 2014/0244324 | A1 | 8/2014 | Ford et al. | |
| 2014/0278613 | A1* | 9/2014 | Suzuki .................. | G06Q 50/12 705/5 |
| 2014/0310651 | A1 | 10/2014 | Padgett et al. | |
| 2014/0343976 | A1 | 11/2014 | Ahluwalia et al. | |
| 2015/0012307 | A1 | 1/2015 | Moss | |
| 2015/0039357 | A1 | 2/2015 | Segal et al. | |
| 2015/0046271 | A1 | 2/2015 | Scholl et al. | |
| 2015/0073925 | A1 | 3/2015 | Renfroe | |
| 2015/0112738 | A1* | 4/2015 | Mariano ................ | G06Q 10/02 705/5 |
| 2015/0134377 | A1 | 5/2015 | Flahive et al. | |
| 2015/0206353 | A1 | 7/2015 | Grasso et al. | |
| 2015/0228123 | A1 | 8/2015 | Yasutake | |
| 2015/0278926 | A1 | 10/2015 | Fang et al. | |
| 2015/0347944 | A1 | 12/2015 | Aparimit et al. | |
| 2016/0048776 | A1 | 2/2016 | Azuma | |
| 2016/0078502 | A1* | 3/2016 | Sedky .................... | G06Q 10/02 705/347 |
| 2016/0117611 | A1 | 4/2016 | Greenberg | |
| 2016/0196508 | A1 | 7/2016 | Richter | |
| 2016/0244311 | A1 | 8/2016 | Burks et al. | |
| 2016/0253602 | A1 | 9/2016 | Koren | |
| 2016/0350721 | A1 | 12/2016 | Comerford et al. | |
| 2017/0083991 | A1 | 3/2017 | Ghosh et al. | |
| 2017/0177747 | A1 | 6/2017 | Atherton et al. | |
| 2017/0220957 | A1 | 8/2017 | Lee et al. | |
| 2017/0278022 | A1 | 9/2017 | Mimassi | |
| 2017/0278203 | A1 | 9/2017 | Mimassi | |
| 2017/0344845 | A1* | 11/2017 | Hennessy ............. | H04W 4/024 |
| 2017/0344945 | A1* | 11/2017 | Hennessy ............. | H04W 4/024 |
| 2018/0089597 | A1 | 3/2018 | Takahashi et al. | |
| 2018/0285465 | A1 | 10/2018 | Schaffernoth et al. | |
| 2019/0051050 | A1 | 2/2019 | Bell et al. | |
| 2019/0075359 | A1 | 3/2019 | Boss et al. | |
| 2019/0095825 | A1* | 3/2019 | Joachim ................. | G06Q 10/02 |
| 2020/0034629 | A1* | 1/2020 | Vo ........................... | A63F 1/067 |
| 2020/0065720 | A1 | 2/2020 | Koki | |
| 2020/0334583 | A1 | 10/2020 | Petroulas | |
| 2020/0334584 | A1 | 10/2020 | Petroulas | |
| 2020/0334586 | A1 | 10/2020 | Petroulas | |

FOREIGN PATENT DOCUMENTS

| | | | |
|---|---|---|---|
| EP | 2784730 | A1 | 10/2014 |
| EP | 3079108 | A1 | 10/2016 |
| WO | WO 2013/191644 | A1 | 12/2013 |
| WO | WO 2013/191644 | A8 | 12/2013 |
| WO | WO 2014/073354 | A1 | 5/2014 |
| WO | WO 2016/065347 | A1 | 4/2016 |

(56) References Cited

FOREIGN PATENT DOCUMENTS

| | | | |
|---|---|---|---|
| WO | WO 2017/075498 | A1 | 5/2017 |
| WO | WO 2018/212735 | A2 | 11/2018 |
| WO | WO 2018/217165 | A2 | 11/2018 |
| WO | WO 2019/084605 | A1 | 5/2019 |
| WO | WO 2019/133279 | A1 | 7/2019 |
| WO | WO 2020/220068 | A1 | 11/2020 |
| WO | WO 2020/220069 | A1 | 11/2020 |
| WO | WO 2020/220070 | A1 | 11/2020 |
| WO | WO 2020/220071 | A1 | 11/2020 |
| WO | WO 2020/220072 | A1 | 11/2020 |
| WO | WO 2020/220073 | A1 | 11/2020 |
| WO | WO 2020/220074 | A1 | 11/2020 |
| WO | WO 2020/220075 | A1 | 11/2020 |
| WO | WO 2020/220076 | A1 | 11/2020 |
| WO | WO 2020/220077 | A1 | 11/2020 |
| WO | WO 2020/220078 | A1 | 11/2020 |
| WO | WO 2020220067 | A1 | 11/2020 |

OTHER PUBLICATIONS

Thompson, "Dedicated or Combinable? A Simulation to Determine Optimal Restaurant Table Configuration", Cornell Hospitality Report (CHR), Center for Hospitality Research at Cornell University, p. 3-16, https://scholarship.sha.cornell.edu/cgi/viewcontent.cgi?article=1194&context=chrpubs, Jan. 1, 2003.

Vidotto, "Managing Restaurant Tables Using Constraint Programming", Thesis, National University of Ireland Cork, http://tidel.mie.utoronto.ca/pubs/Theses/vidotto.phd.pdf, Nov. 2007.

Thompson et al., "Pooling restaurant reservations to increase service efficiency", Journal of Service Research 10.4, Cornell University, School of Hotel Administration, pp. 335-346, https://scholarship.sha.cornell.edu/cgi/viewcontent.cgi?article=1931&context=articles, May 10, 2008.

Feldman, "Optimizing Restaurant Reservation Scheduling", HMC Senior Thesis, Harvey Mudd College, Dept of Mathematics, https://scholarshlp.claremont.edu/hmc_theses/22, May 2010.

International Search Report for application No. PCT/AU2018/051170 dated Feb. 12, 2019.

International Search Report and Written Opinion of the International Searching Authority for application No. PCT/AU2018/051168 dated Dec. 18, 2018 (16 pgs.).

International Search Report and Written Opinion of the International Searching Authority for application No. PCT/AU2018/051169 dated Feb. 12, 2019 (19 pgs.).

International Search Report and Written Opinion of the International Searching Authority for application No. PCT/AU2018/051171 dated Feb. 12, 2019 (23 pgs.).

Extended European Search Report dated Mar. 4, 2021, received in Application No. EP18872051 (12 pgs ).

Burkhard et al. (2005) "Knowledge visualization: A comparative study between project tube maps and gantt charts", Proceedings of I-Know'05, published 2005 <URL: https://kar.kent.ac.uk/14324/1/content.pdf.

Stott et al. (2005) "Automatic layout of project plans using a metro map metaphor", Ninth International Conference on Information Visualisation (IV'05), IEEE, published 2005, <URL: https://kar.kent.ac.uk/14301/1/content.pdf.

Yu et al. (2011) "Make it home: automatic optimization of furniture arrangement", ACM Transactions on Graphics (TOG)—Proceedings of ACM SIGGRAPH 2011, article No. 86 30.4, published Jul. 2011 <URL: https://repository.ust.hk/ir/bitstream/1783.1-44422/1/furniture.pdf.

* cited by examiner

| Priority | Table ID | Table Size | Max. Pty | Min. Pty | Smoking | Blocked | Reserved | Locked | Shared | Location |
|---|---|---|---|---|---|---|---|---|---|---|
| 29 | 49 | 2 | 2 | 1 | | | ✓ | | | Atrium |
| 30 | 18 | 2 | 2 | 1 | | | | | | Front Room |
| 31 | 16 | 2 | 2 | 1 | | | | | | Front Room |
| 32 | 17 | 2 | 2 | 1 | | | | | | Front Room |
| 33 | 13 | 2 | 2 | 1 | | | | | | Front Room |
| 34 | 100 | 7 | 7 | 4 | | | | | | |
| 35 | 63 | 4 | 4 | 3 | | | ✓ | | | |
| 36 | 35 | 4 | 4 | 3 | | | ✓ | | | |
| 37 | 73 | 2 | 2 | 1 | | | | | | Front Room |
| 38 | 76 | 2 | 2 | 1 | | | | | | Front Room |
| 39 | 79 | 2 | 2 | 1 | | | | | | Front Room |
| 40 | 5 | 4 | 4 | 4 | | | ✓ | | | |
| 41 | 2 | 4 | 4 | 2 | | | ✓ | | | |
| 42 | 1 | 4 | 4 | 1 | | | ✓ | | | |
| 43 | 74 | 2 | 2 | 1 | | | | | | Front Room |
| 44 | 75 | 2 | 2 | 1 | | | | | | Front Room |
| 45 | 73 | 2 | 2 | 1 | | | | | | Front Room |
| 46 | 77 | 2 | 2 | 1 | | | | | | Front Room |
| 47 | 81 | 2 | 2 | 1 | | | | | | Front Room |
| 48 | 80 | 2 | 2 | 1 | | | | | | Front Room |
| 49 | 6 | 4 | 4 | 4 | | | ✓ | | | |
| 50 | 23+24 | 4 | 4 | 3 | | | | | | |
| 51 | 21+22 | 4 | 4 | 3 | | | | | | |
| 52 | 21+22+23+24+25 | 10 | 10 | 9 | | | | | | |
| 53 | 23+24+25 | 6 | 6 | 5 | | | | | | |
| 54 | 16+17+18 | 5 | 6 | 5 | | | | | | |
| 55 | 31+32 | 4 | 4 | 3 | | | | | | |
| 56 | 33+34 | 4 | 4 | 3 | | | | | | |
| 57 | 37+38 | 4 | 4 | 3 | | | | | | |
| 58 | 37+38+39 | 5 | 6 | 5 | | | | | | |

212

ResButler Restaurant Database

Diary Setup
- Multi-venue
- Multi time
- User-defined Calendar
- User-defined Posting Periods
- Opening Hours
  - Meal Periods
- Floor Plan Setup
  - Areas (flexible & fixed seating)
  - Sub-areas (flexible & fixed seating)
  - Sub-area Priorities
  - Sections (flexible seating)
  - Classes
  - Private Dining Room
  - Furniture and Reserve Furniture
    - Dimensions (mm)
    - Min & max pax
    - VIP/Super VIP min & max pax override
  - Table sensors and table position numbers
  - Fixed & Flexible Seating
  - Equipment Availabilities

- Booking Setup
  - Menus by constraints
    - Courses by constraints
      a. Course duration by day of the week
      b. Course duration by meal period
      c. Course duration by pax range
      d. Course duration by VIPs/Super VIPs
      e. Course availability by time
      f. Course availability override by VIPs/Super VIPs
  - Capacities by constraints
    - Capacities by day of the week
    - Capacities by meal period
    - Capacities by time interval
    - Capacities by total max pax
    - Capacities by walk-ins
    - Capacities by system available pax
    - Capacities by max tables
    - Capacity overrides by VIPs/Super VIPs
    - Capacities by menu, by courses
  - Booking Durations by constraints
    - Booking duration by day of the week
    - Booking duration by VIPs/Super VIPs
    - Booking duration by menu by course
    - Booking duration by pax
    - Booking duration by set acceptable shortened duration

ResButler Restaurant Database

Booking Intervals by constraints
- Booking intervals by meal period
- Booking intervals by day of the week
- Booking intervals by seating
- Booking intervals by max pax
- Booking intervals by max tables
- Booking intervals by walk-ins
- Booking intervals by system available pax
- Booking intervals by VIP/SVIP override Table reset constraints
- Table reset time (min) by day of the week
- Table reset time (min) by meal period
- Table reset time (min) by seating

Function Setup
- Function Type
  - Function type by venue
  - Function type by pax
  - Function type by day of the week
  - Function type by meal period
- Floor Plan Setup
  - Floor plan by venue
  - Floor plan by function type
  - Floor plan by pax
  - Floor plan by day of the week
  - Floor plan by meal period
- Floor plan maker – display/drag and drop online tool
- Furniture
  - Furniture by venue
  - Furniture by function type
- Equipment Availabilities
  - Equipment availabilities by venue
  - Equipment availabilities by function type
  - Equipment availabilities by day of the week
- Food Menus & Packages
  - Food menus and packages by venue
  - Food menus and packages by function type
  - Food menus and packages by pax
  - Food menus and packages by day of the week
  - Food menus and packages by meal period

ResButler Restaurant Database

- Beverage Menus & Packages
  - Beverage menus and packages by venue
  - Beverage menus and packages by function type
  - Beverage menus and packages by pax
  - Beverage menus and packages by day of the week
  - Beverage menus and packages by meal period
- Capacity Constraints
  - Min and max capacity by venue
  - Min and max capacity by function type
- Durations
  - Start and end time by venue
  - Start and end time by day of the week
  - Start and end time by meal period
  - Start and end time by function type
- Function Spatial Requirements
  - Function spatial requirements by venue
  - Function spatial requirements by function type
- Pricing
  - Base pricing
    - Base pricing by venue
    - Base pricing by function type
    - Base pricing by day of the week
    - Base pricing by meal perioc
    - Base pricing by pax
    - Base pricing by duration
  - Food & Beverage costs
    - Food package
    - Additional food
    - Beverage package
    - Additional beverage
  - Additional costs
    - Theming
    - Audio Visual
    - Entertainment
    - Staffing
- Payments
  - Payment Type
    - Deposit
    - Full prepayment
    - Scheduled part payments
    - Credit Card Details
  - Discounts
    - Pricing adjustments ($ and %)
    - Overall discounts ($ and %)
  - Payment decision tree
    - Venue
    - Function Type
    - Day of the week
    - Meal period
- Terms & Conditions

FIG. 2d-iii

Figure 2D:
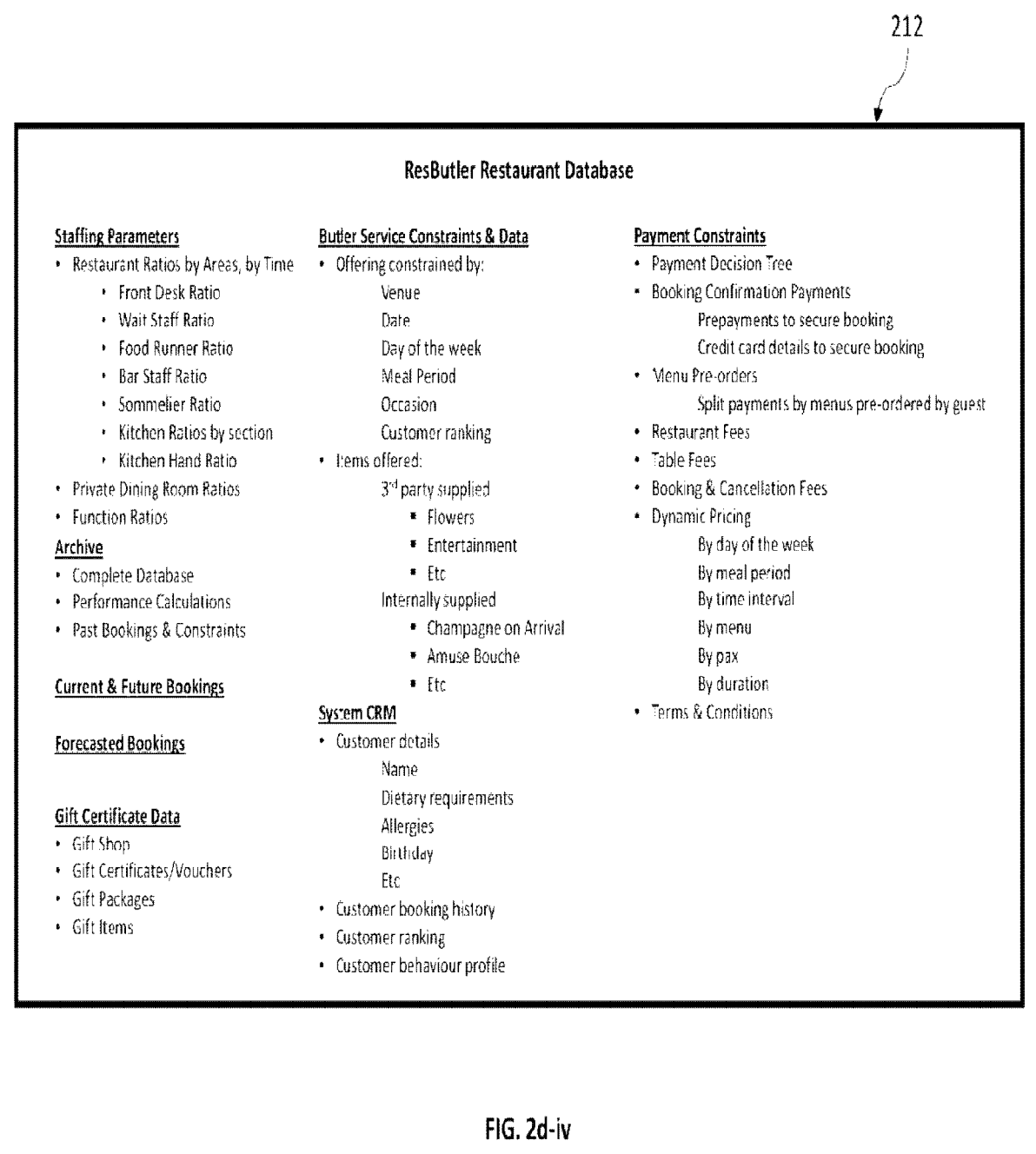

212

ResButler Restaurant Database

Staffing Parameters
- Restaurant Ratios by Areas, by Time
  - Front Desk Ratio
  - Wait Staff Ratio
  - Food Runner Ratio
  - Bar Staff Ratio
  - Sommelier Ratio
  - Kitchen Ratios by section
  - Kitchen Hand Ratio
- Private Dining Room Ratios
- Function Ratios

Archive
- Complete Database
- Performance Calculations
- Past Bookings & Constraints

Current & Future Bookings

Forecasted Bookings

Gift Certificate Data
- Gift Shop
- Gift Certificates/Vouchers
- Gift Packages
- Gift Items

Butler Service Constraints & Data
- Offering constrained by:
  - Venue
  - Date
  - Day of the week
  - Meal Period
  - Occasion
  - Customer ranking
- Items offered:
  - 3rd party supplied
    - Flowers
    - Entertainment
    - Etc
  - Internally supplied
    - Champagne on Arrival
    - Amuse Bouche
    - Etc

System CRM
- Customer details
  - Name
  - Dietary requirements
  - Allergies
  - Birthday
  - Etc
- Customer booking history
- Customer ranking
- Customer behaviour profile

Payment Constraints
- Payment Decision Tree
- Booking Confirmation Payments
  - Prepayments to secure booking
  - Credit card details to secure booking
- Menu Pre-orders
  - Split payments by menus pre-ordered by guest
- Restaurant Fees
- Table Fees
- Booking & Cancellation Fees
- Dynamic Pricing
  - By day of the week
  - By meal period
  - By time interval
  - By menu
  - By pax
  - By duration
- Terms & Conditions

Luxury Class

| Table Number | Space | Subspace | Section | Section Name | Section Starting Number | Demand (d) | View (v) | Quietness (q) | Table Distance (t) | Class Metric (m=1.5d+2v+1.5 q+t) | Ranking within Class |
|---|---|---|---|---|---|---|---|---|---|---|---|
| 81 | Main Dining | Atrium | Yes | 80 | 81 | 5 | 5 | 3 | 2 | 24 | 2 |
| 82 | Main Dining | Atrium | Yes | 80 | 81 | 5 | 5 | 3 | 2 | 24 | 2 |
| 86 | Main Dining | Atrium | No | | | 5 | 0 | 4 | 3 | 16.5 | 4 |
| 91 | Main Dining | Atrium | No | | | 5 | 5 | 5 | 2 | 27 | 1 |
| 92 | Main Dining | Atrium | No | | | 5 | 5 | 5 | 2 | 27 | 1 |
| 11 | Main Dining | Front Room | No | | | 3 | 5 | 1 | 3 | 19 | 3 |
| 12 | Main Dining | Front Room | No | | | 2 | 3 | 1 | 3 | 13.5 | 5 |
| 13 | Main Dining | Front Room | No | | | 2 | 3 | 3 | 3 | 16.5 | 4 |
| 14 | Main Dining | Front Room | No | | | 5 | 5 | 3 | 2 | 24 | 2 |
| 15 | Main Dining | Front Room | No | | | 5 | 5 | 3 | 2 | 24 | 2 |

583

Key

| | Highest Score | Lowest Score |
|---|---|---|
| Demand (d) | 5 | 1 |
| View (v) | 5 | 0 |
| Quietness (q) | 5 | 1 |
| Table Distance (t) | 3 | 1 |

Restaurant Chef's Selection Limited Menu Pre-order [X]

| Name | | Joe | Sam | Bill | Anne | Total |
|---|---|---|---|---|---|---|
| Seating Position | | 1 | 2 | 3 | 4 | |
| **Entree** | | | | | | |
| Antipasto Della Casa<br>Prosciutto, Cacciatorini, Mozzarella, Mixed Olives | $26.50 | ☑ | ☐ | ☐ | ☐ | $26.50 |
| Insalata di Burrata e Pomodorini<br>Mozzarella, Tomatoes, Rocket | $23.50 | ☐ | ☐ | ☑ | ☑ | $47.00 |
| Tortina di Melanzana<br>Eggplant, Mozzarella, Parmigiano, Basil, Pinenuts | $23.50 | ☐ | ☑ | ☐ | ☐ | $23.50 |
| **Main** | | | | | | |
| Osso Bucco<br>Slow Cooked Veal served on Risotto Milanese | $39.00 | ☑ | ☐ | ☑ | ☐ | $78.00 |
| Pesce Al Cartoccio<br>Ocean Trout, Wild Mushrooms, Tomatoes | $42.00 | ☐ | ☑ | ☐ | ☑ | $84.00 |
| **Sides** | | | | | | |
| Roasted Rosemary Potatoes | $11.50 | ☐ | ☐ | ☐ | ☐ | |
| Wild Rocket, Pear and Parmogiano Reggiano | $11.50 | ☐ | ☐ | ☑ | ☐ | $11.50 |
| Total Menu Pre-order | | $65.50 | $65.50 | $74.00 | $65.50 | $270.50 |

Add to Cart

Lunch View/Edit

Seating 1 - 12:00PM-1:00PM Interval:15 Reset:10

☑ 12:00PM ☑ 12:15PM ☑ 12:30PM ☒ 12:45PM

| Time | Max Pax | Walk in (-) Pax | Online Max Pax | Max Tables | VIP | Super VIP | A la Carte 1 Course | A la Carte 2 Courses | A la Carte 3 Courses | Limited A la Carte 2 Courses | Limited A la Carte 3 Courses | Lunch Special 1 Course |
|---|---|---|---|---|---|---|---|---|---|---|---|---|
| 12:00PM | 40 | 8 | 32 | 20 | × | ✓ | 8 | 22 | 32 | 22 | 32 | 4 |
| 12:15PM | 40 | 8 | 32 | 20 | × | ✓ | 8 | 22 | 32 | 22 | 32 | 4 |
| 12:30PM | 40 | 8 | 32 | 20 | × | ✓ | 8 | 22 | 32 | 22 | 32 | 4 |

Seating 2 - 1:00PM-2:00PM Interval:15 Reset:10

☑ 1:00PM ☑ 1:15PM ☑ 1:30PM ☒ 1:45PM

| Time | Max Pax | Walk in (-) Pax | Online Max Pax | Max Tables | VIP | Super VIP | A la Carte 1 Course | A la Carte 2 Courses | A la Carte 3 Courses | Limited A la Carte 2 Courses | Limited A la Carte 3 Courses | Lunch Special 1 Course |
|---|---|---|---|---|---|---|---|---|---|---|---|---|
| 12:00PM | 40 | 6 | 34 | 20 | × | ✓ | 8 | 24 | 34 | 0 | 0 | 0 |
| 12:15PM | 40 | 6 | 34 | 20 | × | ✓ | 8 | 24 | 34 | 0 | 0 | 0 |
| 12:30PM | 40 | 6 | 34 | 20 | × | ✓ | 8 | 24 | 34 | 0 | 0 | 0 |

Seating 3 - 2:00PM-3:00PM Interval:15 Reset:10

☑ 2:00PM ☑ 2:15PM ☑ 2:30PM ☒ 2:45PM

| Time | Max Pax | Walk in (-) Pax | Online Max Pax | Max Tables | VIP | Super VIP | A la Carte 1 Course | A la Carte 2 Courses | A la Carte 3 Courses | Limited A la Carte 2 Courses | Limited A la Carte 3 Courses | Lunch Special 1 Course |
|---|---|---|---|---|---|---|---|---|---|---|---|---|
| 12:00PM | 40 | 0 | 40 | 20 | × | ✓ | 10 | 28 | 40 | 28 | 40 | 20 |
| 12:15PM | 40 | 0 | 40 | 20 | × | ✓ | 10 | 28 | 40 | 28 | 40 | 40 |
| 12:30PM | 40 | 0 | 40 | 20 | × | ✓ | 10 | 28 | 40 | 28 | 40 | 40 |

FIG. 9d
905
Add
Create/Edit
Courses
A la Carte
Hide
Input Menu
Create/Edit
Courses
Limited A la Carte
Hide
Input Menu
Create/Edit
Courses
Pre-theatre
Input Menu
Create/Edit
Courses
Post-theatre
Hide
Input Menu

52 Week Management Reporting Calendar 2017/2018

July

| | A1 | B2 | C3 | D4 | E5 |
|---|---|---|---|---|---|
| S | 1 | 8 | 15 | 22 | 29 |
| S | 2 | 9 | 16 | 23 | 30 |
| M | 3 | 10 | 17 | 24 | 31 |
| T | 4 | 11 | 18 | 25 | 1 |
| W | 5 | 12 | 19 | 26 | 2 |
| T | 6 | 13 | 20 | 27 | 3 |
| F | 7 | 14 | 21 | 28 | 4 |

August

| | A6 | B7 | C8 | D9 |
|---|---|---|---|---|
| S | 5 | 12 | 19 | 26 |
| S | 6 | 13 | 20 | 27 |
| M | 7 | 14 | 21 | 28 |
| T | 8 | 15 | 22 | 29 |
| W | 9 | 16 | 23 | 30 |
| T | 10 | 17 | 24 | 31 |
| F | 11 | 18 | 25 | 1 |

September

| | A10 | B11 | C12 | D13 |
|---|---|---|---|---|
| S | 2 | 9 | 16 | 23 |
| S | 3 | 10 | 17 | 24 |
| M | 4 | 11 | 18 | 25 |
| T | 5 | 12 | 19 | 26 |
| W | 6 | 13 | 20 | 27 |
| T | 7 | 14 | 21 | 28 |
| F | 8 | 15 | 22 | 29 |

934

October

| | A14 | B15 | C16 | D17 | E18 |
|---|---|---|---|---|---|
| S | 30 | 7 | 14 | 21 | 28 |
| S | 1 | 8 | 15 | 22 | 29 |
| M | 2 | 9 | 16 | 23 | 30 |
| T | 3 | 10 | 17 | 24 | 31 |
| W | 4 | 11 | 18 | 25 | 1 |
| T | 5 | 12 | 19 | 26 | 2 |
| F | 6 | 13 | 20 | 27 | 3 |

November

| | A19 | B20 | C21 | D22 |
|---|---|---|---|---|
| S | 4 | 11 | 18 | 25 |
| S | 5 | 12 | 19 | 26 |
| M | 6 | 13 | 20 | 27 |
| T | 7 | 14 | 21 | 28 |
| W | 8 | 15 | 22 | 29 |
| T | 9 | 16 | 23 | 30 |
| F | 10 | 17 | 24 | 1 |

December

| | A23 | B24 | C25 | D26 |
|---|---|---|---|---|
| S | 2 | 9 | 16 | 23 |
| S | 3 | 10 | 17 | 24 |
| M | 4 | 11 | 18 | 25 |
| T | 5 | 12 | 19 | 26 |
| W | 6 | 13 | 20 | 27 |
| T | 7 | 14 | 21 | 28 |
| F | 8 | 15 | 22 | 29 |

January

| | A27 | B28 | C29 | D30 | E31 |
|---|---|---|---|---|---|
| S | 30 | 6 | 13 | 20 | 27 |
| S | 31 | 7 | 14 | 21 | 28 |
| M | 1 | 8 | 15 | 22 | 29 |
| T | 2 | 9 | 16 | 23 | 30 |
| W | 3 | 10 | 17 | 24 | 31 |
| T | 4 | 11 | 18 | 25 | 1 |
| F | 5 | 12 | 19 | 26 | 2 |

February

| | A32 | B33 | C34 | D35 |
|---|---|---|---|---|
| S | 3 | 10 | 17 | 24 |
| S | 4 | 11 | 18 | 25 |
| M | 5 | 12 | 19 | 26 |
| T | 6 | 13 | 20 | 27 |
| W | 7 | 14 | 21 | 28 |
| T | 8 | 15 | 22 | 1 |
| F | 9 | 16 | 23 | 2 |

March

| | A36 | B37 | C38 | D39 |
|---|---|---|---|---|
| S | 3 | 10 | 17 | 24 |
| S | 4 | 11 | 18 | 25 |
| M | 5 | 12 | 19 | 26 |
| T | 6 | 13 | 20 | 27 |
| W | 7 | 14 | 21 | 28 |
| T | 8 | 15 | 22 | 29 |
| F | 9 | 16 | 23 | 30 |

April

| | A40 | B41 | C42 | D43 |
|---|---|---|---|---|
| S | 31 | 7 | 14 | 21 |
| S | 1 | 8 | 15 | 22 |
| M | 2 | 9 | 16 | 23 |
| T | 3 | 10 | 17 | 24 |
| W | 4 | 11 | 18 | 25 |
| T | 5 | 12 | 19 | 26 |
| F | 6 | 13 | 20 | 27 |

May

| | A44 | B45 | C46 | D47 |
|---|---|---|---|---|
| S | 28 | 5 | 12 | 19 |
| S | 29 | 6 | 13 | 20 |
| M | 30 | 7 | 14 | 21 |
| T | 1 | 8 | 15 | 22 |
| W | 2 | 9 | 16 | 23 |
| T | 3 | 10 | 17 | 24 |
| F | 4 | 11 | 18 | 25 |

June

| | A48 | B49 | C50 | D51 |
|---|---|---|---|---|
| S | 26 | 2 | 9 | 16 |
| S | 27 | 3 | 10 | 17 |
| M | 28 | 4 | 11 | 18 |
| T | 29 | 5 | 12 | 19 |
| W | 30 | 6 | 13 | 20 |
| T | 31 | 7 | 14 | 21 |
| F | 1 | 8 | 15 | 22 |

FIG. 9i

AUTONOMOUS AND INTEGRATED SYSTEM, METHOD AND COMPUTER PROGRAM FOR DYNAMIC OPTIMISATION AND ALLOCATION OF RESOURCES FOR DEFINED SPACES AND TIME PERIODS

TECHNICAL FIELD

The present invention relates to a system, method and computer program for the dynamic optimisation and allocation of resources for defined spaces and time periods.

In one embodiment, the invention is directed to an online restaurant booking system that optimises the use of space, time, and other operational considerations of a restaurant in order to optimise desired outcomes which may include optimising capacity, ambiance, preferred seating allocation, extended booking duration times, variable and dynamic pricing options, menu and course options and other quantitative and qualitative criteria.

BACKGROUND

To better understand the inventive concepts and embodiments of the invention described herein, an abridged history and of the restaurant industry and known booking systems is described below, to assist in highlighting the technical advantages of the claimed invention. In particular, the functional limitations and inherent technical difficulties required to overcome the limitations of the known art are described below. The known prior art demonstrates the lack of any effective and workable technical solution to the fundamentally technical problems inherent in the optimisation, personalisation and integration of the many aspects of managing a modern restaurant, particularly with regard to automated booking, ordering and automated aspects of service in a restaurant.

Background—Manual Methods for Managing the Modern Restaurant a) The Birth of the "Modern Restaurant" and a La Carte Dining The Modern restaurant (i.e. the characteristics of a restaurant most people would accept as being "typical") developed in about the seventeenth century, when the enlightenment period (in European society) saw a growth of a literate travelling class that were able to read and had "disposable income", which in turn led to the emergence of a need to provide services for this literate travelling class, such as lodging and meals.

What began as a rudimentary meal provision service (usually as part of providing lodgings) developed into businesses that became solely focused on the provision of meals. As time progressed and some businesses that provided meals became larger and more complex, they developed ways to systematise the manner in which the business was operated to address the additional complexities inherent in serving many people concurrently. Over time, small innovations were introduced, such as the provision of different tables for different groups of people (i.e. a move away from communal eating) and the provision of menus (i.e. where people could select the meal they wished to eat). This move towards "personalisation" eventually developed, by the late $17^{th}$ century, into what would be recognised nowadays as a "restaurant".

The personalisation of the dining experience led to the systemisation of certain processes. The systemisation was achieved through the division of labour, for example, for larger restaurants, the person who seats a customer (the Manager or Maitre Di) at their table was different to the person who took the order (waiter), who was different again from the person who delivered the food to the table (food runner), who was different again from the person who cleared and reset the table and the person who collected the payment (cashier). Through the division of labour efficiencies were gained, but as with any process that requires the division of labour, there also grew a need to have more sophisticated overarching management and systems to manage and co-ordinate the various interdependent activities in the running of the restaurant. The requirement for management and division of labour saw the development of many manually implemented methods for achieving many necessary tasks, such as how to arrange tables for customers, how to seat customers, how to communicate to the kitchen which table the food was for, how to communicate to the bar which table the drinks were for, how to communicate to the food runner and bar staff which table they needed to deliver the food and drink to and many other processes. The processes grew in an ad hoc manner, as different restaurants trialed different ideas and also learnt from each other through observation, mentoring and staff movement.

One of the manual processes that was created that has stood the test of time was the numbering of tables and the use of table numbers to identify tables and their location within a restaurant so that the person taking the order could advise the kitchen which table the order was for, who in turn could advise the food runner which table to deliver the food to and so on.

During the process of creating table numbers the concept of table combinations was also developed being the joining of two or more tables to create a larger table. The process of joining tables together was denoted by showing the table numbers of the tables joined linked by a plus sign. For example, if tables 1, 2, 3 and 4 were joined to create a larger table they were normally denoted as 1+2+3+4.

Some of the manual processes developed in the early 1900s are still actively used today by restaurants. However, one specific process or concept is integral to the other processes and is still widely used today is the process of seating customers at "tables" or "table combinations". It is this process that is at the heart of all known systems used in the "booking of a table" or the allocation of a booking request to a table. It is this process and concept that is also the "bottle neck" for the development of new efficient, dynamic and automated table allocations, outcomes and optimisation.

b) The Manual Concept of "Tables" and "Table Combinations"

The creation of the concept of "table combinations" provided flexibility for the restaurant to cater for smaller groups more efficiently by using smaller tables and then joining those smaller tables together to create larger tables. The concept made it possible for a restaurant to use space more efficiently as, for example, a restaurant did not have to carry many different size tables to cater for different group sizes. In other words, the concept minimised the possibility of having to allocate a booking of two people to a table of six when no smaller tables were available which would have resulted in forgoing the potential income from the use of the remaining four seats.

However, the concept of "table combinations" also inhibited and prohibited the "optimisation" of a space. For example, on Valentine's Day a restaurant could potentially better optimise its space if it comprised a floor plan of only tables of two. However, on say Mother's day when whole families (groups of 4, 6 or more) comprise the majority of bookings, a restaurant comprising all tables of two would be inefficient as when the tables are pushed together to create table combinations, the "gaps" or "spaces" between the tables of two are not required and the restaurant would be left with large empty areas within the restaurant.

A concept not immediately appreciated, even by many who work in the restaurant industry, is that the process of joining tables together results in "table gaps" also being "joined together" resulting in large spaces within the restaurant remaining unused and hence not optimising the available floor space. As such, the number of tables and the size of the tables within a restaurant needs to be matched to the customer requirements for each service if the space is to be optimised.

To allow a different number of tables for different services, occasions, days of the week some fine dining a la carte restaurants created furniture store rooms within their restaurant premises. This is similar to the way that restaurants overcame the problem of not knowing how much food or drink they would need for a service by creating cool rooms, dry ingredient store rooms and beverage storage rooms. Some restaurants also adopted the use of folding tables or trestle tables or different size table tops that could be placed on the same table base to minimise the storage area requirements for extra or different tables or when tables were required to be added or removed to meet ever changing and variable booking demands.

The inclusion of furniture store rooms within the restaurant premises was originally pioneered by fine dining restaurants as such restaurants were more focused on how many people could be seated within their restaurant space during "one seating" as compared to casual dining restaurants that overlooked this element, as dining durations were quicker and they could focus on turning tables over during a service. Further casual dining venues find it difficult to manually cope with the complexities of both the concept of maximising floor space and turning tables over (reusing tables) during a service.

From about the 1980's with the expansion of the hospitality industry, the growth in the number of cafes and restaurants, with more restaurants being owned by investors compared to chefs and owner operators, the increase in rental costs, the creation of restaurants in shopping malls and high traffic areas where space is more limited, furniture store rooms within restaurants have become extremely rare.

c) Telephone as the Medium to "Book a Table"

Until the widespread adoption of instant communications technology, the idea of "booking" a table was a rare concept. That is, booking a table at a restaurant only became a common occurrence from around the 1950's when households and businesses installed telephones. Before that time, there was simply no easy way to book a table at a restaurant, so it was far more common for customers to simply walk into a restaurant and request a table.

To take telephone requests to book a table, manual diaries were developed for restaurants to note the details of the reservation requests. These diaries only sought a small amount of information to make the booking process quick and efficient as the table allocation process could be completed by the skill and expertise of the restaurant manager. Specifically, the information collected merely comprised (see FIG. 1*a* at 132):

a) the customer's name;
b) the number of persons for the booking;
c) the booking time (arrival time);
d) the customer's contact telephone number; and
e) a note as to any special requests for manual consideration.

Limiting the manual information collected for a booking made sense, as there are limitations to the amount of information restaurant staff could ask a person on the phone for efficiency and without the customer feeling they were being interrogated for additional information. Further, the restaurant manager would have been incapable, based on the restaurant manager's time constraints and the manual complexity involved, to manually utilise precise and detailed information such as the number of courses being requested, for each booking request.

The limited booking information collected via the telephone, however, was still supplemented by the specific and continued manual involvement and intervention of the restaurant manager. Specifically, at some point prior to a dining service or on multiple occasions prior to a particular dining service, a suitably skilled person would review the bookings received and determine whether any more bookings could be taken and which tables or table combinations the bookings would be allocated to.

The Restaurant Manager as part of this review and allocation of booking requests, would, amongst other things use their skill and experience to undertake some form of the following processes manually:

1. Review the customer booking name, booking size and special requests, their knowledge of the customer, their previous experience in accommodating similar customer requests together with their knowledge of the restaurant and the outcomes required by the restaurant to allocate tables or table combinations to the various booking requests. The key ingredient in this process was the restaurant manager's personal knowledge and experience to determine:
a. which customers to allocate the best tables to, such as a table with a view;
b. which customers were regular customer and should be seated on a better table than first time visitors;
c. which table to allocate to a special occasion booking to such as an anniversary, which may have been to a more private and intimate table or location within the restaurant;
d. which bookings were similar and allocate those similar styles of bookings within one area of a restaurant. For example, bookings with children being allocated on tables next to each other and away from reservations for tables of two which may want a more private and intimate table;
e. what times bookings finished to potentially book tables with similar finishing times next to each other to minimise the adverse impact of one table being reset next to a customer in the middle of their meal;
f. the allocation of certain types of customers dependent on their specific requirements (e.g. business people to tables that may have a bigger gap or distance to the next table so that they have more privacy, etc.); and
g. whether customers have any special needs, such as the need to provide a larger table or bigger chair space for a wheelchair patron.

2. While undertaking the above manual table allocation process of bookings requests a Restaurant Manager also needed to be cognisant and have a very good understanding of the spatial constraints of the restaurant if they were to maximise or optimise customer satisfaction within the physical constraints of the restaurant and the strategic requirements of the restaurant. Specifically, the restaurant manager needed an intimate knowledge of at least the following spatial characteristics of the restaurant:
a. Understanding the utility of tables in the restaurant, for example, which tables have a view or which tables offer greater privacy, which tables are more intimate, which tables are more noisy or which tables are less desirable as they are next to the kitchen door or at the back next to the toilet;

b. Understanding which tables can be "moved" to create a bigger gap to the next table to permit greater privacy if required; and c. Understanding which tables can accept a wheelchair or a disabled person.

3. Also, while undertaking this table allocation process the restaurant manager had the opportunity to overlay staffing levels for that service and ensure that any table allocations are undertaken in a way that was efficient from a staffing perspective, Specifically:

a. Splitting bookings allocations over different areas within the restaurant so that the workload is split evenly between wait staff;

b. Consolidating or condensing bookings over a smaller floor area within the restaurant when the restaurant is short staffed; and c. Placing important customer bookings in a section or area where the staff is more experienced, etc.

As such the manual allocation of a booking request to a table was, in an ideal setting, a deliberate process that took into account information, skill and knowledge far beyond the simple information collected by the reservations staff over the telephone to achieve the desired outcome for a restaurant based on its strategy.

At the end of each booking allocation process, the restaurant manager may have also made notes on the manual restaurant diary advising reception staff what times were still available and what booking sizes could still be accepted so that a person receiving a future telephone booking request would know whether they could accept that booking or what alternatives they could offer. For extremely busy services a restaurant manager may have undertaken the review of table allocations numerous times before the particular service commenced as they kept trying to rearrange allocations for greater efficiency, optimisation and to achieve their desired outcomes of the restaurant. As such, there was no hard rule as to how many times this manual table allocation process would be undertaken other than to suggest it was undertaken on an ad hoc basis.

As the process of answering a telephone to take a restaurant booking is manual involving human interaction, each booking was being personally handled, such that, there was always the opportunity to reallocate bookings to different tables to ensure that a "Super VIP" could still be allocated their favourite table. As such, table allocations, when being manually allocated, allowed for booking allocations to remain dynamic and not static meaning previous table allocations were not necessarily fixed and unchangeable.

As a last step prior to a service a restaurant manager could undertake the allocation process one last time with full knowledge of all booking requests. As such, the restaurant manager was integral and invaluable throughout the whole table allocation process for booking requests received via the telephone.

The restaurant manager could also use their knowledge from the booking allocation process at the beginning of a service to brief staff as to who the customers were that were allocated to tables in their respective sections, the requests and requirements of those customers, if those customers were regulars and if there were any particular things they should know about or do to create a perfect experience and service for those customers.

How often a restaurant manager would apply their skill and knowledge or how much time was allowed for the abovementioned allocation considerations, how effectively they were implemented, and whether they were applied consistently, even within a single service, is difficult to quantify, for the simple reason that such considerations were not codified per se but were taught or passed on from one person to another in the same manner as most other skills were traditionally taught. There is no formal course or specific text that teaches what specific factors that one must consider in the booking allocation process, how to assess those factors and then how to prioritise or weigh those factors in making the booking allocation decision. Lastly, as this booking allocation process was undertaken by different persons for different restaurants or different people within the same restaurant, their personal preferences and experiences, including their underlying ability to reallocate bookings in the most efficient manner, etc., meant that no two persons would necessarily provide the same set of allocations. As such, it is highly unlikely that any restaurant applied any of the above considerations efficiently, effectively and without exception.

Notwithstanding the lack of consistency in application of these concepts and considerations, the manual allocation of bookings to a "table" or "table combination", if done correctly, is a sophisticated process that takes into account the needs of the customer, the spatial constraints of the restaurants and the resources of the restaurant. Therefore, at its best, a table allocation process as practiced by a skilled, knowledgeable and motivated restaurant manager represented the manual (albeit imperfect) "solving" of a very sophisticated multi-variate problem that comprised qualitative variables, spatial and other quantitative variables and resource variables. It is fundamentally a technical problem as it requires the solving of a problem, which is not strictly a mathematical problem per se, but rather is a logic problem that requires a multi-step algorithm that takes into account many separate and sometimes conflicting requirements.

Even with the best of intentions and a high level of skill and knowledge, it was difficult for a restaurant manager to allocate bookings in an optimal manner, even for a smaller restaurant, as the different considerations, permutations and potential table combinations are impossible to properly consider, irrespective of the experience levels, training, skill or wisdom of the restaurant manager within a reasonable period of time. It is widely understood and acknowledged that the profit margins in restaurants are quite small (generally profit margins are less than 5%) so there is very limited time that any restaurant could afford in additional wages for the restaurant manager or another person could spend undertaking this booking allocation process. As such, this manual process was not only applied inconsistently but would have rarely been optimised.

With the expansion of the hospitality industry and with no formal training available as to how to allocate bookings to tables these skills continue to be underdeveloped and rarely applied, except perhaps in some fine dining restaurants.

Known Computer-Implemented Booking Systems Art d) Practical Prior Art Using the Internet as the Medium to "Book a Table"

With the uptake of the Internet by consumers and businesses, companies began looking at ways of improving, streamlining and removing the manual processes of taking restaurant reservations via the telephone, by using the Internet as an alternative communications medium.

OpenTable (www.opentable.com), the world's most popular and largest online booking system, was one of the first available online systems commencing internet and online restaurant bookings from about July 1998. Today, there are hundreds, if not thousands of companies offering online restaurant reservation and booking services around the world including: ResDiary, Yelp, La Fourchetta ("The Fork"), Chope, Tock, Bookatable, EZTABLE, Resy, Zomato, Zurvu, Respak, Seven Rooms, etc. Online bookings services have been available for the last 20 years and have created a new highly competitive multi-billion dollar industry comprising companies who continue to spend large amounts of money in research and development trying to improve their systems and gain a competitive advantage. However, despite the passing of some 20 years and the companies' commitment to research and development, the underlying process which all restaurant booking companies use in their software for the collection of booking information and the allocation of booking requests to tables is substantively identical with no significant or substantial improvements having been made in the last 20 years.

As the differences in table allocation methodologies for all known booking allocation systems is very small, the companies differentiate themselves by the addition of features that do not relate to the core product of real time booking allocations.

All known systems in use today allocate each booking request to a table or table combination immediately upon receiving the booking request and the booking allocation, once made, becomes static, fixed and cannot change. The static and permanent allocation of a booking to a table or table combination acts as a "barrier" to the efficient allocation of subsequent booking requests.

Also all the prior art online restaurant reservations systems use a very similar approach with regard to the quantum of information collected, the type of information collected and the process of using the collected information in the allocation of a booking to a table.

Specifically, the customer information and details requested and captured by known on line booking systems is identical to the information previously collected when booking requests were made using the telephone. As such, online booking systems offer no greater sophistication in the information collection for booking requests.

All online restaurant reservation systems, without exception, use a "static" allocation process to allocate each booking to a table or table combination as each booking request is received and once a booking has been allocated to a table remains fixed at that table without further change or consideration of subsequent bookings. This "static" allocation approach creates numerous problems and inefficiencies that the prior art has not been able to resolve or offer an alternative.

Without the benefit of manual intervention and the knowledge and skills of a restaurant manager, Internet table reservations systems and booking allocation procedures, are in fact significantly inferior to the manual telephone booking allocation procedure, which required manual intervention.

e) Known Systems Only Allow for a "Fixed Number of Tables" to be Included in the Allocation Solution Pool All available online restaurant booking systems can only consider a fixed number of tables which are then placed into a list or lists of "tables and table combinations".

Known allocation software operates with the constraint that a restaurant operates with a finite set of tables, being the tables located within the restaurant. By definition this constraint means that the restaurant floor space cannot be optimised. For example, when a table combination is created to cater for a larger booking and tables are physically pushed together to create the desired table combination, unused space is created. By definition, the restaurant space cannot be optimised as the additional space created by the joining of tables is not utilised. To provide a numerical example, if there exists a row of five (5) tables of two people, there are at least four (4) gaps between the tables of two (2)—when the tables are combined to create a table of ten (10) to accommodate a booking of ten (10) people, a large gap is created by the formation of the pushing together of the tables. The gap creates the potential to bring in at least one additional table of two (2) and take a further booking of two (2). However, known software applications have no mechanism to recognise and fix this problem. This sub-optimal result highlights a significant inefficiency.

In other words, the known booking systems are inherently unable to add or remove tables during the booking allocation process.

f) Prior Art Requires the Manual Compilation of "Tables and Table Combinations" to Form the Total Number of Tables in a Solution Pool The determination of the total number of tables to place in a restaurant and the lists and permutations of "tables and table combinations" within this practical prior art is a manual process and there is no check or control process or mechanism as to the appropriateness, objective or otherwise of the lists of tables and table combinations.

The information that needs to be provided for known software applications to operate are:

1. A manually determined total number of tables to place within the restaurant;

2. A manually determined list of all tables and table combinations in order of preferred allocation priority; and 3. A prioritised list of tables and table combinations that include the maximum and minimum booking numbers that can be allocated to each table or table combinations.

Once determined, the list of tables and table combinations for a service or period cannot change and the "pool of solutions" from which to allocate a booking cannot change nor can the order of priority in which tables are allocated.

The determination of the number of tables and the lists of "tables and table combinations" are manually prepared and there is no check mechanism to ensure the appropriateness or efficiency of the total number of tables selected or the list of tables and table combinations.

g) Known Systems Only Offer "Static" and "Linear" Allocation" of Bookings to Tables and Table Combinations in the Solution Pool The universally applied methodology for the allocation of bookings to restaurant tables is through the manual creation of a prioritised static list or lists of "tables and table combinations" to which a simple "look-up" style formula is applied to find the first available table or table combination to which a booking has not been previously allocated. This approach is referred to as being "static" and "linear" as it is based on the procedure of allocating booking requests on an "immediate", "First-In; First-Seated" basis, and once the table allocation has been made the allocation remains "permanent" and fixed and is not changed or reconsidered during any subsequent booking request.

No better system has been applied since the original immediate, static, "First-In; First-Seated" method for the allocation of bookings to tables or table combinations was developed in the late 1990s, when computer-implemented booking systems first became available.

FIG. 1*a* is an image of a cover 134 and a sample page 132 of a diary utilised to manually record bookings. FIG. 1*b* is a screenshot from Respak (www.respak.com) showing a static prioritised table ranking and allocation list 136. FIGS. 1*c* and 1*d* are screenshots 138 and 140 respectively from the ResDiary (www.resdiary.com) system showing the use of a similar static table combination list and the prioritising of the table combinations. FIG. 1*e* are screenshots of the input for the table combinations into the OpenTable (www.opentable.com) system 142 and 144. OpenTable varies from the other abovementioned static priority lists as OpenTable does not allow the user to input the priority of the static allocation list the system, rather, it automatically allocates a booking to the smallest best fit "table number" or "table combination" number available and then moves to the next smallest best fit table number or table combination number. As such, the OpenTable approach sets the priority through the use of the table number as the ranking system. In many ways the approach by OpenTable in applying the allocation on table numbers places greater restrictions on a restaurant. The control of the prioritisation of bookings by table number under the OpenTable system means restaurants are now restricted from using table numbers which are solely focused on the physical location of a table within the restaurant.

For any given booking request the abovementioned systems do not consider previously allocated tables or table combinations. This methodology creates inefficiencies with regard to any possible optimisation.

h) Prior Art Requires Manual Intervention as Prior Bookings are Permanent, Fixed and Immovable Internet-enabled static booking allocation software requires more manual intervention than telephone booking requests as each booking request is immediately allocated upon the receipt of the booking request.

The creation of online restaurant booking systems have had the benefit of reducing time required by staff spent on the phones as when bookings come through the internet a receptionist's work load is reduced. However, restaurants using such systems are in a disadvantageous situation when it comes to optimisation of the restaurant space as they are required to manually review the continuous static allocations made by the system more frequently to ensure that subsequent Internet bookings are not rejected by poor prior allocations by the system.

i) Known Systems have No Knowledge of Restaurants Spatial Characteristics

Known systems have no ability to take any of the spatial characteristics of a restaurant into account when making a booking allocation to a table.

The spatial characteristics with a restaurant that could be used to allocate bookings can include; special tables such as window tables or sections, classes or areas with a view and ranking of all tables. These processes are a necessary part of the daily activities of a restaurant manager.

j) Known Systems Cannot "Sell" a Table or Offer Specific Tables for Selection by a Customer Known systems cannot re-arrange allocated bookings to sell or offer a specific table to a customer.

Known systems also cannot control the capacity of subgroups of tables and table combinations—that is, known systems cannot withhold a specific table or table combination or areas for sale with confirmed availability.

k) Known Systems Cannot Consider Customer Requests and CRM Information

Known system do not have any ability to autonomously receive, process and/or act on any customers requests, customer history, customer priority or any other details into consideration as part of the booking allocation process.

l) Known Systems do not Permit a Customer to Personalise their Experience

Allocating bookings to tables and table combinations on a "immediate", "static", "First-In; First-Seated", "permanent", basis results in a very simple process in the allocation of bookings which does not permit bookings to be prioritised or allocated based on other constraints, such as, customer status, customer time duration requirements, customer menu selection and course selection nor the ability to charge a customer a different amount of money for a change to the standard constraints attached to a booking.

Known systems do not recognise that a restaurant booking can represent a booking where a person wishes to tailor and personalise their entire evening so that their experience can be more bespoke and unique. Customer Personalisation Inputs include:

1. Permitting customers to select their specific table, or table type or table location as well as time durations, menus and other constraints;
2. Permitting a customer to personalise their occasion with the addition of third party services not normally offered by restaurants, such as, flowers, guitarist, a box of chocolates to take with them at the end of the meal;
3. Permitting a customer to change the order of service normally offered by a restaurant;
4. Permitting a customer to request a particular waiter or to request their own personal waiter; and
5. Permitting a customer to personalise their occasion, for example with, a champagne bucket with a bottle of champagne on their table on arrival, a message written on their dessert plate, a specially created dish or a specially sourced bottle of wine.

m) Known Systems Cannot Factor Time as a Perishable Resource in the Allocation of Booking While time management has been considered in the management of tables and table combinations, prior art solutions have only considered time as one standard unit of measure for all different bookings irrespective of any further considerations such as different menus that may be offered by the restaurant and the number of courses that may be planned to be consumed by a customer. The prior art is unable to consider or discriminate between different menus, different number of courses, different group sizes, different occasions or other factors that need to be understood and considered for a more accurate allocation of time to a booking.

The prior art does not factor the time required to reset a table before it can be reused as a constraint in the optimisation of a restaurant's capacity as a discrete unit. Further, the prior art cannot vary the time taken to reset a table before the table can be reused for the next booking depending on the number of staff that are working on a particular shift or service or the style of restaurant or any other variable relevant to the restaurant.

The prior art does not factor the time people take to consume a meal based on parameters of menu selected, number of courses, group size, occasion and then use this information to provide recommendations or to automatically update the system for future booking duration time allocations.

The prior art does not factor the time taken by a restaurant to reset a table and how the process of a resetting a table can be improved or reduced so that the valuable resource of time is optimised.

The prior art does not consider time as a variable that can be optimised to increase the utility to the customer while improving the efficiency of the restaurant. For example, if a customer wishes to stay longer in the restaurant without increasing their spend they are reducing the available revenue potential of a restaurant. The prior art cannot offer additional time for a booking for an additional charge if a booking wishes to stay longer or offer a discount or benefit if a booking is willing to commit to stay for a reduced time.

n) Known Systems Cannot Offer Dynamic Pricing and Dynamic Product Offerings in the Booking Allocation Process Known systems do not have the ability to rank and discriminate the relative or perceived utility or value or rank of a table, area, subarea, sections, classes or location within a restaurant. For example, a table with a view being of perceived higher utility and desirability, and hence value, than a table in a back corner next to a toilet.

o) Known Systems Cannot Control Capacity (Table Availability) Offered by Menu or Other Constraints so as to Permit the Application of Yield Management in the Booking Allocation Process By definition yield management involves and requires the strategic control and allocation of capacity (in this case, a restaurant's tables, chairs and stools) to sell the right menu with the right number of courses to the right customer at the right time for the right duration of time for the right price. In this regard, the limitations of static linear combinatorial priority lists are unable to control capacity and adopt sophisticated yield management techniques as part of the allocation process.

As known systems cannot effectively control capacity or the allocation of capacity, attempts at constraint management or yield management have been limited to simple manual promotions offering discounts without reference to the particular tables or table combinations that these promotions could be applied to and have been limited to discount promotions such as:

1. Static pricing such as offering a discount for an early booking;
2. Static product offerings such as a free glass of wine for an early booking;
3. Static pricing such as a 20% discount for pre-theatre dining; and/or
4. A booking fee charged for the selection of a preferred service such as a Friday or Saturday evening.

Known systems do not and cannot consider any yield management measures like revenue efficiency. Revenue efficiency is the product of the utilisation of capacity in a space for a period of time measured in units of time (including the ability to bring in additional tables and chairs or the ability to remove tables and chairs from a restaurant) multiplied by the revenue generated from the space for the service period as compared to the revenue that could have been generated during the service period if all sales, discounts and promotions were assumed to have been sold at their normal recommended retail price.

The prior art as it relates to yield management was succinctly outlined by Heo, Cindy Y., Ph.D, Associte professor, School of Hotel and Tourism Management, The Hong Kong Polytechnic included in the publication "Revenue Management for Hospitality and Tourism", by Patrick Legoherel, Elisabeth Poutier and Alan Fayall, published May 2013, chapter 8, "Restaurant Revenue Management" page 2. Dr Heo writes:

"Revenue management generally involves segmenting customers, setting prices, controlling capacities and allocating inventories to maximise the revenue generated from a fixed capacity" [underlining added]

In this regard, the restaurant yield management prior art makes no reference, explicit or implicit, to controlling capacities such as window tables, preferred tables, high demand tables or to optimising the allocation of bookings to tables. The prior art merely attempts to limit the amount of bookings taken for a particular time interval to ensure that a restaurant is able to service the amount of bookings taken at a particular booking interval using a list of manually created tables and table combinations.

Further, the allocation of inventories in the prior art is limited to segmenting a service period into fixed period seating periods which in itself does not address the issue where a peak dinner booking time for a restaurant being 7:30 pm where the two selected seating periods being 6 pm to 8 pm and 8 pm to 10 pm. As such the prior art does not address the peak booking time of 7:30 pm and cannot set an appropriate price for a 7:30 pm dinner which may provide a better revenue and contribution than two separate bookings, one at 6 pm and one at 8 pm. With ineffective control of capacities and inventory allocation the prior art could not segment customers and set changing or dynamic pricing.

Dr Heo compares yield management in Aviation and its applicability within a restaurant environment and concludes:

"However, non-traditional revenue management industries such as restaurants have unique business characteristics", page 1;

"These unique characteristics of restaurants pose special challenges to restaurant operators and consequently require more creative revenue management strategies." Page 2;

"However, the revenue management strategies that are currently implemented by restaurants merely focus on discounting prices during low demand periods", page 2; [underlining added]

"Restaurants have the potential to incorporate revenue management practices in their operations, but cannot simply apply the same revenue management strategies as those used by airlines and hotels" page 7. [underlining added]

While Dr Heo suggested the possibility of applying certain types of yield management techniques to the restaurant industry, her conclusion was that the application of such techniques presented a number of challenges, however Dr Heo failed to offer any solutions to the challenges identified.

As Dr Heo outlines, even in "manual" form (i.e. a person performing abstract calculations), past attempts to apply the same revenue and yield management strategies as those applied by airlines and hotels to restaurants result in a number of challenges. As such, the application of yield management techniques to a restaurant environment is not a simple and logical extension of the airline and hotel yield management techniques. The reasons why restaurants offer far greater challenges for effective yield management than airlines and hotel include:

a. Airlines and hotels have known capacities, for example the addition of one more chair or one more room within an aeroplane or hotel is not possible so they have a known and fixed capacity. In a restaurant, the addition of one more chair or one more table, or a different table layout means that a restaurant does not have a fixed, easily identifiable, known and manageable capacity—the variable nature of capacity in a restaurant results in an exponential growth in possible outcomes;

b. Airlines and hotels have a known physical capacity such that each seat or room is known and is usable. With a restaurant. Many variables may affect total capacity, beyond the number of chairs and tables available. For example, a restaurant may contain external seating whose availability is subject to the weather and not usable during some service periods;

c. Airlines and Hotels have a known physical environment; for example, the seating configuration within an aeroplane is not changed in line with booking requests. Specifically, a booking request for 10 people for a particular flight does not require that all customers be grouped together in adjoining or adjacent seats—each person can take any available seat within the aircraft. In other words, there is limited or no requirement to reconfigure seating on the aircraft to accommodate the booking request. Similarly, with a hotel, rooms are of a known size with known physical attributes and if a booking cannot be accommodated within one room the booking can generally be allocated a different room with similar amenities. Moreover, there is no requirement for the room to be adjoining. With restaurants however, a large number of constraints limit the ability of a restaurant to allocate a table. For example, when a restaurant receives a booking request for 10 people, the 10 people must be placed on the same table and cannot be randomly placed on tables or seats anywhere within the restaurant. Further, the restaurant booking also requires that their table is separated from other tables for privacy. The problems and further difficulties faced by restaurants as compared to airlines and hotels if further compounded by this additional complication;

d. Airlines and Hotels have known configurations from one flight to the next or one day to the next while restaurants do not have known configurations. For example, the table configuration on Valentine's Day may be for all tables of two yet on a different day like Mother's Day it may be for larger tables making the control of capacity for restaurants more complex than that of an airline and a hotel;

e. Airlines and Hotels have a known duration of service. Specifically, an airline knows the length of a flight and flight time. This is similar to a hotel that offers rooms for fixed durations. With a restaurant, the complexity is much higher than that of an airline or a hotel as the length of meal durations is variable and unknown and based on many unknown variables to a restaurant such as occasion, group size, number of courses to be consumed, etc. This further unknown adds additional complexities to the restaurant capacity control problem;

f. Airlines and Hotels have known arrival times and known departure times. Generally speaking all flights take off at a specific time and all flights arrive at a specific time. With a restaurant environment, for example, you have people arriving for dinner at 6 pm, 6:30 pm, 8:pm, 8:30 pm and then leaving at random times making the control of restaurant capacity unpredictable and more complex;

g. Airlines and Hotels do not have to consider walk-in customers within their capacity control considerations. Firstly, once an aircraft leaves the airport its capacity is closed as it cannot take any more customers. Similarly, hotels do not rely on walk-in customers. With many restaurants, however, a significant part of their business may be walk-in customers and a restaurant has to consider whether its walk-in customers offer greater revenue potential than booked customers and how much of its capacity it should reserve for walk-in customers. Just as a restaurant should consider what bookings to accept prior to service and how the restaurant table layout should be configured to ensure that it has flexibility to accept walk-in customers;

h. Peak times for an airline and hotel last are longer than a restaurant and therefore are easier to manage. Specifically, peak-times for airlines and hotels include as a minimum of at least one complete flight or one complete day, while peak times for a restaurant may only be at say 7:30 pm on a Saturday night which is far more difficult to control. Restaurants therefore need greater accuracy in the planning and control processes;

i. Service provisions for an airline and for a hotel are relatively standardised within each class as the food beverage and refreshments are standardised as is the make-up of the room. With a restaurant service the standards, in many cases include the selection of food and beverages from a menu (a la carte service). Further when selecting items from a menu, customers are also permitted to also advise cooking instructions, if they have allergies, dietary requirements, ordering at their own pace, different requirements for information about the food or other items meaning that duration planning is further complicated and has greater variability; and j. Competition and substitute products are more readily available within a restaurant environment than with airlines and hotels so the process of delivering different promotional offers is more time sensitive than airlines and hotels. As such restaurants require more creative revenue management strategies than airlines and hotels.

As a result of the above complexities the prior art has not been able to apply airline or hotel yield management strategies to restaurants. Further, references in the prior art to yield management as applied to restaurants has been incorrect as correct yield management requires the strategic control of inventory to sell the right product to the right customer at the right time for the right price. The restaurant management strategies that are applied by the prior merely focus and apply discounting prices and complementary prices during low demand periods. Discount pricing techniques including promotions like "happy hour" and "early bird dining" are not based on yield management but rather on simple ad hoc discounting.

The prior art process of determining the right mix of tables and optimal mix of tables within a restaurant does not address any concept of "dynamic capacity". The prior art approach proposes that it is best to have a fixed table for 6 people if a booking is expected for 6 people. A predetermined estimate of the correct mix of tables only serves as a rough approximation of limited value in the control of capacity as it does not allow for dynamic capacity.

The prior art does not provide a process to control duration time other than applying a standard and universal time duration period for all bookings. As a result of this standard duration time, as an example and in simplistic terms, restaurants have merely focused on trying to achieve two seating periods on busy services such as on a Saturday evening, one between 6 to 8 pm and another from 8 pm to 10 pm. By taking this approach, restaurants have denied themselves the opportunity of implementing dynamic pricing such as charging a higher amount for a booking that specifically requires a 7:30 pm time. Through this practice restaurants cannot adopt proper revenue management techniques and yield management techniques such as dynamic pricing and differential products and menus and remain limited to simple discounting on off-peak or low demand times.

The prior art apart from teaching of the difficulties in applying airline and hotel yield management strategies to restaurants cautions restaurants from doing so. Renza Etemad-Sajadi and Arnaud Durand, in their paper "Revenue Management practices in restaurant industry vs airline/hotel industries" published in the International Journal of Quality and Reliability Management, Vol. 35, Issue 4, 2018, pages 846-856 (Emerald Publishing) concluded:

> "Despite the fact that revenue management practices are well known and accepted for airline and hotel industries, they are not acceptable to clients in restaurant industry. The consumers seem to accept the rules of price variability in airline and hotel industries, but they do not see the benefit for them in restaurant industry".

However, the prior art also appreciated the importance of a restaurant having the right table mix. Sheryl E. Kimes, in "Restaurant Revenue Management" Cornell Hospitality Report, 4(20, 4-34 (2004), states:

"One of the major advantages of a table ix that matches the customer mix is that it takes much of the guesswork out of which party to seat at which table"

"Research has shown that an improved table mix can increase revenue potential by up to 35 percent without an increase in customer's waiting time"

Dr Gary M. Thompson in his paper "Optimising Restaurant Table configurations: Specifying Combinable Tables, in Cornell Hotel and Restaurant Administration Quarterly 44(1) 53-60, review the processes by which table mix and table configuration could be optimised.

The prior art focused on attempting to estimate and determine configuration and table mix prior to the receipt of a booking request as compared to determining the configuration and table mix upon receipt of a booking request. As such the prior art is inherently unable to address the issue of "dynamic capacity"—that ism, allowing restaurants to vary capacity to better accommodate an increase or decrease in tables.

Due to the difficulties in implementing yield management within the restaurant industry and the perceived adverse customer reaction to differential or dynamic pricing within the restaurant industry the prior art has not been able to find a solution for the introduction of yield management to the restaurant industry despite the proven success of yield management within the aviation, hotel and car rental industries.

p) Known Systems Cannot Offer Complete and Seamless Integration Between the Different Restaurant Systems Know systems do not offer effective integration between discount and promotional apps, restaurant booking widgets, apps and systems, electronic menus, point of sale systems and payment solutions as the booking allocation process requires continuous manual intervention to achieve the desired outcomes of the restaurant or offer a dining experience that can be tailored to a person's specific requirements.

Known restaurant systems are stand alone, with many independent and different systems with different software and hardware solutions being used to bring together a very cumbersome and ineffectively integrated solution for the optimisation and management of a restaurant. In the known art, the use of different and potentially overlapping systems is inefficient and requires significant manual co-ordination. For example, pre-booked customers, walk-in customers and home delivery orders are generally handled in different manners and through different systems, yet they each impose different demands and requirements on the ability of a restaurant kitchen to process orders. If orders are not co-ordinated correctly and managed possible delays in preparing numerous orders could create detrimental effects which could damage the reputation of the restaurant and may even result in the demise of the restaurant.

Known systems also fail to provide an integrated system for the offering of gift cards or the acceptance as a form of pre-payment to permit a streamlined and autonomous booking and payment process.

Known systems also fail to adequately apply information from Customer Relationship Management (CRM) systems in the allocation of tables to customers to better tailor the customer's booking experience or by giving priority and allocating better tables to more loyal customers or customers who could bring a better social media outcome for the restaurant.

The multiplicity of systems offered by the prior art and the numerous manual interventions required teaches away from the use of a single central system from which all other restaurant systems can logically be integrated into to form a complete, integrated and autonomous restaurant system. This is despite the obvious benefits of an integrated and autonomous restaurant booking allocation process and an integrated and autonomous solutions to increase the revenue of a restaurant, the better meeting of customers' requirements, reducing costs, forecasting demand, adjusting operating constraints, developing resource requirements and staff requirements, providing additional services such as tailoring a customer's experience, home delivery and gift cards.

To put it another way, as the prior art has not been able to improve the table allocation process many companies providing on-line restaurant reservations have stated that there is no better way to allocate booking requests to tables than the processes already available. Further, many of the companies have abandoned trying to improve the booking allocation process and are now focusing on additional features to their systems. To give a racing car analogy of what is happening with many online booking system providers; they have abandoned trying to make their racing car go faster as they do not know how to do it, and are now focusing on features such as adding metallic paint, tinted windows, mag wheels, rear spoilers, which, if anything merely add to the manual processes of maintaining the car without any additional benefits to the speed of the racing car. That is differentiation by appearance than differentiation by performance of the core characteristic. Specifically, most, if not all, online restaurant booking systems now offer are "integrated" CRM system. However, these CRM systems do not and cannot be linked and form part of the table allocation process. An example of the inefficiency of this prior art is that while many of the prior art CRM's record a customers' favourite table, none of the prior art systems can use this information in the booking allocation process to allocate a loyal customer to their favourite table.

q) Prior Art Recognised the Problems of Static Table Allocations and Sought to Find a Dynamic Table Allocation Solution (Vidotto, 2009)

Vidotto in his thesis entitled "Managing Restaurant Tables Using Constraint Programming", National University of Ireland, November 2007, sought to find a dynamic booking allocation process. Dynamic allocation, in this context refers to the process whereby each time a booking request is received all previous bookings are unseated and then all booking requests are considered contemporaneously in an attempt to find an optimal table allocation solution. In theory a dynamic allocation process should permit the restaurant to take more bookings as previously allocated bookings acting do not act as "barriers" to a more efficient allocation of booking requests to tables.

Vidotto acknowledges the existence and the static nature of this practical prior art on page 1 in his theses where he states:

"On current systems, booking and floor allocations are done manually, and require experienced personnel. The first computerised table management programs have recently started to appear in some busy restaurants, but most of them provide no advice to the user, and do not support dynamic table reallocation." [underlining added]

In his thesis Vidotto also outlines the purpose of his research and his thesis as an attempt to find a practical solution to the prior static allocation process as well as offering assistance in the management of a restaurant on page 1 where he states:

"Restaurant table management could be improved if we could develop software that can be used by staff with less expertise and knowledge, and that can help the automation and optimisation of the (dynamic) allocation process" [underlining added]

However, the proposed solution put forward by Vidotto is incapable of the "optimisation of the (dynamic) allocation process". The best Vidotto's proposed solution can achieve is to maximise the number of bookings taken on the manually pre-determined pool of table and table combinations that form the total pool of solutions from which a table allocation can be made.

Vidotto also teaches away from the introduction of a large number of variables and constraints within his proposed booking allocation formula due to the impractical computational times required by his proposed formula as the number of variables and constraints increase.

r) Constraint Programming as the Only Solution to the Dynamic Booking Allocation Problem Vidotto clearly delineates the scope of his work in his thesis, with the title being:

"Managing Restaurant Tables Using Constraint Programming"

Vidotto then states in his "Abstract":

"the core of the issue is a complex dynamic combinatorial problem", [underlining added]

Vidotto reinforces his view as to what he believed the solution to the dynamic allocation problem was on page 1 where he states:

"In computer Science terms, table management is an online constrained combinatorial optimisation problem". [underlining added]

While in Chapter 3, page 27, Vidotto introduces his specific view of constraint programming where he states:

"A constraint program represents the problem as a Constraint Satisfaction problem (CSP), and then solves the CSP with a combination of constraint propagation and search (typically backtracking search)"

"In CP terms, representing a problem means selecting a set of decision variables, each with a domain of values, and a set of constraints over these variables that restricts the values that subsets of variables can take". [underling added]

From a technical perspective, Vidotto only describes the use of the known mathematical formula and technique of "constraint programming".

Based on the above, it is clear that Vidotto's work is solely based on and revolves around the use of tables and table combinations as the solution or domains within a CSP to define and solve the restaurant table management problem.

Bossert, in patent application publication no. 2009/0292566 A1, published 26 Nov. 2009 clearly indicated and noted that "constraint programming" was the base upon which his capacity calculation model was built, thus following Vidotto.

Bossert not only acknowledged the existence of the theoretical art of "constraint programming" for the dynamic allocation of bookings to tables in his cited art in paragraph [0047] of his patent application, but also acknowledged within that paragraph his use of the prior art of constraint programming as the solution for the capacity determination and the allocation of booking requests to tables. Specifically, at paragraph [0047] Bossert states:

"Methods to perform the calculations of capacity module 60 exist in the prior art. For example, mathematical and logical constraints can be used to describe the seating capacity of a restaurant whose tables may be reconfigured and constraint programming solution procedures can determine or at least estimate whether the restaurant has sufficient capacity to accept a set of table reservation requests". [underlining and bolding added]

Form the above it is clear that Vidotto and Bossert disclose "constraint programming" as the only known system and mathematical approach that can solve the problem of dynamically allocating booking requests to restaurant tables.

s) Definition of Constraint Programming

In Chapter 3, page 27, Vidotto introduces his specific view of constraint programming where he states:

"A constraint program represents the problem as a Constraint Satisfaction problem (CSP), and then solves the CSP with a combination of constraint propagation and search (typically backtracking search)"

"In CP terms, representing a problem means selecting a set of decision variables, each with a domain of values, and a set of constraints over these variables that restricts the values that subsets of variables can take". [underlining added]

It is noted that "constraint programming" refers to the construction of a specific type of mathematical formula. While "constraint programming" uses "constraints" or "constraint information" to classify or filter the variables within the "constraint program", the use of constraint information in order to determine a solution does not imply that any mathematical or logical program that utilises constraint information is an example of "constraint programming". "Constraint programming" refers to a specific and particular type of mathematical "process and formula" to be used to solve the problem and not to the use of individual constraints within any formula or any mathematical equation.

In other words, the reference to "constraint programming" in the prior art is a very specific term of art in the field of mathematics and computer science. Vidotto's work is based on the use of CSPs to define and solve the restaurant table management problem.

The term "constraint information", in contrast, is not a term of art in the context of mathematics or computer science. The term "constraint information" is to be ascribed a plain meaning to those skilled in the art, namely those who work and operate restaurants or analogous enterprises where physical space needs to be managed in some manner. The use of the term "constraint information" is intended to include information that defines the physical characteristics and limitations of the space (which may be broadly characterised as the "resources" available, and also the desired outcome with reference to the restaurant's strategy or the customer experience (e.g. a VIP customer wishes to dine at a particular table)). These disparate yet interrelated pieces of information form a collection broadly referred to as the "constraint information". This is a very different concept from the mathematical and computer science concept of "constraint programming".

By definition, the constraint satisfaction problem is one where all possible solutions are determined from a fixed list of tables and then values and constraints are set so that when a new variable (booking request) is received a new search can be undertaken to find the best a pre-defined and developed solution. In this regard, on page 88, Section 3.1.1, Vidotto outlines his specific implementation of the CSP as follows:

1. Decision Variables: these are the booking requests, defined as the number people or party size of the booking
2. Values: A list of all tables and the number of people that can be seated at those tables
3. Domains of Values: (solution pool) an exhaustive list of all the possible "tables and table combinations" (similar to the solution list created by the practical prior art) from which the solution can be found as manually determined from a finite and fixed number of tables
4. Constraints: (constraints are applied to variables for which a solution is sought to restrict to limit the solutions (values) that the variables can take. Alternatively stated, a list of the different conditions that must be met prior to the allocation of a booking to a table or table combination, these conditions or constraints may include:
   - a) booking start times;
   - b) no-overlapping;
   - c) acceptable booking sizes; and
   - d) time allocated to a booking on a table.

Vidotto acknowledges that the computational time required to solve a CSP is excessive and not commercial in his thesis at pages 89 to 90. In an attempt to overcome these problems Vidotto introduces "Pre-solving Checks", "Symmetry breaker constraints" and "Ordering Heuristics", making the CSP he implements very complex, such that the only people who can understand the underlying mathematics and logic would be mathematicians with specific knowledge of the field of constraint programming; something that is extremely distant and remote to the understanding of a Restaurant Manager.

In the conclusion to his thesis titled "Managing Restaurant Tables Using Constraint Programming", Vidotto confirms his thesis is focused on constraint programming as the potential solution to the management of restaurant tables (no mention is made about the management of the restaurant space) where he states on page 232:

> "Constraint programming can be used as a tool to support, enhance, and automate uncertain and highly dynamic restaurant table management" [underlining added]

Further, Vidotto states on page 238:

> "The research is valuable for restauranteurs, but also for the constraint programming community. Restaurant table management has no history in the literature of constraint programming. We believe that this dissertation represents a good and already advanced baseline for tracking an interesting and novel, dynamic and highly uncertain problem." [Underlining added]

Lastly, on page 238 Vidotto states:

> "In scientific terms, our use of constraint programming algorithms for optimised reconfiguration in the face of uncertainty is also novel."

Vidotto's developed and proposed CSP, and CSP's generally, in the context of managing restaurant tables, have not been applied in any practical application and have never progressed beyond the realm of theory. Also the limitations of constraint programming prevent constraint programming, as a concept, from being capable of being reduced to practice in industry. These limitations include but are not limited to:

1. A table allocation can only be made from the pool of solutions defined as "Domains" within the CSP. Further, these domains are manually calculated and inputted within his constraint satisfaction problem called "Tables and Table Combinations". As such the CSP does not calculate an answer, it merely searches and selects the best answer from a pool of predetermined solutions, or to put it another way, the CSP is merely a search mechanism arranged to locate a solution from the predetermined pool of answers within the CSP (this approach is no different to, and suffers from the same limitations, as other known systems);
2. The pool of solutions defined as "Domains" do not comprise the total possible number of possible solutions as they are related to a selected fixed number of tables. Specifically, they are related to the number of tables that are to be set within a restaurant. As such, all tables and table combinations can only be determined form a fixed number of tables within the restaurant. The CSP has no ability to consider additional tables or remove tables from a restaurant's standard floor plan to offer a truly optimised solution (this approach is no different to, and suffers from the same limitations, as known systems);
3. The optimisation of the CSP does not take into account any relationship established with the floor space within the restaurant, and hence, the optimisation of that floor space (this approach is no different to, and suffers from the same limitations, as the known systems);
4. The determination of the pool of solutions (Domains) comprising the "tables and Table combinations" does not eliminate the need of a Restaurant Manager. Further, the skill of the Restaurant Manager would be required on an on-going basis should there be any changes to the size of the tables, the way the tables were being set up, the quantity of tables etc. (this approach is no different to, and suffers from the same limitations, as known systems);
5. With the determination of the pool of solutions (Domains) comprising the "tables and table combinations" the CSP does not offer any checks and balances to ensure that all appropriate solutions have been included within the CSP to ensure that any selected solution is in fact an appropriate solution. At best the CSP can only offer the best solution from the list of inputted solutions (this approach is no different to, and suffers from the same limitations, as known systems);
6. As the CSP is manually defined and inputted it is an expensive exercise that has to be tailor made for each individual restaurant. In other words, each implementation is expensive to maintain and to reprogram if the restaurant makes changes to its number tables, size of tables or table combinations, making the resultant product too expensive and inflexible for most restaurants;
7. Any changes to tables etc. also require significant manual time and analysis to determine new table combinations and the other inputs to the CSP;
8. The constraint information included in a CSP is only a small subset and a very elementary and simplified representation of all the constraint information that a Restaurant Manager should take into account in the allocation of a booking. For example, the CSP does not refer to a CRM (Customer Relationship Management) database to understand the importance and priority of customers or to know what table to allocate specific customers to, such as their favourite table, or a window table, or a quiet table. As such, the CSP solution can never approximate the level of personalisation provided by that of the Restaurant Manager (this approach is no different to, and suffers from the same limitations, known solutions);

9. The CSP cannot offer a specific table to a customer during the booking process or guarantee a specific table to an individual booking request; and
10. The CSP is conceptually (and practically) a complete "mini universe" and once the subset of real world constraints and outcomes (table and table combination) are set up within this high level mathematical equation there is no simple interface that allows a user to amend the mathematically derived constraints. Further, even if a user interface were to be provided the CSP still requires mathematical experts to re-calibrate the resultant equation and no checks and balances exists to prove that the subset that has been created is a complete subset (this approach is no different to, and suffers from the same limitations, as known systems).

t) In Using Pre-Defined Solutions of "Tables" and "Table Combinations" and the System Cannot Offer Optimisation The system of Vidotto is based on the ability of a restaurant to "optimise" bookings through a restaurants ability to search and find a solution from the pool of tables and table combinations when allocating bookings.

Vidotto's acknowledges that his system searches for a solution. In this regard, Vidotto at page 78 states:

"We present a study concerning the design of search algorithms, again, finalised to produce a more efficient search. We conclude by showing the benefit achieved on both representation and search algorithms from comparing the solution we finally achieved to the original, and others recommended by literature" [underlining added]

Vidotto, at page 227, in providing suggestions for future work that could be undertaken to build upon his system, states:

"In this thesis, we have modelled table management as a constraint satisfaction problem. In particular we have developed a search approach based on multiple heuristics and time slicing, which we have demonstrated improves search efficiency and robustness for solving the table management problem compared to other recommended approaches." [underlining added]

Tables and table combinations are critical to the functioning of the Vidotto system so that a search for the solution can be undertaken. Further, the concept of "table combinations" does not offer a fundamentally better solution to the booking allocation problem.

In summary, any system that does not allow additional tables to be brought into a restaurant or tables to be removed from a restaurant cannot optimise a space within a restaurant. Vidotto's proposed solution therefore contains the same fundamental technical problems found in the previous practical art, the only difference being that the solution provided utilises a different system for searching for a table, which only results in the creation of a system that is not practical in implementation.

u) Use of Constraint Programming is not Practical

Another major drawback in the application of Vidotto's solution is the requirement whereby the restaurant manager, a mathematician, and a computer programmer are required to manually develop, define and maintain the system.

v) Use of Scheduling Programming in Conjunction with Constraint Programming is Computationally Inefficient While constraint programming represents the core of Vidotto's work, Vidotto did not use constraint programming in isolation as constraint programming cannot account for the dimension of time. The dimension of time is important to a restaurant as a booking request utilises a table for a period of time, after which the table is vacated and becomes reusable. Time is therefore an integral component of any efficient booking process. Vidotto introduces the scheduling aspect to account for time in his cited art on page 61 where he states:

"Scheduling jobs with fixed start and end times (SFSE) is a subclass of scheduling, and represents the base for our scheduling model for the restaurant table allocation problem" [underlining added]

Vidotto then builds upon his base scheduling model of his cited art on page 78 where he states:

"In the next section we represent table management as a scheduling problem, with tables as resources and parties and tasks with fixed start and end times. We then introduce an initial (basic) CSP representation of the static problem. We extend the original representation with some pre-solving checks and additional constraints designed for improving the efficiency through enforcing extra constraint propagation. We present a study concerning the design of search algorithms, again, finalised to produce a more efficient search. We conclude by showing the benefit achieved on both representation and search algorithms from comparing the solution we finally achieved to the original, and others recommended by literature" [underlining added]

Vidotto, then summarises the contribution of his findings on page 233 where he states:

"Restaurant table management is a complex and dynamic problem: restaurants must manage reservations and unexpected events in real-time, making good use of resources, and providing good service to customers. In this dissertation, we represented the dynamic table management problem as a sequence of static problems linked by changes. We modelled the underlying static problem as a sequence of static problems linked by changes. We modelled the underlying static problem as a subclass of scheduling with fixed start and end times." [underlining added]

It was through this process that Vidotto was able to incorporate time within this work and then display the results on a Gantt. In our opinion, this process is disconnected as the relationship between the scheduling program and software and the imbedded or sub-set constraint program do not have a natural or common denominator for this process to mathematically or logically flow. The disconnection of spatial concepts and time in the cited art of Vidotto are highlighted by the unusable layout and format of the information he presents in FIG. 7.4 on page 210. Specifically, he refers to FIG. 7.4 where he states:

"User interface, displaying a table map of the new seating plan with party"[underlining added]

Use of the term "table map" in this context is completely misleading and the information within FIG. 7.4 is of little use to a restaurant manager as:

1. In common usage, the term "table map" is synonymous with the words "table plan". FIG. 7.4 is not a "table plan" of the restaurant or a representation of the layout of the tables within the restaurant floor plan.
2. FIG. 7.4 merely contains a representation of various boxes that are not laid out in any easily identifiable pattern, or a representation of the layout of the tables within the restaurant.
3. The information contained within each of the boxes is very difficult to decipher and without reference to the column of information to the left is meaningless to a restaurant manager during a high pressure service period. For example, the booking at 6:00 pm for Buckley can only be found by the manual search of each of the boxes until you find that the name Buckley was entered into each of the boxes representing Tables 21, 22, and 23 which is not very intuitive.

w) Use of Constraint Programming is Computationally Inefficient and does not Offer a Practical Solution Vidotto acknowledged that his work was inherently computationally inefficient and that further work needed to be done to improve the computational efficiency of his proposed solution. On page 227 of his thesis Vidotto discusses areas where he believes more work could be done to further develop his work:

"In this thesis, we have modelled table management as a constraint satisfaction problem. In particular we have developed a search approach based on multiple heuristics and time slicing, which we have demonstrated improves search efficiency and robustness for solving the table management problem compared to other recommended approaches."

"The different ordering heuristics and the different time limits were not tuned, but were generated by inspection of the problem characteristics, so better performance should be achievable."

"Future work should then focus on optimising the set of heuristics, the order heuristics are selected within the same set, and the sequence of time limits."

"Future work should investigate whether, when, and to what extent, savings in search outweigh the overhead of caching" [Underlining added]

x) Dynamic Estimating (Bossert, 2009)

Bossert in his 2009 patent application stated his objective and purpose at paragraph [0008] in a similar fashion to Vidotto where he states:

"A need therefore exists in the art for an improved manner of handling reservation requests for restaurant capacities and similar resources that more fully utilizes resource configurability to increase yield and revenue." [Underlining added]

Bossert acknowledged the existence of constraint programming and the solution for his capacity problem within a restaurant at paragraph [0047] he states:

"Methods to perform the calculations of the capacity module 60 exist in the prior art. For example, mathematical and logical constraints can be used to describe the seating capacity of a restaurant whose tables may be reconfigured and constraint programming solution procedures can determine or at least estimate whether the restaurant has sufficient capacity to accept a set of table reservation requests". [Underlining added]

While Bossert acknowledged the existence of "constraint programming" within the prior art Bossert also shared Vidotto's concerns the impractical computational times required by a constraint program in its search for a solution, at paragraph [0054] Bossert states:

"While the above recursion is amenable to computer implementation, those of ordinary skill in the art will appreciate that exact solution may be computationally tractable for only small restaurants."

"In particular, the state space may grow very quickly with restaurant size, and the formulation may exhibit the so-called curse of dimensionality of dynamic programming methods."

"As such, the combinatorial nature of the state space may render impractically burdensome the memory or solution time required to evaluate the seats-to-go functions jk as called for by the dynamic programming recursion." [underlining added]

To overcome the computational time problems, Bossert proposed an "Approximate Dynamic Programming Solution Approach". Specifically, at paragraph [0055] Bossert states:

"To achieve more practical computational times and reduce memory requirements, disclosed hereinbelow is an Approximate Dynamic Programming (ADP) approach based on Monte Carlo Simulation and approximation of the seats-to-go functions". [underlining added]

Bossert discloses an approach that was further removed from the actual manner in which a restaurant allocates tables and resources, and one that is more dependent on estimations, approximations and mathematical complexities, in attempting to overcome the mathematical complexities and definitional problems of the chosen method of "constraint programming" as a technique for solving the allocation problem.

Despite their best efforts to find a solution to the impractical computational times required by constraint programming both Vidotto and Bossert have failed as their solutions are yet to be adopted or applied in industry.

Bossert, by adding additional heuristics and approximations as an extension to Vidotto's work, added additional prohibitive costs in the creation of bespoke solutions for each restaurant (by virtue of each restaurant having a different number of tables and table combinations and constraint information, means each restaurant requires a tailored mathematical solution and formulas which is expensive to implement, change and/or modify). Secondly, any reliance or dependency on "approximations" or "estimations", or other approaches that require guesswork cannot be said to offer finite solutions which ultimately result in a more efficient allocation.

Bossert lists numerous possible constraints and variables that can be taken into consideration, but fails to provide any detail as to how such variables could be practically incorporated into a constraint programming model. In fact, the disclosure in Bossert is limited to generic statements concerning the use of approximate dynamic programming techniques and estimations which remain as abstract ideas, with no enabling disclosure of how such ideas could be implemented in any resultant software application. As such, Bossert's disclosure, like Vidotto's, remains without application but unlike Vidotto's work which provided enabling disclosure (despite not being practical) Bossert's disclosures within his patent application are best described as mere "paper anticipations" of various desirable features, but with no reduction to practice.

y) Yield Management (Bossert, 2009)

Yield management, by definition, is the strategic control of inventory to sell the right product to the right customer at the right time for the right price.

Bossert fails to address yield management in any meaningful manner, particularly as his use of yield management has not been used to determine the product, the timing, the price and then used that information to determine how many of the restaurants tables, and which tables or spaces within the restaurant would be made available for each of the different products offered such that the capacity to be made available was known prior to the booking request being received.

For yield management to be undertaken correctly it is necessary to address at least two fundamental issues:

1. Firstly, the algorithm, equation or process must be able to discriminate between customers through a process of either charging customers a different price for the same goods or services depending on some other factor (e.g. the time when the product is bought or the service is carried out), or charging customers a different price for different services or products (e.g. only offering a three course meal at a peak booking times while permitting the sale of a one course meal at an off-peak time). As a simple example, Bossert provides no solution as to how to discriminate between a window table which one could potentially charge a higher price to a table next to the toilet or a table next to the kitchen door. Similarly, the methodology proposed by Bossert is not able to take into account any variables, such as how tables could be treated differently at different time periods or how different conditions could be imposed to control the tables or capacity being offered. For example, how can a restaurant limit bookings for people only wanting to have one course at a peak time of say 7:30 pm which may mean that the restaurant cannot use the table before that time and after that time when the preference should be to only offer a three course menu for bookings to be accepted at 7:30 pm?
2. Secondly, yield management is essentially the application of a defined algorithm or mathematical formula to the control of inventory. As such, a yield management module in the context of a software solution must be able to specifically control and release inventory. Bossert fails to provide a yield management solution that is capable of controlling the release of inventory, as the disclosure, at FIG. 3 describes a process where a capacity calculation module ("60") firstly determines capacity (using constraint programming and its inherent limitations) and only then does the proposed yield management calculation module ("70") accept or reject a reservation request. By taking this approach, Bossert is essentially "putting the cart before the horse".

The yield management disclosure of Bossert has no practical utility, nor is it an enabling disclosure, as it does not adhere to yield management principles, it does not properly apply yield management principles and it does not describe a workable solution. It is, at best, a mere "paper anticipation" for a set of ideas, not a workable embodiment that utilises yield management terminology.

SUMMARY

In a first aspect, the invention provides a computing system for optimising and allocating bookings within a space for a defined period of time in a venue, comprising an optimisation and allocation module in communication with a processor and arranged to receive the at least one request and communicate with a database to determine whether other requests for spaces have been made by other users, and if so, utilise the processor to retrieve information regarding the other requests for spaces and combine the at least one request with other requests to form a pool of requests, retrieve constraint information regarding the venue including information regarding the size of the venue and the size and quantity of available furniture that may be allocated to the space in the venue, and in a structured way iteratively allocate all requests from the pool of requests utilising the restraint information to produce an optimised and/or prioritised allocation instruction set, wherein the optimised and/or prioritised allocation instruction set saved in the database and provided by a space allocation user interface to one or more users associated with the venue.

In one embodiment, to provide a computing system and a user interface to at least one remote user to input the restaurant's floor plans to scale to be stored in the data base.

In one embodiment, to provide a computing system and a user interface to at least one remote user to input and divide the restaurant's scaled plans into spaces, subspaces and sections and maintain all information to scale with that information to be stored in the data base In one embodiment, the venue, space, subspaces and sections can be divided into different classes and to create a ranking system for each class and in one example provide different menus, service, and or offerings to each different class.

In one embodiment, to provide a computing system and a user interface to at least one remote user to create tables, chairs and other furniture to scale within the scaled floor plans, areas, subareas and sections and for that information to be stored within the data base.

In one embodiment, the system further comprises a sub-ranking of each table within each space, subspace, section and class wherein the ranking and sub-ranking is utilised as part of the algorithm to prioritise the allocation bookings and ensure the restaurants loyal customers or special persons are given better tables and seating.

In one embodiment, the user interface allows the at least one remote user to input into the table number generator their preferred table number groupings for the generation of table numbers for tables.

In one embodiment, the user interface allow the at least one remote user to input into the position number generator information as to how the position numbers are to be structured around a table allocated to a space, subspace, section or class in the allocation of a booking.

In one embodiment the user interface is arranged to allow at least one remote user to input information relating one or more objects of furniture. For example, the system may allow the user to provide table set-up details, such as which types of tables and table tops are interchangeable, or which chairs may be paired with particular types of tables. In this manner, the algorithm is provided with increased flexibility in the manner in which different items of furniture may be paired and/or substituted.

In one embodiment, the user interface allows at least one remote user to define the quantum and sizes of the tables and chairs allocated to the different spaces, subspaces and sections on the floor plan noting which are fixed tables and chairs and, which are flexible tables and chairs, and which can be moved and reallocated as well as defining the additional quantum and sizes of additional tables and chairs that can be brought in as required to optimise the seating available on the scaled floor plan which would vary in one example, based on the different sizes of bookings received.

In one embodiment, the user interface allows the at least one remote user to define the seating priority for bookings within the different spaces, subspaces and sections.

In one embodiment, the user interface allows the at least one remote user to define the dimension of the gap required between tables for different bookings by space, by subspace, by section, by class.

In one embodiment, the user interface allows the at least one remote user to input into the data base different seating periods that are allowed during a particular service. For example, breakfast, lunch or dinner on any particular day. This feature allows the restaurant to have flexible seating periods of different durations that can overlap. In turn, the ability to set up multiple seating periods is utilised by the iteration process of the algorithm, ensuring that an existing booking on an earlier seating has been given the time allocated to it based on its choice of menu and other constraints plus allowance has been made for the time to reset the table before a further booking can be made on that table for a later seating booking. To ensure time is better managed and optimised in the allocation of bookings to a space, table or table combination In one embodiment, the data base includes different menus, different number of courses per menu, different group sizes and they are allocated different booking times and duration periods of time that would be offered to a booking request, wherein, this information would be utilised as part of the algorithm to allocate bookings and ensure booking times accepted did not overlap or conflict.

In one embodiment, the data base includes the different time that would be required to prepare and re-set tables for re-use by day and by time as part of the algorithm to allocate bookings and ensure booking times accepted did not overlap or conflict due to the requirement to reset tables.

In one embodiment, the database includes sub-space constraint information regarding sub-spaces with the space available within the venue, whereby the iterative and structured allocation of requests for each sub-space, independent of other sub-spaces, to optimise and/or prioritise the allocation of space and time within each sub-space.

In one embodiment, the database includes section constraint information regarding sections within each of the spaces and sub-spaces available within the venue, whereby the iterative allocation of requests occurs for each section, independent or in conjunction with other sections, to optimise and/or prioritise the allocation of space and time within each section.

In one embodiment, the data base includes constraint information that information that define spaces and sub-spaces to include objects including furniture that are fixed and cannot change during the booking allocation process.

In one embodiment, the data base includes constraint information that define sections within spaces and subspaces as including objects including furniture that are flexible and can be rearranged added to or removed during the booking allocation process.

In one embodiment, the data base includes constraint information whereby different sections comprising object areas are classified differently.

In one embodiment, the data base includes constraint information whereby different sections classifications comprise different constraints and different outcomes during the booking allocation process.

In one embodiment, the different constraints for the different section categories can include different table size tables with different chairs and different gaps between tables different permitted maximum table sizes when tables are joined which could be less than the maximum physically possible within a section.

In one embodiment, the different constraints for the different section categories can include details of which tables are interchangeable with which tables, the patterns of table allocations which can be created and may include a process where a round table is placed between created or allocated rectangular tables.

In one embodiment, the different constraints for the different section categories and fixed tables can include which sections and or fixed tables can be utilised to cater for larger bookings. Where such information is not provided, in one embodiment, all larger bookings that do not fit within one space, subspace, section or class will be allocated to sections and fixed tables that utilise the smallest amount of continuous floor space.

In one embodiment, the different constraints for the different sections can include the dividing of one section into one or more subsections with different constraints for each subsection.

The database may include constraint information regarding multiple spaces, whereby the iterative allocation of requests occurs for each one of the multiple spaces, independent of other spaces, to optimise and/or prioritise the allocation of space and time within each space.

In one embodiment, the database includes object constraint information regarding at least one object including but not limited to a table, chair and/or stool arranged to be allocated to a space, whereby the iterative allocation of requests for spaces includes utilising the object constraint information to optimise and/or prioritise the allocation of a space, a sub-space and/or a section in the venue.

In one embodiment, the object constraint information is information regarding at least one of the dimensions of the spaces, dimensions of subspaces, the dimensions of sections and the dimensions of one or more items of furniture.

Firstly, with regards to tables our claimed invention uses its spatial knowledge of the restaurant premises to create tables as required by the bookings received. As such, it can add or remove tables from a restaurant's standard floor plan. From that perspective our first dimension can be said to be the restaurant floor plan (length and width) properly dimensioned and to scale with all objects in correct relativity. Then secondly, time is used as the other dimension to turn our two dimensional floor plan from a single flat plane to a volumetric cube by introducing time as the other axis.

The claimed invention utilises, in contrast, a decision tree logic structure which seeks to find a "pathway" to a solution that it creates that not only optimises the allocation of bookings to tables, but also seeks to optimise the placement of tables. In effect, the claimed invention optimises the number and placement of tables for the number of bookings, rather than simply trying to allocate bookings to a predetermined fixed number of tables and table combinations which have no spatial relationship to each other.

In addition, the decision tree is dynamic, in that the decision tree does not merely provide a series of "yes/no" gates, but rather, if as a consequence of the constraint information, a sub-optimal solution is provided, the claimed invention is able to iterate with varied conditions, in an attempt to create an optimised solution for the restaurant and the client Fourthly, as a corollary, the claimed invention does not require the input of tables and table combinations, as the starting premise for the claimed invention is not a predetermined number and/or layout of tables and table combinations. Rather, the claimed invention, upon receiving relevant constraint information, is tasked with not only allocating a booking to a table, but also allocating a table to an appropriate location in the space to achieve both qualitative and quantitative outcomes:

1. The claimed invention provides dynamic allocation of bookings, which may be optimised for a mixture of both quantitative and qualitative outcomes. This is achieved by the use of "spatial awareness" algorithms. Examples of the quantitative and qualitative outcomes include:

i. Quantitative Outcomes include:

a) Optimising one restaurant space before another restaurant space;

b) Optimising the whole restaurant and different spaces at the same time; and c) Allocation of a booking to a specific table.

ii. Qualitative Outcomes include:

a) Allocating bookings to the "best" tables;

b) Leaving an empty table between bookings when the restaurant is not full to give bookings greater privacy; and c) The allocation of a SVIP to their preferred table.

2. Moreover, as the algorithm has knowledge of the space and the furniture within the space, bookings can be allocated in a completely autonomous manner. In the description, it is clearly shown the underlying feature of "spatial awareness" allows completely autonomous restaurant management system from the time of the online restaurant booking request until the time a person leaves the restaurant other than the physical aspects of cooking the food, delivering the food and beverages to the table and cleaning and resetting a table.

3. The restaurant may also selectively choose the level of automation they wish to use within their restaurant. Hence the claimed invention can cater for anything from a casual café to a three Michelin star restaurant so no limitations or barriers exist in its industry applicability.

4. As the claimed invention has knowledge of the space, the invention can be utilised to optimise for almost any relevant desired outcome, whether it be revenue optimisation, cost minimisation or maximisation of the customer experience.

In one embodiment, the optimisation and/or prioritisation module iteratively allocates bookings to a table or a group of tables utilising constraint information arranged to create a particular ambiance within the space. The ambiance constraints in one embodiment include an algorithm that includes any one or more of the following parameters:

1. The allocation of bookings to the best available tables when the restaurant or a space, sub-space, section or class is not forecasted or predicted to be required or full, taking into account potential late bookings and walk-in customers;

2. The upgrade of bookings to better available tables where the better tables are not forecasted or predicted including late bookings and walk-in to be required;

3. The allocation of bookings based on a customer's CRM history or social media profile; and/or 4. The allocation of bookings based on a First In Best Seat ("FIBS") system on the basis that the earliest request received should receive priority, as it is likely that such a booking may represent a significant special occasion like a wedding anniversary, special birthday or occasion as compared to a last minute booking where expectations could be less or would be less on the basis that it is a last minute booking.

In one embodiment, the optimisation or prioritisation is undertaken utilising an iterative process including at least one of the following algorithmic steps: firstly allocating the request for the most number of seats or metric from the pooled group of requests for the first defined seating period or subset period which is less than the entire period of an individual service being allocated to a space that represents the smallest best fit space within the smallest fixed seating area, section, subspace or space within a venue; secondly allocating the second largest booking request from the pooled group of requests for the same defined seating period or subset period being allocated to a space that represents the smallest best space within the available smallest fixed seating area, section, subspace or space within a venue after taking into account previously allocated bookings; and continued allocation of all remaining bookings until all booking requests have been allocated for all seating periods or subset periods, or in the event that a booking cannot be allocated, the last received booking being placed on a waitlist and/or the user being given a different availability for their booking.

In one embodiment of the system the application of the following methodology:

a. allocating the received booking request to the requested table;

b. allocating the received booking request to the requested table by firstly identifying one or more requestors associated with the booking request, and using the identity of the one or more requestors to retrieve constraint information including a requestor ranking relative to other requestors, whereby the booking request is allocated based on the requestor ranking;

c. where a requested table is already allocated to a previous booking request, determining the identity of the one or more requestors associated with the booking request and using the identity of the one or more requestors to retrieve constraint information including a requestor ranking relative to the previous booking requestors, and if the ranking of the requestor is higher than the ranking of the previous booking requestor, reallocating the at least one previously allocated booking request to a different table to allow the received booking request to be allocated to the requested booked table;

d. upon requiring a reallocation of at least one booking to accommodate a received booking request, reallocating the at least one previously allocated booking request by allocating the booking request of the largest size first and reallocating all other booking requests in descending order of size;

e. upon requiring a reallocation of at least one booking to accommodate a received booking request, determining a booking size metric of the received booking and each of the allocated bookings by calculating a size metric which utilises the number of persons that comprise the booking request and the service time duration for the booking request as inputs, and utilising the size metric to reallocate all bookings in order from the largest size metric booking to the smallest size metric booking;

f. determining a difficulty metric utilising the size metric and a peak period seating time value to determine a difficulty measure, the difficulty measure representing a theoretical measure of the relative difficulty in allocating the booking request, whereby booking requests are ranked from most difficult to least difficult and allocated in descending order from most difficult to least difficult;

g. determining sub-service periods within a service period, and for all booking requests that fall within the service period, firstly allocating all booking requests that fall across one or more sub-service periods in order of descending size, and subsequently allocating all booking requests that do not fall across the one or more sub-service periods in order of descending size;

h. utilising constraint information to determine a difficulty measure, the difficulty measure being representative of the relative difficulty of allocating a booking request, whereby bookings are allocated in descending order of difficulty;

i. reallocating at least one previously allocated booking request to optimise the number of bookings within each of the one or more spaces;

j. reallocating at least one previously allocated booking whereby bookings of identical or similar size are clustered, in both physical proximity and chronological proximity;

k. reallocating at least one previously allocated booking whereby the total time that the each table or table combination remains unused between bookings during a single service period is minimised;

l. reallocating at least one previously allocated booking to cluster bookings such that physically adjacent tables have similar start times;

m. reallocating at least one previously allocated booking such that physically adjacent tables have similar finish times;

n. reallocating at least one previously allocated booking so that smaller size bookings are physically clustered adjacent to larger size bookings;

o. Reallocating at least one previously allocated booking such that a previously joined table for an earlier booking in a service period is reutilised for a later booking in the service period;

p. reallocating at least one previously allocated booking such that the at least one booking is allocated in a manner where a minimal number of tables are joined or split to allocate the booking;

q. reallocating at least one previously allocated booking such that the total of bookings within a service period are arranged in a manner that requires the least possible number of table movements during the service period;

r. allocating at least one potentially conflicting booking to the smallest fitting table irrespective of availability, and where a conflicting booking is generated, reallocating the previously allocated booking as a result of the newly created conflicting allocation;

s. reallocating at least one previously allocated booking whereby an empty table is retained between one or more booked table;

t. utilising constraint information to reallocate all bookings from the highest ranked available table in a descending order of rank;

u. reallocating at least one previously allocated booking whereby the ranking of the booking requestor determines the table allocated;

v. reallocating at least one previously allocated booking utilising one or more qualitative constraints derived from information associated with the booking requestor including but not limited to a stated occasion associated with the booking, a menu or courses selected by the requestor, the courses selected by the requestor, ancillary products selected by the requestor and the date of the booking; and w. reallocating all bookings to one or more different table solution sets to determine whether at least one of the one or more different table solution sets results in a more optimal outcome, and if so, selecting the at least one of the one or more different table solution sets that results in the more optimal outcome.

In one embodiment of the system the ranking of all tables and table combinations available for booking requests from best to worst.

In one embodiment of the system the relative location of each table and table combination.

In one embodiment of the system wherein the algorithm can determine if additional furniture can be brought in or removed from the available list of tables and table combinations if such action will result in a more optimised outcome.

In one embodiment of the system offering different menus and pricing for different booking intervals, services, dates and dates.

In one embodiment, the algorithm utilised for bookings made prior to a service is different to the algorithm used while a service is in process whereby no new additional tables are brought into an area, subarea, section or class.

In one embodiment, the optimisation module may allocate a booking to a table, and entire section, subspace, space or any combination thereof or the entire venue such that all booking requests can be undertaken autonomously irrespective of the size of the booking or the specific requirements of the user making the booking.

In one embodiment, the optimisation and prioritisation model is linked to a CRM and, or third party websites and capable of differentiating between booking requests where there are identical or similar bookings to allocate the higher ranked table to the higher ranked, more regular customers, or potentially more beneficial customers to the restaurant utilising information from at least one of internal or third party databases of information, wherein the identity of the customer making the booking is utilised in conjunction with the database information. The CRM may include any relevant information, such as:

1. Customer membership levels;
2. Customer rankings within each membership level;
3. Customer priority seating levels ("VIP" and "SVIP");
4. Customer seating preferences including, space, tables, chairs;
5. Customer constraint preferences as used in the various algorithms;
6. Customer information including individual item selections from previous visits over and above any booking information for the table through the use of position numbers with the booking; and/or
7. Waiter and staff inputted information concerning details and preferences of the customer with reference to the booking allocation algorithm.

In one embodiment, all locations, sections, subspaces and spaces are allocated a dynamic identifier such that all tables are sequentially numbered in a consistent manner irrespective of the relative reconfiguration of the tables as more bookings are taken so their usage or usage of the area can be monitored and compile an area or table preference rating which can be used for the dynamic pricing of tables.

In one embodiment, the constraint information can determine and make available a plurality of booking times and capacities such that a user may select specific tables, locations and/or seating arrangements from the available tables, locations and/or seating arrangements with or without the requirement of an additional payment.

In one embodiment, the constraint information is arranged to vary the available menu and courses to a customer dependent on group size, or the day or time of an available booking, in a manner which optimises available resources within a restaurant.

In one embodiment, the constraint information is arranged to vary the party sizes that it will accept at different times, such that inefficient booking sizes such as 1, 3 or 5 which result in tables with unutilised seats being eliminated from peak restaurant booking and demand times.

In one embodiment, a user can select any one of a preferred table, selecting booking time, time duration at the table and payment of a further amount.

In one embodiment, the computing system is arranged to communicate, via a communications network, with supplier servers (the suppliers being arranged to provide third party services), wherein a request to utilise a third party service received from a user is autonomously relayed to the third party site. For example, the database of the embodiment may include information regarding florists, chocolate shops, guitarists, magicians and entertainers, to provide a listing of the additional services that a diner may request through their booking in addition to any ad hoc requests made by the diner upon booking.

In one embodiment, a customer can create a tailored and personalised dining experience where they can select any number of personalised services such as, their personal waiter, a specific flower arrangement on the table or a bunch of flowers for their guest, a bottle of champagne next to their table to be opened on their arrival, a specific food and beverage menu or specific food and beverage items including the provision of a specific vintage or rare bottle of wine, a guitarist or other entertainer during their meal or a present on departure to remember the evening, inviting guests, creating place cards and allocating guests to table position numbers.

In more detail, in the embodiment described above, the computing system is arranged to manage and communicate bespoke and personalised dining experience selections whereby the system automatically places orders with suppliers, confirmations, compiles run sheets and information for the restaurant's Head Chef and Restaurant Manager and Restaurant office staff of the requirements and post the information on the restaurants diary, and issue invoices and receive payments.

In one embodiment, there is further provided a self-seating app or widget showing the allocated table location within the restaurant floor plan, together with the table number and the position numbers and location of each individual guest including the ability to print name cards for use on the table.

In one embodiment, the optimisation or prioritisation algorithm utilises the processor to determine the revenue potential for a particular combination of menu, group size and date/time of a booking, wherein the algorithm dynamically varies the booking options offered to a customer to control the capacity offered to optimise revenue.

In one embodiment, the system is arranged to monitor the user request for any particular table, section, subspace, space, class or venue by at least one of the date, service, time, occasion, group size, or other relevant parameter to determine the appropriateness of dynamic pricing changes for the table, area, subarea, section or class or changes to other parts of the venue to increase efficiency.

In one embodiment, the system is arranged to utilise information regarding the historical performance of one or more spaces, subspaces, sections or classes to improve the performance of one or more other spaces, subspaces, sections or classes. In other words, the system utilises an algorithm that utilises a number of types of information relevant to entire space and applies the information gained from one section of the restaurant to better organise another area of the restaurant. In colloquial terms, the algorithm takes a "holistic" overview of the restaurant as a whole before optimising a space, subspace, section, or class.

In one embodiment, the system is arranged to execute a simulation using estimated booking patterns or historical booking patterns to determine an optimal restaurant layout. The layout may include selecting the most appropriate table sizes and furniture, quantities of different table sizes and furniture to purchase, flexible seating areas versus fixed seating areas, different combinations of areas, subareas and sections, different classes to determine an optimised restaurant furniture layout so as to assist in the management of the restaurant, the set-up of the restaurant or the financial projections and planning of the restaurant.

In one embodiment, the system may also optimise one or more constraints, the iterative allocation of bookings and/or defining of a venue into spaces, subspaces, sections, classes within the restaurant the offering of different menus in different situations and at different times, the allocation of SVIP's to their preferred table and the rating of tables. Such an embodiment allows customers to select their preferred table, offering different amounts of time to different menus with different courses. In other words, the constraint aspect of the broader inventive concept may be combined with a static linear combinatorial priority list to provide a level of optimisation and automation, while not utilising a dynamic table allocation algorithm.

In one embodiment, the user interface is arranged, in response to restraint information provided by the user, to provide additional restraint information to the user, wherein the system provides an interface to allow the user to accept the additional restraint information or alter their request.

In one embodiment, the database includes menu constraint information regarding menus available, the menu constraint being dependent on the time period constraint information provided by the user, whereby the computing system provides a choice to the user to accept the additional restraint information or the user alters their request dependent on the menu constraint information.

In one embodiment, the user interface is arranged to permit a user to search for the availability for two different spaces in a venue, and if availability is found in both spaces to book and pay for both spaces simultaneously. For example, a booking could be made for two stools at 7 pm at the bar for drinks and then a table for 2 at 7:30 pm in the main dining room for dinner.

In one embodiment, the user interface is arranged to permit the user to search two different venues for availability and if availability is found at both venues the user books and pays for both venues simultaneously. For example, one venue may be a theatre or show and the other venue is a restaurant.

In one embodiment, the optimised and/or prioritised allocation instruction set is saved in the database and provided as a diagrammatic representation within a detailed representation of the floor plan. In a specific embodiment, any new or additional tables or furniture added into a space, subspace, section, class or venue are highlighted so that the restaurant manager may easily visualise and understand the type, quantum, and location of the additional furniture as compared to the standard floor plan layout, number of tables and location.

The claimed invention defines a properly constructed "three dimensional volumetric relationship" using the floor plan (two dimensions) and time (as the third dimension). As such, there are no requirements to use scheduling software techniques to incorporate time within the claimed invention.

In one embodiment, the optimised and/or prioritised allocation set saved in the data base and provided as a diagrammatic representation within a detailed representation of the floor plan changes dynamically over time, such that the representation of the table allocation is layered in time with a notation as to how many times each table will be used during service. In other words, the floor plan displayed on the user interface is a true "live" representation of the table plan at any point in time during a service with the representation of the tables being rearranged with the correct table numbers and gaps between tables. This feature also allows restaurant staff or anyone looking at the floor plan to easily identify the location of a table or easily understand how to reset and reposition tables.

In one embodiment, the system is arranged to autonomously communicate to a third party the requirement to provide additional furniture or other items required for a service In a second aspect, there is provided a computer enabled method for optimising the use of space in a venue, comprising the steps of: receiving at least one request to reserve a space or a table or a table combination within the venue from at least one remote user from an application residing on a remote device via the communications network, and retrieving other information and constraint information from the data base such as, the menu or menus available for a particular day and time as well as the time allocated for the menu and courses selected by group size and using that information to communicate with a user prior to accepting a request for a booking and then determining whether other requests for spaces have been made by other users, and if so, retrieve information regarding the other requests and information pertaining to those requests for spaces, tables or table combinations and combine the at least one request with other requests to form a pool of requests, and other information pertaining to those requests retrieve constraint information regarding the venue, and iteratively allocate all requests from the pool of requests utilising the restraint information to produce an optimised space, tables or table combinations allocation instruction set, wherein the optimised prioritised and re-allocated space, tables or table combinations allocation instruction set is provided to one or more users associated with the venue.

In one embodiment, a user interface is provided to at least one remote user to input into the data base the different menus that a restaurant wishes to make available by the different spaces, subspaces, classes and sections, on different days, for different meal periods and by the times and group sizes they wish to make the menus available. For example, only offering a one course menu option at 6 pm and requiring a person to accept 3 course menu if they wish to dine at say a peak time like 7:30 pm; or offering a more expensive menu for more premium seating; or offering a cheaper price or cheaper menu for less premium seating for allocation to a space, subspace, section, class, table or table combination.

In one embodiment, the user interface is arranged to allow at least one remote user to input into the data base the different duration times that will be allowed for a booking based on constraints such as, the menu selected, the number of courses selected, the size of the group, the occasion and the day and is also used to inform user of this condition as part of the accepted booking terms and conditions wherein the user can accept these conditions or alter their request.

In one embodiment, there is provided a user interface to at least one remote user to input into the database the different times required to reset a space, subspace, section, class, table, or table combination. This information may subsequently be reutilised to ensure that turnaround times are efficiently managed.

In one embodiment, the user interface allows at least one remote user to input into the data base the different seating periods that would be allowed during a defined period of service (such as dinner) on any particular day. This feature allows the restaurant to have not only fixed seating periods but also flexible seating periods of different durations that can overlap. The iteration process by the algorithm can be undertaken multiple times, and can include iterating once for each defined seating period with the algorithm ensuring that an existing booking on an earlier seating has been given the time allocated to it based on its choice of menu and other constraints plus allowance has been made for the time to reset the table before a further booking can be made on that table for a later seating booking. In other words, time is better managed and optimised in the allocation of bookings to a space, table or table combination.

In one embodiment, there is provided an application residing on a remote device arranged to access a data base that provides standard and special menus that are dynamically displayed depending on the availability of those menus during a particular time period and group size. The menus can be referred to by users to see the menus available and the times that they will be available prior to making a booking or to select from when pre-ordering or for ordering at the restaurant during a service period.

In one embodiment, the prioritisation algorithm varies the menu offered to a customer dependent on at least one of group size, occasion, booking time, and the day of an available booking, in a manner that permits the optimisation of revenue and efficiency within a restaurant in the allocation of bookings to spaces, subspaces, sections classes, tables or table combinations.

In one embodiment, wherein the data base includes menu constraint information regarding menus available dependent on the time period constraint information provided by the user, whereby the user can select to accept the additional restraint information or can alter their request dependent on the menu constraint information.

In one embodiment, wherein the database includes menu constraint information regarding the number of courses provided in a menu based on at least one request.

In one embodiment, the data base includes time and/or date constraint information regarding at least one time and/or date that a space, sub-space, section, class, table or table combination available to be allocated wherein each time and/or date includes an indicator arranged to allocate a relative rating to the time and/or date, wherein the rating is utilised as a constraint condition. The constraint condition may require the user to pay a particular charge depending on the rating associated with the time and/or date.

In one embodiment, the user interface is arranged to allow the user to search a restaurant's availability not only by time as permitted by the prior art but also by:

1. Menu and menu courses including planned promotional special menus;
2. Group size;
3. Tables to which a booking request can be guaranteed allocation; and/or
4. System generated specials to "back fill" awkward times, for example, times between bookings and difficult to fill tables.

In one embodiment, the user interface is arranged to allow a user to select at least one item from at least one menu to be consumed during the use of the space, sub-space, section, class, table, or table combination. Upon selecting the at least one menu item, the user may be required to pay for the use of the space in advance of using the space.

In one embodiment, the user interface is configured to enable at least one remote user to select a menu, and items on the menu for the allocated use of the space, sub-space, section, class, table or table combination and pay for at least a portion the use of the space in advance of using the space.

In one embodiment, the user interface is configured to enable a first remote user to invite a second remote user to interact with the interface.

In one embodiment, the system is arranged to adjust the amount of pre-payment received by a restaurant in a manner which maximises the commitment by a user to a booking. This in turn minimises "no shows" and increases upfront cash flow to a restaurant. The amount of pre-payment required is determined by interrogating a database arranged to provide object constraint information regarding one or more of the terms and conditions for a particular booking made available on a particular day, a particular service, a particular area, a particular class of seating, a table, a table combination, particular time, a particular menu selected, a particular number of courses, a particular number of guests and/or a particular persons CRM ranking/rating, a user input module arranged to receive information regarding the actual usable resources at any given time, wherein an optimisation module in communication with a processor receives the data, and the data is analysed to provide a dynamic prepayment algorithm to determine the relative optimal prepayment that should be requested for a specific booking request.

In one embodiment, the system further includes a pre-payment decision tree whereby each booking request is reviewed to determine if pre-payment is required for the booking to be secured. As an example, some form of pre-payment may be required through the application of one or more constraints for a particular booking request which could vary by day of the week, a particular event irrespective of the day, by peak and off-peak times on a particular day, by menu selected, by courses selected, by group size, by occasion and an algorithm determine the best and most appropriate requirement for the booking to a space, sub-space, section, class, table or table combination.

In another embodiment, there is provided a payment module arranged to provide a pre-payment interface arranged to discriminate between booking requests wherein pre-payment obligations are tailored to the user's booking request. Such a module ensures that, where necessary, a requestor making a booking request has a greater commitment to ensuring they turn up, minimising "no-shows" and increasing restaurant revenue and profitability in the allocation of a booking to a space, subspace, section, class, table or table combination.

In another embodiment, the system utilises information in the database, such as a person's CRM ranking, as a constraint to make a final determination as to whether a person is required to meet the pre-payment criteria to secure the booking. Such a system provides greater recognition to loyal customers and assists in the process of displaying mutual trust and respect for loyal patronage.

In a third aspect, there is provided a computer optimisation system including a system in accordance with the first aspect of the invention which defines the capacity in the form of usage within a space: a database arranged to provide historical and live data regarding the use of the resources of a restaurant, an input module arranged to receive information regarding the usable resources at any given time from the system according to the first aspect of the invention, an optimisation module in communication with a processor and arranged to receive the at least one request and communicate with the database to receive the historical and live data and the usable resource data, wherein the data is analysed utilising a yield determination algorithm to determine, data regarding the relative optimal use of the usable restaurant resources and provide relative optimal use data to the system in accordance with the first aspect of the invention.

In another aspect associated with the third aspect, there is provided a computing system for allocating one or more booking requests for the provision of a service in a venue, the service including the allocation of a space within the venue and the provision of one or more products comprising: a processor in communication with a product database including a plurality of products, each one of the plurality of products being associated with a product capacity value, a user interface arranged to interact with a booking requestor and the processor, the interface being arranged to request product constraint information regarding one or more constraints provided by the booking requestor, retrieve product capacity values from the database, and utilise the product capacity values and product constraint information to determine product availability, the interface being arranged to interact with the requestor and provide additional product information and supplementary product information for the product requestor wherein the requestor may one of agree to the additional constraints and request table capacity allocation for confirmation of the booking or reject the constraints and not be allocated.

The system may use the qualified product information to determine table availability using an iterative allocation process in accordance with the embodiments described herein.

The system may use the qualified product information to determine table availability using an optimised condition in accordance with the embodiments described herein.

The system may also use the qualified product information to determine table availability by classifying tables into categories to aid in the allocation process.

In more detail, with reference to the aspect described above, the product can be the number of courses associated with a menu, a menu item, a beverage, or a combination thereof.

A product has specific attributes and those attributes can include an association with a specific service period, booking time, booking duration time, day of the week, date, group size and/or occasion.

The product may include or be associated with one or more services, including extended duration time, location within a venue, class of tables within a venue specific type of table, specific table within a venue, specific level of service.

The product can include third party items such as flowers, entertainment, etc.

A cost associated with the product may be set dynamically by time, group size, occasion, table location, specific table, payment of booking fees, additional services, discounts or promotional pricing.

In one embodiment, the yield management algorithms utilise capacity generated by space and time calculations. This is in contrast to known yield management techniques which measure yield based on capacity as measured utilising tables and table combinations as discrete units of capacity.

In one embodiment, the dynamic pricing algorithm may use one or more of time of day, date, space, subspace, section, class, peak, time of a booking, duration of a booking, menus with different courses, size of booking to control capacities offered for a particular space, subspace, section, class, menu, courses and size of booking In one embodiment, the algorithm interrogates the data base to locate unbooked periods of time longer than the minimum time required to consume a one course menu to match an appropriate menu or menu(s) to the periods of time, wherein the system offers the located booking times and booking durations to users at a discounted cost. This allows the system to autonomously "backfill" unused time slots, which increases restaurant revenue while minimising discounts offered for other non-constrained bookings.

In one embodiment, the data base is interrogated to find periods of time that contain short lead time unallocated space, sub-space, section, tables or chairs and offering such space at a discount in order to create and have a standby list of customers.

In one embodiment, the system is arranged to calculate and collect information concerning the duration times of customers and associating the duration times with relevant constraint information. The constraint information may include menu, menu courses, time of booking, day of booking, occasion, and/or group size. The collected information is used to provide recommendations or autonomously adjust booking duration times allowed for different areas, subareas, sections or classes at different times, menus and courses offered.

In one embodiment, the seating allocation of a restaurant is analysed by comparing the hypothetical actions which would have been taken by a system in accordance with the invention, to actions taken by a manual intervention, to determine whether the autonomous action or the manual intervention provides or provided a more favourable outcome using a customer's CRM or social media ranking.

In one embodiment, restaurant capacity is calculated as the product of the tables that are capable of incorporation into the space including additional tables as they would have been included by the autonomous use of the allocation algorithms and the number of chairs and the number of hours that the restaurant is open for service. This hypothetical calculated capacity is utilised as a benchmark and used to compare to real life performance (specifically against manual interventions performed by a member of staff) to evaluate whether the manual intervention produces a more desirable result. If so, the algorithm autonomously adjusts the algorithm and allocation process.

In one embodiment, restaurant utilisation is calculated as the product of the total number of guests that can be seated by the system and algorithm including the allocation and use of additional tables and the number of hours that users were seated. In other words, the metric is the product of the total chairs the system managed to incorporate into the floor plan multiplied by the hours the restaurant was open for a service or other defined period. This is a more useful metric as it represents a true utilisation value.

In one embodiment, the revenue yield is calculated as the product of the actual revenue received for a period divided by the revenue that could have been received if all items had been sold at their full recommended retail plus the revenue at the full recommended retail price of any complimentary items. For this calculation to be undertaken a full complete, itemised, detailed list of all products supplied to customers and other information contained in a restaurant point of sale system and other relevant information from other systems is integrated and recorded.

In one embodiment, the efficiency of area space, subspace, section, class or restaurant is the product of the capacity utilisation and the revenue yield.

In one embodiment, an optimal capacity utilisation may be calculated by varying defined fixed and flexible seating areas within the restaurant to determine an optimum ratio of fixed versus flexible seating areas. In one embodiment, the system can recommend changes to areas, menus, courses, times, and/or group sizes to provide a more optimised solution. In the context of the embodiment described, optimum is defined according to goals set by the restaurant and by the inherent limitations of the restaurant, such as the table sizes and table types available within the fixed and flexible seating spaces, subspaces, sections, classes or within the restaurant.

In more detail, resource constraints such as desired customer service standards may be calculated by inputting wait staff to customer ratios, staff set-up times for different booking levels, bar staff to customer ratios, food runner to staff ratios, reception staff to customer ratios by booking times, kitchen to customer ratios based on menus offered for a service and/or if food is pre-ordered the input of more specific kitchen to staff ratios by space, subspace, section, or class while also considering additional personalised customer booking requests and restaurant set-up requirements including allowing for late bookings and walk-ins in combination with the timing of customer menus and arrival times. This comprehensive input of data allows the system to provide detailed rosters which are created and communicated to staff.

In one embodiment, the user interface allows at least one remote user to input into the data base information and constraints regarding a plurality of events that a restaurant may undertake, participate in or which may have an impact on the demand for the restaurant's services. The information and constraints provide input regarding the expected impact of such an event and may include, for example, the number of invited guests or the number of the people who may be expected to attend the events. The event information and constraints are as an input by the forecasting algorithm to determine forecasted demand, which in turn is utilised to determine a set of constraints to apply to the capacity allocations, such as determining appropriate menus, courses, booking times, booking durations, staffing and other resource requirements.

In one embodiment, additional information (such as forecasted weather and known future events) is provided to the algorithm to predict future demand by space, subspace, section, class or for the restaurant. The future predicted demand is used to adjust the options offered to customers. In other words, menus, booking times, booking durations, and the relative probability of gaining additional revenue from the charging of different fees such as from extending booking times, are calculated. In turn, the system may then allocate bookings and/or limit bookings. For example, if the probability of walk-in customers is high, some tables may be reserved for walk-in customers, who may then be charged at a premium. Alternatively, if the probability of walk-in customers is low, a discount may be applied to customers who book, in order to attract booking customers. That is, the system autonomously optimises booking constraints to optimise revenue for the restaurant.

In summary, previous utilisation patterns and other constraints may be utilised to forecast demand, revenue, and to autonomously adjust the capacity and constraints provided by the system to a remote user.

In one embodiment, the associated constraint information includes an incentive, the incentive being communicated to the booking requestor.

In one embodiment, the allocation algorithm applies a differential pricing model dependent on the venue constraint information and the requestor constraint information.

In one embodiment, the one or more potential booking allocations are determined by calculating the optimal revenue yield of a plurality of potential booking allocations and selecting one or more of the plurality of potential booking allocations on the basis of a revenue yield threshold, wherein the selected one or more potential booking allocations are communicated to the requestor.

In a fourth aspect, there is provided an autonomous, integrated booking and management system.

For example, once flexible floor plans are calculated, the flexible floor plans are electronically transmitted to a Point Of Sale system ("POS"), which may include hand held devices. The electronic transmission of floor plans, which are updated in a contemporaneous manner (including autonomous updating of table numbers) provide a seamless and autonomous continuous transfer of information for staff to display an exact representation of the floor plan at any point in time with respect to aspects including table numbers table groupings and table gaps.

In one embodiment, the transfer of information from the reservations and allocation system to other systems, such as, the labour and roster system, the food ordering and purchasing system and the kitchen printing system is autonomous.

In one embodiment, the reservations dairy is capable of autonomously processing any type of booking, including individual bookings and function bookings. This is achieved, at the user interface, by providing an integrated booking widget and/or booking app.

In one embodiment, the app or widget includes a self-seating function which is capable of displaying and directing a user to a table by presenting the user with an exact representation of the table and floor plan of the restaurant. This may be achieved by a combination of any one or more types of information display, including a location map including a restaurant floor plan, a table number, position numbers of individual guests and the ability to autonomously print name cards for use on the table, or display electronic name cards in situations where electronic displays are available at the table.

In one embodiment, a user located in a restaurant reception area may be given a device or use their own personal device to request a booking, order a meal, prepay and receive self-seating details. This provides an autonomous service, such that there is no requirement for the restaurant to provide staff to seat a person, allocate a table, take an order and/or accept payment.

In one embodiment, individual customer information is tracked by table position number so that the restaurant CRM contains data specific to the customer. The collection of customer specific data allows for the tailoring of a customer's future visits.

In one embodiment, all walk-in customers are required to enter identifying information into the booking system to allow the system to allocate tables. This allows the system to allocate the best available table to ensure the most efficient allocation of tables, ensure all customers to the restaurant are properly included in the CRM system for future use and not permit manual allocations.

In one embodiment, the reservations diary allows for multi-venues and multi-time zones within a single diary. In other words, customer facing diaries and internal diaries (which may operate in different manners) are automatically reconciled to avoid the need for any transfer of information from one diary to another.

In more detail, there may be provided a multi calendar that permits additional user defined calendars to be created for reporting and management purposes. The user defined calendars may have a different start and end date to the bookings calendar, a different number of months and different start and end dates for each user defined month (or period), may commence on any day of the week, and has user defined reference points so that equivalent time periods in previously defined years, months or weeks maybe reconciled against current or future defined years, months or weeks.

In one embodiment, the user defined calendar is used for the generation of business-centric performance, historical and forecasting reports.

In one embodiment, the performance module calculates and uses the measures of available seat hours to measure capacity, actual seat hours to measure usage, revenue yield to measure the actual revenue received against the revenue that could have been received had all items sold and complimentary items given been charged at their full recommended retail price and efficiency as the product of capacity utilisation by the revenue yield.

In one embodiment, a home delivery diary is integrated into the system and is arranged to receive on-line home delivery orders.

In one embodiment, a gift certificate system is integrated into the system and is arranged to issue gift certificates.

In one embodiment, a gift certificate module is provided, the payment module is arranged to accept gift certificates as a form of pre-payment. The gift certificate may be utilised as a deposit, part payment or full payment for a booking.

In one embodiment, a kitchen interface is integrated, wherein orders are provided to the kitchen for seated customers or home delivery orders directly to the kitchen, wherein constraint information is provided to estimate cooking times and delivery times to thereby prioritise orders and optionally communicate the estimated times to the restaurant manager and/or the customer.

In one embodiment, there is provided an autonomous, integrated restaurant management system using the online booking system and the diary and data base as the core central system. The restaurant management system may interface electronically with ancillary systems in order to receive or provide information. Notwithstanding the requirement to source or provide data to other external systems, the restaurant management system, in an embodiment, provides an integrated system by providing the following functionality:

1. A CRM for the correct allocation and prioritisation of bookings;
2. A database of evolving operational constraints for the correct allocation and prioritisation of bookings;
3. A module to provide and redeem gift cards;
4. A POS system for the transfer of the dynamic and changing floor plans and table numbers;
5. A POS system for transfer of any pre-orders or menu selections;
6. A POS system and/or kitchen printer for the provision of pre-orders directly to the kitchen;
7. A payment gateway for the collection and processing of payments;
8. A home delivery ordering module for receiving and processing home delivery orders, including the autonomous management of kitchen priorities and workload;
9. An integrated booking module capable of receiving and processing both individual and function bookings;
10. Integration with third party purchasing modules to co-ordinate personalisation considerations for the ability to provide dynamic reporting, forecasting and yield management information to a requestor of the provision of dynamically changing menus based on available times and resource constraints for customers to review, pre-order, or order at the restaurant; and/or 11. A self-seating capability which may be deployed to kiosks, in-restaurant devices and/or user devices which provides a floor plan showing the table allocated on a floor plan as it would be on their arrival.

In one embodiment there is provided a user interface in the form of a "restaurant management page" in one embodiment or a "dashboard" arranged to provide the restaurant manager with a summarised yet complete view of all aspects and activities within the restaurant. The dashboard includes one or more pop-up screens to ensure that the user does not have to leave the main control cockpit screen. Further, the cockpit includes an email display, an urgent message display, a home delivery summary display, a walk-in summary display, individual booking run sheet display, function run sheet display, a dynamic and current floor plan and a reversible Gantt chart to easily highlight available tables, multiple area bookings, gift cards, floor plan or area selections, a CRM link for bookings, a Restaurant Butler personalised details display, links to a POS, kitchen printing and purchasing displays.

In one embodiment, there is provided a booking system comprising a data base arranged to provide seating availability in an entertainment venue and table availability in a restaurant, wherein a customer utilises an interface to review the seating availability at the venue and the seating availability at a restaurant simultaneously, wherein all bookings and payments are undertaken via the interface.

In one embodiment, there is provided an interface that allows a customer to tailor a function space to a customer's requirements and provide payment autonomously, wherein all actions required to prepare the function space are created autonomously, including the creation of run sheets, table numbers, AV requirements, the placement of orders with suppliers and the organisation of staffing requirements.

In one embodiment, the interface utilises feedback information from the user, and optionally, historical data, to provide intuitive suggestions to enhance a function experience and/or to offer an alternatives when the first preference is not available. This may include capturing information such as occasion type, experience sought, theme of event, group size, budget or other constraints.

In one embodiment table configuration options and alternatives are provided for users via the user interface.

In one embodiment food menus, food menu packages and beverages and beverage packages offered to booking requests are autonomously selected in response to information received regarding the occasion, theme, style of event and group size.

In one embodiment, the interface is arranged to provide a floor plan to the user whereby the floor plan dynamically alters depending on the booking information provided. This may include appropriate table configurations, decorations, audio-visual equipment.

In one embodiment, the interface is arranged to provide a floor plan to the user with drawing tools so that they can tailor the floor plan specifically to their personal requirements within the constraints applicable to and set by the venue.

In one embodiment, the function booking system recognises, evaluates and prices all items selected and placed on the floor plan together with any other selection to provide the user an itemised quote and price for the function they have selected, designed and personalised, whereby the user can make further changes, make a tentative booking, be provided a reference number and be able to make further changes in the future up until which time a deposit would need to be paid to secure the function room or they would lose their tentative booking.

In one embodiment, should a subsequent user wish to book a space where a previous user has a tentative booking on a space the user with the tentative booking receives an autonomous communication requesting that they confirm the tentative booking within a defined period of time.

Embodiments of the system, as described above, allows for the autonomous placement of orders, invoicing, monitoring and management of the entire delivery process for a confirmed function.

In one embodiment, position numbers are allocated to a table by the system and a user may utilise the interface to allocate guests against the defined position numbers. Once guests have been allocated to position numbers, the system may autonomously contact the guests and invite the guests to utilise the interface to pre-order and, if appropriate, to pre-pay for the guest's share of the cost of a booking or of the function. Name cards or place cards can also be selected as an option to be printed and placed on the table(s) at a user's request.

In a fifth aspect, there is provided a computing system for optimising the use of space in a venue, comprising: a user interface providing module arranged to provide a user interface to at least one remote user via a communications network, a user input receiving module arranged to receive at least one request to reserve a space for a period of time within the venue from the at least one remote user via the communications network, a negotiation module in communication with a processor and arranged to receive the at least one request and communicate with a database to retrieve constraint information regarding the venue and determine whether the at least one request can be accepted, and if not, utilise the processor to retrieve information regarding the other requests for spaces and propose at least one alternative request to the user via the user interface, wherein if the at least one alternative request is accepted by the user, the at least one alternative request is saved in the database.

In one embodiment of the system an algorithm interrogates the database to determine what tables, booking times and booking durations have not been booked and make available for specific promotions. In a further embodiment the menus pricing and other terms and conditions for each offer can be determined by the system by matching the demand profile for these available tables, times and durations with constraints and different promotional packages set up by the venue.

In one embodiment of the system different promotional packages can be set up for which the algorithm can then select from to provide an incentive to accept alternate booking details. The promotional packages that can be set-up include: a percentage discount on the whole bill or part of the bill, a percentage discount only on food or part of the food, a percentage discount only on beverages or part of the beverages, the provision of various complementary items including a complimentary glass of wine and a complimentary dessert. Further, the specific circumstances to which these promotional packages can apply by service, by day, by date. For example, the maximum promotional benefit on a Monday may be greater than a Saturday, and the maximum potential benefit at a non-peak time may be greater than a peak time.

In one embodiment of the system the provision of an incentive or promotional benefit for a customer to accept an alternate time offered, or alternate booking duration or more stringent terms and conditions.

In one embodiment of the system a person who has already made a booking is able to log in and change the details of their booking.

In one embodiment of the system permit the booking requestor to determine the seating position of their guests.

In one embodiment of the system permit the booking requestor to invite their guests to pre-order and part pay or pre-pay for their selections.

The negotiation module may propose at least one alternative request using past alternative request data retrieved by the processor from the database.

The past alternative request data may include the frequency of the acceptance of the at least one alternative request by the user.

The negotiation module may be biased to propose at least one alternative request based on the relative frequency of the acceptance of the at least one alternative request by the user when compared to other alternative requests saved in the database.

The negotiation module may provide at least one alternative request until such time as the request is abandoned by the user.

The at least one alternative request may include an autonomously generated incentive to provide an incentive to the user to accept the at least one alternative request.

The incentive may include at least one of a good and service related to the at least one alternative request.

In a sixth aspect, there is provided a computer enabled method for optimising the use of tables and table combinations in a venue, comprising the steps of: receiving at least one request to reserve a table or a table combination within the venue from at least one remote user from an application residing on a remote device via the communications network, as well as retrieving other information and constraint information from the data base and using that information to communicate with a user prior to accepting a request for a booking and then determining whether other requests for tables and table combinations have been made by other users, and if so, retrieve information regarding the other requests and information pertaining to those requests for tables or table combinations and combine the at least one request with other requests to form a pool of requests, and other information pertaining to those requests retrieve constraint information regarding the venue, and iteratively allocate all requests from the pool of requests utilising the restraint information to produce an optimised table and table combination allocation instruction set, wherein the optimised prioritised and re-allocated, tables or table combinations allocation instruction set is provided to one or more users associated with the venue.

In one embodiment of the system in a venue with one or more spaces an algorithm that can determine if the booking request can be categorised into one or more categories.

In one embodiment of the system the categories include a Super VIP category and a guaranteed table category where booking requests will be allocated to their selected table on a permanent basis if the specific table requested is has not been previously allocated to a booking request from the same category and by a higher requestor within that category.

In one embodiment of the system where that booking request can be categorised in one or more spaces the optimisation algorithm to prioritise the allocation of the booking requests by the priority of the category.

In one embodiment of the system where more than one booking has been received combine all the booking requests received with all prior booking requests received to form a pool of booking requests and reallocate all the booking requests in accordance to the optimisation algorithm and methodology to a pool of solutions comprising tables and table combinations.

In one embodiment of the system the application of the following methodology:

a. allocating the received booking request to the requested table or table combination;
b. allocating the received booking request to the requested table or table combination by firstly identifying one or more requestors associated with the booking request, and using the identity of the one or more requestors to retrieve constraint information including a requestor ranking relative to other requestors, whereby the booking request is allocated based on the requestor ranking;
c. where a requested table or table combination is already allocated to a previous booking request, determining the identity of the one or more requestors associated with the booking request and using the identity of the one or more requestors to retrieve constraint information including a requestor ranking relative to the previous booking requestors, and if the ranking of the requestor is higher than the ranking of the previous booking requestor, reallocating the at least one previously allocated booking request to a different table or table combination to allow the received booking request to be allocated to the requested booked table or table combination;
d. upon requiring a reallocation of at least one booking to accommodate a received booking request, reallocating the at least one previously allocated booking request by allocating the booking request of the largest size first and reallocating all other booking requests in descending order of size;
e. upon requiring a reallocation of at least one booking to accommodate a received booking request, determining a booking size metric of the received booking and each of the allocated bookings by calculating a size metric which utilises the number of persons that comprise the booking request and the service time duration for the booking request as inputs, and utilising the size metric to reallocate all bookings in order from the largest size metric booking to the smallest size metric booking;
f. determining a difficulty metric utilising the size metric and a peak period seating time value to determine a difficulty measure, the difficulty measure representing a theoretical measure of the relative difficulty in allocating the booking request, whereby booking requests are ranked from most difficult to least difficult and allocated in descending order from most difficult to least difficult;
g. determining sub-service periods within a service period, and for all booking requests that fall within the service period, firstly allocating all booking requests that fall across one or more sub-service periods in order of descending size, and subsequently allocating all booking requests that do not fall across the one or more sub-service periods in order of descending size;
h. utilising constraint information to determine a difficulty measure, the difficulty measure being representative of the relative difficulty of allocating a booking request, whereby bookings are allocated in descending order of difficulty;

i. reallocating at least one previously allocated booking request to optimise the number of bookings within each of the one or more spaces;
j. reallocating at least one previously allocated booking whereby bookings of identical or similar size are clustered, in both physical proximity and chronological proximity;
k. reallocating at least one previously allocated booking whereby the total time that the each table or table combination remains unused between bookings during a single service period is minimised;
l. reallocating at least one previously allocated booking to cluster bookings such that physically adjacent tables or table combinations have similar start times;
m. reallocating at least one previously allocated booking such that physically adjacent tables or table combinations have similar finish times;
n. reallocating at least one previously allocated booking so that smaller size bookings are physically clustered adjacent to larger size bookings;
o. Reallocating at least one previously allocated booking such that a previously joined table for an earlier booking in a service period is reutilised for a later booking in the service period;
p. reallocating at least one previously allocated booking such that the at least one booking is allocated in a manner where a minimal number of tables are joined or split to allocate the booking;
q. reallocating at least one previously allocated booking such that the total of bookings within a service period are arranged in a manner that requires the least possible number of table movements during the service period;
r. allocating at least one potentially conflicting booking to the smallest fitting table or table combination irrespective of availability, and where a conflicting booking is generated, reallocating the previously allocated booking as a result of the newly created conflicting allocation;
s. reallocating at least one previously allocated booking whereby an empty table is retained between one or more booked table or table combinations;
t. utilising constraint information to reallocate all bookings from the highest ranked available table or table combination in a descending order of rank,
u. reallocating at least one previously allocated booking whereby the ranking of the booking requestor determines the table or table combination allocated;
v. reallocating at least one previously allocated booking utilising one or more qualitative constraints derived from information associated with the booking requestor including but not limited to a stated occasion associated with the booking, a menu or courses selected by the requestor, the courses selected by the requestor, ancillary products selected by the requestor and the date of the booking; and
w. reallocating all bookings to one or more different table and table combination solution sets to determine whether at least one of the one or more different table and table combination solution sets results in a more optimal outcome, and if so, selecting the at least one of the one or more different table and table combination solution sets that results in the more optimal outcome.

In one embodiment of the system the ranking from best to worst of all tables and table combinations available for booking requests In one embodiment of the system the relative location of each table and table combination In one embodiment of the system wherein the algorithm can determine if additional furniture can be brought in or removed from the available list of tables and table combinations if such action will result in a more optimised outcome.

In one embodiment of the system offering different menus and pricing for different booking intervals, services, dates and dates.

In one embodiment the optimisation algorithm allows for the splitting of a venue into spaces, subspaces, sections and or classes and for the allocation of tables and table combinations for each of the different spaces, subspaces, sections and classes for the structured iterative allocation process to be undertaken independently of each other.

In one embodiment, the data base includes menu information including different menus different numbers of courses per menu, different group sizes, wherein the menu information is allocated different periods of time, wherein, the menu information is utilised as part of the allocation of booking times accepted. The use of the menu information prevents overlaps or conflicts.

In one embodiment, a pre-payment decision tree is provided whereby each booking request is reviewed to determine if pre-payment is required for the booking to be secured. As an example, some form of pre-payment may be required through the application of one or more constraints for a particular booking request which could vary by day of week, a particular event irrespective of the day, by peak and off-peak times on a particular day, by menu selected, by courses selected, by group size, by occasion using an algorithm to determine the best and most appropriate requirement for the booking to a table or table combination.

In more detail, a seventh aspect of the embodiment provides a computing system for optimising the revenue and contribution of one or more spaces in a venue, which comprises a venue interface and input module to permit the venue to enter information into the system utilised by the one or more optimisation algorithms in the booking allocation process to optimise the quantitative and qualitative outcomes of the space using a table and table combinations solution pool from which to find an optimised outcome.

In one embodiment a computer system in a venue with one or more spaces for optimising and allocating booking requests to tables and table combinations wherein the first allocation is not made until a specific predetermined threshold has been reached or exceeded such as the number of booking requests received or a specific time before the iterative allocation or reallocation of all bookings to tables and table combinations In one embodiment of the computer system wherein the tables and table combinations are arranged into subgroupings.

In one embodiment of the system where all the tables and table combinations are ranked utilising multiple criteria.

In one embodiment of the system where the constraint information includes customer information and third-party databases to rank the one or more booking requests In more detail an eighth aspect of the embodiment provides a computing system in accordance with the first aspect of the invention, wherein venue constraints are varied utilising one of a forecasting module arranged to use historical data to predict probable desired outcomes and an artificial intelligence engine arranged to review both historical data and external data to predict probable desired outcomes, wherein the predicted outcomes are utilised to vary one of the venue constraint information and the strategy of the venue to in turn affect the optimisation of quantitative and qualitative outcomes.

In one embodiment the matching of a booking requestors information with the constraints of the venue to offer the booking requestor possible options and plans based on their requirements as well as plans to add or remove objects to further personalise their needs and requirements.

In one embodiment of the system a pricing grid to provide pricing information for each plan and permitted personalisation variations.

In one embodiment the use of artificial intelligence to interact and better tailor and optimise the quantitative and qualitative constraints to achieve the outcomes based on the strategy of the venue while best meeting the needs of the customer. The venues can include function spaces, event spaces, workspaces hotel and accommodation.

Broadly, a ninth aspect of the embodiment provides for a computing system for optimising the allocation of products and services provided by a venue. The services include booking times and durations, which are controlled such as by offering specific times and time durations, wherein associated products or services that offer the greatest revenue and/or other desired contribution are only made available during peak times and lower revenue products are made available during off-peak periods to assist the optimisation of quantitative and qualitative outcomes based on the strategy of the venue. In other words, broadly speaking, embodiments of the system are arranged to vary offerings to booking requestors based on the requirement and desirability of providing specific products during specific service periods or times. In one embodiment, the invention is arranged to be optimised for the supply of products to specific service industries which offer a combination of the rental (or occupation) of a physical space and the provision of other products and services, such as hairdressers, car parks, massage services, and other trade and professional services.

In one embodiment of the system in allocating online bookings using customers information.

In one embodiment of the system filtering products so that availability is only shown to certain customers products, services, prices, times, durations and terms and conditions are only shown and made available to certain customers and not to others. In one example, discriminating on the availability and offers to customers based on a customer's ranking.

In a tenth aspect, there is provided a computing system for optimising the allocation of products and services for travel, aviation, cruising, rail, coach, holidays, car rental and other similar activities and businesses In one embodiment where customers information can be used in the bookings and allocation process to offer a more personalised, more bespoke and more efficient service to customers while maximising the optimisation of quantitative and qualitative outcomes based on the strategy of the entity.

In one embodiment of the system filtering products so that availability is only shown to certain customer's products, services, prices and terms and conditions are only shown and made available to certain customers. In one example, discrimination the availability and offers based on customer's ranking.

In an eleventh aspect, there is provided a computer enabled method for optimising the use of tables and table combinations in a venue, comprising the steps of: receiving at least one request to reserve a table or a table combination within the venue from at least one remote user from an application residing on a remote device via the communications network, as well as retrieving other information and constraint information from the data base and using that information to communicate with a user prior to accepting a request for a booking and then determining whether other requests for tables and table combinations have been made by other users, and if so, retrieve information regarding the other requests and information pertaining to those requests for tables or table combinations and combine the at least one request with other requests to form a pool of requests, and other information pertaining to those requests retrieve constraint information regarding the venue, and iteratively allocate all requests from the pool of requests utilising the restraint information to produce an optimised table and table combination allocation instruction set, wherein the optimised prioritised and re-allocated, tables or table combinations allocation instruction set is provided to one or more users associated with the venue.

In one embodiment the optimisation algorithm allows for the splitting of a venue into spaces, subspaces, sections and or classes and for the allocation of tables and table combinations for each of the different spaces, subspaces, sections and classes for the structured iterative allocation process to be undertaken independently of each other.

In one embodiment, the data base includes menu information including different menus different numbers of courses per menu, different group sizes, wherein the menu information is allocated different periods of time, wherein, the menu information is utilised as part of the allocation of booking times accepted. The use of the menu information prevents overlaps or conflicts.

In one embodiment, a pre-payment decision tree is provided whereby each booking request is reviewed to determine if pre-payment is required for the booking to be secured. As an example, some form of pre-payment may be required through the application of one or more constraints for a particular booking request which could vary by day of week, a particular event irrespective of the day, by peak and off-peak times on a particular day, by menu selected, by courses selected, by group size, by occasion using an algorithm to determine the best and most appropriate requirement for the booking to a table or table combination.

In a twelfth aspect, there is provided a computing system for optimising the use of space in a venue, comprising: a user interface providing module arranged to provide a user interface to at least one remote user via a communications network, a user input receiving module arranged to receive at least one request to reserve a space for a period of time within the venue from the at least one remote user via the communications network, a negotiation module in communication with a processor and arranged to receive the at least one request and communicate with a database to retrieve constraint information regarding the venue and determine whether the at least one request can be accepted, and if not, utilise the processor to retrieve information regarding the other requests for spaces and propose at least one alternative request to the user via the user interface, wherein if the at least one alternative request is accepted by the user, the at least one alternative request is saved in the database.

The negotiation module may propose at least one alternative request using past alternative request data retrieved by the processor from the database.

The past alternative request data may include the frequency of the acceptance of the at least one alternative request by the user.

The negotiation module may be biased to propose at least one alternative request based on the relative frequency of the acceptance of the at least one alternative request by the user when compared to other alternative requests saved in the database.

The negotiation module may provide at least one alternative request until such time as the request is abandoned by the user.

The at least one alternative request may include an autonomously generated incentive to provide an incentive to the user to accept the at least one alternative request.

The incentive may include at least one of a good and service related to the at least one alternative request.

In a thirteenth aspect, there is provided a computing system for optimising the use of space in a venue, comprising a user interface providing module arranged to provide a user interface to at least one remote user via a communications network, a user input receiving module arranged to receive at least one request to reserve a space within the venue from the at least one remote user via the communications network, an optimisation module in communication with a processor and arranged to receive the at least one request and communicate with a database to determine whether other requests for spaces have been made by other users, and if so, utilise the processor to retrieve information regarding the other requests for spaces and combine the at least one request with other requests to form a pool of requests, retrieve constraint information regarding the venue, and iteratively allocate all requests from the pool of requests utilising the restraint information to produce an optimised space allocation instruction set, wherein the optimised space allocation instruction set is saved in the database and provided by a space allocation user interface to one or more users associated with the venue.

The restraint information may include the space available for allocation within the venue.

The database may include sub-space constraint information regarding sub-spaces with the space available within the venue, whereby the iterative allocation of requests includes utilising the sub-space constraint information to optimise the allocation of space in the venue.

The database may include object constraint information regarding at least one object arranged to be allocated to a space, whereby the iterative allocation of requests for spaces includes utilising the object constraint information to optimise the allocation of space in the venue.

The object constraint information may be information regarding the dimensions of one or more tables.

The sub-space constraint information may be information regarding a sub-space within the venue.

The venue may be a restaurant.

In a fourteenth aspect, there is provided a computer enabled method for optimising the use of space in a venue, comprising the steps of receiving at least one request to reserve a space within the venue from the at least one remote user via the communications network, determining whether other requests for spaces have been made by other users, and if so, retrieve information regarding the other requests for spaces and combine the at least one request with other requests to form a pool of requests, retrieve constraint information regarding the venue, and iteratively allocate all requests from the pool of requests utilising the restraint information to produce an optimised space allocation instruction set, wherein the optimised space allocation instruction set is provided to one or more users associated with the venue.

In a fifteenth aspect, there is provided a computer system for optimising the use of a restaurant, comprising: a database arranged to provide historical and live data regarding the use of the resources of a restaurant, an input module arranged to receive information regarding the actual usable resources at any given time, an optimisation module in communication with a processor and arranged to receive the at least one request and communicate with the database to receive the historical and live data and the actual usable resource data, wherein the data is analysed utilising a yield determination algorithm to determine the relative optimal use of the usable restaurant resource. The optimisation module may provide information regarding one or more parameters that may be optimised to increase the yield of the restaurant.

The historical data may be utilised by the algorithm to forecast future demand.

The database may include information from other restaurants, to provide comparison data.

The historical data may be utilised to calculate resource requirements.

In a sixteenth aspect, there is provided a computing system for optimising the use of space in a venue across a defined period of time, comprising a user interface providing module arranged to provide a user interface to at least one remote user via a communications network, a user input receiving module arranged to receive at least one request to reserve a space within the venue from the at least one remote user via the communications network, the user further providing a period of time for which the space in the venue is to be utilised, an optimisation module in communication with a processor and arranged to receive the at least one request and communicate with a database to determine whether other requests for spaces have been made by other users, and if so, utilise the processor to retrieve information regarding the other requests for spaces and combine the at least one request with other requests to form a pool of requests, retrieve constraint information regarding the venue including the periods of time for which the requests for space are associated with, and iteratively allocate all requests from the pool of requests utilising the time restraint information to produce an optimised space allocation instruction set, wherein the optimised space allocation instruction set is saved in the database and provided by a space allocation user interface to one or more users associated with the venue.

The user interface may be arranged, in response to restraint information provided by the user, to provide additional restraint information to the user, wherein the system provides an interface to allow the user to accept the additional restraint information or alter their request.

The database may include menu constraint information regarding menus available, the menu constraint being dependent on the time period constraint information provided by the user, whereby the computing system provides a choice to the user to accept the additional restraint information or the user alters their request dependent on the menu constraint information.

The database may include time and/or date constraint information regarding at least the time and/or date that a space is available to be allocated wherein each block of time and/or date includes an indicator arranged to allocate a relative rating to the time and/or date, wherein the rating includes a constraint condition.

The computing system may further include a time and/or date optimisation algorithm wherein the user is prompted to select a different time and/or date depending on the output of the algorithm.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which:

FIG. 2*c*, FIGS. 2*d-i* to 2*d-iv*, FIGS. 2*e* to 2*f* are flowcharts illustrating a computer enabled method in accordance with an embodiment of the invention;

FIG. 2*g* is a flowchart illustrating a diagrammatic representation of a system in accordance with an embodiment of the invention as compared to the prior art;

FIGS. 2*h* and 2*i* is a flowchart illustrating a diagrammatic representation of a system in accordance with the prior art;

FIGS. 2*j* to 2*m* is a flowchart illustrating a diagrammatic representation of a system in accordance with an embodiment of the invention;

FIGS. 9*a* to 9*i* are screenshots illustrating constraint set-ups within the system including a menu decision tree, pre-order constraints, menu set-up, menu and course duration time set-ups, Super VIP and VIP overrides, table reset times, alternate reporting calendar set-up an embodiment of the invention.

DETAILED DESCRIPTION OF PREFERRED EMBODIMENTS

Figure 1A:
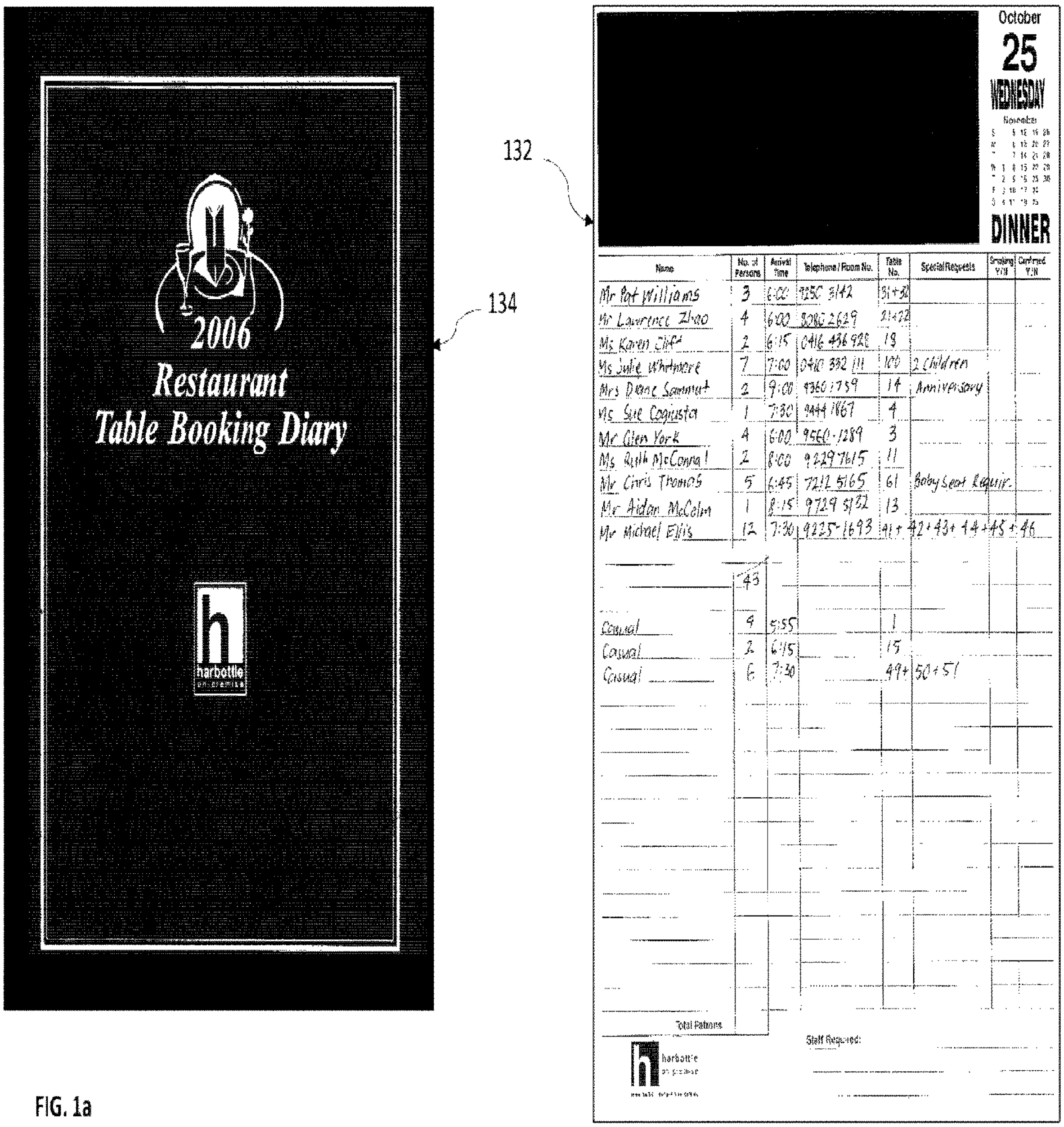
FIG. 1*a* is an extract from a manual reservations' diary.
Figure 1B:
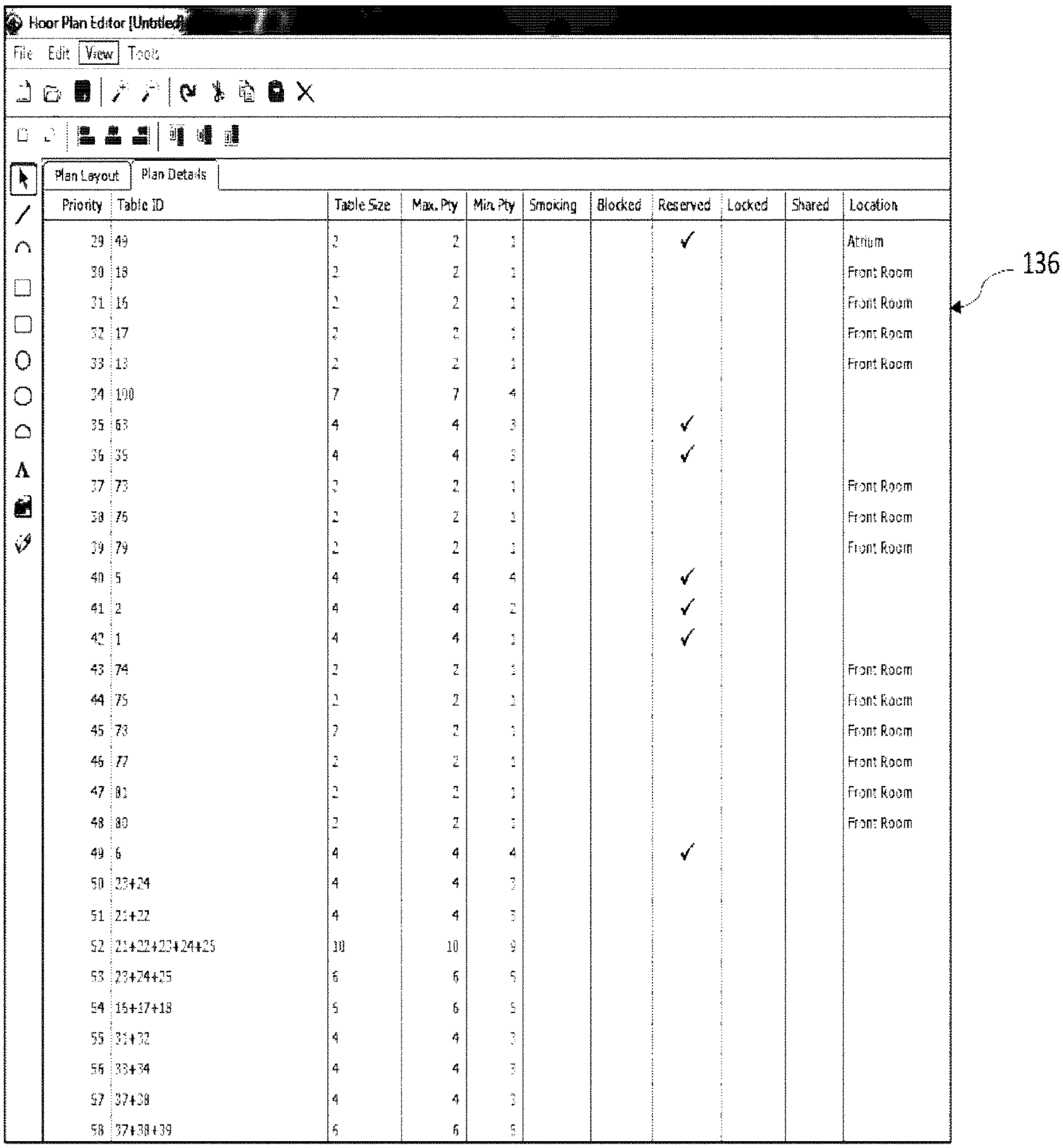
FIGS. 1*b-e* are screenshots of the interface for various prior art booking/table reservations systems.
Figure 1C:
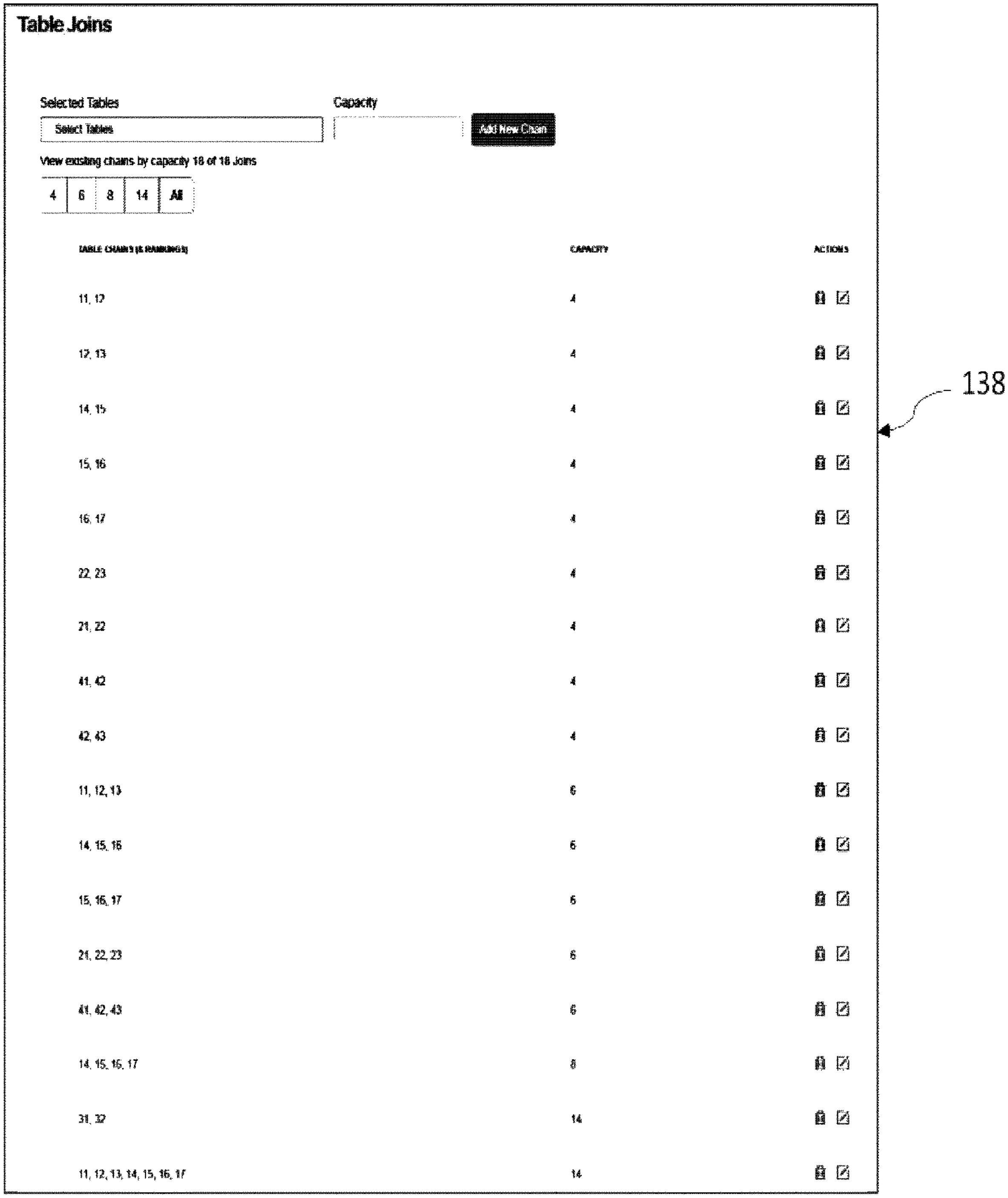
Figure 1D:
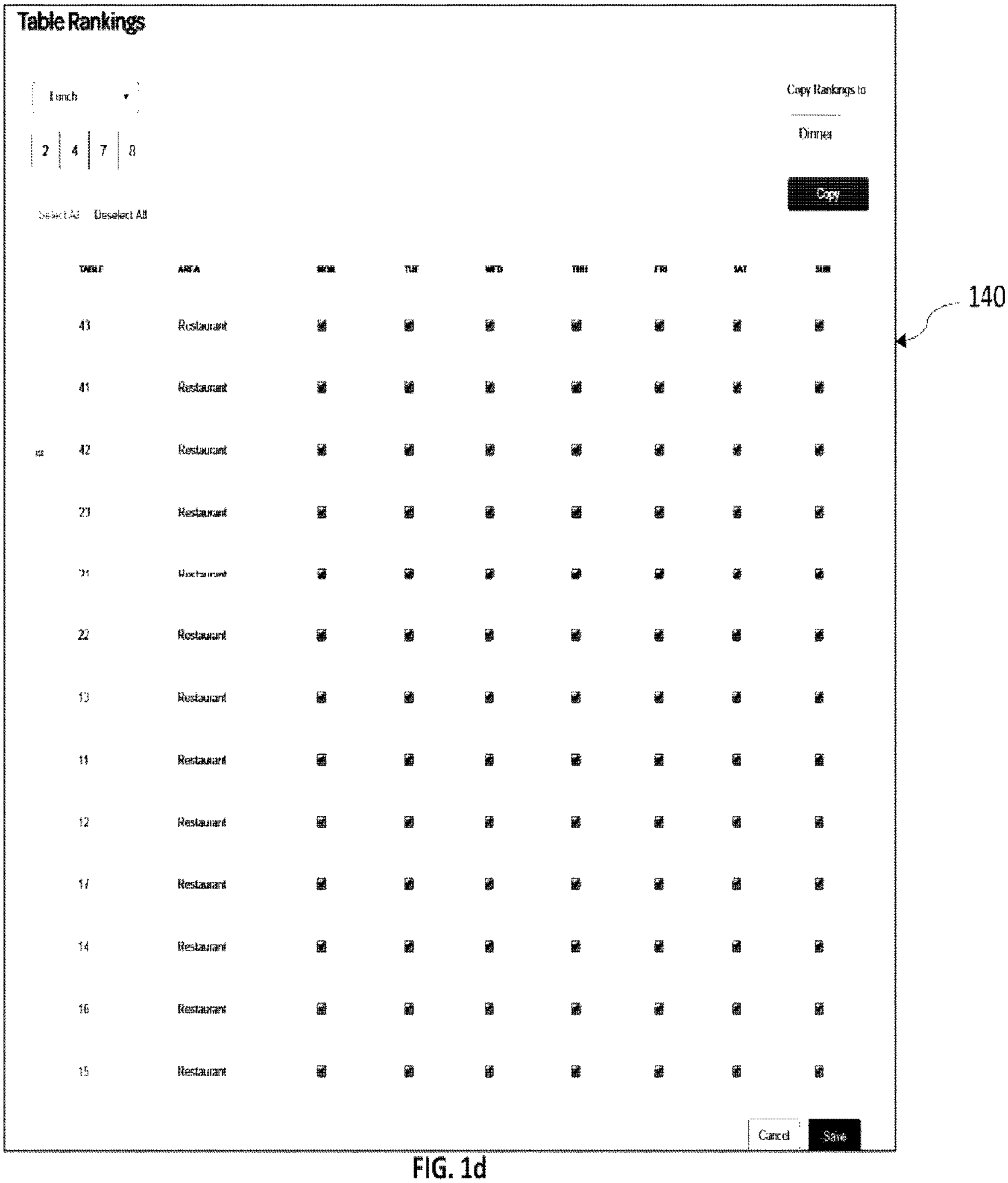
Figure 1E:
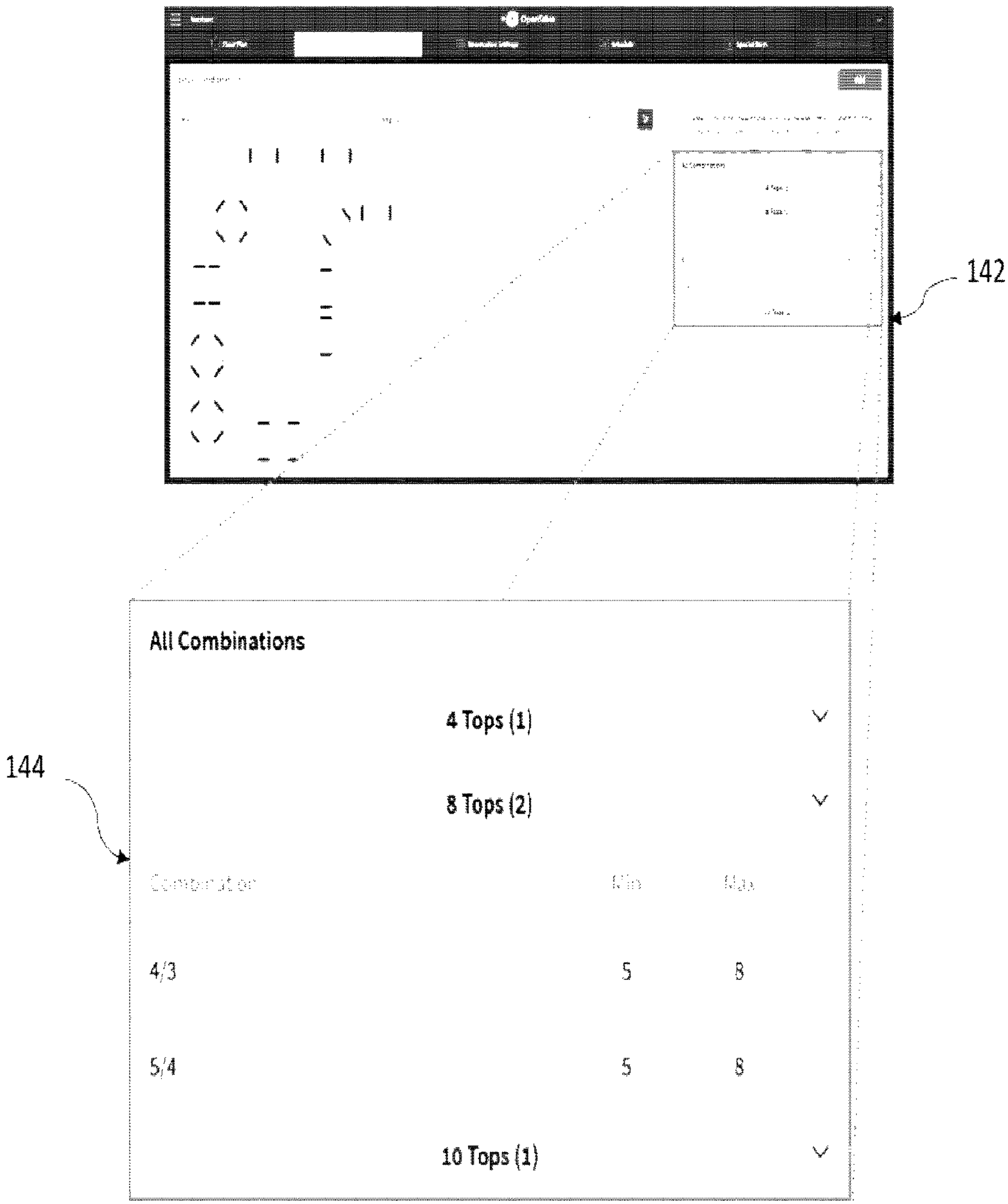

The present invention relates generally to a computing system, method, computer program and data signal for managing a venue with one or more spaces. In one embodiment which is described in more detail herein below, the invention is directed to a computing system, computer enabled method, program and data signal which includes and one or more modules, the modules including algorithms arranged to receive venue constraint information regarding one or more aspects of the space and also receive requestor constraint information regarding one or more aspects of the booking request, and to use the received information to optimise both quantitative and qualitative outcomes for both the booking requestor and the venue.

The qualitative and quantitative outcomes may include improve the ambiance of the venue in one or more spaces, optimising use of the space, allowing booking requestors to request specific portions (e.g. tables or seating arrangements) or be allocated to a specific portion as a priority, offer and offering dynamic pricing and dynamic differentiated products and services. The algorithm provides true yield management, booking requestor self-management and an integrated and autonomous system. In one embodiment, the venue is a restaurant and the allocated portion may be a table, a seat at a bar, or any other seating arrangement.

In more detail, one aspect of the embodiment described herein provides a computing system for optimising the use of one or more spaces in a venue, which includes a user interface module arranged to provide a user interface to at least one remote user via a communications network. The embodiment further comprises a user input receiving module arranged to receive at least one request to reserve a space within the venue from the at least one remote user via the communications network.

The embodiment also comprises an allocation module which is in communication with a processor. The allocation module is arranged to receive the at least one request and communicate with a database via a processor to determine whether other requests for spaces have been made by other remote users.

If other requests for spaces have been made by other remote users, the allocation module either on receipt of a request or upon the activation of a trigger event utilises the processor to retrieve information regarding the other requests for the one or more spaces and combines the at least one request with the other requests to form a pool of requests, retrieve constraint information regarding the venue, and iteratively allocate all requests from the pool of requests utilising the constraint information to produce an optimised space allocation instruction set, wherein the optimised space allocation instruction set is saved in the database and provided by a space allocation user interface to one or more users associated with the venue.

Embodiments of the present invention use a knowledge of the dimensions of the space and what the Applicant has dubbed a "volumetric" algorithm to optimise capacity and revenue within a single venue or a multi-venue restaurant environment that can include diverse operations such as fine dining, casual dining, cafes and cabaret shows. The system has an encoded algorithm which avoids the inherent constraints in prior art solutions. All known prior art solutions are based on allocating booking requests to a set list of tables and table combinations using simple look-up formulas. In a static allocation model, allocation consists simply of finding the first available and suitable table in the set list. In so called "dynamic" solutions, combinatorial constraint programming is used to allocate each booking request to a table or table combination. Combinatorial constraint programming, while theoretically possible, is not practical, as it is not computationally efficient and therefore is not workable in the "real world".

In broad terms, one primary difference between the embodiments described herein and prior art is that the embodiment defines the problem to be solved as the "optimisation of the use of a space" using both quantitative and qualitative constraints as compared to the prior art, that has defined the problem as the "management of tables" with prior art algorithms relying on the selection of the best fit table or table combinations from a predetermined list of tables and table combinations to which a previous booking has not been allocated.

By defining the problem as the "optimisation of the use of a space" and using volumetric algorithms with quantitative and qualitative constraints to solve the allocation problem of finding the optimal table or seating location for each booking requestor, the embodiment provides an autonomous system which not only allocates booking requests in a much more optimal manner (since it can "weigh" and optimise for a series of complex desired outcomes) but also operates across the entire experience of the booking requestor, from the time a booking is requested, to the personalisation of the experience at the venue, until the service has been completed and the bill paid. In the proceeding description of an embodiment, for the ease of reference, the complex set of desired outcomes that a venue wishes to deliver to a booking requestor (customer) will be referred to, in short form, as the "utility" derived by the customer from the booking.

By defining the problem as the "optimisation of the use of a space" embodiments of the invention provide a fundamentally different conceptualisation of the problem to be addressed, in that, in optimising a restaurant, there are many more considerations than the random allocation of booking requests to predefined tables and table combinations. To provide a specific example, a well-run restaurant, if it is to maximise yield and grow customer loyalty, has to determine how to best use the space available, which includes the ability to allocate booking requests to tables in a manner that takes into account other aspects of the dining experience, such as the ambiance within the restaurant, the allocation of a person to their preferred location or table, the distance between tables (which impacts on desirable qualities during the dining experience such as privacy), the ability of the restaurant to offer different menus at different times and at different prices to the same or different areas within a restaurant, allowing diners to extend meal period times without causing strain on available resources or conflicts with other bookings, offering different menus, offering personalisation to achieve the individual requirements and strategies of different venues and restaurants in a way that also better meets customers' requirements and demands. As such, the "volumetric" algorithm described and defined hereinbelow is unique in that the algorithm utilises quantitative and qualitative criteria to provide an integrated and autonomous restaurant management system.

In the following description of an embodiment, specific terms will be used to broadly define particular features or aspects of the inventive concept or the information utilised to allocate a booking request, within the context of a specific example embodiment, namely the allocation of bookings in a restaurant.

Therefore, for the avoidance of doubt, in the embodiment described, the term "booking requestor" is a broader term for a person or entity interacting with the embodiment to make a booking request. Once a booking request is allocated, the booking requestor becomes a "customer", "patron" or "diner" of the venue. In the example embodiment, the term "restaurant" is utilised as a proxy for the term "venue", insofar as a restaurant is a practical example of a venue. The terms "space", "sub-space" and "section" refer to specific delineated areas of the venue. The term "allocated portion" refers to the specific area within the venue that is allocated to the booking requestor. In the "real world" example embodiment described herein, the "allocated portion" may be a table, a series of tables, a seat (such as a chair or a bar stool) or may simply be a physical space, devoid of specific furniture. Therefore, where reference is made to customer being allocated a table, table combination, a seat, etc., the reader is to interpret this reference as a specific example of a booking requestor being allocated an "allocated portion"

The preferred embodiment detailed below has been described under various headings for ease of reference by the reader and to provide a logical deconstruction of the features and aspects that comprise the claimed invention. However, it will be understood that the headings are provided merely as a guide to the reader, and no gloss should be taken from the headings to limit the embodiments or the broader inventive concept described herein.

In addition, while the description provided hereinbelow refers to aspects of the inventive concept that may be considered abstract in nature, such aspects are described in the abstract for the purpose of providing context to the technical implementation and the technical aspects of the claimed invention and no gloss is to be taken from the abstract description of underlying concepts to inherently limit the technical nature and scope of the invention. The Applicant makes no claim over the abstract concepts described herein, only to the inherently technical implementation as claimed in the claims of the present specification.

Space Management and the Optimisation of Outcomes

Broadly, the embodiment described herein is directed to a system and method for optimising the use of a space by optimising the table layout and seating capacity of a space in a venue (specifically a restaurant in the embodiment described herein) without combinatorial constraint programming or the industry adopted, and practically applied approach of static linear look-up formulas to allocate a booking a predefined set of table or table combination to which a booking has not previously been allocated to.

The embodiment provides a software application embodied in a system and deployed as a method that allows a user to create a plan of the venue to scale, as well as divide the venue into multiple spaces, multiple sub spaces, multiple sections and multiple classes. Further, in the context of the embodiment described herein, sections are designated as "flexible spaces" where furniture is not fixed and can be moved and repositioned while spaces and subspaces, to the extent that they do not overlap with a section, are locations where furniture, once positioned, is fixed or semi-fixed. That is, the furniture is either permanently fixed and therefore cannot be repositioned, or the furniture can be replaced (i.e. swapped for another table or chair) but cannot be moved within the location.

In the context of the embodiments described herein, the terms "class" and "classes" are distinct to spaces, subspaces and sections, and are overlayed as a layer "on-top" of spaces, subspaces and sections.

The term class refers to a number of qualitative characteristics ascribed to the area, which may include quantitative criteria and variables that reflect qualitative aspects of the area. All spaces, subspaces and sections may be ascribed a class, as may an individual table or seating arrangement. As an example, the qualitative and quantitative criteria and variables utilised to define a class may include a relative ranking of a view, ambiance, privacy, required gaps between tables, menu available, number of courses, styles of service or other criteria utilised to differentiate between the relative "experience" or outcome afforded to the booking requestor.

In more detail, the embodiment allows for the encoding of the physical dimensions and characteristics of all available furniture and other relevant objects, and the quantities of the furniture and objects, including their dimensions, such that a "to scale" plan or model can be generated. Such a model also includes the dimensions and location of other physical aspects of the venue, including doors, windows, kitchen and other preparation areas, toilets, etc., to enable the system to calculate the relative spacing and relationship between each one of the furniture and objects, to thereby determine the relative ability to place furniture or objects within the space, and also to determine the relative utility of placing the furniture and objects within the space, including the utility for specific booking requests, where a booking requestor has provided specific constraint information that the requestor wishes to satisfy in order to proceed with the booking.

This feature allows additional furniture to be brought into the space to cater for unusual booking requests. Moreover, yield and utility are optimised as the ability to position or reposition furniture or objects allows, for example, additional tables to be brought into the space under certain circumstances, such as where additional space is created as a result of joining tables together.

Correspondingly, the embodiment is capable of removing tables, in circumstances where a more optimised allocation may be achieved by removing tables from the space.

Such a feature is particularly useful for restaurants that have the ability to maintain a store of additional furniture in varying quantities and sizes. For example, it may be possible within a fixed or flexible space to interchange two round tables seating 6 people each with a number of rectangular tables that can seat 12 people when joined, thereby allowing a booking of 12 people to be taken on a single table by interchanging the round tables with smaller but joined rectangular tables.

Different spaces, subspaces and sections within the restaurant are defined with a table location index from which the system can then add table numbers to tables in sequential order when they are placed within a floor plan. Further, the table numbers dynamically vary in accordance with changes to the booking allocations, table layouts and number of tables used.

In one embodiment of the system a user can set up a reference floor plan layout as a reference point for the venue operator from which bookings can be allocated to. However, the system is not limited to using the tables and layout shown on the reference floor plan and can rearrange the tables by joining them, replacing them and/or removing them if a more optimised outcome is achieved by such variation. To assist the venue operator in their understanding of the changes made by the system, the system display changes and additional tables introduced by the system in a different colour.

The embodiment also includes further information which can be utilised to determine the "best" table to use within the allocated portion. The best table, being determined by the requestor constraint information and the venue constraint information for each booking request. For example, the best table for which to place a booking request may be a window table for a special occasion or for a booking willing to pay a premium, or the best table may be a quiet table for a business meeting or the best table may be one with no view for a booking request on a limited budget. Alternatively, the best table may be defined by the venue as the table that provides the highest revenue or permits the greatest number of bookings or the table that maximises the utilisation of the floor space. The embodiment also allows the venue to vary the parameters as to what it defines as the best table by service and by day to give the venue greater flexibility in meeting customer demand within its own strategy as well as allowing greater differentiation from competitors.

To achieve the varied desired outcomes, which may also vary at different points in time as well as vary depending on the demand profile for a particular service period, several individual algorithms can be selectively used in isolation or in combination to create a system and method for optimising the required outcomes. In one embodiment, the system is capable of eliminating unused space within a venue or restaurant when tables are required to be joined to form a larger table to cater for a larger booking size.

Advantageously, the system dispenses with the requirement for the input of a list of specific tables and table combinations as the system uses the physical characteristics of the furniture and objects, and the space to place all furniture and objects within the venue to generate a floor plan.

Customer Relationship Management

Broadly, the embodiment also provides a system and method for optimising the quantitative and qualitative outcomes of use of a space by optimising booking allocations to a table or a space while meeting qualitative outcomes and taking into account constraints such as the requirements of regular customers.

In one embodiment the system is linked to a venue's customer database and/or other third-party databases to determine the identity of the booking requestor. More particularly, where available, historical or preferential data relevant to the booking requestor can be accessed. Such data may include a ranking ascribed to the requestor, a preferred table or seating location within the restaurant, the number of previous visits, a spend amount per visit, a spend per person per visit, or any other information that may have an impact on the table allocated to the requestor. Such information is combined to determine a rank or similar metric, which is then utilised in the booking allocation process.

In one embodiment of the system, customers can be placed into various categories including the categories of Super VIP, VIP and a category for all other customers. The venue may select, in the embodiment, whether the categories are utilised in the booking allocation process. For example, the embodiment provides a feature whereby seating for selected customers such as Super VIP's is automatically allocated, guaranteed and fixed to their preferred table or location irrespective of other constraints, while maintaining the ability to optimise the use of a space around customers allocated to their preferred location. Similarly, VIP's can be allocated to their preferred location, but only if such an allocation does not adversely affect the optimisation of other required outcomes within the venue. Lastly, the allocation of all other bookings can be optimised to ensure that individual the customer experience is still maximised to the extent possible, by allocating tables in order of a ranking system.

As a corollary, the algorithm allows for the reallocation of bookings within a space so that regular requestors are provided with relatively "better" locations within the venue as compared to non-regular requestors.

It will be understood that in the context of the embodiment described herein, the terms "better" and "best" (and similar terms) are used to describe a location and/or table that may be qualitatively or quantitatively determined to be more desirable to either the booking requestor or to the venue, relative to other locations and/or tables within the venue.

The determination of which table is "better" or "best" is determined by calculating a metric value utilising a number of input values, as shown in FIG. 5*t*. The metric value takes into consideration intrinsic characteristics of the location in the venue of the table (e.g. is the table near a window or near the kitchen door? is the table in a quiet location or a noisy location? is the distance between the table and the next table large or small? Etc.) as shown generally at table 581. It will be understood that the metric may take into account any number of qualitative or quantitative variables that are relevant to describing the location of the table in the venue. Each variable, in turn, may be weighted accordingly. For example, in a restaurant with water views, the view from the table may be a variable that is more heavily weighted than whether the location is a quiet location. Therefore, tables with a water view may be ranked relatively higher than tables which are in a quiet area of the restaurant. The system allows the venue to set such variables in a manner that is consistent with the strategy and image of the restaurant.

It will be understood that the metric may be fixed, or may vary over time, depending on the relative importance of each input value due to other extrinsic factors. For example, a higher weighting may be ascribed to quiet tables during a lunch service, when privacy is more desirable for business customers, whereas a higher weighting may be ascribed to tables in a more central area of the venue during dinner service, where customers prefer a more lively atmosphere. Examples of the relative values ascribed to each characteristic is shown at table 583 of FIG. 5*t*.

Following on from the previous points, the algorithm can optimise ambiance and customer satisfaction by allocating the "best" tables to booking requests when the restaurant is not full. This is important when a space or a restaurant is not full as optimisation of the floor space may not achieve the best outcome for the restaurant as the provision of the best space for a booking may result in a customer being happier and possibly spending more than if they were seated in a worse space or if the bookings are concentrated in one area of the restaurant.

Figure 5A:
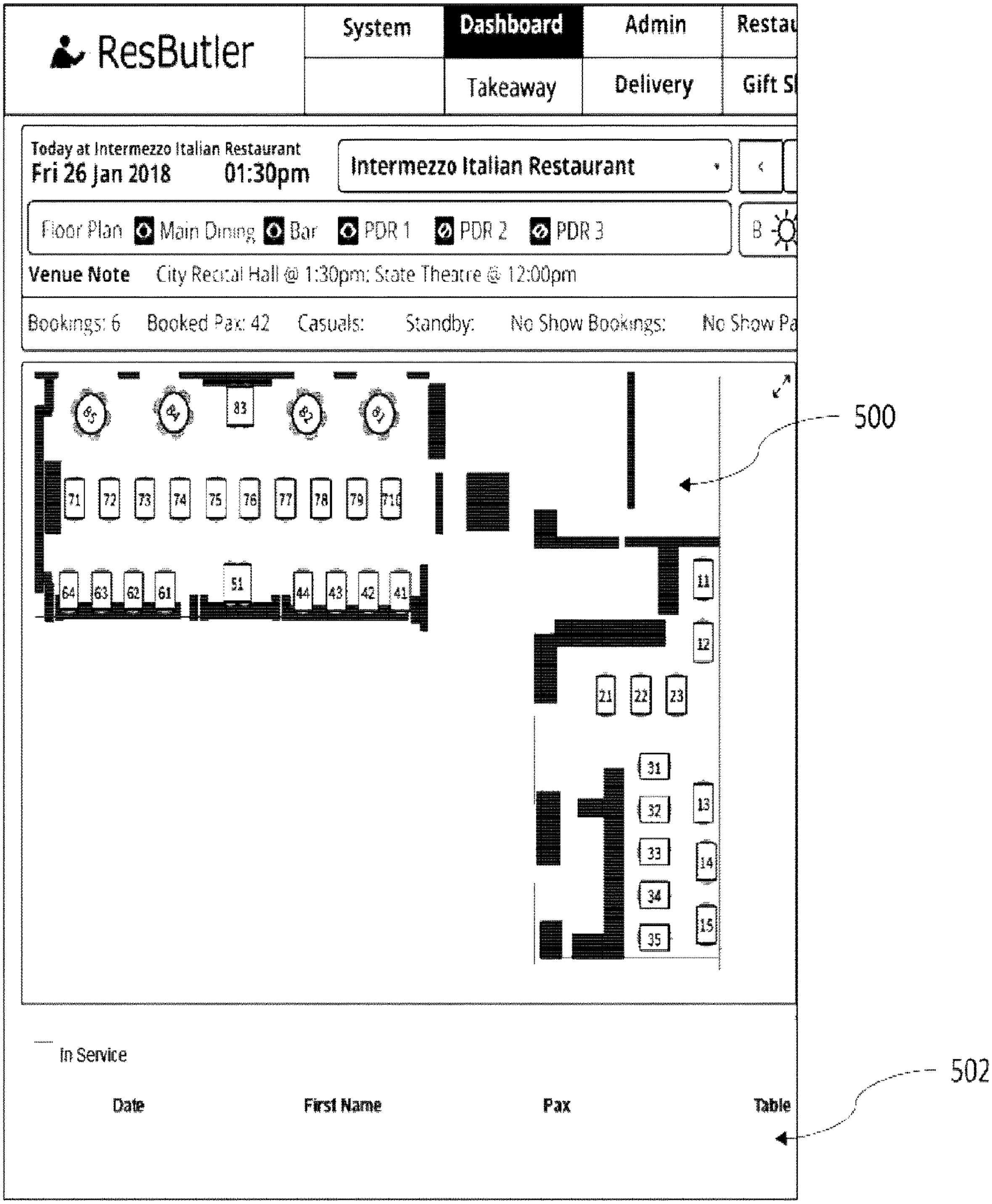
FIGS. 5*a* to 5*s* are screenshots illustrating dynamic booking allocations and a user interface screen in accordance with an embodiment of the invention.
Figure 5B:
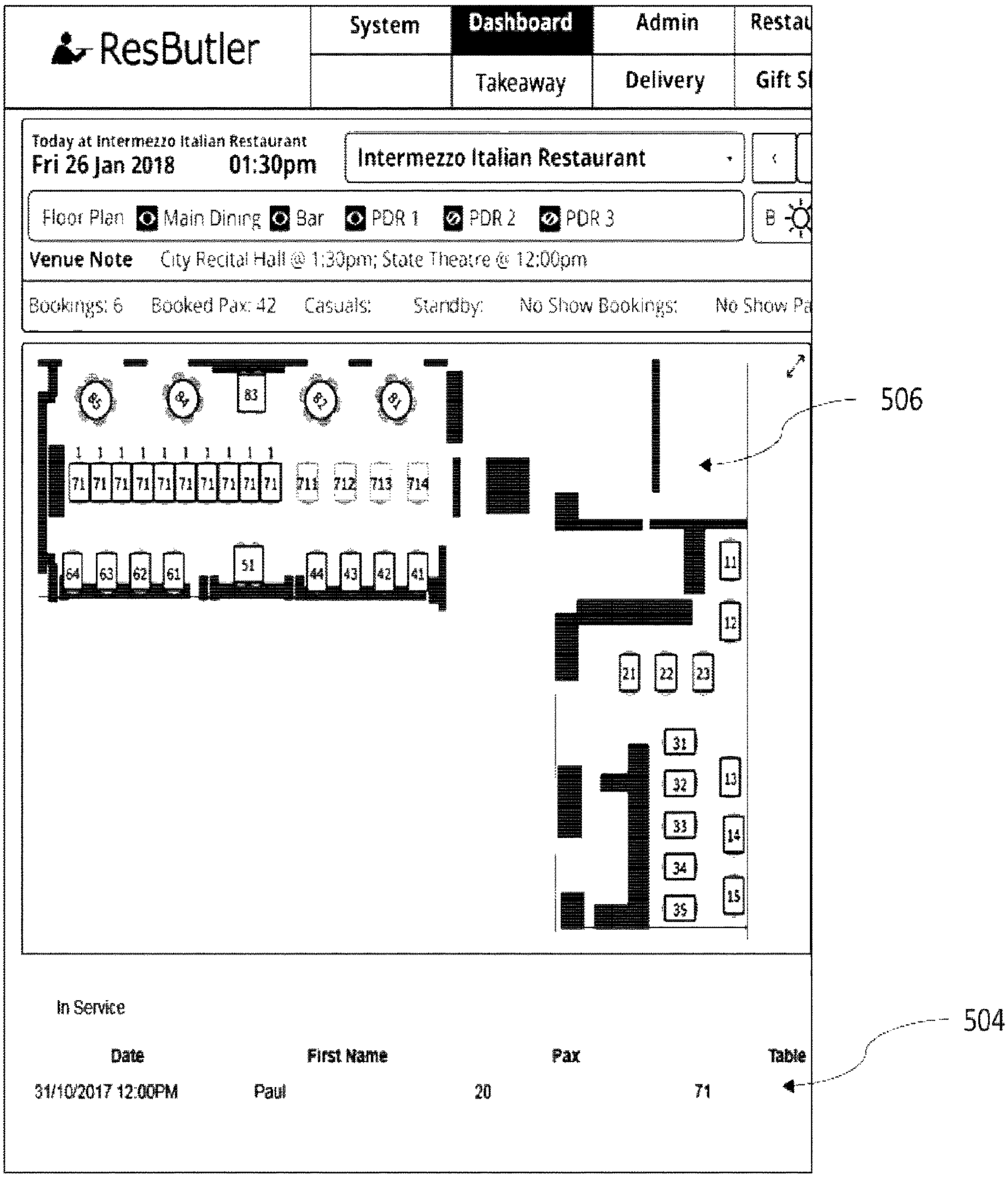
FIGS. 5*t* to 5*u* are diagrams illustrating table rankings within a class and customer rankings in accordance with an embodiment of the system.
Figure 5C:
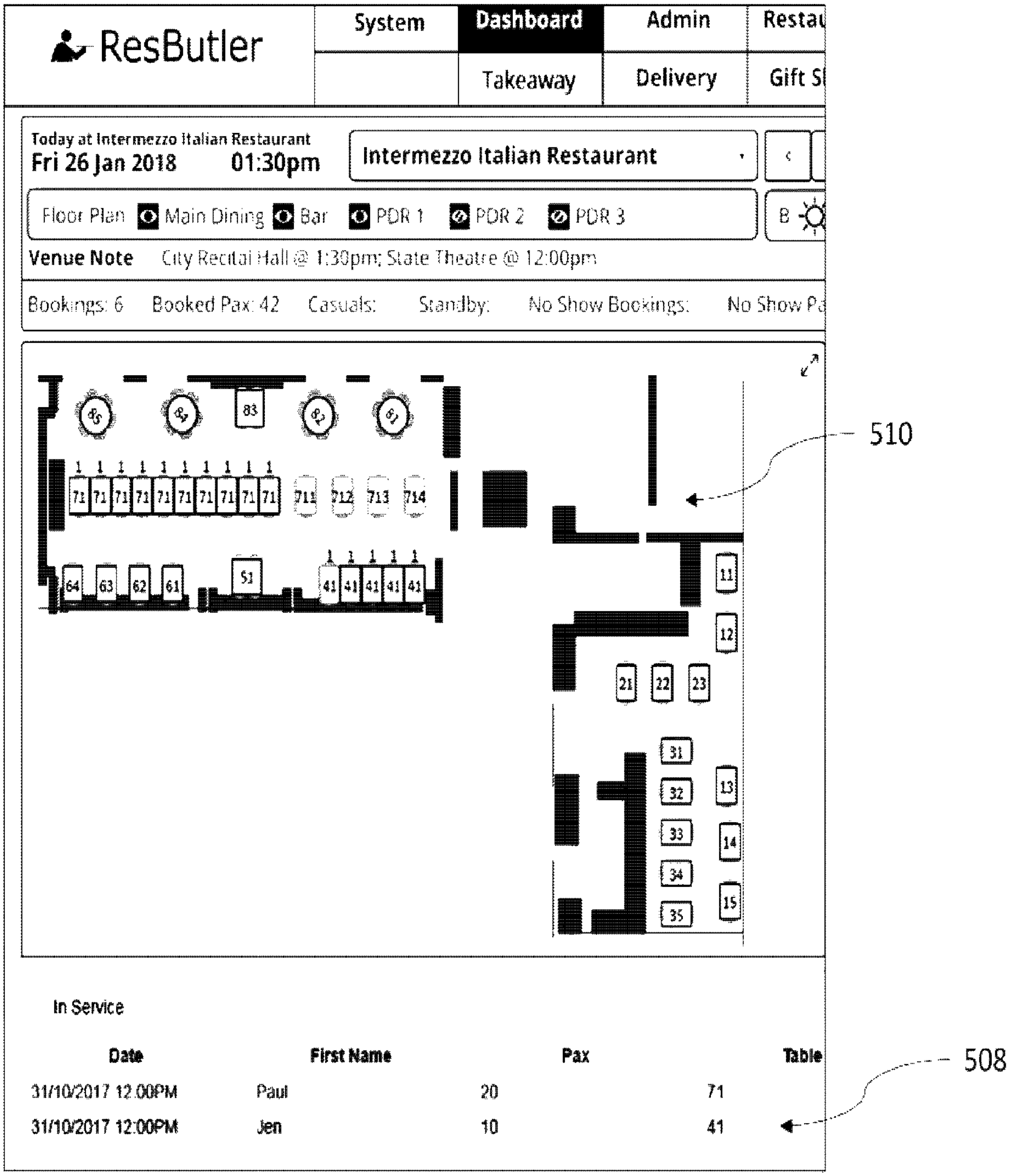
Figure 5D:
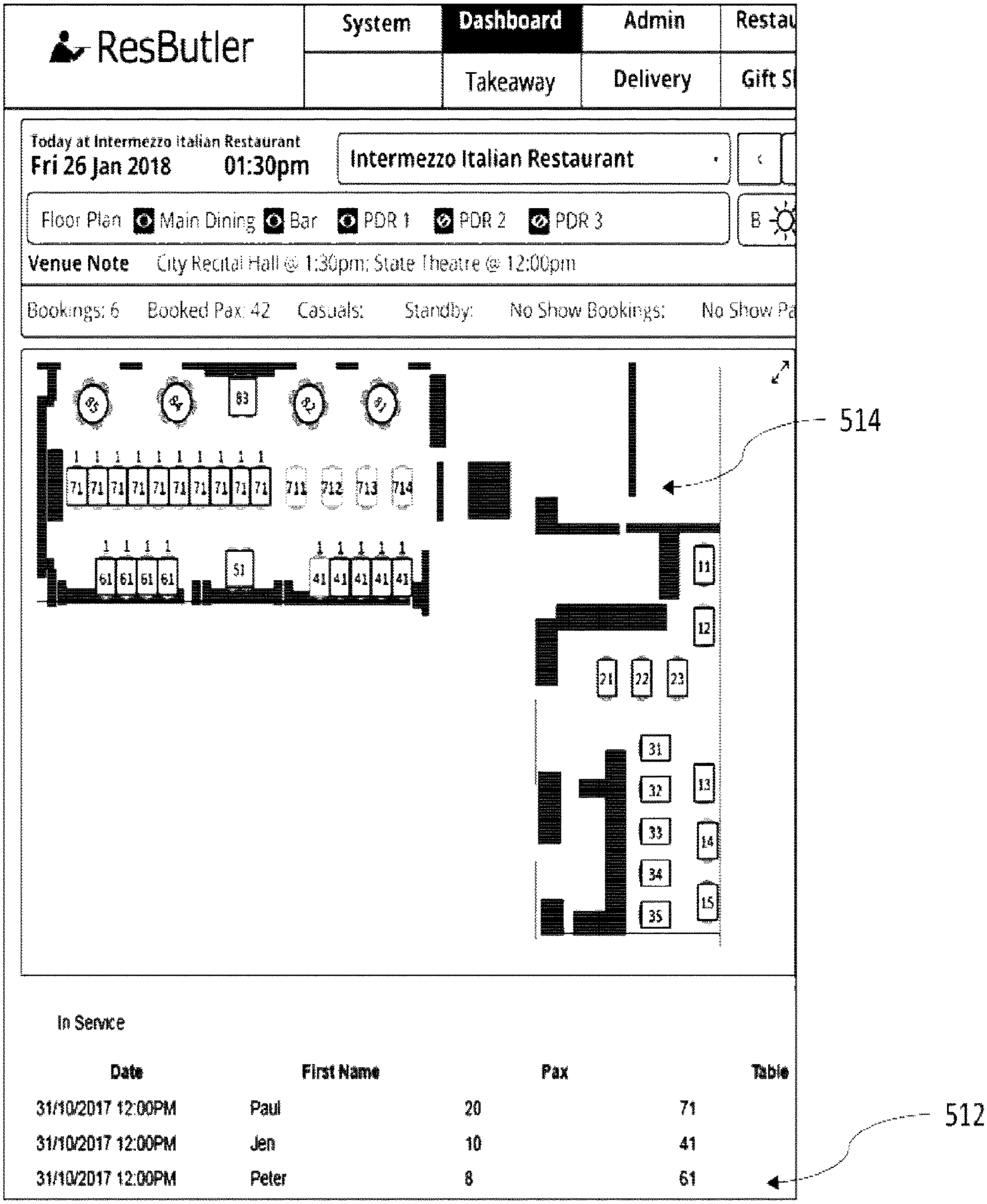
Figure 5E:
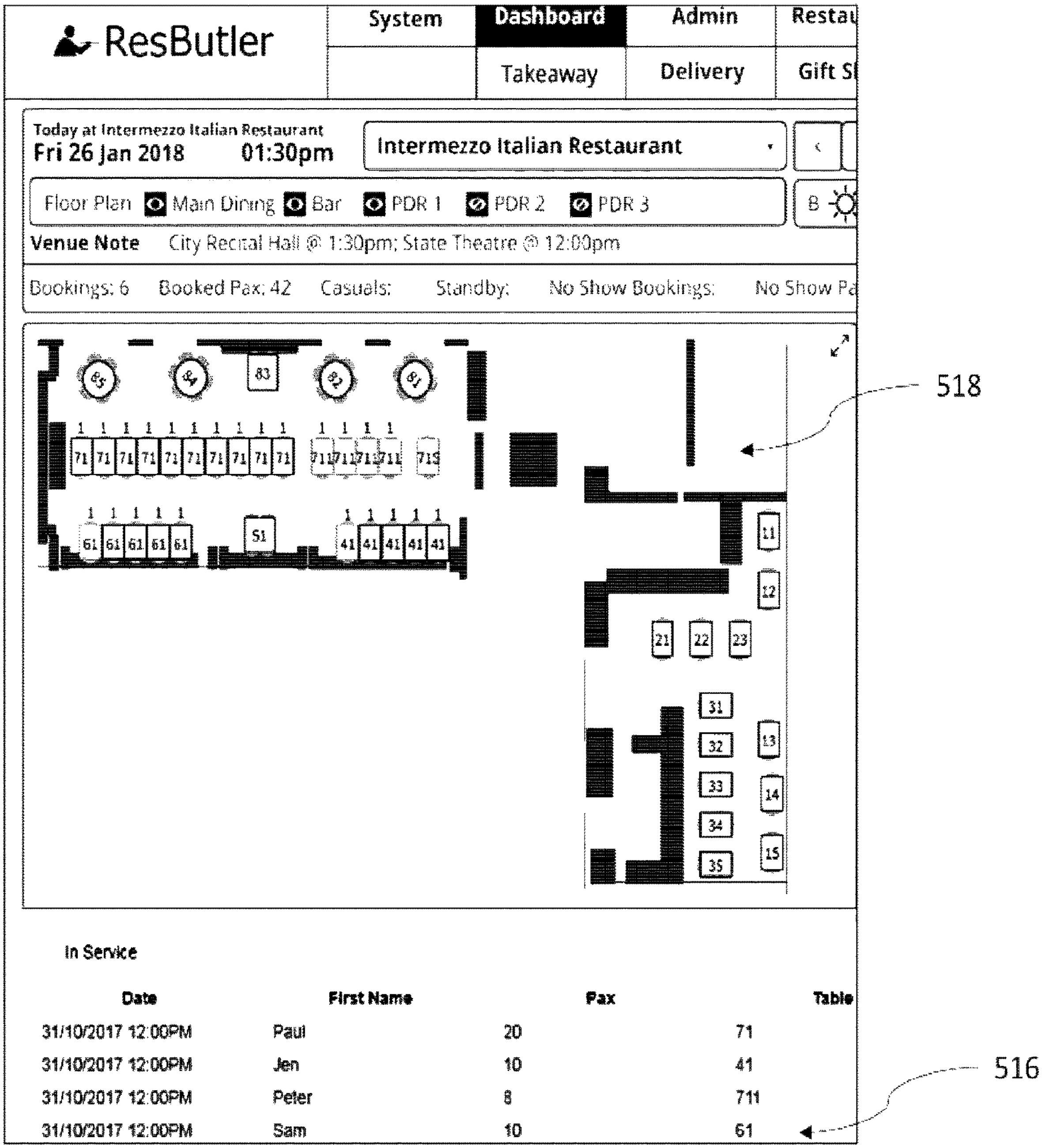
Figure 5F:
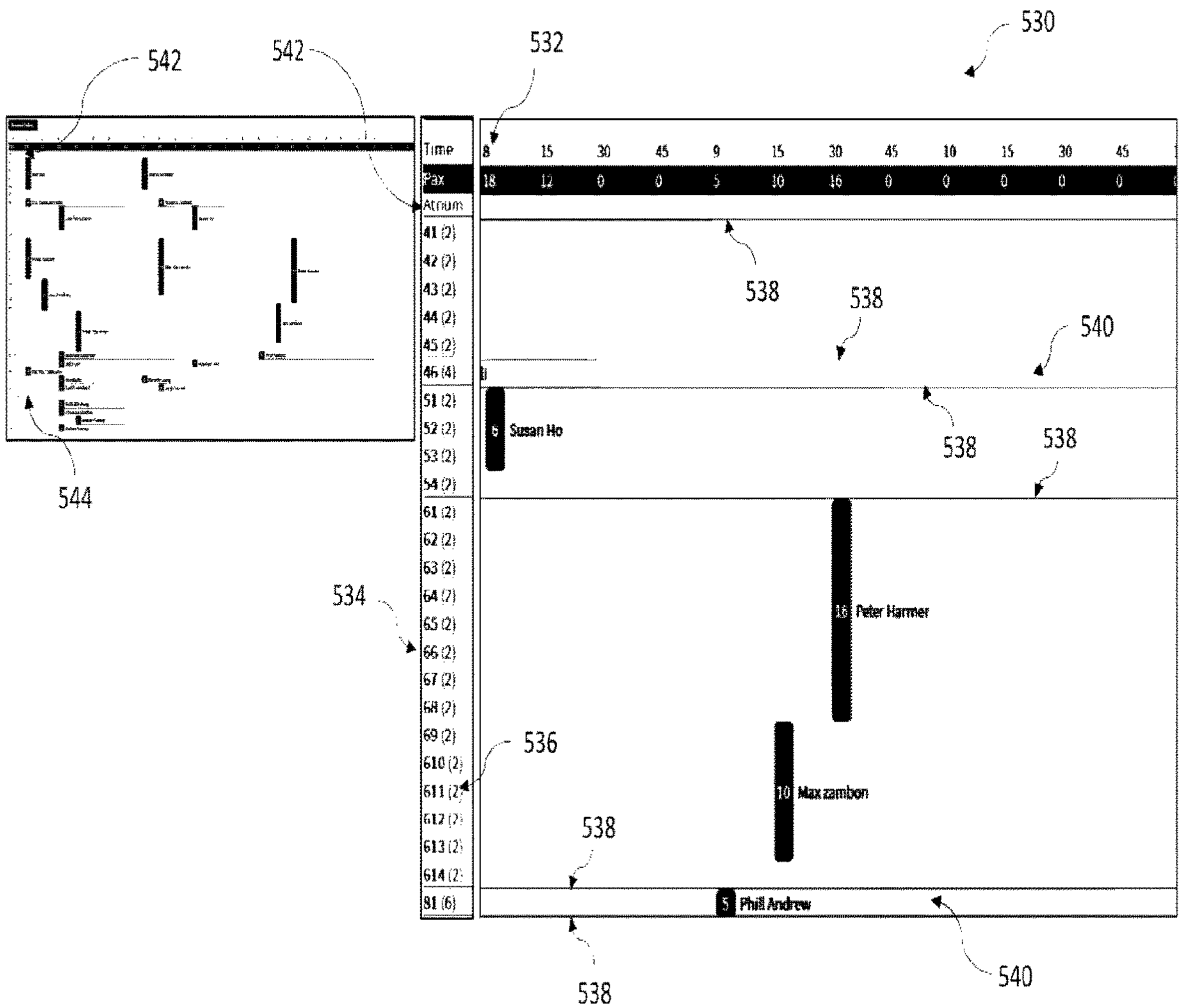
Figure 5G:
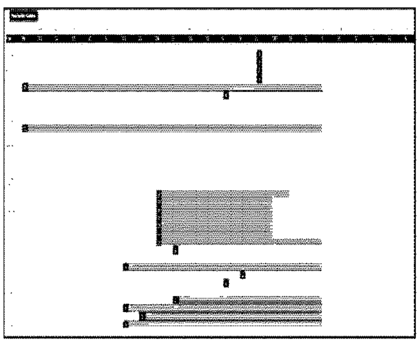
Figure 5G:
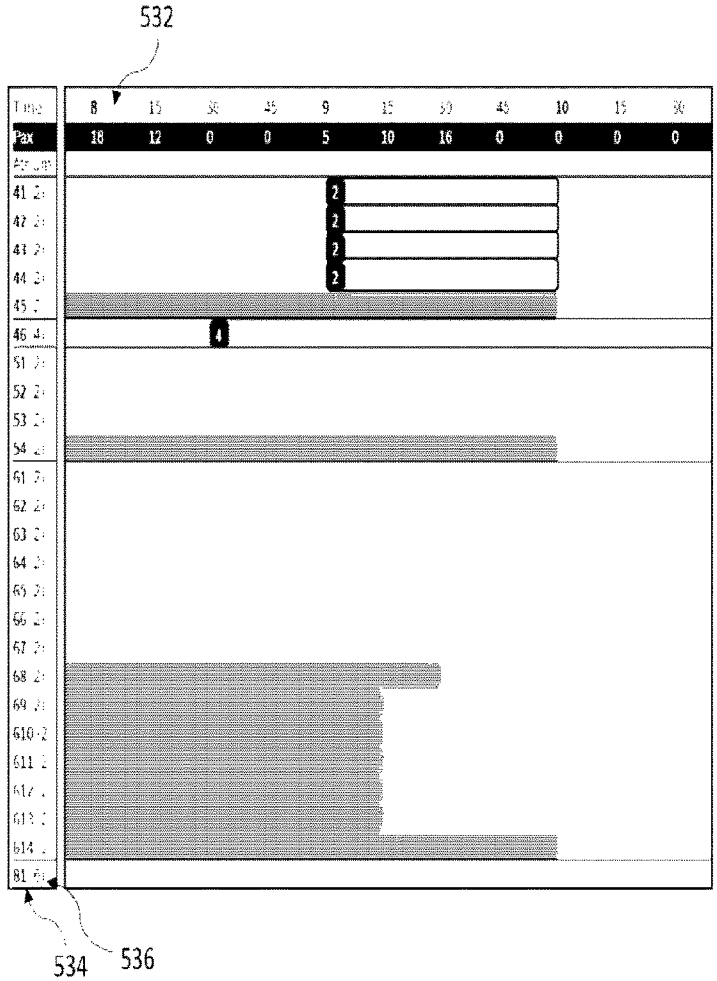
Figure 5H:
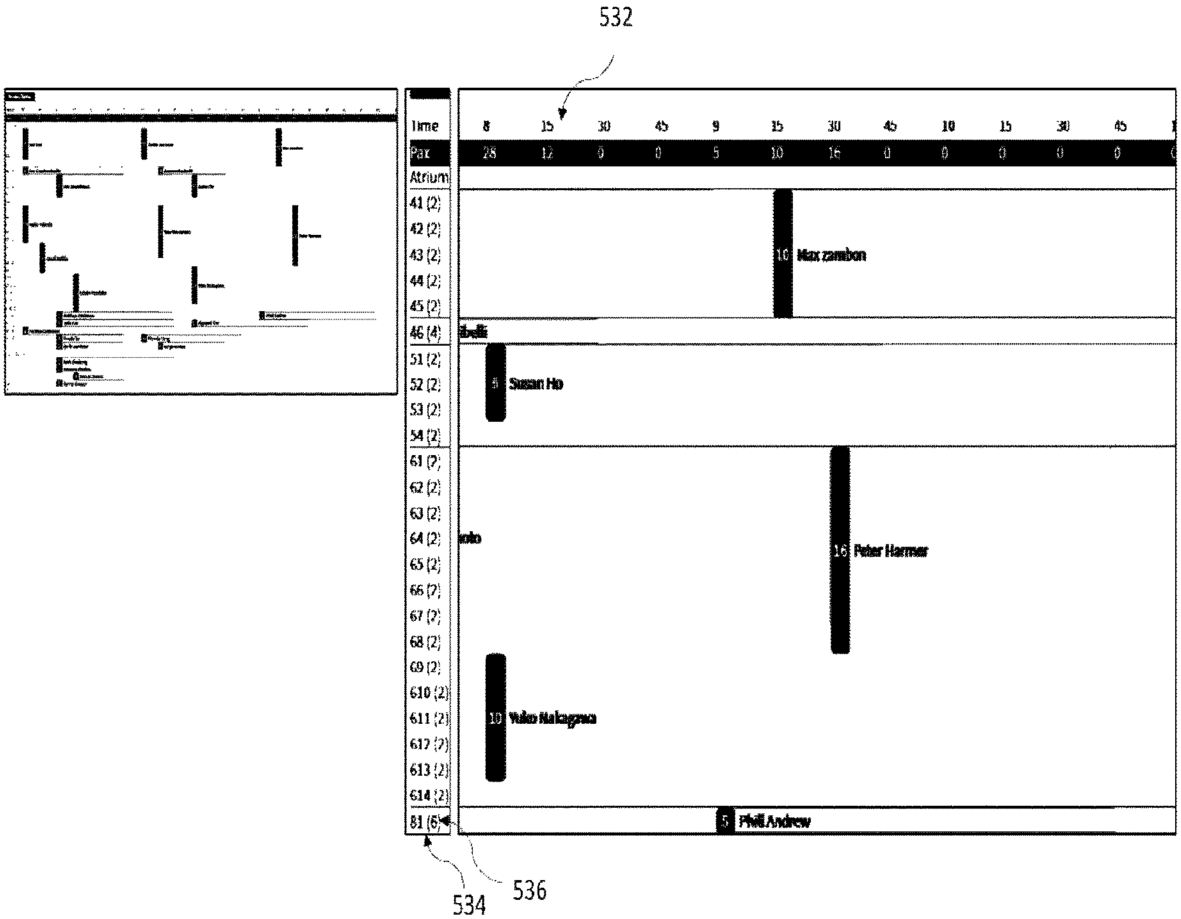
Figure 5I:
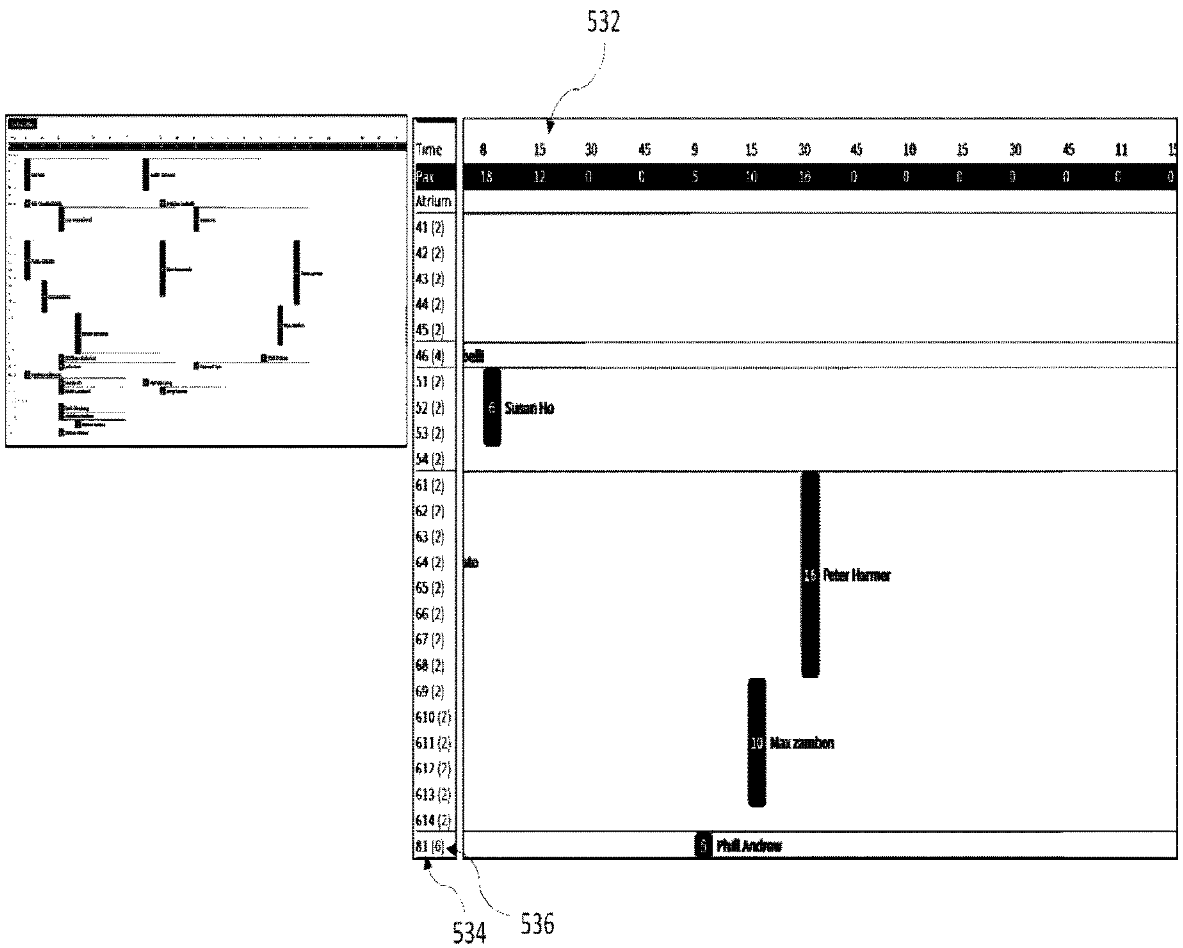
Figure 5J:
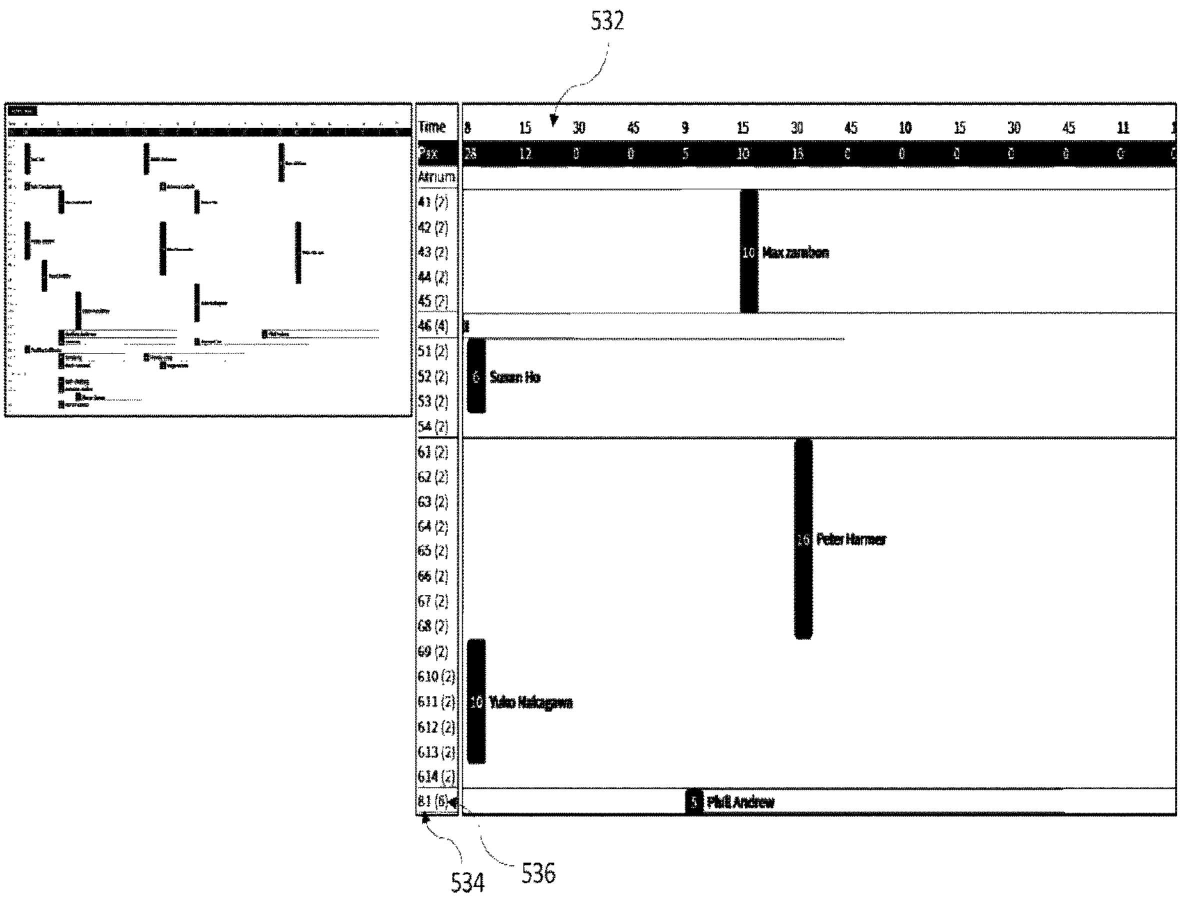
Figure 5K:
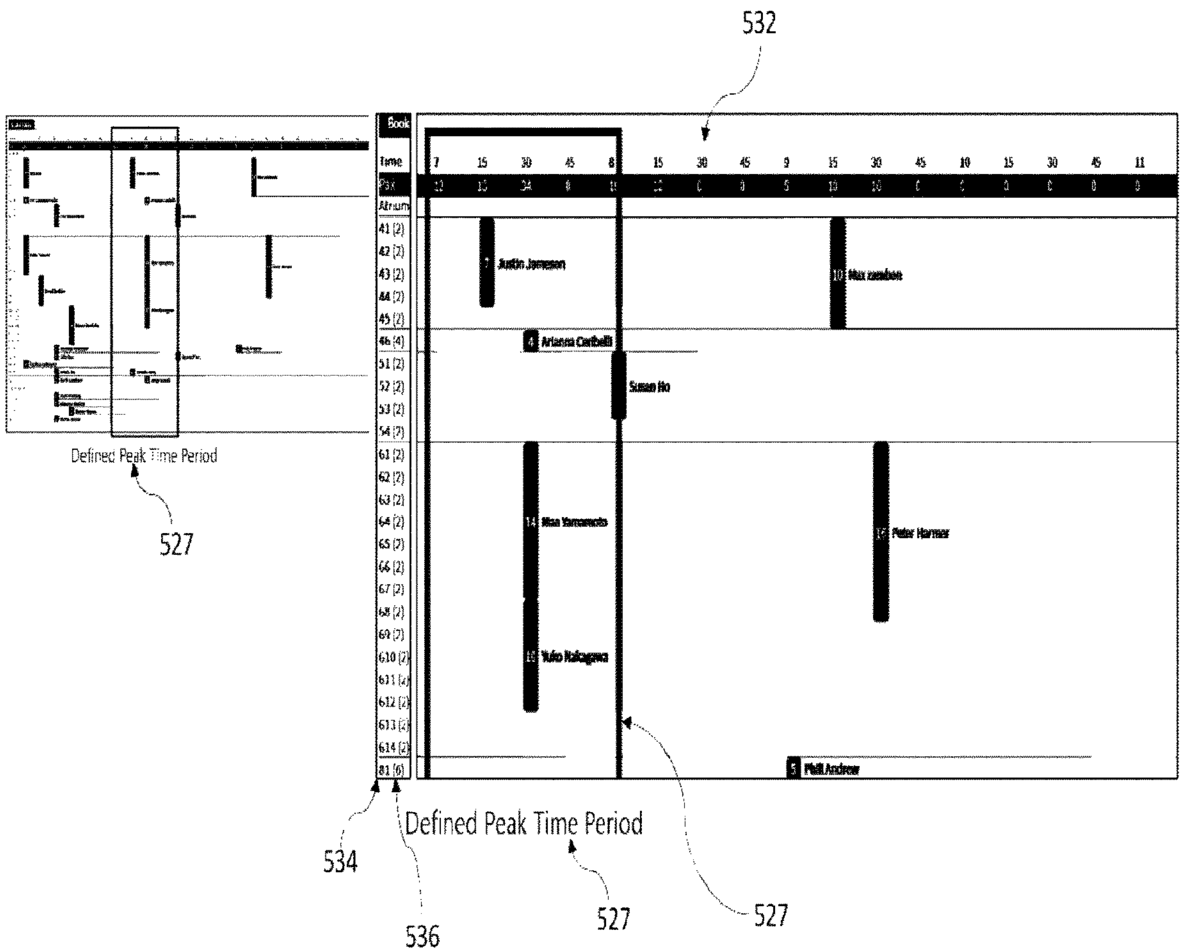
Figure 5I:
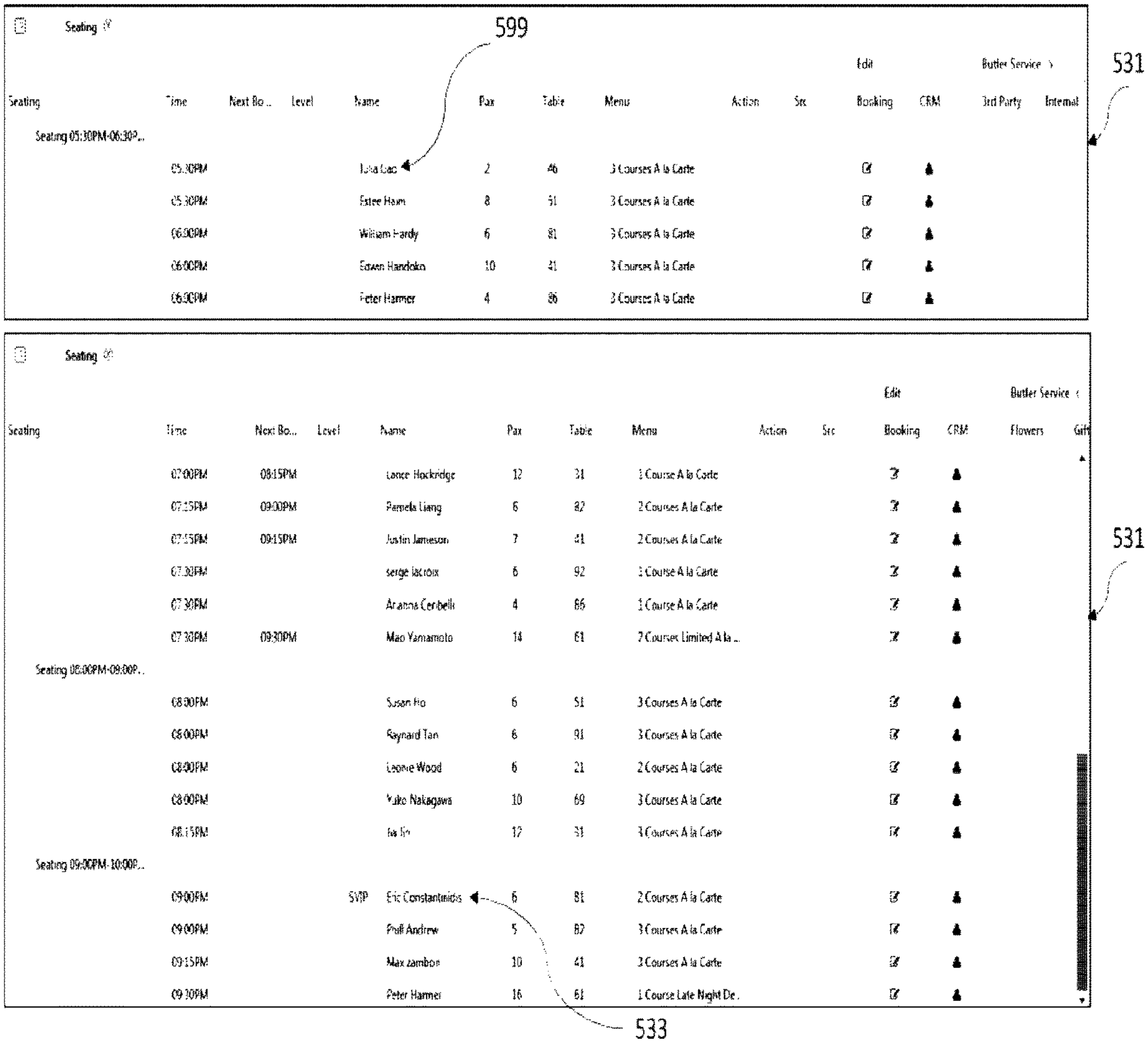
Figure 5M:
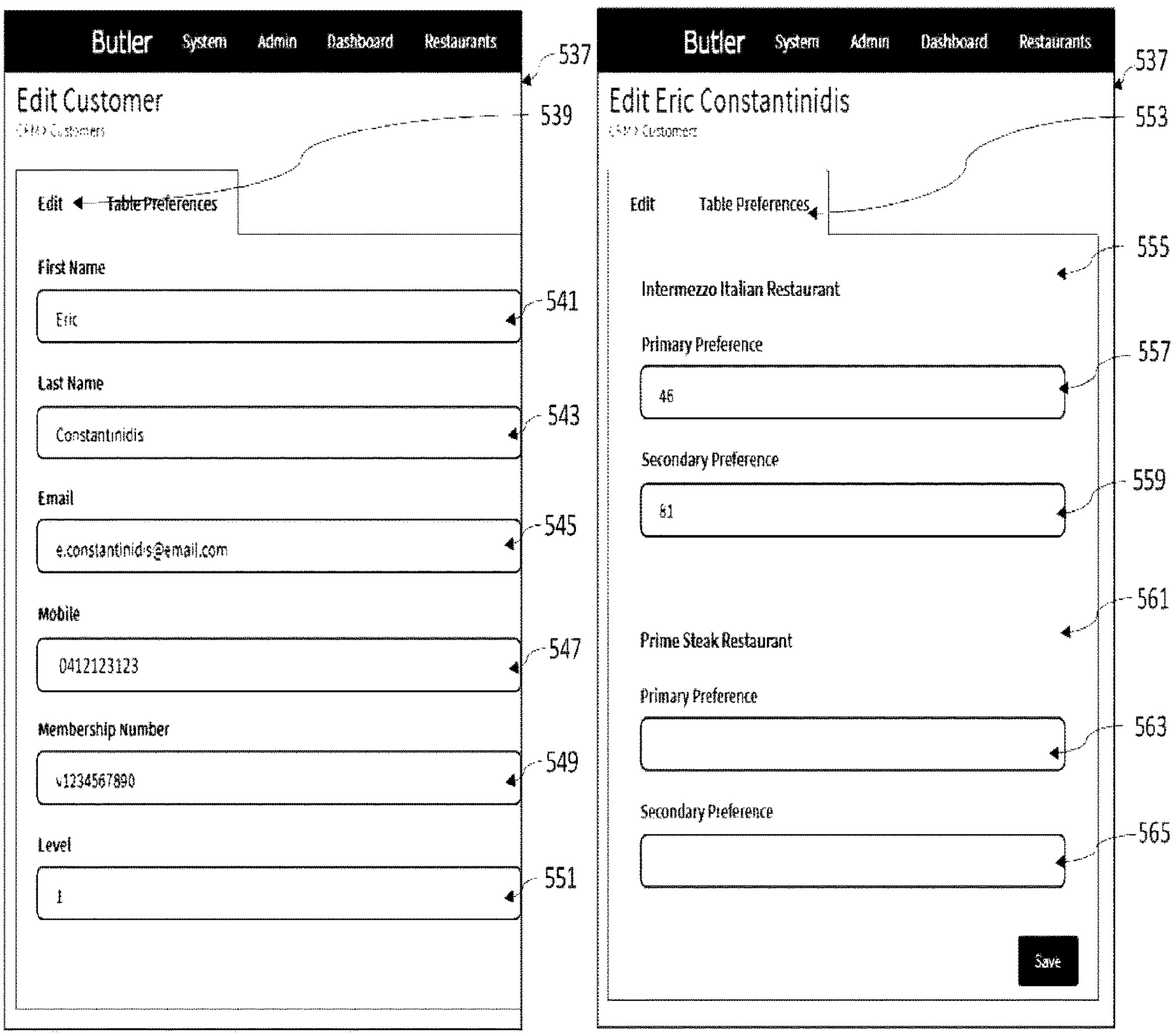
Figure 5N:
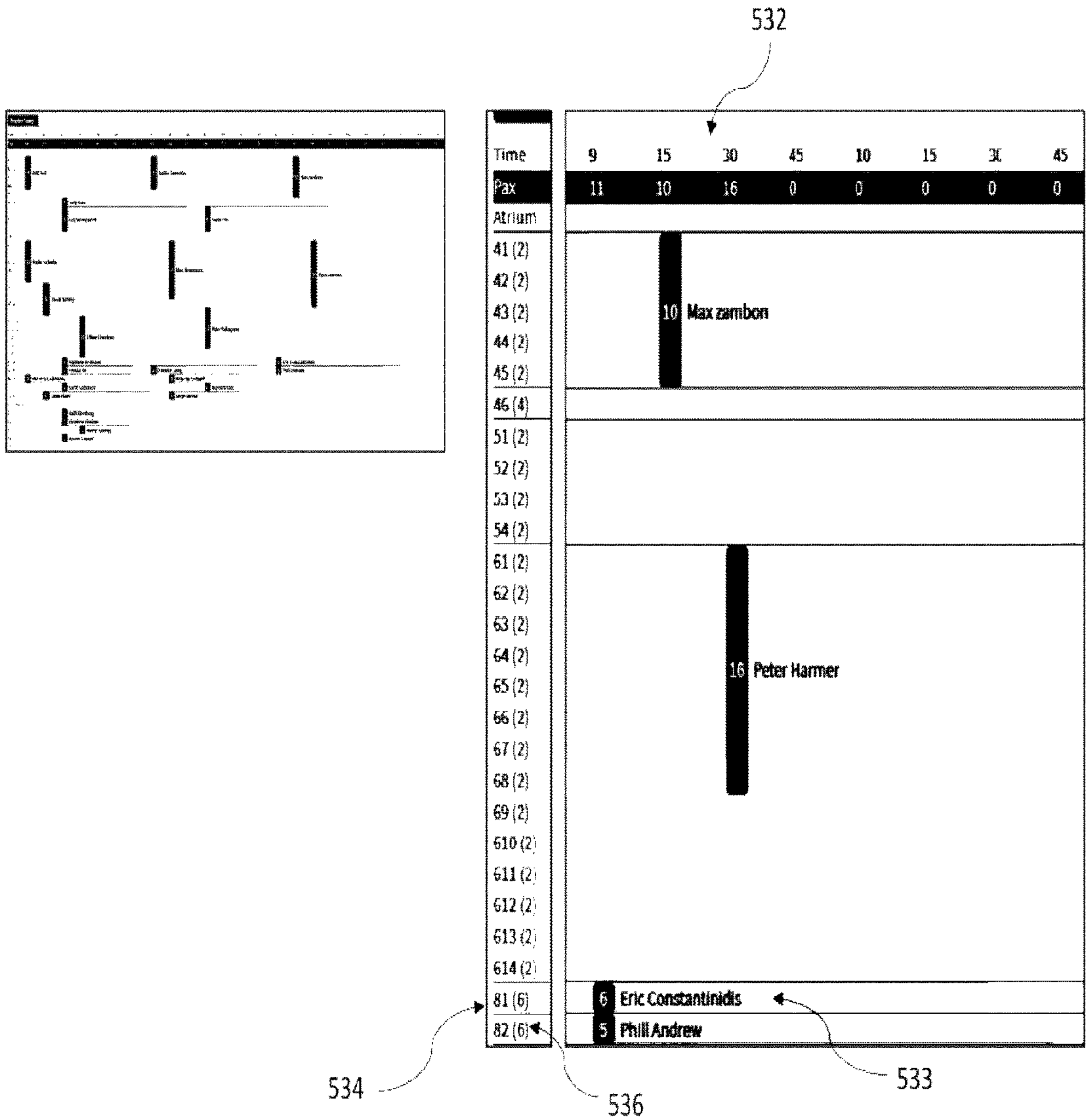
Figure 5O:
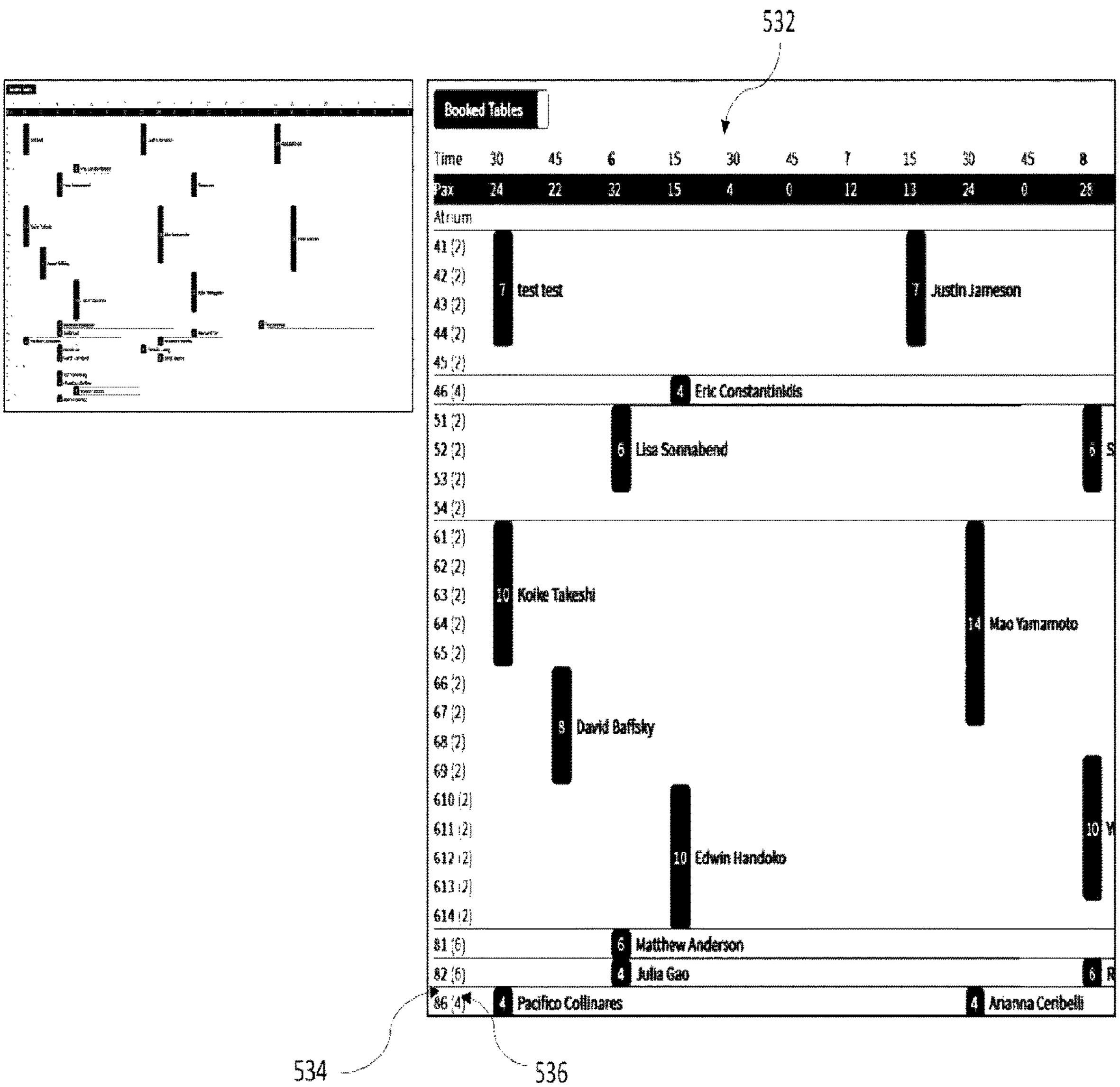
Figure 5P:
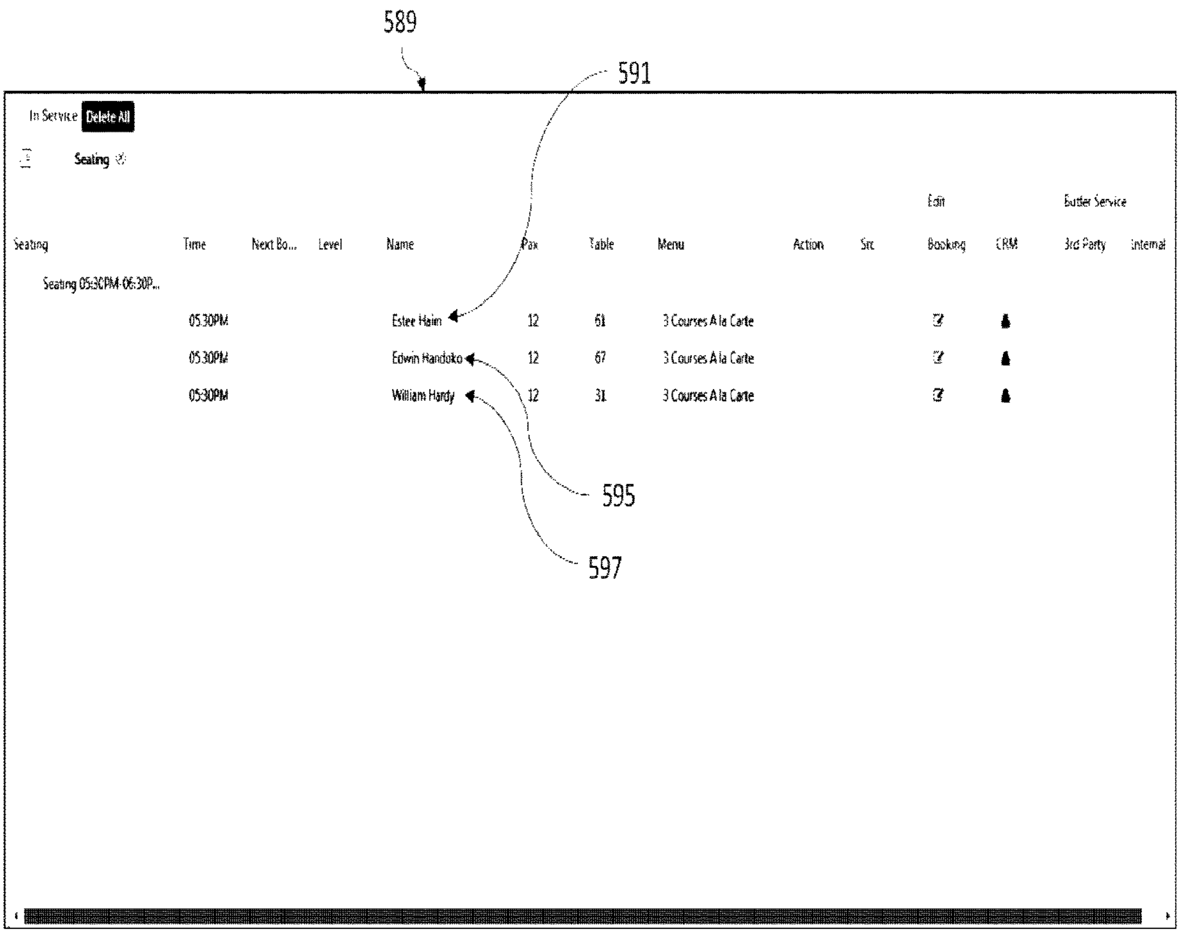
Figure 5Q:
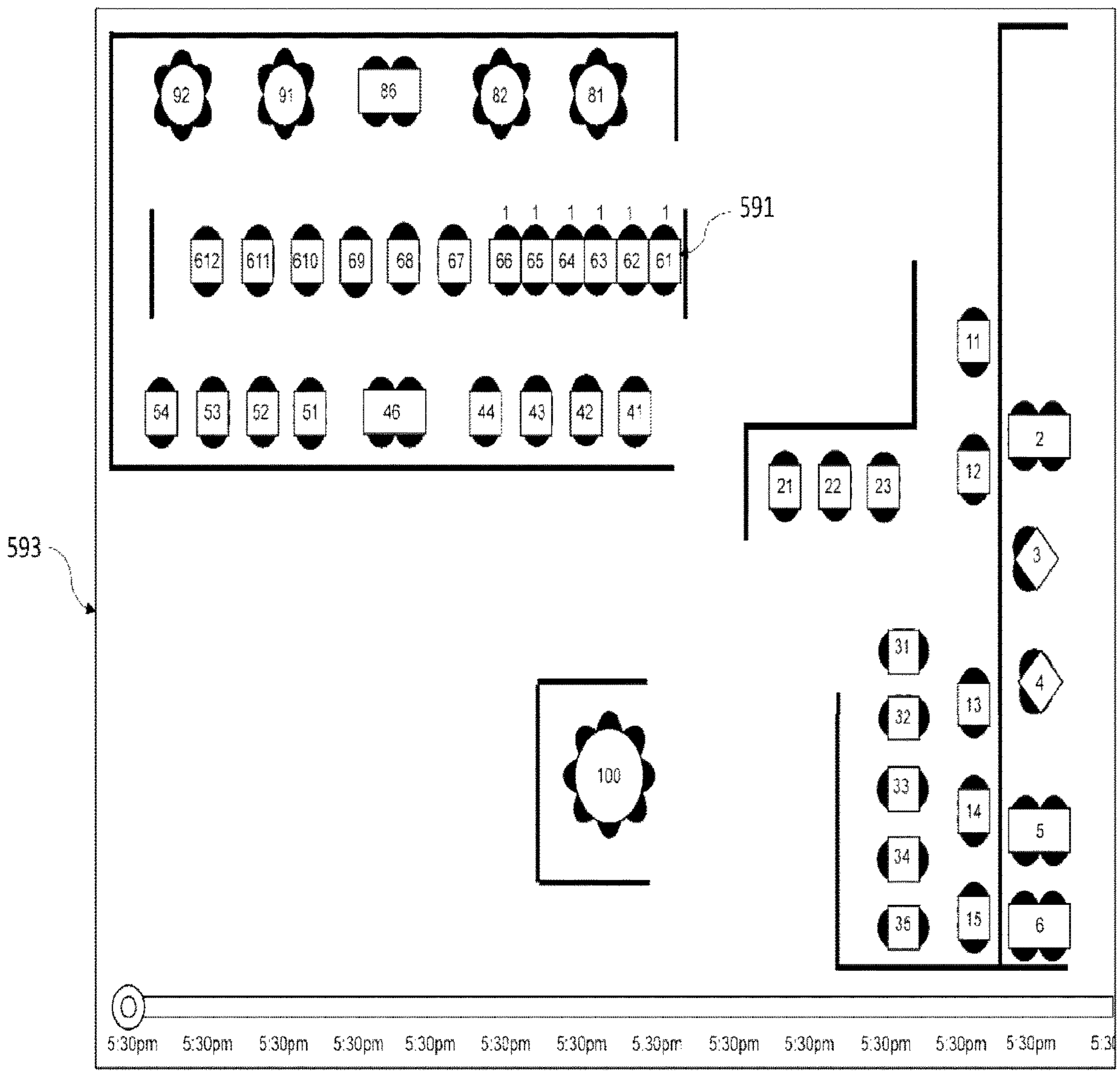
Figure 5R:
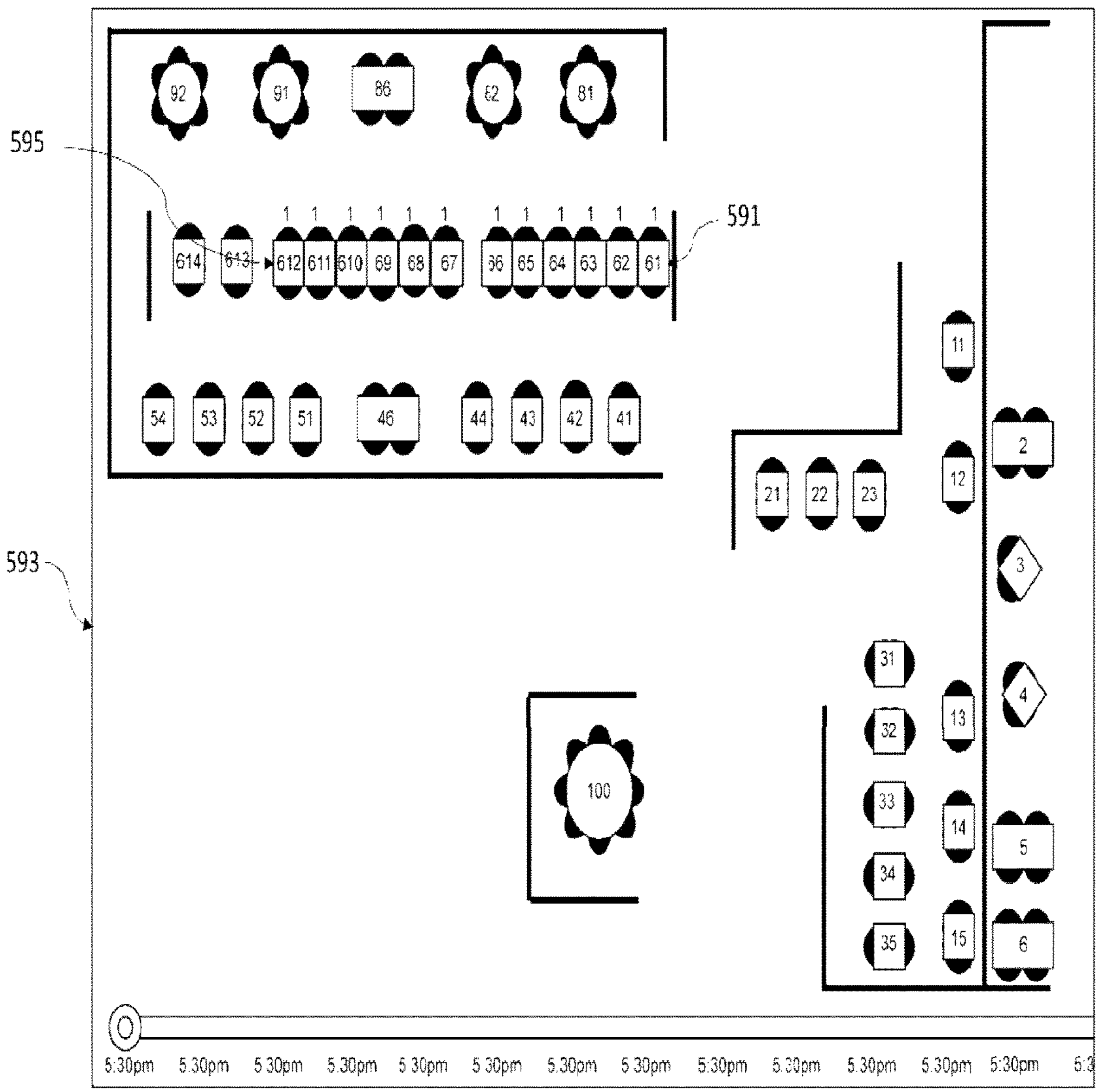
Figure 5S:
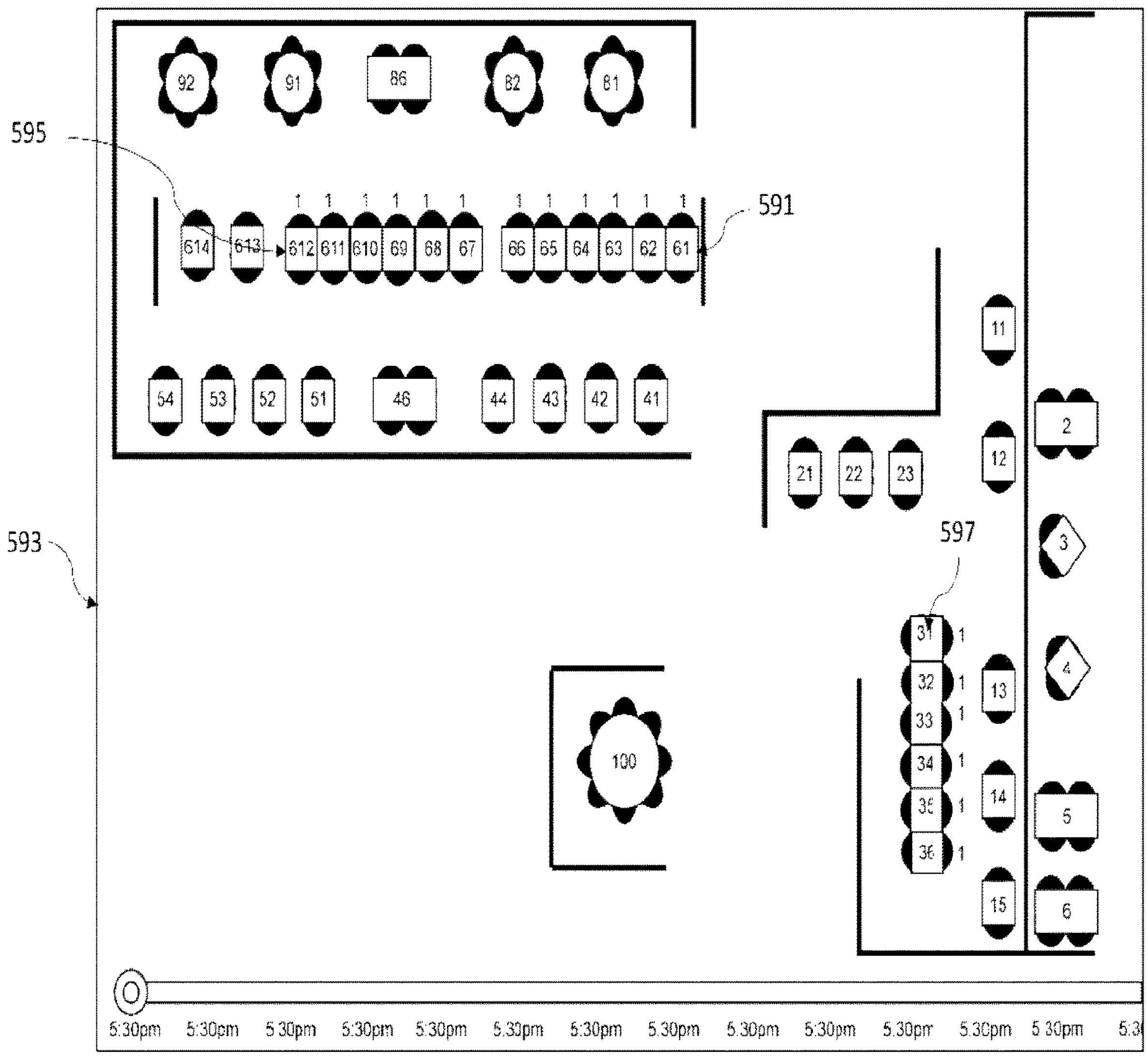
Figure 5U:
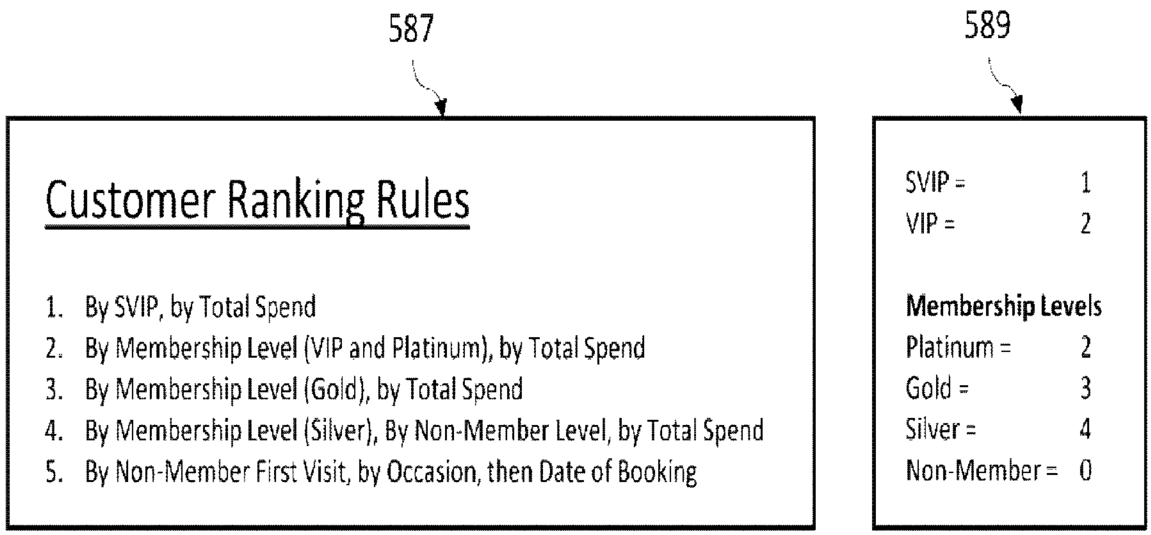

Correspondingly, as shown in FIG. 5*u*, customers may also be provided with a "ranking". At 587, there is shown a deliberately simplified example (for the purposes of the present specification) of the manner in which customers may be ranked. Depending on the ranking as determined at table 587, customers may be allocated a numerical ranking value according to table 589, which may then be used to match a customer ranking to a table ranking, or for any other suitable purpose.

Dynamic Floor Plans

Broadly, the embodiment described herein includes an interface arranged to communicate the determined allocation of booking requests (and the resultant table and seating arrangement) to a user (typically restaurant staff) through a dynamic "real time" floor plan displayed on the user interface. In this manner, staff are able to arrange the restaurant ahead of a service time. Moreover, the floor plan, in one embodiment, is utilisable as part of a self-seating process.

In one embodiment the "real time" dynamic floor plans depict the floor plan and table layout within the venue at any future point in time, such that, the floor plans and table layouts can be communicated to and provided to any user including a booking requestor.

In one embodiment of the system there is provided a widget, app, or other form of software application which may be utilised on a mobile computing device or incorporated into a kiosk located at the venue. The software or device permits a walk-in customer to a venue to make a booking request (as described above) and also to be given directions via the real time dynamic floor plan as to the location of the allocated portion, so that the booking requestor can undertake a self-seating process.

Where an allocated portion is not immediately available, the booking requestor is advised as to the future availability of an allocated portion and the requestor can select whether to be placed on the wait list or to cancel the request. In some instances, a booking requestor may be provided with an incentive to accept a different booking time. The incentive may take any known form, such as a free drink at the bar, or a discount or a complimentary product such as a glass of wine when they return and are seated. The system monitors the use of the table and sends the waitlisted booking requestor an email and/or text message when the table is ready.

Menus, Courses, Duration Times and Group Sizes (Variable Products)

In the context of the specification and the embodiment described herein, the services generally offered by a restaurant are commonly referred to in the industry as "products" but may include a mixture of products and services. That is, a product can be a number of courses associated with a menu, a menu item, a beverage, or a combination thereof.

A product has specific attributes and those attributes can include an association with a specific service period, booking time, booking duration time, day of the week, date, group size and/or occasion.

The product may include or be associated with one or more services, including extended duration time, location within a venue, class of tables within a venue specific type of table, specific table within a venue, specific level of service.

The product can include third party items such as flowers, entertainment, etc.

A cost associated with the product may be set dynamically by time, group size, occasion, table location, specific table, payment of booking fees, additional services, discounts or promotional pricing.

In one embodiment the system a plurality of different menus are provided and each menu is associated with one or more service periods or specific times within a service period. Similarly, particular menus may be associated with specific group sizes (i.e. booking sizes), with booking requests for specific occasions (e.g. a birthday, an anniversary, Valentine's day, etc.) and with any other variable that may have an impact on the constraints under which a booking is to be allocated. The menus are utilised by one or more optimisation algorithms within the allocation module to either provide various constraints (which are displayed as options to a booking requestor) at the time that the requestor makes the initial booking request, or alternatively to offer an alternative option (set of constraints) to the booking requestor, should the booking requestors primary request not be allocable by the algorithm. For example, booking requestors, in one embodiment, can view available capacity by menu and by courses.

It will be understood that menu constraints may also be associated with a space, subspace section or class for use by the one or more optimisation algorithms as a constraint when undertaking the booking allocation process.

It will be understood that the system also allows for a "table reset" time to be associated with each booking request, such that an amount of time is allowed between consecutive bookings to ensure that each allocated booking can be adequately serviced by the venue. Moreover, the table reset time may be varied depending on any other relevant constraint. For example, the table reset time may be different depending on class, the service period, the space, sub-space or section, or any other constraint that has an impact on the amount of time required to reset a table and receive a new booking.

It will be understood that different menus, courses and durations may also be provided to a booking requestor dependent on the identity of the requestor. For example, VIP customers and regular customers can be offered different menus, courses and durations.

The algorithm also allows for multiple seating periods during a service period with the allocation algorithm allocating booking requests for each seating period while taking into account the previous seating period and the next seating period. The algorithm can also optimise for bookings that cross over one or more seating periods.

Variable Pricing

As described above, a product has specific attributes and those attributes can include an association with a specific service period, booking time, booking duration time, day of the week, date, group size and/or occasion.

The product may include or be associated with one or more services, including extended duration time, location within a venue, class of tables within a venue specific type of table, specific table within a venue, specific level of service.

The product can include third party items such as flowers, entertainment, etc.

As such, it follows that a cost associated with the product may be set dynamically by time, group size, occasion, table location, payment of booking fees, additional services, discounts or promotional pricing.

In more detail, as the system is capable of providing different seating periods, different menus, different classes, different seating arrangements and can optimise according to requestor constraint information (i.e. can personalise the experience and service delivered to each individual requestor), it follows that differential pricing may be associated with one or more of the options (constraints) associated with the allocated booking.

For example, differential pricing may be associated with different service periods, different booking times, extended booking times, specific tables, sections, sub-spaces and spaces, different classes, and any other venue constraint relevant to the cost of delivering the requested booking and service.

As a corollary, it will be understood that the system is capable of further optimising by calculating the cost, revenue and gross/net profit associated with each possible permutation of a booking request, as well as whether other permutations exist which may increase the utility of the booking requestor, and may utilise the calculated cost and hypothetical increased utility to the requestor to determine the manner in which yield may be increased, and correspondingly provide inducements to booking requestors to select options (i.e. "upgrades") which provide a more optimal experience for the booking requestor, provide a more optimal yield to the venue, or a combination of both. In the embodiment, this may take the form, for example, of the system offering to upgrade a booking, for an incremental increase in cost to the requestor, to a table with higher utility (in accordance with the constraint information provided by the requestor).

The further optimisation may also be provided to group booking requests and to booking requests where the identity of the requestor places them in a particular grouping. For example, VIP customers and regular customers can be offered different menus at different pricing which in turn determines aspects of the booking allocation process.

Booking Request Personalisation

The requestor constraint information may include a request for a specific table. In turn, the allocation algorithm may allocate the specific allocation portion dependent on a number of other constraints, including the identity of the booking requestor, the status of the booking requestor, the availability of the table, the payment of an additional amount, or any other constraint relevant to the allocation of a specific allocation portion.

In one embodiment of the system a venue is able to offer a booking requestor the ability to order ancillary or third party items relevant to the booking. For example, the booking requester may request a specific staff member to attend, a bucket of champagne next to their table upon arrival, flowers on the table upon their arrival and other personalised items including entertainment to permit a booking requestor to personalise their dining experience.

Yield Management

In more detail, a third aspect of the embodiment described herein provides a computing system for optimising the revenue and contribution of one or more spaces in a venue, which comprises a venue interface and input module to permit the venue to enter information into the system which permits the strategic control of inventory by space, subspace, section and class with information regarding the menus, courses and services being offered to the booking requestor at "the right time and for the right price". The information is utilised by the one or more optimisation algorithms in the booking allocation process to optimise the quantitative and qualitative outcomes of the space in accordance with the yield requirements of the venue. Moreover, the yield requirements may vary over time in a manner that allows yield to be improved over successive service periods.

In one embodiment of the system the constraints concerning the utility of different tables, spaces, subspaces, sections and classes and the peak demand times are combined with constraints that provide the ability to differentiate between different menus, courses, different service standards, different products and services, different duration times, different pricing policies within a venue and combine the sets of constraints to permit the strategic determination and control of capacity by offering dynamic product changes and dynamic pricing changes such that revenue and yield can be monitored and used as inputs by the one or more optimisation algorithms as part of the booking allocation process.

For example, the system may offer a booking requestor an alternate booking time or menu or duration period at an alternate price if the requested time and menu are not available as part of the booking allocation process. As a corollary, the system can charge a higher or lower price depending of the demand for a particular service or menu or time or table or area or class as part of the booking allocation process.

In one embodiment the system can increase or decrease the amount of tables offered within a class if demand varies markedly within that class.

In one embodiment the system can search and locate tables with unbooked time periods and offer special and promotions in an effort to fill those tables and times.

In one embodiment the system can use the information provided by the booking requestor to make suggestions and recommendations of items and selections to enhance the experience of the booking requestor.

In one embodiment the system can calculate metrics related to the performance of the revenue generating processes and the efficiency of those processes so that these metrics can be used in future yield management decisions as well as forecasting and as decision variables for a completely autonomous process.

In one embodiment, the invention is directed to controlling, allocating, forecasting and optimising capacity to improve revenue efficiencies by using yield management algorithms to optimise restaurant-related outcomes and efficiencies.

In a fourth aspect, there is provided an autonomous, integrated booking and management system.

Self-Seating, Pre-Orders, Venue Orders and Point of Sales Systems

In one embodiment, the system provides a self-seating facility for walk-in customers and a facility for pre-booked customers to check their table allocation together with the provision of a dynamic real-time floor plan with directions on the location of the requestor's allocated table. There is also provided a wait list facility with automatic communication so that a customer who is placed on a waitlist can be advised of when a requested table is available.

In one embodiment the system provides dynamic real-time plans to pre-booked customers arranged to show the forecasted floor plan upon their arrival with directions as to locate their table for self-seating purposes.

In one embodiment, the dynamic real time floor plan is provided as an integrated component of a point of sale system so that a venue user using the point of sale system can refer to a correct floor plan that depicts dynamically updating table numbers and layout.

In one embodiment there is provided, via the user interface, electronic menus from which booking requestors can pre-order a meal as part of the booking allocation process. The electronic menus are integrated with a product tree and classification system such that the resources required to prepare a meal can be tracked for cost, resource and revenue purposes.

As a corollary, the payment required for a booking and a meal are determined by a payment decision tree which also utilises requestor constraint information and venue constraint information to determine whether the venue requires a deposit or a pre-payment to be made in order to confirm the booking.

In one embodiment the system includes an integrated gift certificate acceptance module or is capable of interfacing with a third party gift certificate module.

In a further embodiment, the invention is capable of integrating with other systems and/or may incorporate other systems within the embodiment (such as by accessing an API) to create an integrated autonomous restaurant system that operates to control the restaurant management process, beginning at a booking, through to when the booking requestor leaves the restaurant after the booking.

Function Diary Integrated with the Restaurant Diary

In one embodiment there is provided a restaurant booking diary with an associated optimisation algorithm arranged to optimise restaurant bookings, and a corresponding function booking diary wherein an optimisation algorithm is provided for function bookings, due to the requirement for greater personalisation and changes to restaurants standard operations, floor plans, pricing menus and order of service.

The optimisation algorithm for function bookings is arranged to change the recommended floor plan offered to a function booking requestor in response to the information provided by a booking requestor. For example, the floor plan suggested for a wedding with 60 people would be different to a floor plan for 100 people, which would be different again for a floor plan for a 60 person business event or a 60 person hen's party. Moreover, the recommended menus, pricing, availabilities, restrictions and terms and conditions are also varied depending on the information provided by the booking requestor.

In one embodiment, the system provides a function planning module, arranged such that a booking requestor can allocate guests to tables including positions at those tables as well as sending invitations to guests with confirmation information, directions, transportation and car park details so as to provide a full service arrangement including third party services such as flowers, audio visual equipment and entertainment.

Dashboard for the Reservations System and Diary

In one embodiment there is provided an integrated interface such that the user can view all information required to manage a service period within a restaurant on a single screen, which functions as a control dashboard. Where additional information is required pop-up windows are provided so that the user is never more than "one click" away from any information required to manage the restaurant in real time.

In one embodiment of the system the dashboard includes at least one of a floor plan and a Gantt chart, a booking list displaying booking details and a communications panel. In a further embodiment the communications panel displays emails, text messages, bookings taken during service, wait lists, standby lists, home delivery orders and takeaway orders to ensure that all information is within a single interface without the requirement to utilise other systems.

In other words, the visual interface affords complete integration with all restaurant systems, widgets and apps including self-seating, home delivery and takeaway orders, point of sale systems, staff attendance and rostering and purchasing.

Rostering and Scheduling System

In one embodiment, historical booking information and future booking information is utilised with forecasted information and staff availability information for the generation of staff rosters.

In one embodiment, the user can enter staff to customer ratios and other staff performance standards for the system to use together with expected bookings for the creation of staff rosters. In a further embodiment the monitoring and measurement of staff performance against the performance standards and the provision of recommendations for changes and improvements.

Purchasing System

In one embodiment, all pre-orders, confirmed and booked functions, home delivery orders, take away orders taken through the reservations system and dashboard and the point of sales system are visible via the single interface.

In one embodiment, the venue is capable of ordering food, beverages and services from third parties directly through the system.

Booking Two Venues at the Same Time

In one embodiment, the booking requestor can book two or more venues simultaneously as part of the same booking request. For example, the booking requestor may book theatre tickets and make a restaurant booking.

Restaurant Table Simulator and Table Configurator

In one embodiment the user is capable of manually defining multiple different spaces within a venue. That is, multiple spaces, subspaces and sections of different sizes and different orientations can be defined, with a corresponding mix of fixed and flexible table areas and different table sizes and quantities.

Correspondingly, the allocation algorithm allows restaurants and venues to run booking simulations to determine the best orientation, spacing and layout of tables and furniture within a restaurant or a venue to determine the best solution based on the restaurants requirements so to assist in the restaurant planning process such as determining what size tables to buy, how many tables to buy, how many chairs to buy and other physical decisions within the restaurant.

Home Delivery, Take-Away Order and Pick-Up

In one embodiment of the system all online orders are co-ordinated and controlled by the system to ensure that orders are controlled in a co-ordinated way, wherein the kitchen and other resources within the restaurant are properly managed and not overburdened. Moreover, such control allows for detailed communication with the customer.

Gift Certificates

In one embodiment, the system is capable of accepting gift certificates as a form of pre-payment.

In more detail, a fifth aspect of the embodiment described herein which provides a computing system for optimising the revenue and contribution of one or more spaces in a venue, which comprises a venue interface and input module to permit the venue to enter information into the system utilised by the one or more optimisation algorithms in the booking allocation process to optimise the quantitative and qualitative outcomes of the space in a way that offers alternate options, customer interaction, marketing and promotion.

Alternate Options

In one embodiment, there is provided a promotions module arranged to interrogate the database to determine what tables, booking times and booking durations have not been booked for a specific service period, and correspondingly automatically generate and publish/communicate specific promotions, using yield information to ensure that the promotions maintain a desired outcome/yield.

In a further embodiment, the pricing for items on the menu and the terms and conditions associated with each promotional offer is determined by the system by utilising the demand profile for the available tables, times and durations and constraint information to optimise a desired outcome.

Marketing and Promotion

In one embodiment, the constraints utilised by the promotional module include providing a percentage discount on the whole bill or part of the bill, a percentage discount only on food or part of the food, a percentage discount only on beverages or part of the beverages, the provision of various complementary items including a complimentary glass of wine and a complimentary dessert. Further, the constraints can include specific circumstances to which promotional packages can apply, limited by service period, by time, by day of the week and/or by date. For example, the maximum promotional benefit on a Monday may be greater than a Saturday, and the maximum potential benefit at a non-peak time may be greater than a peak time.

Customer Interaction

In one embodiment, the interface allows a booking requestor to alter the details of their booking.

In one embodiment, the interface permits the booking requestor to determine the seating position of all persons that form part of the booking request.

In one embodiment, the system permits the booking requestor to send a message to all persons associated with the booking request, wherein each person associated with the booking request can interact with the interface to pre-order and part pay or pre-pay for their selections.

In more detail, a sixth aspect of the embodiment described herein which provides a computing system for optimising the revenue and contribution of one or more spaces in a venue, which comprises a venue interface and input module to permit the venue to enter information into the system utilised by the one or more optimisation algorithms in the booking allocation process to optimise the quantitative and qualitative outcomes of the space using a table and table combination solution pool from which to find an optimised outcome.

Table and Table Combination Categories

In one embodiment of the system in a venue with one or more spaces an algorithm that can determine if the booking request can be categorised into one or more categories.

In one embodiment of the system the categories include a Super VIP category and a guaranteed table category where booking requests are allocated to their selected table on a permanent basis if the specific table requested is has not been previously allocated to a booking request from the same category and by a higher requestor within that category.

In one embodiment of the system where that booking request can be categorised in one or more spaces the optimisation algorithm to prioritise the allocation of the booking requests by the priority of the category.

In one embodiment of the system where more than one booking has been received combine all the booking requests received with all prior booking requests received to form a pool of booking requests and reallocate all the booking requests in accordance to the optimisation algorithm and methodology to a pool of solutions comprising tables and table combinations.

In one embodiment of the system the allocation algorithm utilises at least one or more of the following steps to allocate booking requests:

a. allocating the received booking request to the requested table or table combination;

b. allocating the received booking request to the requested table or table combination by firstly identifying one or more requestors associated with the booking request, and using the identity of the one or more requestors to retrieve constraint information including a requestor ranking relative to other requestors, whereby the booking request is allocated based on the requestor ranking;

c. where a requested table or table combination is already allocated to a previous booking request, determining the identity of the one or more requestors associated with the booking request and using the identity of the one or more requestors to retrieve constraint information including a requestor ranking relative to the previous booking requestors, and if the ranking of the requestor is higher than the ranking of the previous booking requestor, reallocating the at least one previously allocated booking request to a different table or table combination to allow the received booking request to be allocated to the requested booked table or table combination;

d. upon requiring a reallocation of at least one booking to accommodate a received booking request, reallocating the at least one previously allocated booking request by allocating the booking request of the largest size first and reallocating all other booking requests in descending order of size;

e. upon requiring a reallocation of at least one booking to accommodate a received booking request, determining a booking size metric of the received booking and each of the allocated bookings by calculating a size metric which utilises the number of persons that comprise the booking request and the service time duration for the booking request as inputs, and utilising the size metric to reallocate all bookings in order from the largest size metric booking to the smallest size metric booking;

f. determining a difficulty metric utilising the size metric and a peak period seating time value to determine a difficulty measure, the difficulty measure representing a theoretical measure of the relative difficulty in allocating the booking request, whereby booking requests are ranked from most difficult to least difficult and allocated in descending order from most difficult to least difficult;

g. determining sub-service periods within a service period, and for all booking requests that fall within the service period, firstly allocating all booking requests that fall across one or more sub-service periods in order of descending size, and subsequently allocating all booking requests that do not fall across the one or more sub-service periods in order of descending size;

h. utilising constraint information to determine a difficulty measure, the difficulty measure being representative of the relative difficulty of allocating a booking request, whereby bookings are allocated in descending order of difficulty;

i. reallocating at least one previously allocated booking request to optimise the number of bookings within each of the one or more spaces;

j. reallocating at least one previously allocated booking whereby bookings of identical or similar size are clustered, in both physical proximity and chronological proximity;

k. reallocating at least one previously allocated booking whereby the total time that the each table or table combination remains unused between bookings during a single service period is minimised;

l. reallocating at least one previously allocated booking to cluster bookings such that physically adjacent tables or table combinations have similar start times;

m. reallocating at least one previously allocated booking such that physically adjacent tables or table combinations have similar finish times;

n. reallocating at least one previously allocated booking so that smaller size bookings are physically clustered adjacent to larger size bookings;

o. Reallocating at least one previously allocated booking such that a previously joined table for an earlier booking in a service period is reutilised for a later booking in the service period;

p. reallocating at least one previously allocated booking such that the at least one booking is allocated in a manner where a minimal number of tables are joined or split to allocate the booking;

q. reallocating at least one previously allocated booking such that the total of bookings within a service period are arranged in a manner that requires the least possible number of table movements during the service period;

r. allocating at least one potentially conflicting booking to the smallest fitting table or table combination irrespective of availability, and where a conflicting booking is generated, reallocating the previously allocated booking as a result of the newly created conflicting allocation;

s. reallocating at least one previously allocated booking whereby an empty table is retained between one or more booked table or table combinations;

t. utilising constraint information to reallocate all bookings from the highest ranked available table or table combination in a descending order of rank;

u. reallocating at least one previously allocated booking whereby the ranking of the booking requestor determines the table or table combination allocated;

v. reallocating at least one previously allocated booking utilising one or more qualitative constraints derived from information associated with the booking requestor including but not limited to a stated occasion associated with the booking, a menu or courses selected by the requestor, the courses selected by the requestor, ancillary products selected by the requestor and the date of the booking; and w. reallocating all bookings to one or more different table and table combination solution sets to determine whether at least one of the one or more different table and table combination solution sets results in a more optimal outcome, and if so, selecting the at least one of the one or more different table and table combination solution sets that results in the more optimal outcome.

In one embodiment the ranking of all tables and table combinations available for booking requests.

In one embodiment the relative location of each table and table combination.

In one embodiment the algorithm can determine if additional furniture can be brought in or removed from the available list of tables and table combinations if such action will result in a more optimised outcome.

In one embodiment, the system offering different menus and pricing for different booking intervals, services, dates and dates.

In more detail, a seventh aspect of the embodiment described herein which provides a computing system for optimising the revenue and contribution of one or more spaces in a venue, which comprises a venue interface and input module to permit the venue to enter information into the system utilised by the one or more optimisation algorithms in the booking allocation process to optimise the quantitative and qualitative outcomes of the space using a table and table combinations solution pool from which to find an optimised outcome.

Table and Table Combination Threshold

In one embodiment a computer system in a venue with one or more spaces for optimising and allocating booking requests to tables and table combinations wherein the first allocation is not made until a specific predetermined threshold has been reached or exceeded such as the number of booking requests received or a specific time before the iterative allocation or reallocation of all bookings to tables and table combinations.

In one embodiment of the computer system wherein the tables and table combinations are arranged into subgroupings.

In one embodiment of the system where all the tables and table combinations are ranked.

In one embodiment of the system where the constraint information includes customer information and third party databases to rank the one or more booking requests.

In more detail, an eighth aspect of the embodiment described herein which provides a computing system for optimising the revenue and contribution of one or more spaces in a venue, which comprises a venue interface and input module to permit the venue to enter information into the system utilised by the one or more optimisation algorithms in the booking allocation process to optimise the quantitative and qualitative outcomes of the space for functions, events, workspaces hotels and accommodation.

In one embodiment of the system in a venue with one or more spaces an online booking system and one or more algorithms that can optimise and allocate furniture within a space such that it is tailored to the requirements of the requestor In one embodiment of the system in venue a function space venue, an event space venue or a hotel or other accommodation venue.

In other words, in one embodiment the system seeks to manage the entire guest experience from time of booking with the ability to handle pre-orders, pre-payments, part-payments, invitations to booking guests to pre-order and prepay, amendments to bookings, personalisation and tailoring of booking requests, automatic seating allocations and self-seating directions, automatic ordering at a table, pre-order, automatic printing of orders in the kitchen, taking of home delivery orders and automatic printing of home delivery orders into the kitchen, the management of a la carte and home delivery orders in the kitchen and estimation of cooking times and when the food will be ready, the issuing of gift certificates and the redemption of the gift certificates as payment or part-payment for an order, the simplification and processing of final payments through a point of sale system and integrated Customer Relationship Management (CRM), accounting, reporting, budgeting and forecasting.

In a ninth aspect one of an embodiment of the system the allocation of online bookings for a services where the availability of those services are controlled, limited and offered for specific times and time durations such that the products or services offered are arranged such that products and services with the greatest revenue and contribution are only made available during peak times and lower revenue products and services are made available or offered during off-peak periods to permit the optimisation of quantitative and qualitative outcomes based on the strategy of the venue.

In one embodiment of the system allocating online bookings using customer's information as part of the allocation algorithm.

In one embodiment of the system filtering products so that availability is only shown to certain customers concerning products, services, prices, times, durations and terms and conditions are only shown and made available to certain customers and not to others. In one example, discriminating on the availability and offers to customers based on a customer's ranking.

In a tenth aspect, one embodiment of the system the allocation of online bookings for travel, aviation, cruising, rail, coach, holidays, car rental and other similar activities and businesses whereby customers information is used in the booking and allocation process to offer a more personalised, more bespoke and more efficient service to customers while maximising the optimisation of quantitative and qualitative outcomes based on the strategy of the entity.

In one embodiment of the system allocating online bookings using customer's information as part of the allocation algorithm.

In one embodiment of the system filtering products so that availability is only shown to certain customers concerning products, services, prices and terms and conditions are only shown and made available to certain customers. In one example, discrimination the availability and offers based on customer's ranking.

The Computing System

Figure 2A:
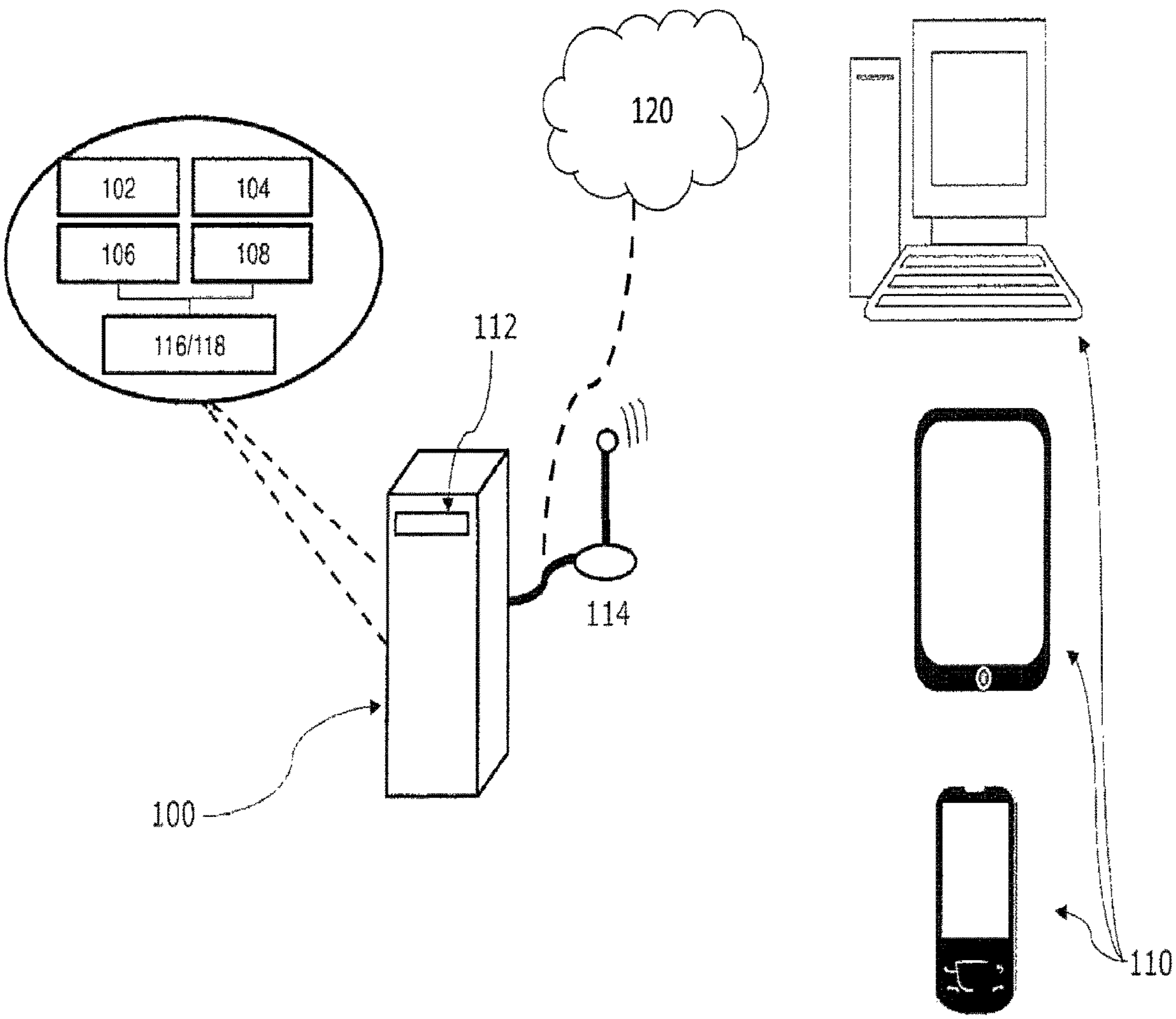
FIG. 2*a* is an example computing system on which a method and/or a computer program may be operated, in accordance with an embodiment of the invention.

One embodiment of the computing system is shown at FIG. 2*a*.

In FIG. 2*a* there is shown a schematic diagram of a computing system, which in this embodiment is a computing system 100 suitable for use with an embodiment of the present invention. The computing system 100 may be used to execute application and/or system services such as a computer program and an interface in accordance with an embodiment of the present invention.

With reference to FIG. 2*a*, the computing system 100 may comprise suitable components necessary to receive, store and execute appropriate computer instructions. The components may include a processor 102, read only memory (ROM) 104, random access memory (RAM) 106, an input/output devices such as disc drives 108, remote or connected mobile devices 110 (such as computers, smartphones or tablets and the like), and one or more communications link(s) 114 including internet links to other applications, websites and system services including Internet cloud services 120.

The computing system 100 includes instructions that may be installed in ROM 104, RAM 106 or disc drives 112 and may be executed by the processor 102. There may be provided a plurality of communication links 114 which may variously connect to one or more user devices 110, such as computers, smartphones or tablets, wherein the one or more user devices have a user interface for interacting with user by collecting and displaying data or information using the conventional means provided by such devices. At least one of a plurality of communications link 114 may be connected to an external computing network through a telecommunications network, including Internet cloud services 120.

In one particular embodiment the device may include a database 116 which may reside on the storage device 112. It will be understood that the database may reside on any suitable storage device, which may encompass solid state drives, hard disc drives, optical drives or magnetic tape drives. The database 116 may reside on a single physical storage device or may be spread across multiple storage devices, either locally or remotely.

The computing system 100 includes a suitable operating system 118 which may also reside on a storage device or in the ROM of the server 100. The operating system is arranged to interact with the database 116 and with one or more computer programs to cause the server to carry out the steps, functions and/or procedures in accordance with the embodiments of the invention described herein.

The user interface 110 of one or more mobile devices facilitates the collection and display of user data for the computing system 100. The user interface 110 may be a program or website accessed on a computer or mobile device via a communication network, such as the Internet. Alternatively, the user interface 110 may be a widget arranged on a website that may be accessed by a user using a computer or mobile device via a communication network such as the Internet. The user interface 110 may also be provided as a mobile application or "app" present on the user device, such as a tablet or smart phone.

The at least one user interacts with the user interface 110 and may be a first user (also referred to as the "booking requestor") requesting to use a space in a venue. The at least one user may also include a second user (referred to as the "operator" or "venue operator"), who is associated with the venue and utilizes the optimised space allocation instruction set provided by the allocation module to enable the use of the space by the booking requestor.

The booking requestor interacts with the computing system to make a request. The requestor may make a request for one or more patrons of the venue to use the space in a venue, where the requestor may also be one of the patrons of the venue. That is, a user that interacts with the system is referred (on their own behalf or on behalf of a group of people) is referred to as a booking requestor and the person (or group of people) that will be allocated a table (i.e. attend the venue or restaurant) may be variously referred to as the "patron" or "patrons", the "customer" or "customers", the "guest" or "guests" and/or the "diner" or "diners", or any other term as appropriate for the venue.

An embodiment includes the computer system 100 processing the request and undertaking all subsequent steps in an autonomous manner. Alternatively, in another embodiment, the operator may use one of the user interfaces 110 provided to one or more devices to receive, input, or modify information in order to provide further input to the computer system 100, so that the computing system may process the request and provide instructions to the entity.

In processing the request, the computer system 100 may arrange objects in the space in accordance with the optimised space allocation instruction set. That is, the booking requestor acts as a customer making a request which is to be "serviced" by the operator in accordance with the optimised space allocation instruction set. As may be appreciated by a skilled addressee, there may be any number of remote users and operators who are able to interact with the computing system via the user interface 110 via any number of different devices.

Figure 2B:
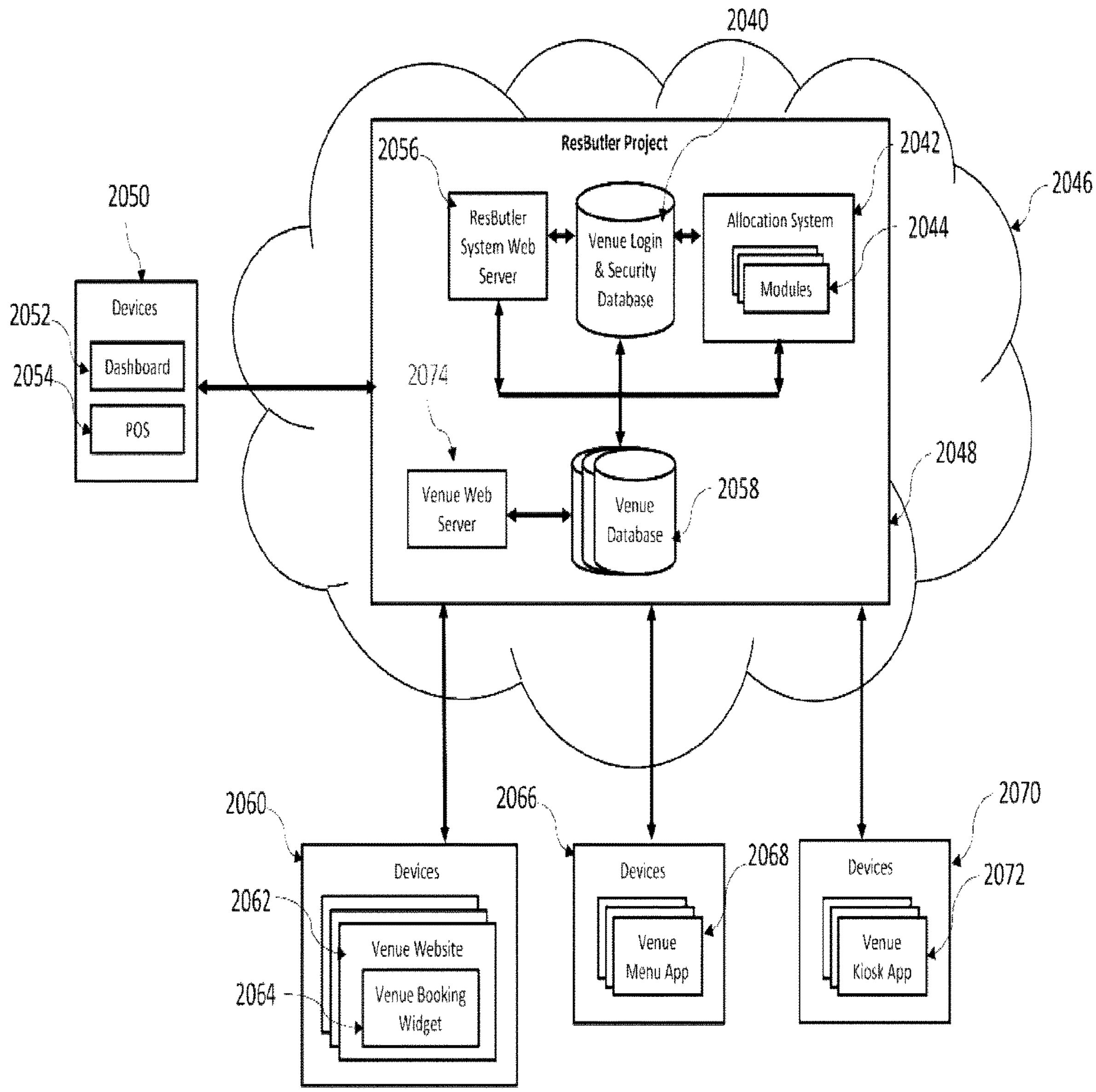
FIG. 2*b* is an example of a flowchart illustrating a computer system upon which a computer enabled method may be operated, in accordance with an embodiment of the invention.

Referring to FIG. 2*b*, there is illustrated in more detail the ResButler system in accordance with an embodiment of the invention. The ResButler system comprises a "back end" 2048 which is located in a cloud computing environment 2046 comprising an allocation system 2042 in communication with a security database 2040, a series of Venue databases 2058 (which include venue constraint information and booking allocations). Booking allocations are performed by an allocation system 2042 which includes one or more modules 2044, each module being arranged to apply specific allocation algorithms. In turn, a venue operator can access the system via a system web server 2056. The ResButler system 2048 provides access, on a remote device 2050, to a dashboard 2052 and a Point of Sale system 2054.

Booking requestors may access the ResButler system 2048 via devices 2060, 2066 and/or 2070. Device 2060 is a conventional computing system or device arranged to utilise a web browser to access a venue website 2062 which incorporates a booking widget 2064 Device 2066 is a mobile device, such as a smart phone, which is arranged to use an app 2068 to access the system. Device 2070 is an on-site "kiosk" device, which includes a kiosk app arranged to allow a requestor to access the system via the kiosk, for self-seating or to make a booking as a "walk-in" customer. Device 2070 may also be a mobile device such as a tablet computing device arranged to use app 2072.

The Computing Method

Figure 2C:
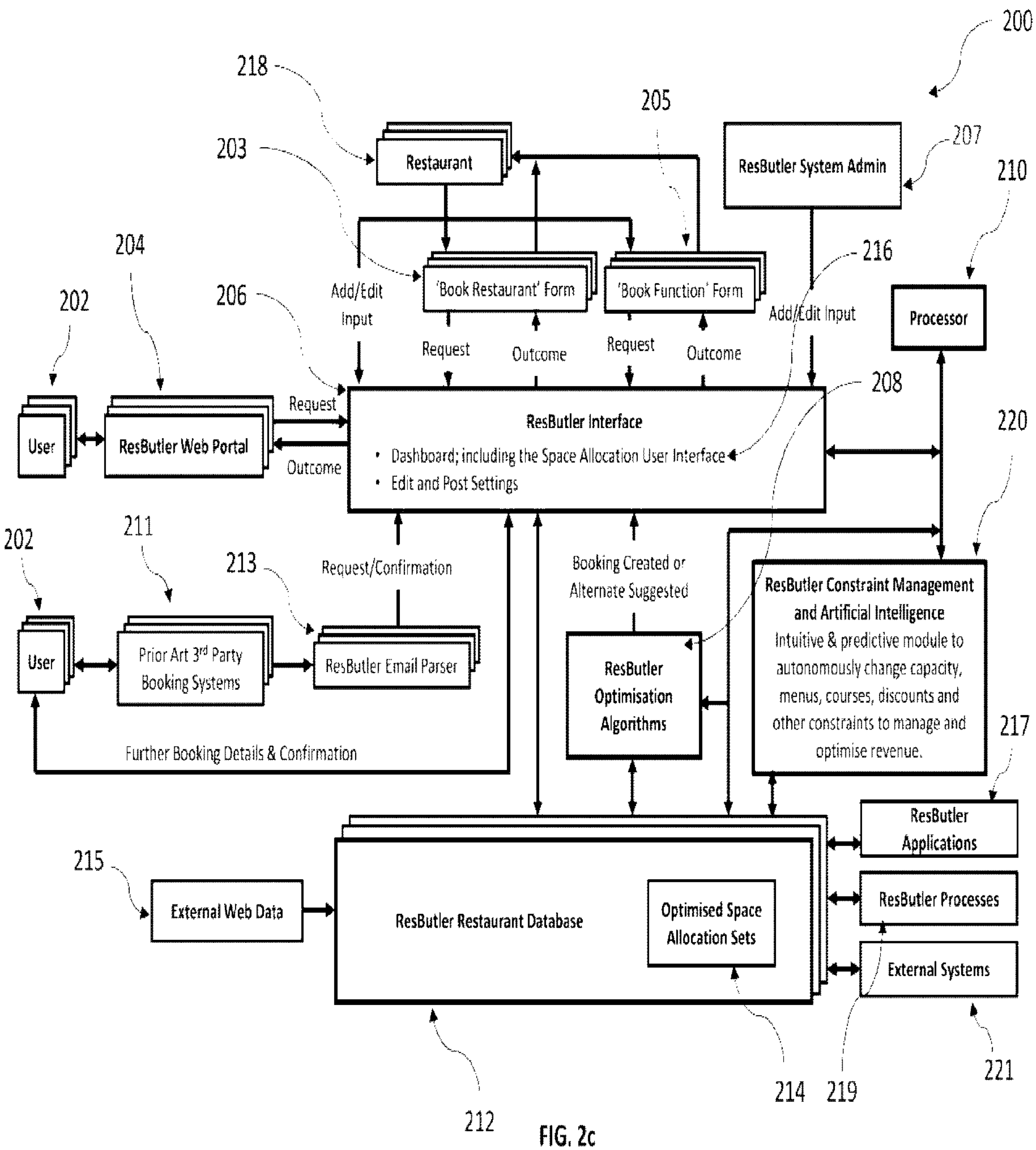

Turning to FIG. 2*c*, there is shown a flow chart of the processes undertaken by the computer system 200 to determine the optimal allocation of a user request to use a space. Firstly, a user makes a request 202 which is collected by the user interface 204 on a device. Alternatively, the user 202 may access a third party booking site 211, which forwards information to an email parser 213. The input receiving module 206 receives a request from the user interface 204, where the at least one user may be a customer making the request.

Alternatively, the at least one user may also be a service providing user (a second user or operator), who is associated with the venue and may provide information to the user interface 204 on behalf of another remote user. For example, the service providing operator, who may be employed by the venue, may take a booking over the phone on behalf of a remote user. As would be readily understood by the skilled addressee, multiple user interfaces may be contemplated depending on whether the use is an "outside" user such as a remote user or an operator, such as an employee.

The user input receiving module 206 transforms the data of the at least one user's request into at least one string of request data and then communicates the request data to the optimisation module 208 via a telecommunications network. The request data includes all or part of the at least one user's request as collected by the user interface 204. That is, the at least one user's request may include a request for a time period during which the space in a venue will be used, the number of people who will be using the space, the contact details of the at least one user making the request, the reason or occasion for the use of the space, and whether there any special requirements to be made known for the use of the space. The skilled addressee will appreciate that the user input receiving module 206 may receive any data or information that is set out by the user interface. That is, the user interface 204 may be arranged to collect any type of data provided by the remote user or operator.

The at least one string of the request data is then received by the optimisation module 208. The optimisation module 208 communicates with the database 212, where the database contains stored data relating to the request or any previously made requests. In an embodiment, the database 212 stores the at least one string of request data prior to processing by the optimisation module 208. The stored data may also include any ancillary information (information not directly related to the request) collected by the user interface and the user input receiving module. For example, the stored data may include at least one other request to use the space which have been made by at least one other user.

The stored data may also include past data, such as request data from requests made in the past, the details of the past use of the space, or the amount of money spent during the use of the space. The computer system 200 may provide the remote user with an option to open a user account or log into a previously opened account, which may be accessed by the user by means of a unique username and password as set by the user. The account may be accessed by any mobile device connected to the Internet or a local network in communication with the computer system 200. This enables the user to provide additional information to the user input receiving module 206 which is stored in the database in association with that particular user, such as personal, financial, or other types of user information.

The computer system as described provides a real time service to the user in processing their request. However, by providing the user with an account associates the user account with the request and allows the user to access the request where they may complete the request or modify the details of the request at any time after the request has been made.

The computer system as described, in one embodiment also generates real time and forecasted plans of the space including the placement of the furniture and objects which can be provided to the user by email or shown on their device such that a user can be provided instructions as to the location of the allocated table and directions on how to find their allocated table to "self-seat" themselves and minimise the cost of such activity to the venue. The real time and forecasted floor plans are also provided to the operator within the system application to assist the operator in the planning, operation and management of the space, especially during the critical service period when time is critical and instructions can be provided to an operator on how to reset tables for the next booking.

Space Information and Constraints

The stored data in the database 212 may also include constraint information where the constraint information may include information relating to the space available for allocation within the venue. That is, the stored data may also include constraint information relating to the venue itself, such as the spatial constraints of the space of the venue, the ingresses and egresses of the venue, and the facilities available in the venue.

The stored data in the database 212 may also include sub-space constraint information where the sub-space constraint information includes information regarding a sub-space within the venue. That is, the space may also include information relating to the at least one sub-space which is defined by the constraint information stored in the database.

In other words, a venue may have sub-spaces of a space within a venue (within this application the terms space and subspace may be interchangeable with the terms area and subarea respectively), where the sub-space constraint information relates to the limitations of the sub-space, including but not limited to, the physical dimensions of the sub-space, the shape or arrangement of the sub-space within the whole space of the venue, and the maximum and minimum number of users able to be accommodated in the sub-space, the amount or type of furniture that may be accommodated within the sub-space. The division of the entire space that constitutes the venue into one or more sub-spaces may be undertaken for a number of reasons, such as but not limited to, providing speciality service or seating areas, child friendly zones, premium seating, or sectioning parts of the venue due to the physical constraints of the venue or the furniture contained therein.

In an embodiment, spaces and sub-spaces include sections within the spaces and subspaces of the space in the venue, such that the optimisation module 208 performs an iterative allocation of requests utilising the sub-space constraint information to optimise the allocation or use of sub-spaces within the space in the venue. The iterative allocation of requests is performed by the processor 210, where the processor iteratively executes the steps of the algorithm and the iterative allocation process using the user request data and the constraint information stored in the database 212. The algorithm includes a number of steps to determine the optimal use of the space—the steps of the algorithm are described in more detail later.

In the embodiment where the venue is a restaurant, the restaurant may include any number of spaces, sub-spaces or sections within the restaurant. The iterative allocation of requests to use the different spaces, sub-spaces and sections may be optimised individually, or in combination with other sub-spaces, depending on the specific desired outcomes and the constraint information. For example, one space, sub-space or section may be arranged to maximise one particular variable, such as revenue, where another sub-space may be arranged to maximise another variable, such as patron satisfaction.

In an embodiment, the constraint information may also include object constraint information regarding at least one object arranged to be allocated to a space, sub-space or section, whereby the iterative allocation of requests for spaces, sub-spaces or section may include utilising the object constraint information to optimise the allocation of the objects within a space, subspace or sub-space in the venue. That is, using the object constraint information, the objects are optimally arranged within the space or sub-space to maximise the chosen variable.

In an embodiment, the objects may include tables and chairs for dining. As is reasonably understood by a skilled addressee, there are potentially an infinite number of variations to the types of tables and chairs that may be used for dining. As such, the objects may include square, rectangular, circular, elliptical or irregular shaped tables. Moreover, the objects may also include singular chairs or stools or shared seating such as benches. In a further embodiment the information of which tables are interchangeable within a space, subspace or section which tables are fixed and which tables are flexible and can be positioned in different spaces, subspaces and sections.

In an embodiment, the object constraint information may include the type of object (for example, whether the object is a table or chair), the shape of the object, the physical dimensions of the object, information regarding the ability of the object to interface with other objects (e.g. whether the object can be joined or arranged proximate to other similar objects), and a rating value that describes the relative quality of an object (for example, the comfort rating of one type of chair compared to other types of chairs). The constraint information may also include the dimensions of the object when arranged in a "compressed" or "folded" state when the object is in a storage configuration.

For example, the constraint information could be used such that the algorithm is capable of identifying that a circular table cannot be joined with a square table, or that a bar stool is not suitable seating for a standard height table. In other words, the constraint information is utilised to determine which objects can be joined or placed proximate to one another in order to form a functional combination of objects. For example, the algorithm is able to determine that two square tables of equal widths can be placed next to one another or joined in such a way to form a single rectangular table.

The constraint information may also include information that allows the algorithm to make comparisons between the relative utility of different objects, given a starting parameter which is to be optimised. For example, the constraint information can be utilised by the algorithm to determine whether the removal of two round tables (each seating 4 patrons) is a more suitable solution to the use of a single rectangular table (or a combination of rectangular tables) within the dimensions of the space, sub-space or section to maximise a given parameter (such as seating the most number of guests within the dimensions of the space, sub-space or section).

In one embodiment the constraint information allows the algorithm to interchange a different size table top for an existing table top to create a different seating outcome to accommodate a booking request or to maximise a given parameter. In the alternative, the algorithm also permits the removal of a table top placed on top of another table if it is not required for the subsequent re-use of the table.

In one embodiment the one or more spaces and subspaces within the venue represent fixed seating spaces where tables and other objects are treated as fixed and cannot be moved. Within the defined spaces and subspaces additional areas can be created which are referred to as sections and the furniture and objects within sections are defined as flexible and can be moved. This allows the system to differentiate between objects that are fixed like a corner booth (which cannot be moved or substituted) and loose objects like single unattached tables that can be moved to optimise for different requirements and outcomes. With flexible spaces the one or more algorithms can "push" tables together and join them, introduce additional tables, remove tables, replace tables with a different size and/or type of table, and replace one table top with another or remove a table top from a table that has two table tops so as to optimise a given parameter such as the optimisation of bookings within a section, subspace and space.

Figure 4A:
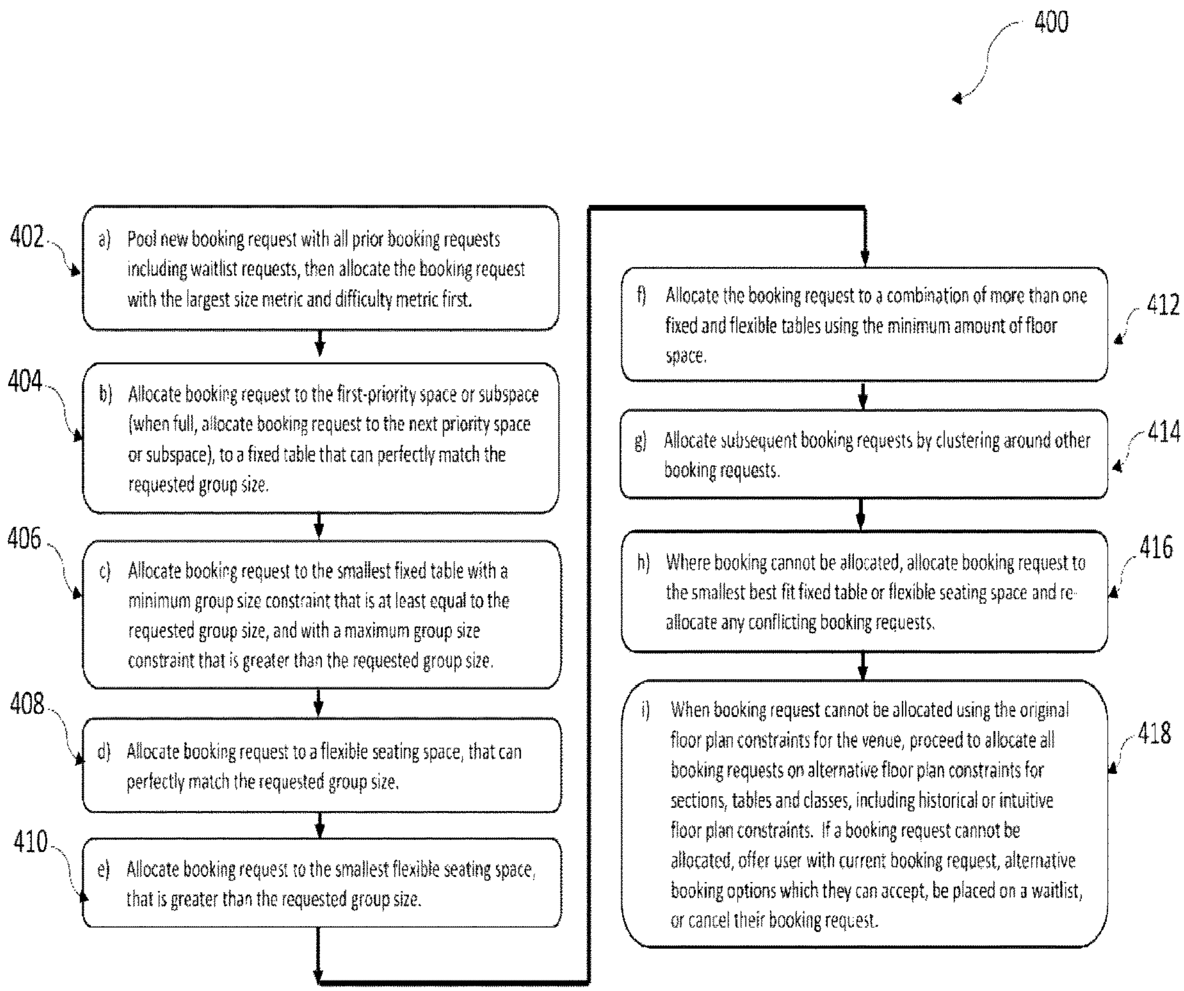
FIG. 4*a* is a flowchart illustrating a computer enabled method optimisation steps in accordance with an embodiment of the invention.
Figure 4B:
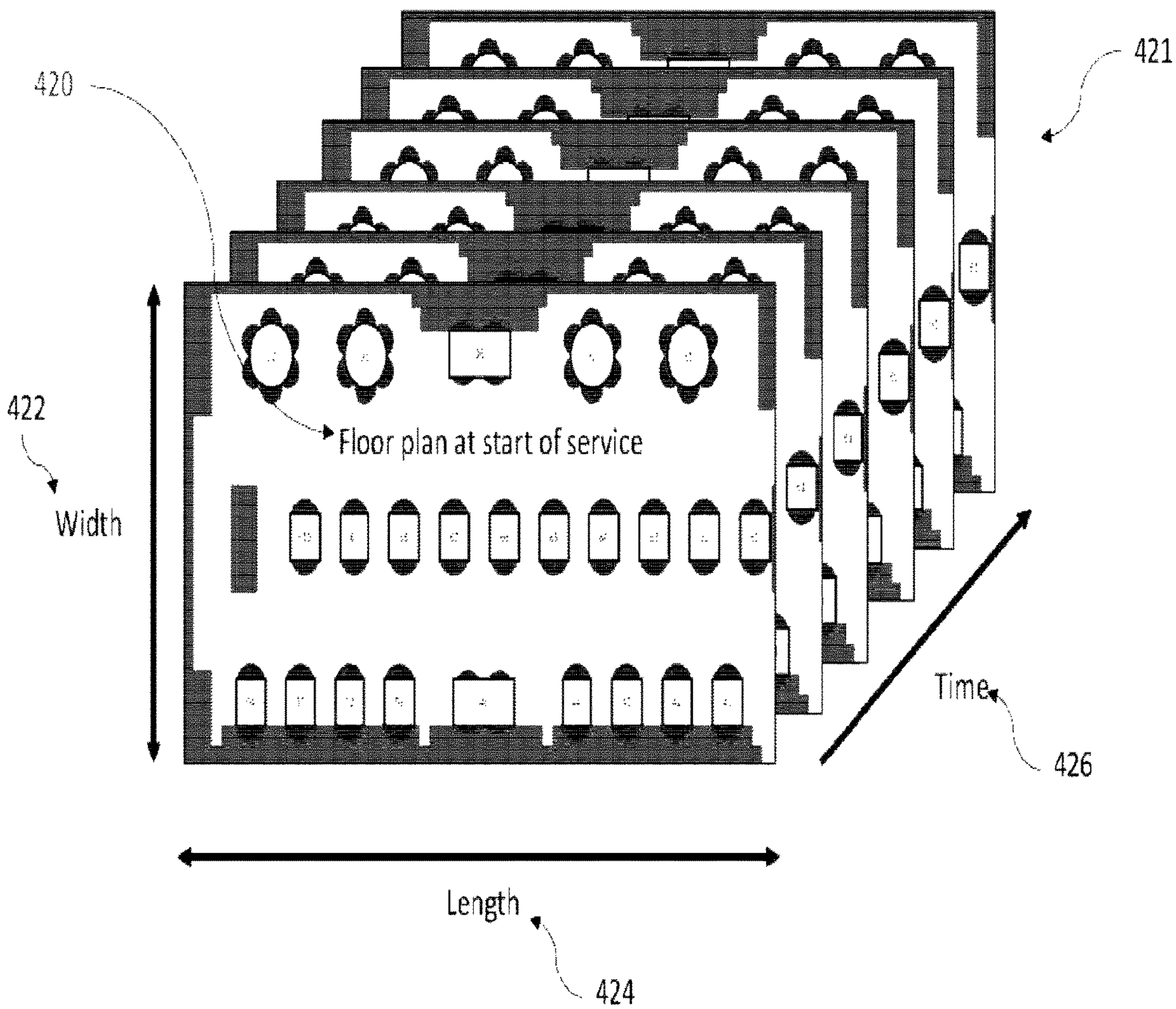
FIG. 4*b* is a diagram illustrating a volumetric and dynamic representation of a floor plan in accordance with an embodiment of the invention.
Figure 4C:
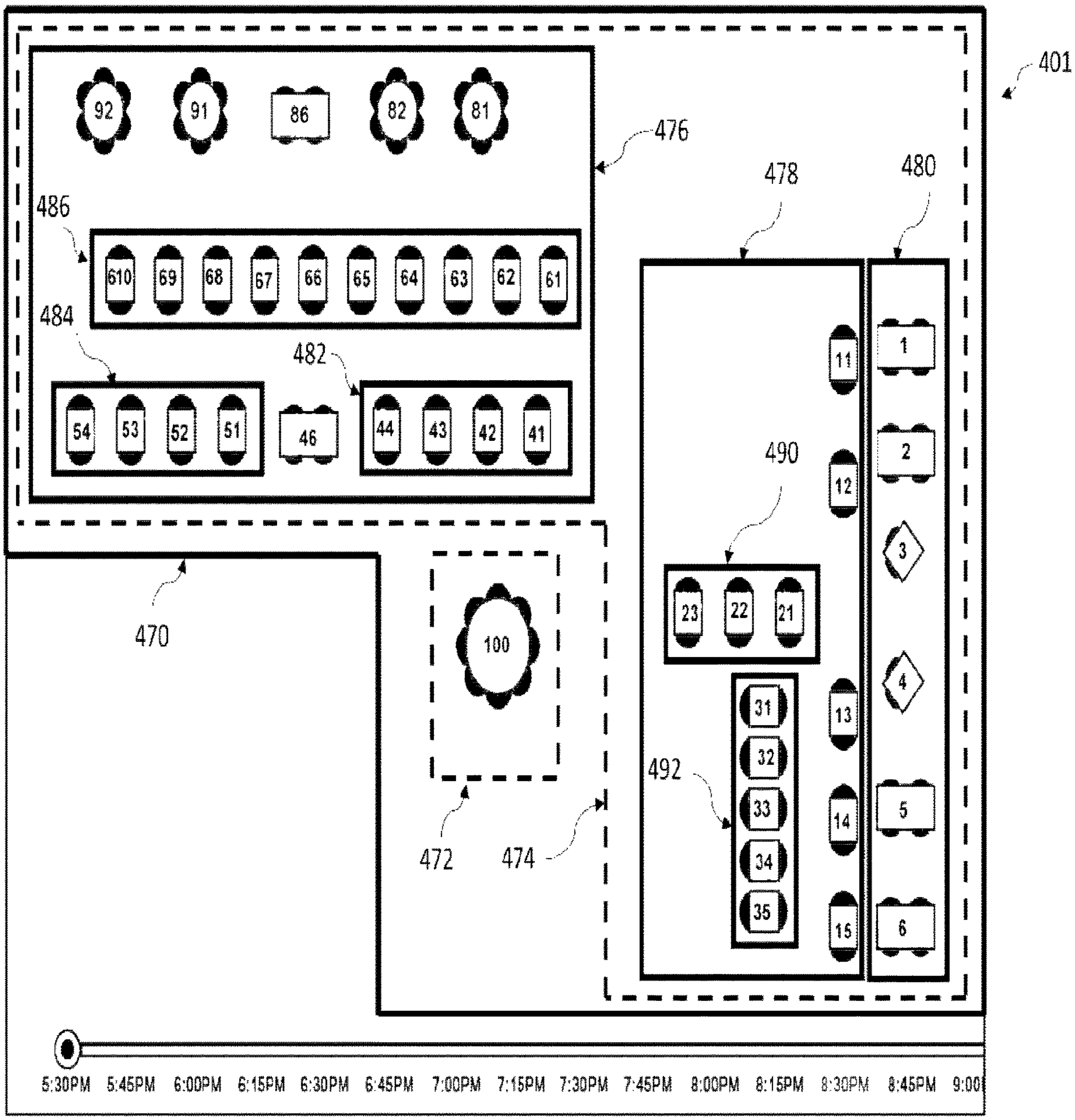
FIGS. 4*c* to 4*e* are floorplans illustrating the use of spaces, subspaces, sections, fixed and flexible seating area of a system in accordance with one embodiment of the invention.
Figure 4D:
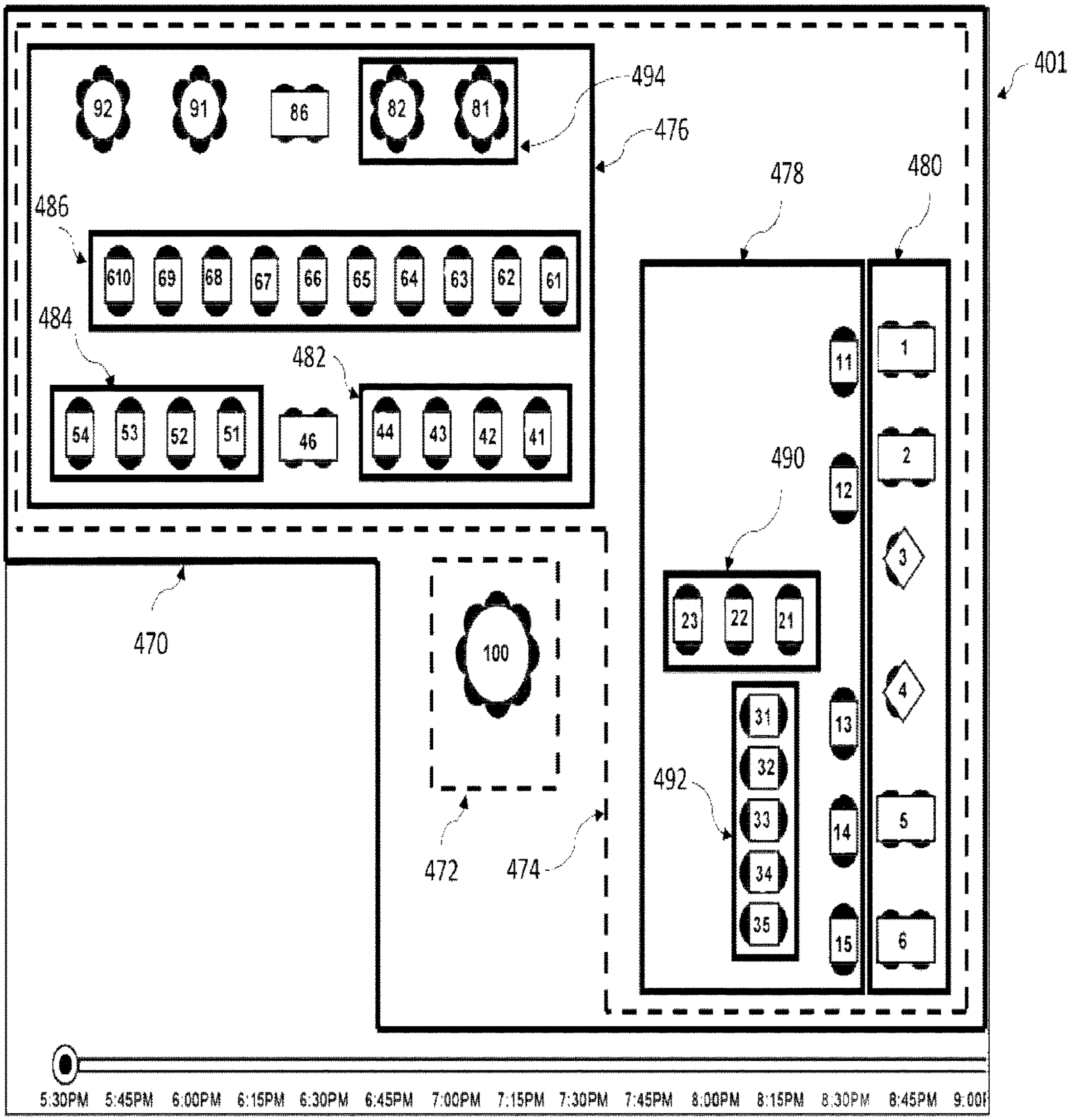
Figure 4E:
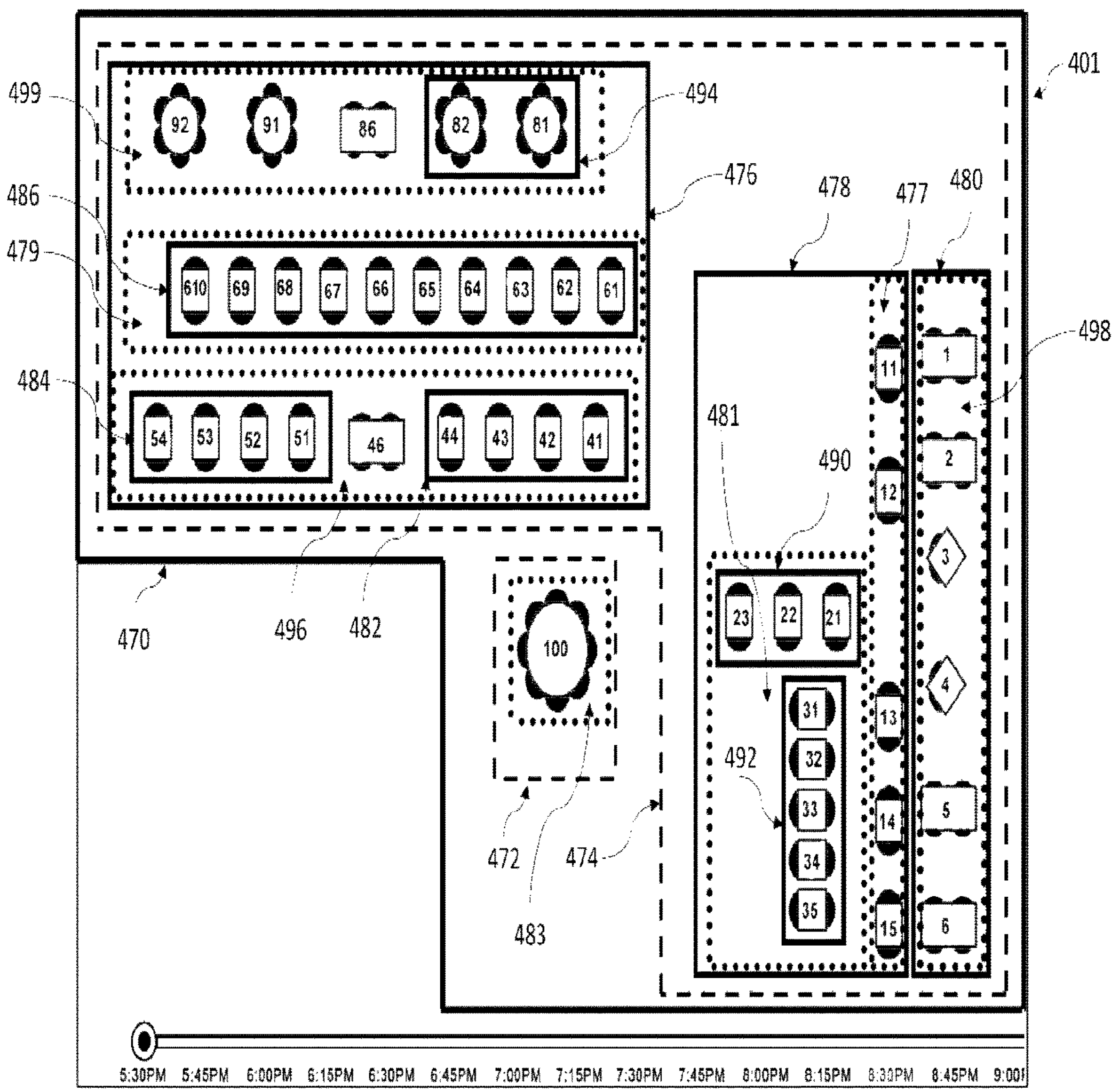

FIGS. 4*c*, 4*d* and 4*e* illustrate one embodiment of a venue floor plan 401 which comprises a venue 470 which in the example includes two spaces 472 and 474. Space 472 has been defined as the "Bar" and comprises one fixed table while space 474 has been defined as the "Main Dining Room" and comprises three subspaces; 476 defined as the atrium subspace, 478 defined as the front room subspace and, 480 as the colonnade subspace. Within the atrium subspace 476 there are 4 sections 482, 484, 486 and 494 which represent the flexible table areas where objects and tables can be rearranged. In the front room subspace there are two sections 490 and 492 while in subspace 480 there are no sections meaning all tables within that subspace are fixed.

Further, in one embodiment the constraint information includes information from the operator as to which spaces, subspaces and sections are open and information concerning which space or subspace to allocate and optimise bookings to first or if the entire venue should be treated as a single optimisation process without ordering of the bookings to one space or subspace first. Those skilled in the art will understand that the ordering and allocation process between different the different spaces, subspaces, sections and the ordering of the optimisation process can have practically unlimited permutations.

The constraint information may further include table numbers for easy communication of table positions to users. In FIG. 4*c* table numbers are first referred to as locators or markers of a certain location with the venue and applied in a way that provides easy communication as to where a general relative location of the table relative to the venue and with reference to other tables. In FIG. 4*c* the colonnade subspace comprises what is referred to as the "ones"—that is, all table numbers which are assigned a number less than ten. Secondly, the front room subspace is referred to as comprising the "tens to thirties" and the atrium subspace is referred to as having the "forties to nineties".

The constraint information may also include class information whereby a class can include spaces, subspaces and sections and any combination thereof. FIG. 4*e* comprises three different classes, namely "luxury class" denoted by 499 and 477, "premium class" denoted by 479 and 498 and "standard class: denoted by 496, 481 and 483.

The allocation of numbers in this manner gives food runners an automatic understanding of where they are required to deliver food. At the second level of the numbering system all fixed tables are given fixed table numbers within our numbering system. Flexible table areas, specifically are only noted as the twenties or the thirties, etc. and the system numbers all additional tables within a section in numerical sequence starting with the number 1 in that sequence, namely, 21, 31, 41 etc. as shown in FIG. 4*c*. The flexible table areas are generally referred to as "sections" and for more clarity are denoted by areas with dotted line boxes (boundaries) generally denoted by 482, 484, 486, 494, 490, 492 and 480 in FIG. 4*d*. The venue user also sets up the constraint within the system if the numbering system within a section should start from the left, or from the right, or from the top, or from the bottom of a section. In the embodiment described herein, the numbering system adopted does not use the numbers 10, 20 30, 40, etc. within a section as the "ones" sequence does not have a zero and if two or more sections were parallel to each other the table numbers would not form a perfect grid which would require additional thought to find a table.

The constraint information may further include patron identifiers, such as, but not limited to, a unique seat or position at each table. This allows for specific identification of patrons and the particulars of the request made to use the space. For example, when the request is made, the system may allocate each of the patrons to a position number, such that the patrons can preselect a menu item or items, drinks or any other particular aspect of their experience at the venue, and corresponding pay in advance for the experience, where the preselected items would be associated with each position number. In a further embodiment there are provided sensors at specific locations to identify the arrival and the seating of individual people at a specific position number at the table as well as knowing when all guests have arrived and the table is complete. In one embodiment, the sensors may be located in a table and/or chair. In another embodiment, sensors are provided at spaced apart locations within the venue, wherein the sensors are capable of locating individuals within a particular space.

That is, the embodiment offers a real time complete service for the booking requestor optimally arranging the layout of the restaurant to seat the requestor, receive their order, deliver their order, including providing self-seating and payment facilities, and thereby manage the entire experience at the venue.

As such, the embodiment provides the requestor with the ability to review or modify the details of the request. For example, if the requestor is associated with the venue (e.g. they have registered with the venue), the requestor may review or modify the details of their request after the request has been made by accessing their account. Alternatively, if the requestor has no previous association with the venue, the requestor may be provided with a unique reference number (or other identifier such as a QR code) to identify the request, and the requestor may use the identifier to review or modify the details of the request and the subsequent allocation.

Moreover, the constraint information may further include status information relating to the booking requestor. The embodiment provides the ability for requestors to interact with the user interface 204 and register identifying information which is saved by the database and allows the requestor to subsequently interact with the system (colloquially referred to as "becoming a registered member" of the venue), wherein the requestor is provided with a personal "account" storing past request information and more detailed requestor constraint information, wherein the past request information is utilised as further constraint information for all subsequent booking requests. The status of each requestor (and also each person associated with the requestor) is stored in the database in a secure manner in accordance with known methods for securing sensitive and private data.

For example, a requestor that is identified by the venue to be a "Very Important Person" (VIP) is allocated a higher ranking compared to a requestor who is not a VIP. Where a ranking system is employed for all requestors, requests to use a specific space, sub-space, section or table may be preferentially allocated to a booking requestor based on the status of the requestor. Moreover, the requestors within each category of "status" has an individual ranking within the corresponding status ranking. That is, the request of requestor identified as a more important VIP will be prioritised over a requestor identified as a less important VIP when allocating a request to use a space, sub-space, section or table. The ranking of a requestor may be determined by the owner of the venue or by the at least one user associated with the venue. In the embodiment described herein, the ranking also includes the category of "Super VIP", which includes requestors who are ranked higher than a VIP. However, it will be understood that the categories described herein are provided by way of example only, and act as "labels" to allow categorisation. No gloss should be taken from the labels utilised to limit the scope of the embodiment or the broader invention described and defined herein.

Additionally, the embodiment may access one or remote databases or websites which contain news or popularity data (for example a measure of the popularity of search or recently viewed news or information such as https://trends-.google.com.au/trends/) to determine a ranking or prompt the embodiment to update a requestor's ranking.

Moreover, the venue constraint information may include information that allocates a ranking to an section, subspace or space. That is, one or more spaces, sub-spaces, sections or classes may be allocated a ranking based on the attributes of the space. For example, a sub-space that includes a desirable view, which would be understood to enhance the experience of the requestor using that sub-space, would be considered to be a "premium" sub-space. Other attributes that form part of the venue constraint information can include the comfort of the furniture in the sub-space, the space between tables, or any other relevant physical characteristics of the space, sub-space or section.

Correspondingly, the range, quality or price of the menu items, the number of courses offered for the sub-space or the quality of service by users associated with the venue are constraint information that fall under the "class" classification. In other words, the "class" classification encompasses constraints that are not directly related to the physical space, but to constraints that are more relevant to the services offered at the venue.

It will be understood that in a venue, some of the objects to be allocated to a space or sub-space may be permanently fixed in their position. Such objects may include booths or seating at a bar. Accordingly, in the embodiment, the descriptors "space" and "sub-space" refer to areas within the space where the venue constraint information includes information indicating that the objects are either unable to be moved and are considered "fixed objects", or alternatively, that the objects can only be moved in very limited ways. For example, a fixed table may be modified by the addition of a different table top but may not be swapped for a different table.

Correspondingly, the objects to be allocated to a section can be moved, removed or combined with other objects. In an embodiment, the venue constraint information specific to sections includes information indicating that the objects in the sections are able to be moved. Therefore, the objects within the sections can be arranged into many different permutations enabling potentially limitless object arrangements that may be allocated to a section. It is the ability to "map" a particular arrangement of furniture within a section that, in part, enables the use of the space to be optimised to accommodate user requests.

The limit of the number or type of objects that can be allocated to a space is determined by the dimensions and shape of each object and the constraint information included that defines the dimensions and shape of each section. In other words, in an embodiment, the venue constraint information also includes object constraint information regarding the dimensions of one or more tables, chairs and/or any other objects that are locatable within each section. As such, there is no requirement for the venue to "provide" a restaurant layout, except for areas where objects are fixed.

The constraint information can further include information that allows for the identification of each object through the use of unique identifier mechanisms, such as an identification number or an embedded Radio Frequency Identification ("RFID") chip with a unique number or code to enable the identification of specific objects. The constraint information may also include information on the status of the object, for example, whether the object is currently positioned in the space or is in another space (or in storage), whether the object is in use or not in use, and whether the object is optimally arranged or has been arranged manually. That is, the embodiment may also include one or more RFID sensors (or other sensors that allow the position/location of an object to be determined relative to the dimensions of the space) arranged in the space such that the embodiment receives live data from both the RFID sensors and chips to determine whether the object has been optimally arranged in the space subject to the optimised space allocation instruction set.

The constraint information can further include information relating to the dimensions or capacity of the storage space. Such information may include the dimensions of objects in a stored state within the known dimensions of the storage space to determine the capacity of the storage space for storing objects. Alternatively, the capacity of the storage space may be provided by reference to the specific number of items that may be stored in the storage space.

The venue constraint information can further include information relating to the service period during which the space, sub-space or section is utilisable. Accordingly, the venue constraint information can include information relating to the division of a use of the space across discrete service periods (also commonly referred to as "seatings" in the restaurant industry) where the service period is initially set. The venue constraint information can also include meal periods, which describe the amount of time required to service menus of different course sizes and complexities. In the example of a restaurant, a meal time "unit" would be determined by the time taken by a restaurant patron to consume a meal consisting of a single course, including seating time and "re-setting time". By quantizing the meal time in this manner, the time utilisation of a particular space, sub-space or section is optimisable across the operating time of the space, sub-space or section.

Further, as would be appreciated by the skilled addressee, the stored data in the database may include historical information relating to past use of the space in a venue which can be used to optimise average meal times allowed or allocated to a booking request.

The venue constraint information may also include information relating to external factors that have an impact on the venue. External factors can include, for example, events related to particular times of the year, such as, but are not limited to, the day of the week, public holidays, festivals, school holiday periods, conferences, proximate social or religious events, or past, current or predicted future weather. The person skilled in the art would understand that the venue constraint information may include any variable external to the venue that affect the operation of the venue, even if the relationship is latent or indirect. The optimisation module 208 may utilise one or more of the external factors as a factor in the optimisation of the operation of the venue or may also utilise one or more of these factors in a predicting and forecasting functionality, which is described in further detail below.

Optimisation Module/Algorithms

In an embodiment, the optimisation module 208 uses the processor 210 to query the database 212 to determine whether other booking requests for spaces have been made by other requestors, wherein booking requests includes unallocated requests, previously allocated requests, requests on a wait list and requests on hold. If booking requests are identified on the database 212, the optimisation module 208 utilises the processor 210 to retrieve the requests in the database 212 and combine the at least one request with the other requests to form a pool of requests. The optimisation module 208 also utilises the processor 210 to retrieve other relevant venue constraint information from the database 212. There are also provided Book Restaurant Forms 203 and Book Function forms 205. An external portal 218 allows the venue operators to access "back end" functions and provide or edit venue constraint information.

The optimisation module 208 uses the processor 210 to iteratively allocate all requests from the pool of requests utilising the venue constraint information and the requestor constraint information. All requests in the pool of requests are allocated to produce an optimised space allocation instruction set 214, in accordance with the venue and requestor constraint information. That is, with each new request, all previous allocations that have been determined become past optimised space allocation instruction sets. The past sets are saved in the database 212. With a new request, all previously accepted requests in the pool of requests are iteratively re-allocated to produce a new optimised space allocation instruction set that includes the current request.

Each new optimised space allocation set 214 that is generated by the allocation module 208 is saved in the database 212, which may also access external web data 215, and may utilise other modules including ResButler Applications 217, ResButler Processes 219 and External Systems 221. The computing system 200 further includes a space allocation user interface 216, which is in communication with the database 212. The space allocation user interface 216 displays at least one optimised space allocation instruction set 214 to one or more operators associated with the restaurant 218. The optimised space allocation instruction set may be represented on the user interface of the restaurant 218 as an interactive digital scaled-map representing the position of specific objects, such as tables, and the arrangements and combinations of those objects within the space. The interactive digital scaled-map may be modified by one or more users associated with the venue. Alternatively, the optimised space allocation instruction set may be generated as an image, Gantt chart, documented instructions or any other manner of representation that illustrates to an user the optimised arrangement of objects in a space.

The allocation module 208 may also include a predicative module 220 that allocates booking requests at least in part on the historical data stored in the database 212. The predicative module 220 utilises the processor 210 to predict an optimised space allocation instruction set based on past data using regression analysis techniques or any other mathematical algorithms which identify relationships between past dependant and independent variables and match them to current variable data to extrapolate an optimised space allocation instruction set to accommodate the at booking request.

For example, where the venue is a restaurant and the computer system 200 has received a request for a particular day, such as Valentine's day, the system 200 can review historical optimised space allocation instruction set data from past Valentine's days and determine that the prior optimised space allocation instruction sets comprised primarily of tables of two. The predictive module 220 communicates with the processor 210 and the database 212 to provide the allocation module 208 with the data necessary to determine an optimised space allocation instruction set in accordance with the historical data. This set may be used by the optimisation module 208 as the first optimised space allocation instruction set generated for the first request received for that use of the space of the venue.

In an embodiment, the predictive module 220 may also be used for optimising the use of resources in a restaurant or venue, where the predictive module 220 uses the processors 210 to accesses historical and live data regarding the use of the resources of a restaurant stored in the database 212. The predictive module 220 also accesses the information regarding the actual usable resources at any given period of time collected by the user interface 218. The predicative module 220 utilises the optimisation module 208 and processor 210 to analyse the historical and current "live" data and the actual usable resource data and determine the relative optimal use of the usable restaurant resources for the any given period of time using a yield determination algorithm, or any other similar deterministic algorithm.

For example, the predictive module 220 may access historical and live data and usable resource data and determine the number of staff likely to be required for the next service period for the venue.

In an embodiment, the predictive module may further be utilised to simulate the operation of a venue prior to receiving live booking requests. The predictive module allows the venue operator to manually fix particular venue constraint information variables (such as the total number of guests per service period, service period duration times, constraint information relevant to specific occasions, different menus, different courses, different allocated menu and course duration times, discrete and overlapping service periods, etc.) to derive one or more simulated optimised space allocation instruction sets. Using the one or more simulated optimised space allocation sets, the venue operator can determine the ideal number of objects and other variables which will optimise the yield (such as the amount and types of tables and chairs, the menus offered, etc.). The simulation capability offers a substantial improvement over the current method of setting up a venue by guessing or trial and error of the arrangement of a venue.

The allocation module 208 may further provide information regarding one or more resource parameters that may be optimised to increase the yield of the restaurant. The optimisation module 208 may also user the predicative module 220 to utilise the yield determination algorithm or the historical data to forecast future demand for the resources to set capacity, menu, pricing, and service constraints, as well as to calculate resource requirements such as, staffing requirements, food costs, ancillary costs, rental costs, maintenance costs, and capital costs. The yield optimisation may be provided as instant feedback to one or more venue operators, where the feedback may be in the form of an automatically generated report, which may include either static or interactive tables, graphs or other graphical tools or used to autonomously adjust the constraints of the embodiment.

Figure 2E:
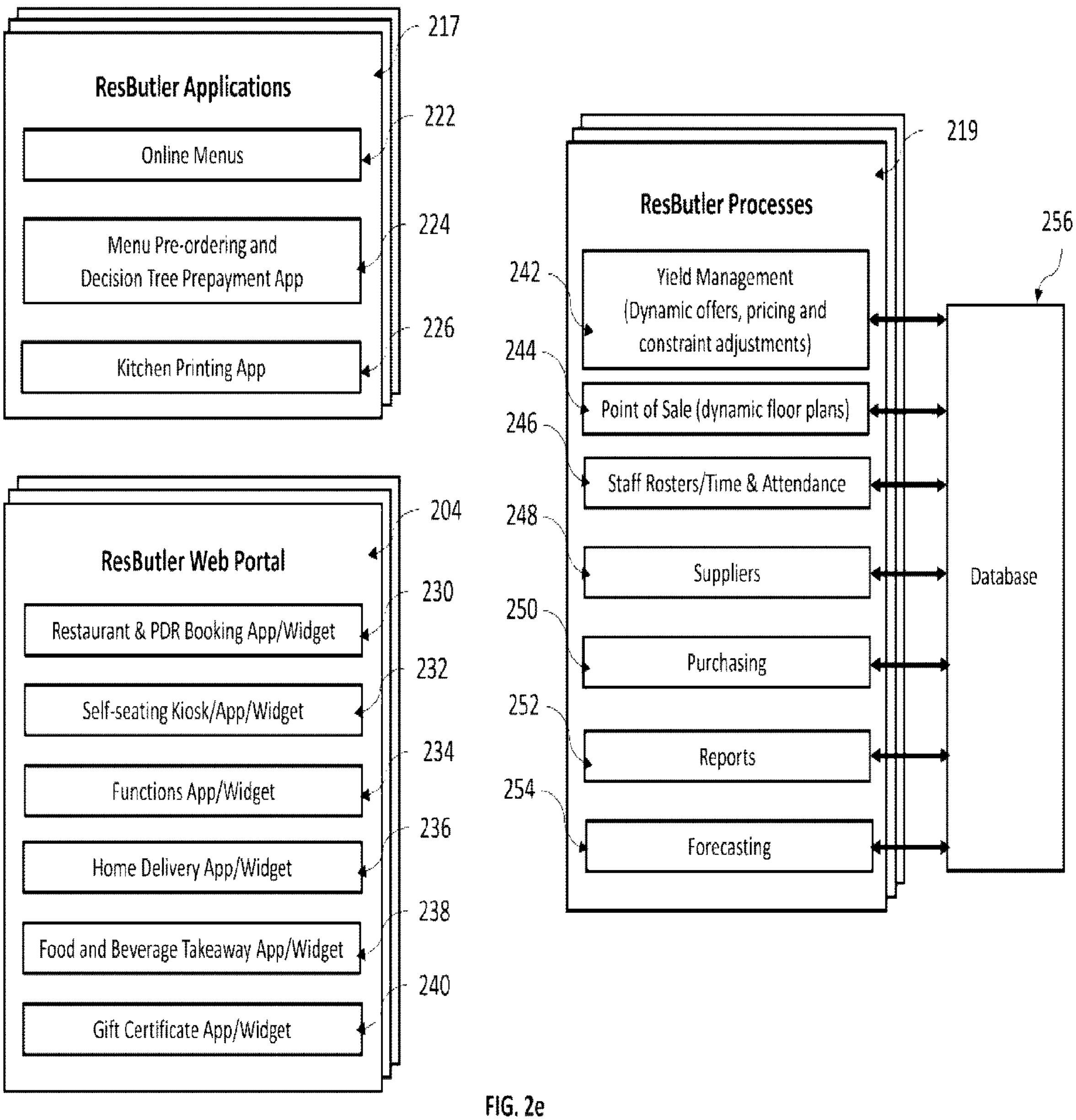

Referring to FIG. 2*e*. there is displayed a example of the applications 217, the web portal applications 228 and the processes 219 in accordance with an embodiment of the invention.

In particular, the ResButler applications 217 includes online menus 222, pre-ordering decision tree 224 and kitchen printing app 226. The web portal 204 includes the booking app/widget 230, the self-seating app 232, a functions app 234, a home delivery app 236, a takeaway app 238 and a gift certificate app 240.

Moreover, in terms of "back end" functions, the ResButler system includes a number of processes 219 arranged to interrogate the database 256 for yield management 242, point of sale 244, staff rosters 246, supplier information 248, purchasing information 250, financial and other reports 252 and forecasting reports 254.

Figure 2F:
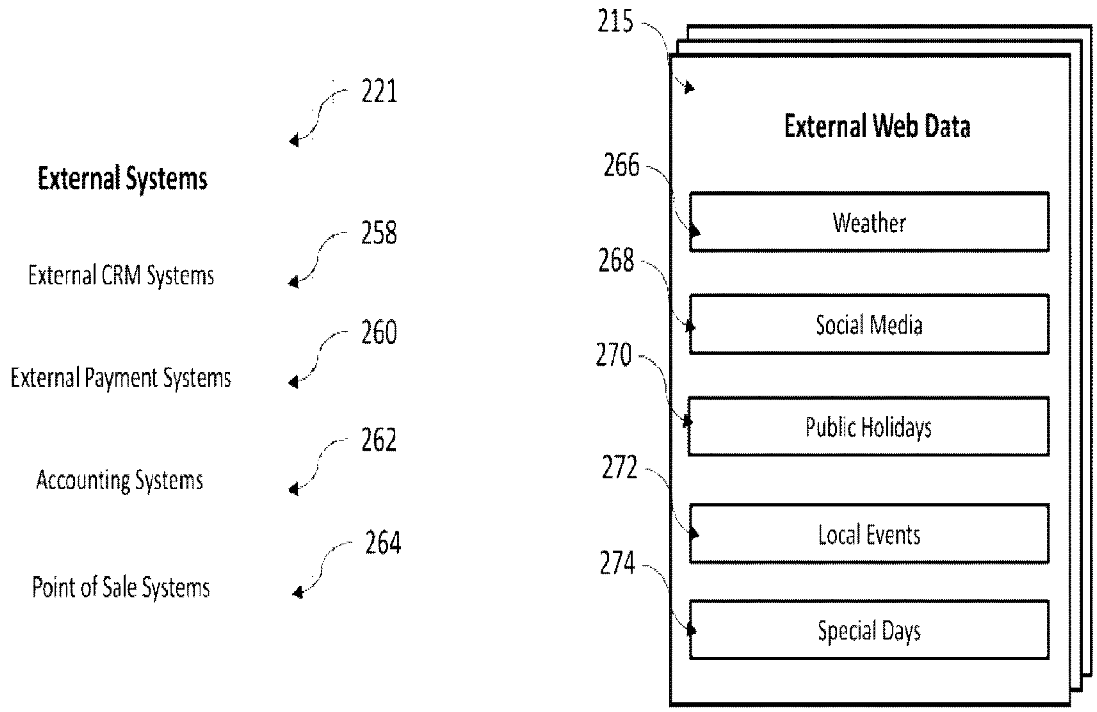

Referring to FIG. 2*f*, the ResButler System also includes access to a number of external systems 221 including an external CRM 258, an external payment gateway 260, links into external accounting systems 262 and external point of sale systems 264. Moreover, the ResButler system is arranged to receive web (or external) data 215 of different types, including weather 266, social media 268, public holiday information 270, local event information 272 and special day information 274. This data may be received as a direct "feed" using an API or similar connection, or may be "scraped" from a website, depending on the type of data and the source. Such variations are within the purview of a person skilled in the art.

As discussed above, the embodiment 200 discloses a system for optimising the use of space in a venue. It will be understood by the skilled addressee that the computing system 200 is applicable to any use where space is to be allocated. For example, optimising space in a venue where the venue may be a restaurant, bar, café or any hosting venue offering the use of a space where the arrangement of the objects impact the optimisation or desired outcome of the space.

Moreover, the system may also be used for optimising the use of space in a venue where the venue is an entertainment venue such as a concert, cultural or a sporting event where the arrangements of the objects impact the optimisation outcome.

Moreover, the system may also be used for optimising the use of space in a venue where the venue is a workspace or function or event space venue or hotel or accommodation venue where the placement of objects can optimise and improve an outcome.

Alternatively, the system may also be used for optimising the use of "time" in areas where products or services have different revenue and margin impacts, and the products can be offered at different times with different constraints to optimise desired outcomes. For example, a hairdresser could offer "hair colouring" only at off peak times as a person may be occupying a seat for a very long time when it may have been used for two haircuts which could have yielded more revenue and margin for that seat. Alternatively, a car park could offer a minimum 2 hour parking time slot during peak periods and a half hour minimum parking time slot during non-peak periods. As another example, in a fast paced casual restaurant model with orders entered online, the system can allocate the customer to a particular table with directions on how to locate the table as well as giving the customer a fixed time to consume their meal (such as half an hour) to ensure that customers do not "hog" tables or "spread themselves out" taking more chairs or tables than they need.

System Flowchart

Figure 2G:
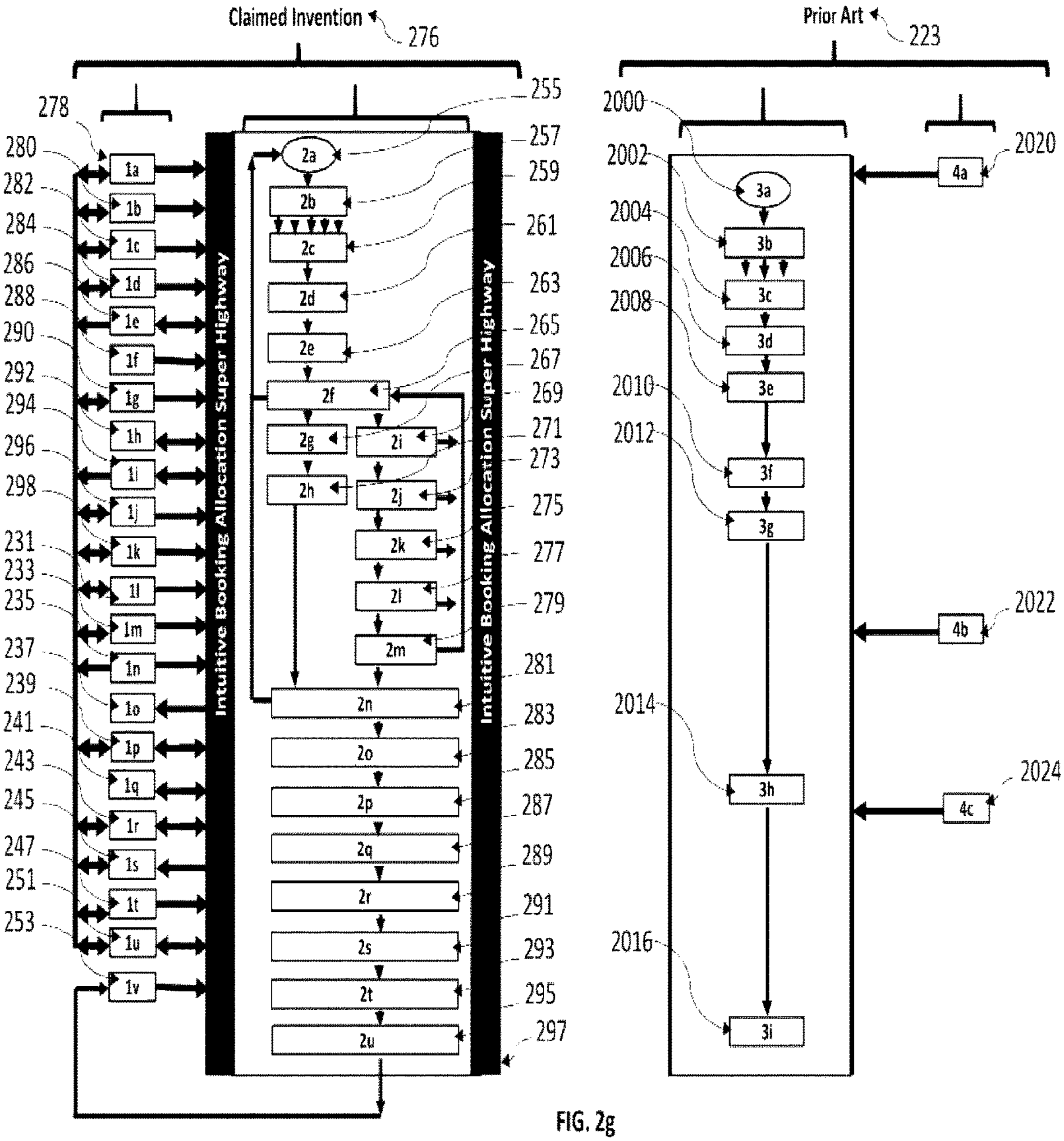

Referring now to FIG. 2*g*, there is shown a series of modules/components and method steps, for the embodiment described herein, alongside a comparison with a prior art system, which is utilised to provide context with regard to the differences between the embodiment and the prior art. Numerals on FIG. 2*g* correspond with numerals on following FIGS. 2*h* to 2*m*. Therefore, any reference to modules, components and/or method steps in FIGS. 2*h* to 2*m* are equivalent to the reference numerals found in FIG. 2*g*.

Referring to now FIGS. 2*j* to 2*m*, there is shown a diagrammatic representation of each of the component parts of the system in accordance with an embodiment of the invention. The following references are provided as a summary of the information referred to within the flow chart:

1a Restaurant Set-up Rules: Open/closed; Meal periods; Primary Floor Plan to scale; Alternative Floor Plan Constraints to scale; Rooms, Areas, Subareas, Sections, Bars to scale; Dimensions, storage, furniture; Seat block-outs; etc. (278)

1b Menus: Pre-theatre; Post-theatre; A la Carte, breakfast, lunch, dinner, supper etc.; By group size; By time; etc. (280)

1c Dynamic Pricing and Dynamic Product and Service Promotional Offers: Extended Time Duration Pricing; Shortened Duration Discounted Pricing; Promotions by Time, Group Size, Menu, Course, Day of the Week (282)

1d Special Events Scheduled by Venue: Family Day etc. (284)

1e CRM: VIP details; VIP offers; Member history; Member ranking; etc. (286)

1f External Websites: Celebrities, etc. (288)

1g Forecasting and Predictive Model: Booking times; Booking capacities; Booking classes; Staffing forecast; Resource forecast; Operational forecast, etc. (290)

1h Suppliers: Orders; Deliveries; Constraints, details etc. (292)

1i Database of Booking Requests: Utilised in the iterative booking allocation optimisation (294)

1j Optimisation Quantitative and Qualitative Strategic Rules and Outcomes: Floor Space Optimisation Algorithm; Time Related Optimisation Algorithm; Event Related Optimisation Algorithm; Strategy Related Optimisation Algorithm; Third-Party Optimisation Algorithm; Pre-service Optimisation Algorithm; In-service Optimisation Algorithm; Self-Seating Optimisation Algorithm (296)

1k Resource Parameters: Venue set-up times; etc. (298)

1l Reporting: Performance analysis; Customer satisfaction; Deliverables; Labour Analysis; Actual v. Predicted etc. (231)

1m Database Historical Information: Booking duration times; Time bookings made; Classes of bookings; Spend by booking types; Yield; Efficiency; Walk-ins etc.; etc. (233)

1n External Websites: Weather (235)

1o Printed Operational In-Service Run Sheets (237)

1p Operational Requirements and Planning: Staffing levels; Rosters; Start/Finish times; Orders; Delivery Schedule; etc. (239)

1q Point of Sale Integration: Dynamic Floor Plans; Seating; Orders; Payments; Sale items; Etc.; CRM details (241)

1r Stock Control, Ordering and Purchasing (243)

1s Home Delivery and Takeaway Integrations for Production and Time Scheduling (245)

1t Payment Rules: Payment Decision Tree; Prepayment and payment constraints (247)

1u Artificial Intelligence: Including data mining, advanced analytics, modelling and predictive analysis to automatically amend constraints. (251)

1v Alternate Payment Systems (253)

Referring to FIGS. 2*j* to 2*m*, the following references are provided as a summary of the information referred to within the flow chart as "Claimed Invention" 276, "Intuitive booking allocation super highway" (297) and booking allocation information 2026:

2a User (255)

2b Various Access Channels (257)

2c User/User Interfaces: Restaurant Booking Widget, Function Booking Widget, Self-seating Kiosk, Self-seating App, Restaurant Booking App, Menu Pre-ordering App/Widget, Promotional Apps/Widgets, Booking Form. (259)

2d User requirements used in the Booking Allocation: (Claimed Invention) Buy a specific table, request a specific table, request an extended dining duration, Flowers, Chocolates, Card, Entertainment, Gift, Different order of service, Personal Waiter, Specific Personal Waiter, Budget, Occasion etc. (261)

2e Strategic Control of Capacity, Product and Services for Booking Allocations: (Claimed Invention) Strategic capacity availability by Area, Sub-area, Section and Class. Strategic Product and Service Availability by Menu, by Courses, by Variable Time Durations to meet revenue and yield management targets. (263)

2f Booking Allocation for the Optimisation of Space: (Claimed Invention) Sale of specific tables with guaranteed allocation, Super VIP guaranteed seating, VIP prioritised seating, Optimisation of remaining table allocations to Area, Sub-areas, Sections and Classes based on venue strategy. (265)

2g Payment/Deposit Confirmation (267)

2h Butler Service: Ordering of 3rd Party Services/Products. (271)

2i Time-Related Booking Optimisation: At a predetermined time (e.g. 1 hr before service), reallocation to offer the best tables to the highest ranking, non-guaranteed table-allocated customers (Musical Chairs) (269)

2j Event-Related Booking Optimisation: At the occurrence of an event, e.g.: Rain, reallocation of outdoor bookings to tables in undercover Areas, Sub-areas, Sections and Classes. (273)

2k Capacity-Related Booking Optimisation: In the event that a particular class of table is at full capacity, a determination if demand for other classes of tables is such that they can be reduced and additional tables offered for the class in demand. (275)

2l Strategy-Related Booking Optimisation: Ambience reallocation: if restaurant is not expected to fill up or other parameters apply. (277)

2m Third Party Information Booking Optimisation: Theatre information, website information which may have an impact on capacity decision. E.g. allocating bookings to a minimum space in anticipation of a full theatre next door. (279)

2n Pre-service Booking Allocation Optimisation: Final optimisation before service taking all the above factors into account, as well as opening up capacity for walk-ins, if such capacity had been previously excluded from the allocated capacity. Creation of run sheets and service notes for staff. If a venue selects self-seating option, floor plans and seating locations as they would appear at time of arrival of each booking are sent to each customer. (281)

2o Cockpit Dashboard: Dynamic Floor Plan; Time-based floor plan (283)

2p In-service Booking Allocation Optimisation: Optimisation can be based on any combination of the above optimisation algorithms or different algorithms which can only use tables located within the restaurant and/or without moving pre-allocated bookings and/or allocating bookings based on space optimisation or other dimension such as allocation to the best table. (285)

2q Self-Seating Kiosk (Booking Allocation): Applicable for venues that have selected the self-seating option. The kiosk can provide information on the seating location of confirmed bookings as well as the ability of accepting new walk in bookings. (287)

2r Autonomous Restaurant and Complete Integration: Fully integrated information system including table and position sensors. (289)

2s Point of Sale System: Fully integrated with dynamic real-time table plan layout with orders sent to kitchen and bar as appropriate. (291)

2t Payments: Fully integrated with links to original booking including part payments by table, customer and position number. (293)

2u Accounting System: Revenue; P&L (295)

Figure 2H:
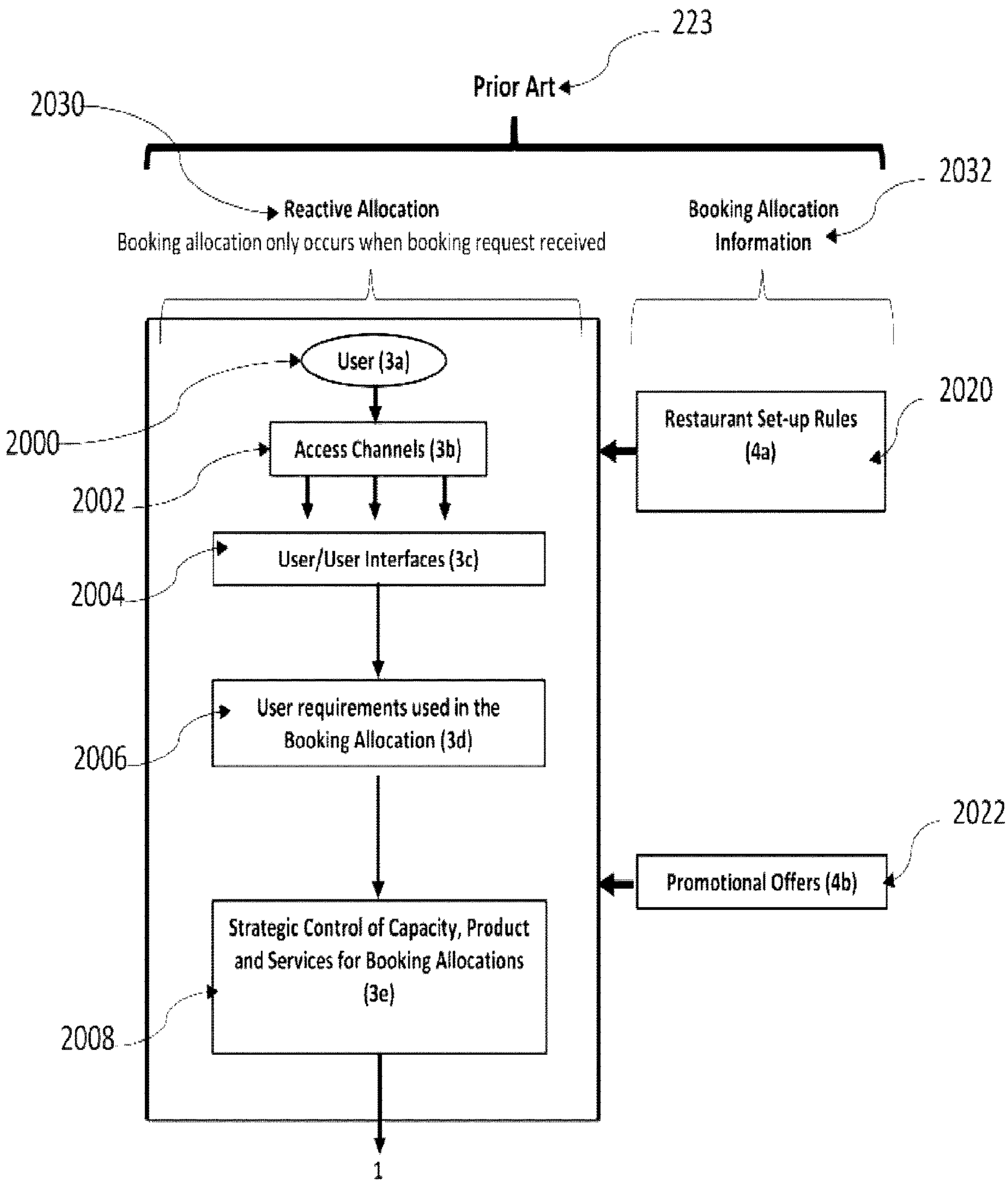
Figure 2I:
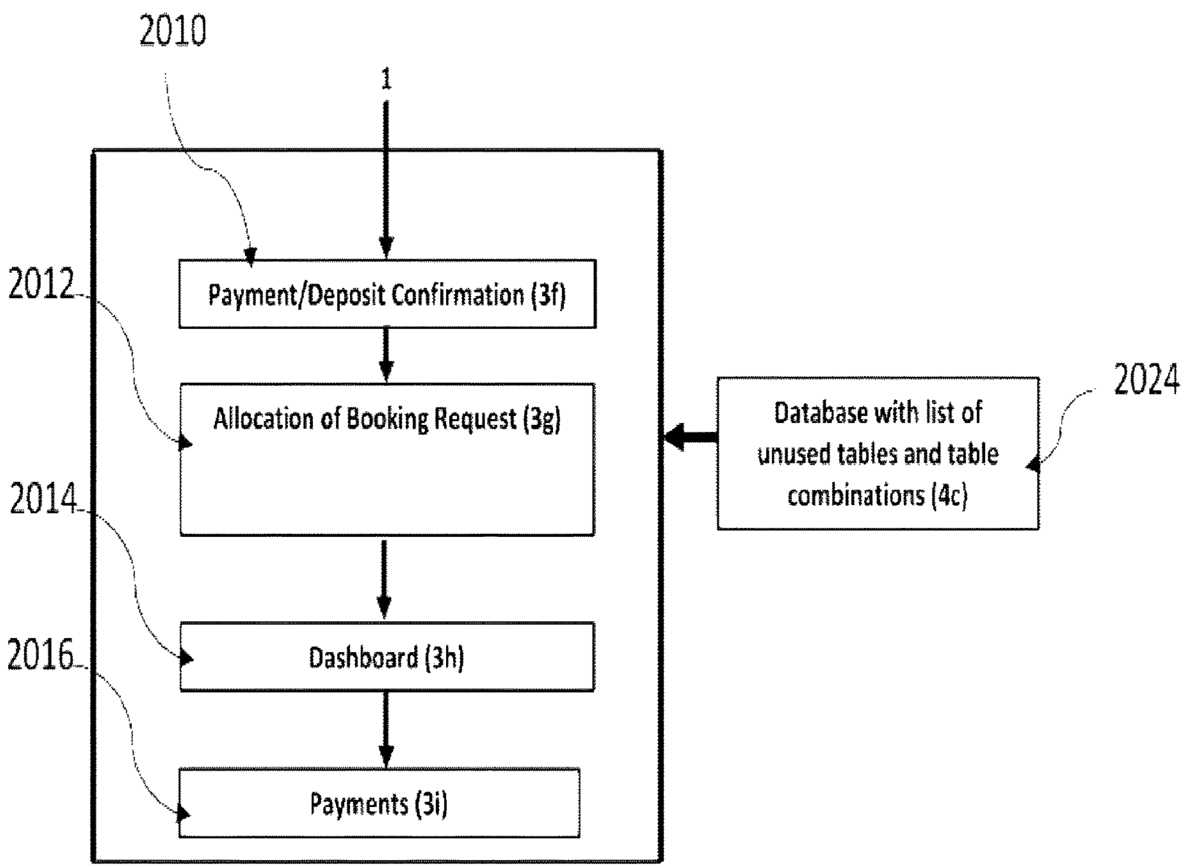
Figure 2J:
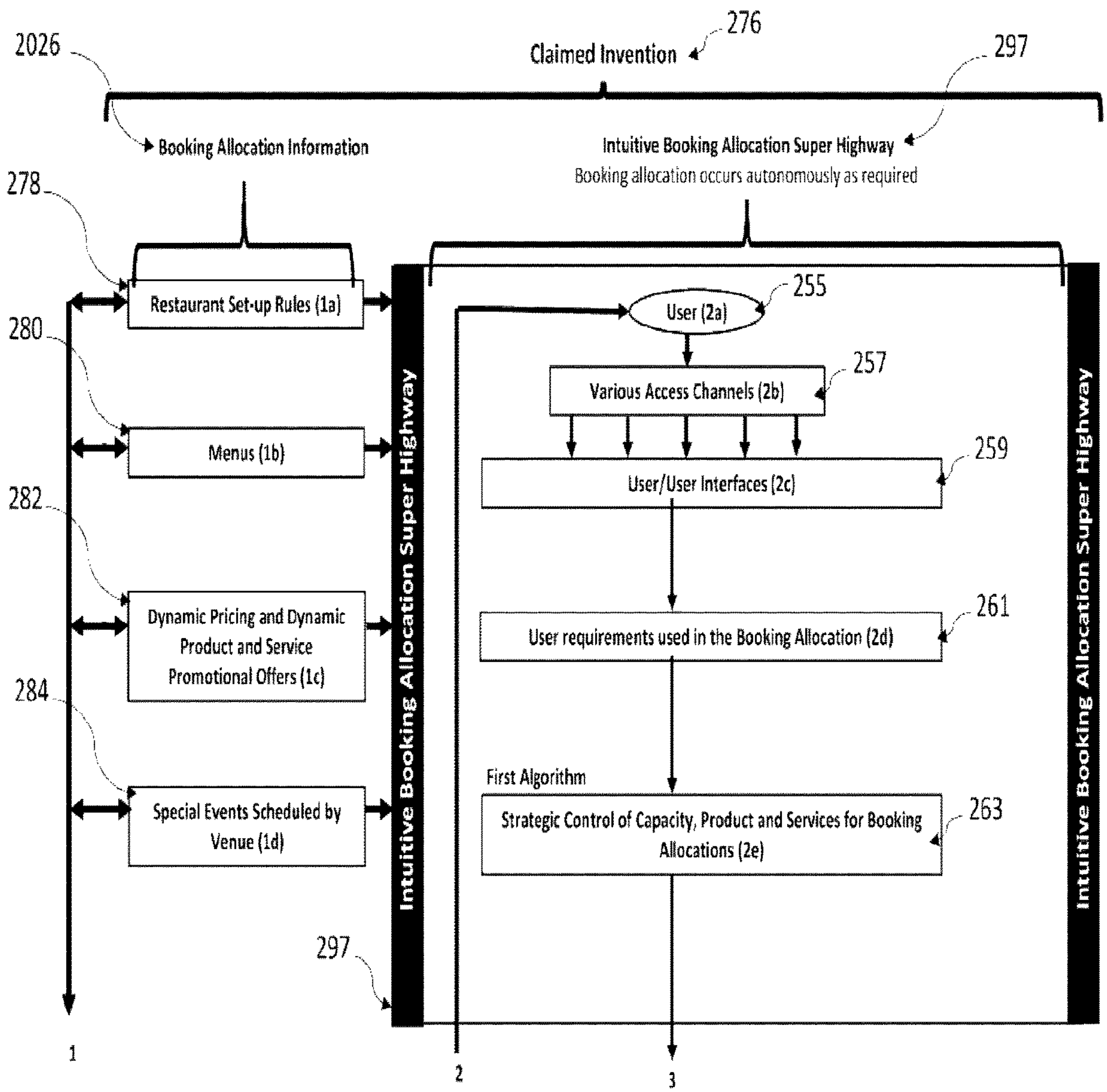
Figure 2K:
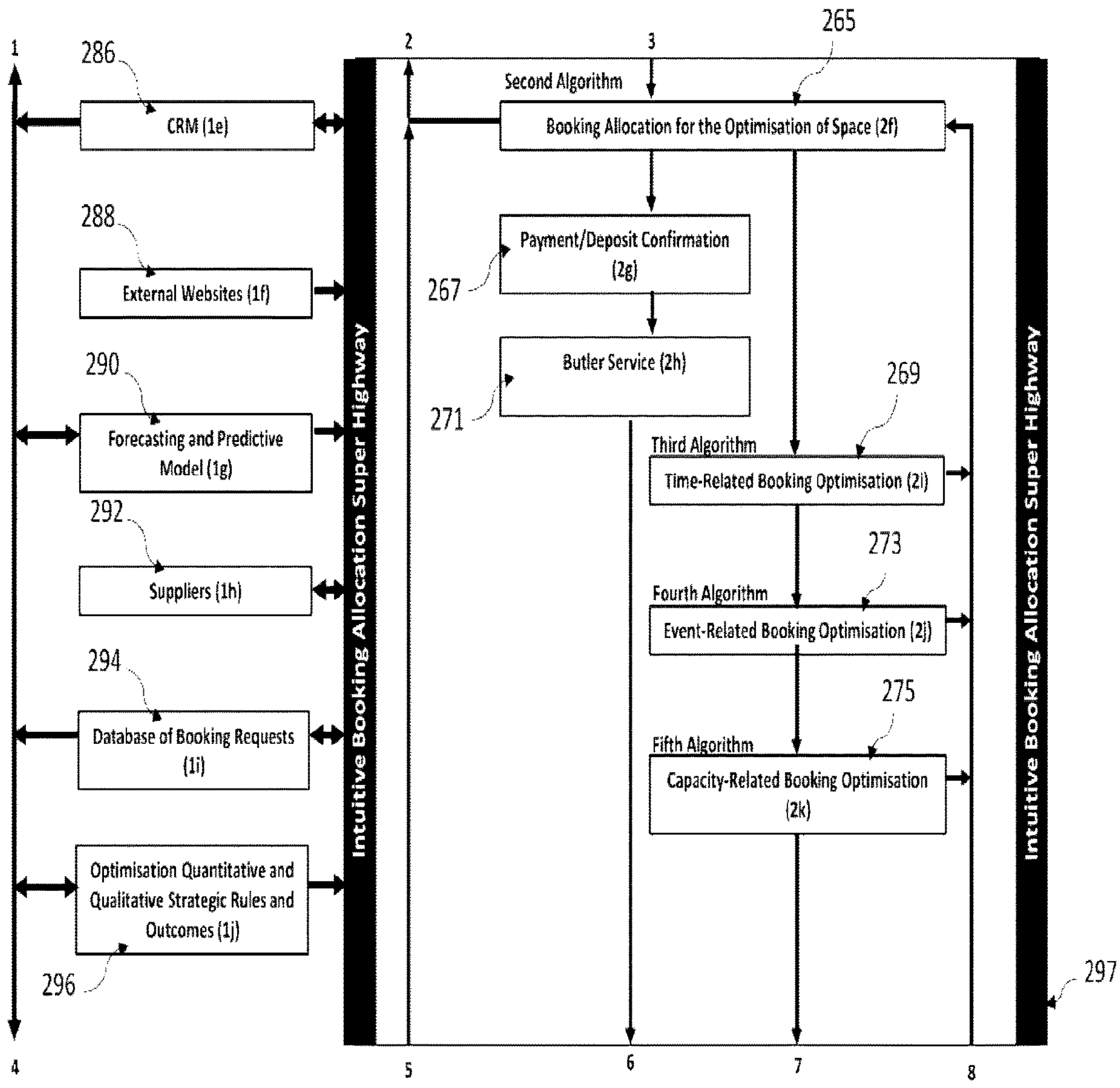
Figure 2I:
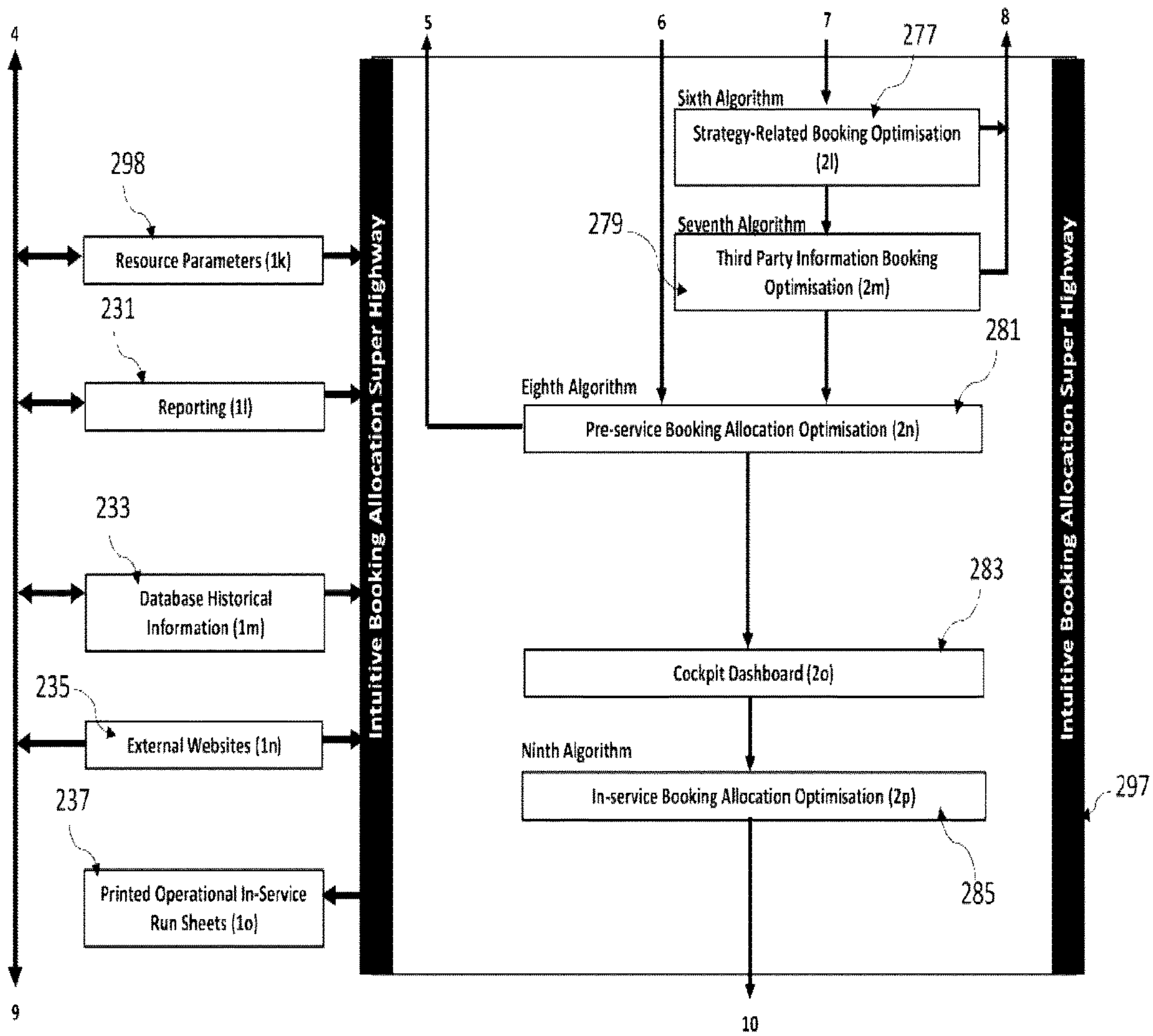
Figure 2M:
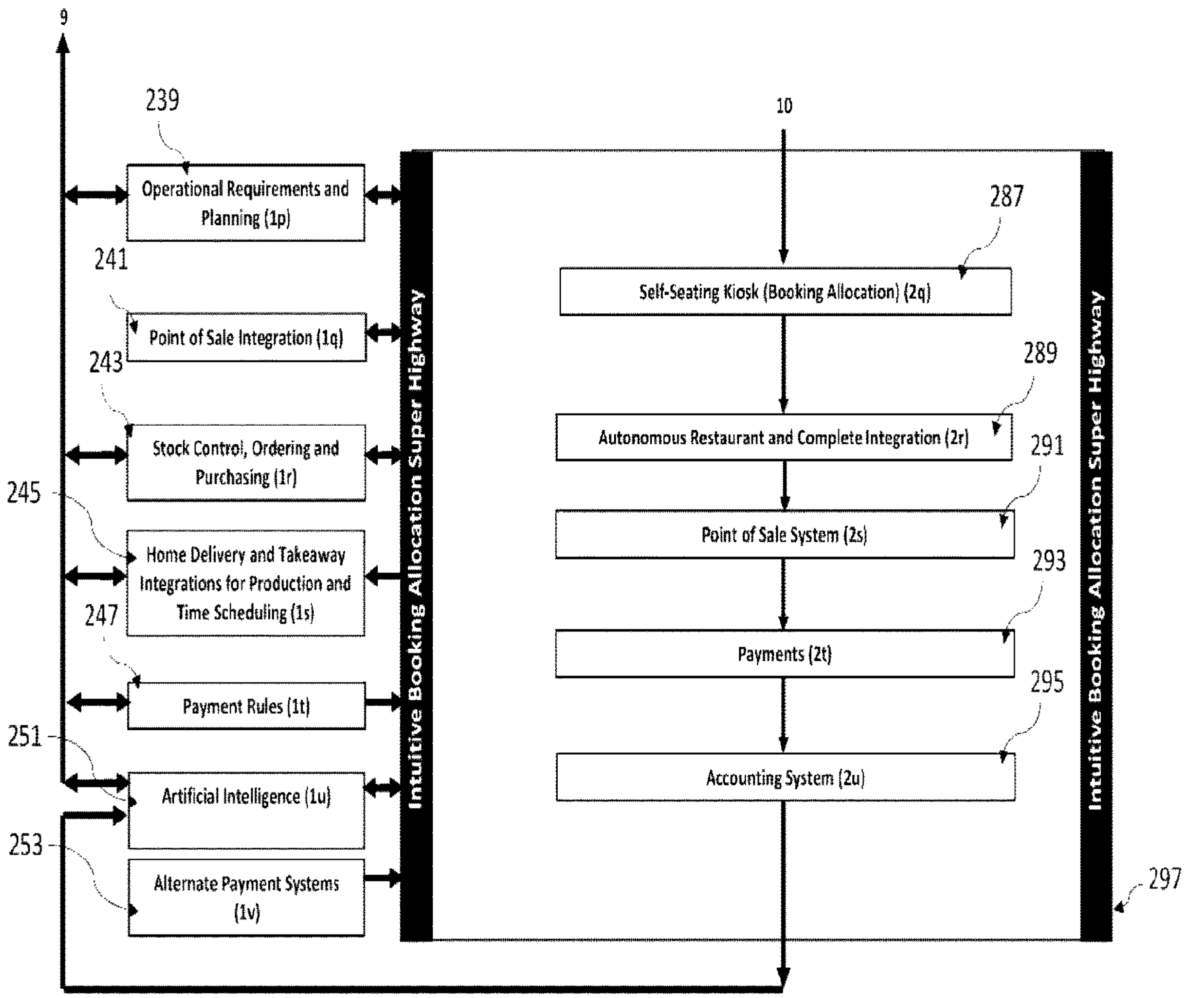

Referring to FIGS. 2*h* to 2*i*, the following references are provided as a summary of the information referred to within the flow chart as "Prior Art" 223, "Reactive Allocation" 2030 with booking allocation information 2032:

3a User (2000)

3b Access Channels (2002)

3c User/User Interfaces: Restaurant Booking Widget, Booking Form. (2004)

3d User requirements used in the Booking Allocation: (Prior Art) Date, time, meal period, pax (2006)

3e Strategic Control of Capacity, Product and Services for Booking Allocations: (Prior Art) Capacity and Max Group Size by booking time interval for a standard time duration. (2008)

3f Payment/Deposit Confirmation (2010)

3g Allocation of Booking Request: (Prior Art) Use of a prioritised list of tables and table combinations to allocate bookings. Prior Art process finishes with this step. (2012)

3h Dashboard: Static Floor Plan (2014)

3i Payments (2016)

Referring to FIG. 2*h* and FIG. 2*i*, the following references are provided as a summary of the information referred to within the flow chart as "Prior Art" 223, "Booking Allocation Information" 2032:

4a Restaurant Set-up Rules: Open/closed; Meal periods; Floor Plan (not to scale); Seat block-outs; Rooms, Areas, Bars; Tables and table combinations prioritised list; Standard booking time duration (2020)

4b Promotional Offers: Discount by time interval (2022)

4c Database: List of unused tables and table combinations (2024)

Referring to FIGS. 2*h* and 2*i* they provide a diagrammatic representation of each of the component parts of the prior art.

Referring to FIG. 2*j* to FIG. 2*m*, the following description is provided as a summary of the overarching algorithms contained in the embodiment illustrated.

It will be understood that the description with regard to FIG. 2*j* to FIG. 2*m* are not to be taken as an exhaustive description of the invention or embodiment, but rather a summary of an embodiment, to enable a person skilled in the art to gain an understanding of the broader inventive concept. It will be understood that the subsequent Figures will describe some of the algorithms in more detail and will provide examples of reduction to practice. That is, the description with regard to FIG. 2*j* to FIG. 2*m* are not to be taken as evidence that the inventive concept is "abstract" or the mere implementation of an abstract concept. Rather, the description of FIG. 2*j* to FIG. 2*m* is intended as a primer or high level view of the underlying inventive concept, to enable the person skilled in the art to better understand the inventive concept.

It will be understood that the description with regard to FIGS. 2*j* to 2*m* are not prescriptive in that all algorithms are required to be taken or taken in the order that they are shown the description or that they form a definitive list of steps and algorithms possible. The purpose of FIGS. 2*j* to 2*m* is to highlight the inventive concept of using the knowledge of space, objects and their relativity and utility in the optimisation of a space based on the strategic parameters or constraints of a venue.

Moreover, there will be described below a series of algorithms, which for convenience, are numbered. However, it will be understood that each algorithm is independent, and the numbering is not reflective of any specific order in which the algorithms are to be applied. The embodiment may apply one or more algorithms dependent on constraint information.

The First Algorithm is termed the "Strategic Capacity Control" algorithm, module 263, (2*e*) which makes an assessment of requests based on availability with reference to allocations by space, subspace, class, by time, allowing capacity for walk-ins, by menu, by course, etc.

The Second Algorithm is termed the "Optimisation of Space Outcomes" module 265, (2*f*) and is relevant to guaranteed table allocations. The algorithm which is an iterative seating optimisation algorithm which is arranged to allocate seating first to Super VIP's and guaranteed seating allocations then based on availability by VIP, group size, etc., to optimise the allocation and position of tables. This algorithm is arranged to optimise floor space efficiency around guaranteed table allocations.

The Third Algorithm is termed the "Time Related Optimisation" algorithm, module 269, (2*i*) which is best described by an example. For example, one hour before service, if it is decided that no new tables should be added, all bookings are reviewed, and, if there are two different bookings at 6 pm and one booking is from a regular customer and one is from a first time visitor, the regular customer is allocated to the better table and the first time customer is allocated to the other table.

The Fourth Algorithm is termed the "Event Related Optimisation" algorithm, module, 273, (2*j*) which is triggered or undertaken by the occurrence of an event. For example, if it rains, the algorithm would re-allocate part or all of the bookings to outside tables to inside tables as all or part of the outside tables may be rendered unusable.

The Fifth Algorithm is termed the "Full Capacity Optimisation", module, 275, (2*k*) which is triggered or undertaken when one space, subspace, or class is full. For example, if a specific class within the restaurant was full the algorithm would evaluate if demand for the other classes for that service had availability. If other classes had availability then it would determine if those tables would be filled and what the revenue and contribution would be and if it then determined that it would be best to increase the size of the class that was full and reduce the seating availability in another class it could do so and increase the capacity within the class for which the booking request was received and allocate the booking request against one of the additional tables created in the expanded class.

The Sixth Algorithm is termed the "Strategy and Ambiance Optimisation", module 277, (2*l*) algorithm. All bookings are reviewed, and if it is found that the restaurant will not be at capacity, the bookings are spread around the restaurant so that a better ambience is achieved within the restaurant. For example, if a restaurant only has two bookings for a Monday evening, the Second Algorithm may have sat both bookings next to each other in a back corner of the restaurant as this was the most efficient use of the restaurant space. This algorithm recognises that this arrangement is not an ideal seating arrangement for an empty restaurant and allocates the two bookings in this example to give both bookings the two best available tables.

The Seventh Algorithm is termed the "Third Party Information Optimisation", module 279 (2*m*) algorithm. For example, the optimisation algorithm could access third party information such as the bookings for the local theatre and the start and finish times of a show to determine capacity allotments and constraints. Further, it can determine not to offer discounts or promotions at 9 pm as the theatre will finish and it expects numerous walk-in customers.

The Eighth Algorithm is termed the "Pre-Service Quantitative and Qualitative" algorithm, module 281, (2*n*). This is the final optimisation algorithm before a service and can be a combination of one or more of the previous algorithms at the discretion of the restaurant manager. It is run at a predetermined time before service and is also used to create run sheets and provide information to restaurant staff as well as provide final seating plans and arrangements for self-seating customers. As another example, as a restaurant can be split into different classes part of a restaurant can offer self-seating and part of a restaurant can offer full table service.

The Ninth Algorithm is termed the "In-service Allocations without additional tables or changing existing table allocations" algorithm, module 285, (2*p*). This algorithm is executed after service begins and new bookings are limited to the use of only tables physically available within the restaurant. The in-service optimisation process uses the In-service Allocations algorithm to provide a limited optimisation process which limits the allocation process by means of additional constraints to optimise request allocation process with minimise the disturbance to current patrons.

The Ninth Algorithm is not mandatory as the eighth algorithm or any other algorithm or a combination thereof could continue to be used without the need to unseat existing bookings whilst maintaining the ability to add or remove one or more tables.

The Booking Process

Figure 3:
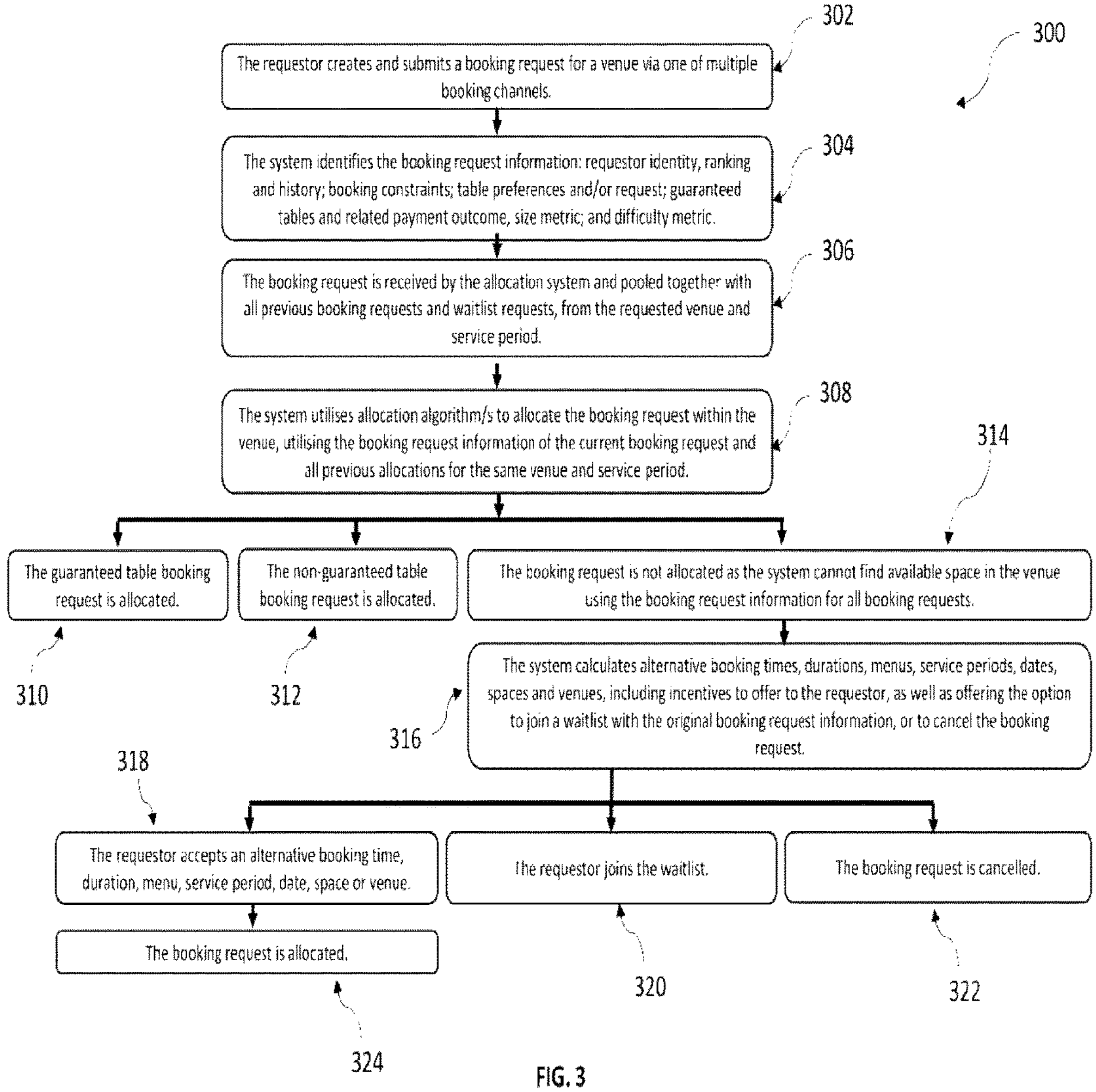
FIG. 3 is a flowchart illustrating a computer enabled method of the booking process in accordance with an embodiment of the invention.

Referring to FIG. 3, the iterative allocation process 300 may be performed by the processor performing a number of steps that determines whether a request can be accommodated given any previous remote user requests that are stored on the database and in accordance with the constraint information. The process 300 may include the following steps:

- Step 1 shown at 302: The requestor creates and submits a booking request for a venue via one of the multiple booking channels.
- Step 2 shown at 304: The system can identify the booking request information, retrieve information to classify requestor identity, ranking, history, table preference, if they will be granted guaranteed seating, and uses this information together with the space and venue constraint.
- Step 3 shown at 306: The booking request is then pooled together with all previous requests which are still active for that service, including requests placed on a waitlist or any other active list.
- Step 4 shown at 308: All booking requests are attempted to be allocated in accordance with the optimisation algorithm applied.
- Step 5 shown at 310: The last received booking, as it has been defined as a guaranteed table allocation is allocated to the prescribed table and the booking requestor is notified that their booking has been accepted.
- Step 6 shown at 312: All previously received bookings as well as the last received booking could be allocated to a table and the booking requestor is advised that their booking request has been successful.
- Step 7 shown at 314: All previous booking requests as well as the last booking request could not be allocated a table so the last received booking request cannot be accepted.
- Step 8 shown at 316: The system calculates all alternate booking times which can accommodate the booking request, as well as shortened durations and alternate options including incentives for the booking requestor to consider and accept the alternates suggested. The booking requestor is also given the options of joining a waitlist or to cancel their request.
- Step 9 shown at 318: The booking requestor accepts one of the alternate options offered, the system then accepts the booking and the booking process is completed at 324.
- Step 10 shown at 320: The booking requestor accepts to join the waitlist and is placed on the waitlist. The booking requestor remains on the waitlist until an allocated booking is amended, cancelled, a new booking is received or other action is taken for that service when system will trigger the algorithm to reconsider and see if the waitlist booking can be allocated to a table. If the waitlist booking can be subsequently be allocated to a table an email and/or message will be sent by the system to the booking requestor to confirm that they would still like to go ahead with the booking. At some point prior to the commencement of the service, at the time inputted by the venue the booking requestor will be advised that their waitlist booking will be cancelled as they have been unsuccessful for that service and offering the booking requestor an alternative.
- Step 11 shown at 322: The requestor decides that they do not wish to accept and alternate time or alternate conditions and they do not wish to be added to the waitlist and they cancel their booking request.
- Step 12 shown at 324: The booking request is allocated, and forms part of the optimised allocation instruction set, which is subsequently displayed on the user interface to the venue operator.

As can be appreciated by a skilled addressee, the above steps may be re-arranged or varied to optimise certain objectives for the use of the space. Alternatively, the above steps may also be repeated or varied over certain temporal periods. For example, the steps may be re-arranged or varied for each service period, meal consumption period, etc., allowing certain periods to overlap at different tables as determined by the venue operator or as may be requested by a booking requestor. For example, during non-peak sittings, the venue operator may vary the steps to enable requestors to self-allocate the use of the space. However, during peak sittings, the venue operator may vary the steps so that the use of the space would be allocated only by the system ensuring that all allocations are optimised.

Optimisation Steps

In an embodiment, during the performance of FIG. 3, Step 4, 308, the processor may also include different algorithms, rules and subroutines to arrange the objects in the space, sub-space or class as shown in FIG. 4*a*. The subroutine 400 may include the performance of the following allocation and optimisation steps:

- Subroutine step 1 shown at 402: Pooling of all booking requests including waitlist booking requests for a space and sorting the bookings in order of allocation complexity starting with the largest size metric (number of guests multiplied by the meal duration time) and the most difficult metric (booking size metric of the booking request that overlaps a peak period or nearest to a defined peak demand period, wherein a service period can have more than one peak demand period).
- Subroutine step 2 shown at 404: Select the largest and most difficult booking request metric and the first defined priority space or subspace (in an attempt to provide a clearer example of the optimisation steps the complexity of Super VIP's, guaranteed table allocations, classes and other allocation permutations have been excluded from this example which are discussed in more detail later within this application) and attempt to allocate the largest most difficult booking request metric to a fixed table that perfectly matches the maximum seating capacity of that table. If booking request can be allocated then next booking request from the pooled booking list to be allocated further, if the first priority space or subspace becomes full then the nest priority space or subspace is to be utilised. In the event that the booking request cannot be allocated then move to step 406.
- Subroutine step 3 shown at 406: Allocate the largest and most difficult booking request metric to a fixed table that meets the minimum number of guests permitted on that table and does not exceed the maximum number of guests for that table. If booking request allocated back to step 404 or move to step 408.

Subroutine step 4 shown at 408: Allocate the largest and most difficult booking request metric to a flexible table that can perfectly match the size of the booking request meets the maximum number of guests permitted within that flexible space. If booking request allocated back to step 404 or move to step 410.

Subroutine step 5 shown at 410: Allocate the largest and most difficult booking request metric to a flexible table that represents the smallest flexile space to which this booking can be. If booking request allocated back to step 404 or move to step 412.

Subroutine step 6 shown at 412: Allocate the largest and most difficult booking request metric to a combination of more than one fixed and or flexible tables that represents the smallest floor space to which this booking can be allocated. If booking request allocated back to step 404 or move to step 414.

Subroutine step 7 shown at 414: Allocate subsequent booking requests by clustering around larger booking requests. If booking request allocated back to step 404 or move to step 416.

Subroutine step 8 shown at 416: Where a booking request cannot be allocated allocate it on top of the smallest best fit subspace and then add all displace booking requests to the original pool of requests and back to step 404 or move to step 416.

Subroutine step 9 shown at 418: Where all attempt to allocate a booking request have failed then review alternate floor plan constraints to determine if an alternate set of floor plan constraints would permit the allocation of the booking. If final booking can be allocated notify the user making the last booking request that their booking has been successful or offering alternative booking options as shown in 316, 318, 320 and 322.

Dynamic Floor Plan

With reference to FIG. 4*b*, in one embodiment the computing system includes a floor plan that comprises a standard floor plan 421 with standard dimensions of length 424 and width 422 on a two dimensional axis. The third and volumetric axis is a representation of time 426.

In one embodiment the "volumetric floor plan" 421 is updated in real time each time a booking is allocated directly to the dynamic "volumetric" floor plan without the need for the booking request to be allocated to a Gantt chart or other scheduling type chart or format before allocation to the dynamic floor plan.

In one embodiment the "volumetric floor plan" is dynamic such that the volumetric floor plan dynamically changes with time and the movement of objects including tables in accordance with the booking allocated.

In one embodiment the "volumetric floor plan" is used to forecast two dimensional floor plans a particular point in time and these forecasted floor plans can be provided to a user together with instructions to the user so that they can identify and find their allocated table without assistance such that they can "seat themselves" and eliminate the labour costs incurred by a venue in undertaking this activity. In a further embodiment this dynamic floor plan can be used by a venue together with the booking request option provided by the system to permit "walk-in" customers to request a booking through a kiosk, another venue device, a booking widget, app that a user can access through their own device and be provided with the real time floor plan and directions to their table to be able to "seat-themselves" as part of a "self-seating" process.

In one embodiment the forecasted "volumetric floor plan" is offered to venue operators so that they can use it in the planning, staffing and operational aspects of a service.

Dynamic Booking Allocation Examples

FIGS. 5*a* to 5*e* illustrate the steps taken by the iterative allocation process in determining an optimal arrangement of furniture within a sub space. FIG. 5*a* illustrates a to-scale arrangement of furniture 500 within a venue prior to the allocation of any allocated booking requests 502. FIG. 5*b* shows a first booking request made by Paul for twenty people 504. The optimisation module generates an optimised space allocation set 506 which shows that the tables 71-710 of FIG. 5*a* have been joined together to form table 71 in FIG. 5*b*. Further, the optimised space allocation set 506 also includes new tables 711-714, which have been added from storage and are automatically optimised into the space remaining from combining tables 71-710.

Referring to FIG. 5*c*, a second booking request 508 is made by Jen for ten people at the same time as the first booking. The allocation module generates an optimised space allocation set 510 which shows that the tables 41-44 of FIG. 5*b* have been joined together to form table 41 in FIG. 5*c*. Further, the optimised space allocation set 510 also includes a new table, which has been taken from storage and placed in the space as part of table 41 to accommodate the table of ten.

Referring to FIG. 5*d*, a third booking request 512 is made by Peter for eight people at the same time as the first and second bookings. The optimisation module generates an optimised space allocation set 514 which shows that the tables 61-64 of FIG. 5*c* have been joined together to form table 61 in FIG. 5*d*.

Referring to FIG. 5*e*, a fourth booking request 516 is made by Sam for ten people at the same time as the first, second and third bookings. As all the bookings are for the same time period and as the allocation module unseats and reseats all previous booking requests in an iterative process to ensure optimisation the entire allocation process was undertaken on receipt of the booking request for Sam for 10 people 516. Further as the optimisation module, in one embodiment, allocates each booking in order of the size of the booking, Paul's and Jen's bookings were allocated to the same space and tables as previously allocated. Next it was Sam's request that needed to be allocated being larger than Peter's, and, as the area where table 61 was located in the previous iteration can accommodate a maximum of 10 people, optimising that space requires that Sam's booking is allocated to table 61. To do this a further table is taken from storage to create a new table 61 in FIG. 5*e*. Peter's booking was then considered by the optimisation module to generate an optimised space allocation set 518 which shows that the tables 711-714 of FIG. 5*d* have been arranged and joined together to form table 711 in FIG. 5*e* and re-allocated the booking for Peter for 8 people to this allocation. Further, the optimised space allocation set 518 also includes a new table which has been added from storage to be accommodated in the space as table 715.

Referring to FIGS. 5*f* to 5*s*, the booking allocations are shown on a Gantt chart 530.

Referring to FIG. 5*f*, the Gantt Chart 530 illustrates the passage of time in 15-minute intervals across the top 532, (on the horizontal axis), the table numbers 534 and the maximum number of chairs at each table (in brackets) 536 on the vertical axis. Further, the horizontal lines between the table numbers illustrate the external tables within a section, being a row of tables that can be joined together to form different combinations of larger tables to accommodate different booking requests 538. The booking algorithm also has the ability to add or remove tables from a section, if the addition or removal of tables will result in a more optimised outcome. Horizontal lines surrounding a single table represent a fixed table 540, as its capacity is fixed within the selected floor plan layout. Alternatively, two or more tables within the horizontal lines represent flexible seating or a section, as the tables can be moved by the algorithm to form one or more larger tables. The vertical axis therefore clearly shows that the floor plan comprises different fixed and flexible seating areas within an area of the venue. Also, shown on the table on the vertical axis, are the headings "Atrium" 542 and "Front Room" 544, highlighting the two subspaces being the Atrium 542 and the Front Room 544.

FIGS. 5*f* to 5*s* provide examples of how the venue and requestor constraints are set and how the algorithm utilises the constraints in the booking allocation process. In the example restaurant that forms the basis of FIGS. 5*f* to 5*s*, the venue constraints are set so that a booking request will be firstly allocated within the Atrium subspace 476 before it is allocated to the Front Room subspace 478 (as this is deemed a more efficient allocation in the context of the example restaurant). The floor plan shown comprises two spaces, the first space being the "Main Dining Room" 474, which comprises 3 subspaces which are the Atrium (larger dining subarea) 476, the Front Room (smaller dining area) 478 and the Colonnade (outdoor area) 480. The second space 472 is a bar area comprising only one table.

A review of the Gantt chart 530 of FIG. 5*f*, shows details of all prior bookings taken for the service period displayed, and a review of the table allocations shows, to an observer, that there does not appear to be any available space to accommodate a further booking for 10 people at 8:00 pm for a two hour duration till 10 pm. FIG. 5*g* shows the 'opposite' view or 'inverse' view of FIG. 5*f*, namely all available tables for the service period are displayed rather than all booked tables. Again, a visual inspection of FIG. 5*g* does not indicate that there is any availability for the aforementioned booking request. In other words, a venue operator would conclude that the venue is unable to accept the booking request and would reject such a booking request. Moreover, all known booking systems would reject a booking request for 10 people at 8:00 pm with a two hour duration with the same starting conditions.

Despite FIG. 5*f* showing no obvious availability for a booking request for 10 people at 8:00 pm for Yuko Nakagawa, when the booking request was inputted into the embodiment, the booking was accepted without creating a conflict, as can be seen in FIG. 5*h*. In this example, the algorithm seats the Yuko booking by undertaking the following steps:

1. Unseating all previous bookings;
2. Reallocating all bookings based on the largest metric (the volume metric being the number of people multiplied by duration) and most difficult metric (the largest booking taking up largest area which contains the greatest number of possible permutations); and
3. Clustering other bookings around the larger bookings by order of volume metric and difficulty metric;

Referring to the specific example, for Yuko Nakagawa, the size of her booking is 10 people multiplied by 2 hours (3 Courses A la Carte) resulting in a volume metric of 20 hours. Max Zambon, whose booking was also for 10 people multiplied by 1.5 hours (2 Courses A la Carte) results in a volume metric of 15 hours. As such, Yuko is allocated ahead of Max on table 610, FIG. 5*h*.

After Yuko's allocation, the algorithm allocates Max on table 41 which is available and can accommodate his booking without conflict as shown in FIG. 5*h*.

In another example, returning to FIG. 5*f* before the booking request of Yuko on FIG. 5*h*, Yuko's request is now amended to create a booking request for 10 people at 7:30 pm for three courses finishing at 9:30. From the Gantt chart in FIG. 5*f* there remains, no availability which is readily apparent. However, utilising the algorithm, the booking request of Yuko is successfully undertaken, as shown in FIG. 5*j*. The reallocation process was undertaken as follows by the algorithm:

1. All previous bookings unseated;
2. Reallocating all bookings based on the largest metric (the volume metric being the number of people multiplied by duration) and most difficult metric (the largest booking taking up largest area which contains the greatest number of possible permutations) Subsequently clustering other bookings by order of volume and difficulty around previously allocated bookings;
3. Continuing the allocation process and ultimately clustering other bookings around the larger bookings, again by order of volume metric and difficulty metric;
4. The size of the Yuko booking is 10 people multiplied by 2 hours (3 Courses A la Carte) resulting in a volume metric of 20 hours. Max's booking is also for 10 people multiplied by 2 hours (3 Courses A la Carte) also resulting in a volume metric of 20 hours as per FIG. 5*i*. While the volume of both bookings is 20 hours, Yuko is allocated before Max on table 69 as it provides better clustering and a more optimised allocation as illustrated in FIG. 5*j*;
5. Additionally, Yuko's booking is deemed to be more difficult to accommodate and covering an area of more permutations as her booking is closer to the period between 7 pm-8 pm defined within the system as the 'peak' booking time period as per FIG. 5*j*; and
6. After Yuko's allocation, Max is allocated on table 41 which is available and can accommodate his booking without conflict as per FIG. 5*j*.

In FIG. 5*k*, Yuko's booking, for the purposes of the example, is amended to vary the start time from 8:00 pm to 7:30 pm. In the context of the example, the venue constraint information includes a defined "peak period" 527 between 7 pm and 8 pm, such that the algorithm flags booking requests with a start time between the period between 7 pm to 8 pm as being the "most difficult" and are therefore placed in the "most difficult" matrix (multiple peak periods can be encoded into the embodiment). Due to the variation in Yuko's requestor constraint information, all allocated booking are unseated, placed in a pool together with Yuko's requested change and all bookings are reallocated. Yuko's booking request resides in the more difficult matrix so the booking request is allocated first and all remaining bookings are subsequently allocated. FIG. 5*k* illustrates that Yuko's booking has been moved to table 68 from table 69 on FIG. 5*j*. The reallocation was undertaken as table 68 permitted better clustering and use of floor space than table 69.

FIG. 5*l* illustrates a table 531 highlighting various booking allocations. Firstly, a booking is shown at 5:30 pm for Julia Gao on table 46, at 599, and a booking is shown for Eric Constantinidis for 6 people at 9 pm on table 81, at 533. Eric is also noted as a "SVIP", which means Eric should be given a guaranteed allocation to his favourite table. A review of the CRM system shows that Eric's favourite table is table 46, as can be seen in FIG. 5*m*, which illustrates an input box 537 for Eric's customer information including an edit tab 539 and a table preferences tab 553. In the edit tab 539, the customer information includes a first name 541, a last name 543, an email 545, a mobile number 547, a membership number 549 and a membership level 551. In the table preferences tab 553, there is included, for each restaurant 555 and 561, a primary preference (557 and 563 respectively) and a secondary preference (559 and 565 respectively).

Returning to the example, Eric cannot be allocated to his favourite table as it has a maximum seating number and table 46 is already allocated to another booking request, namely Julia Gao. The allocation of Eric's booking on table 81 can also be seen on FIG. 5*n*.

In reference to FIG. 50, as an example of the manner in which the allocation module operates, if Eric's booking is reduced from 6 people to 4 people and the start time is varied from 9 pm to 6:15 pm to create a conflict with Julia's booking which was already allocated to table 46. The algorithm receives the change request and reallocates Eric to table 46 despite the conflict with Julia as:

1. SVIP customers are allocated before non-SVIP customers. As such, Eric is given priority and preference when the booking algorithm identifies the SVIP ranking in the reallocation process. The algorithm then searches the CRM system to determine Eric's preferred table as being table 46 and allocates the request accordingly.
2. Subsequently, the booking algorithm allocates Julia Gao's booking and as table 46 is now taken, it allocates Julia to table 82, (see FIG. 5*n*) with all booking requests being accommodated.

FIG. 4*e* illustrates one embodiment of a venue floor plan 401 which comprises two spaces 472 and 474. Space 472 has been defined as the "Bar" and comprises one fixed table while space 474 has been defined as the "Main Ding Room" and comprises three subspaces; 476 defined as the atrium subspace, 478 defined as the front room subspace and, 480 as the colonnade subspace. Within the atrium subspace 476 there are 4 sections 482, 484, 486 and 494 which represent the flexible table areas where objects and tables can be rearranged. In the front room subspace there are two sections 490 and 492 while in subspace 480 there are no sections meaning all tables within that subspace are fixed. Further, in one embodiment the venue constraint information includes information provided by the venue operator as to which spaces, subspaces and sections are open and information concerning which space or subspace to allocate and optimise bookings to first.

FIG. 4*e* illustrates one embodiment of a venue floor plan 401 which comprises three classes a luxury class 499 and 477; a premium class 479 and 498 and a standard class 481, 496 and 483

In FIG. 5*p* there is illustrated a table 589 with three bookings of 12 people at 5:30 pm. The first booking 591 is allocated in the atrium subspace to table 61 as it is the first priority area and in the 60's section as this is the only table area that can accommodate a booking for 12 people (591), as shown in the table map 593 of FIGS. 5*q*, 5*r* and 5*s*. Two additional tables are added to the 60's section. Moreover, by "joining" the tables together to make a table for twelve, additional floor space becomes available and the algorithm adds two further tables from storage. The second booking 595 for 12 people is allocated to the atrium on table 67 as this is the next table area within the atrium that can receive a booking for a table of 12. Again a further two tables are added to the restaurant floor plan 593 making a total of 4 tables brought in from storage as shown on FIG. 5*r* at 595.

The third booking 597 for 12 people cannot be accommodated within the atrium subspace so it is allocated to the next priority area being the front room (on table 31). A further table is brought in from storage to complete the number of tables required, as shown in table plan 593 of FIG. 5*s* at 597. As can be seen from the example, the embodiment prioritises bookings by spaces, subspace, sections, classes etc., including as the step of adding additional furniture as required for the optimisation of outcomes.

Referring again to FIG. 2*c* by way of example, the user interface 204 and the input receiving module 206 may query the requestor. The querying of the requestor may include the proposal of at least one alternative alternate instance to the requestor by the user interface. An alternative instance proposed to the requestor may include but is not limited to the use of the space at a different time or a different duration time or a different number of courses, or a different day or at a completely different venue. The requestor may select at 206 one alternate instance which is received by the input receiving module 206.

The input receiving module 206 provides the alternate instance selected by the requestor to the optimisation module 208 which processes and determines the optimised space allocation set 214 (including the alternative instance) in the same manner as it would process a normal request.

In an embodiment, the optimisation module 208 may also include an incentive module (not shown) which determines whether to provide further incentives to the user in order to incentivise the user to accept an alternate instance as part of the optimisation module and also determines which incentive to offer. The incentive may be in the form of a discount to the remote user for the use of the space, or a discount for a related purchase. The incentive may also include other offers of goods, services or discounts as determined by the operator or incentives that have been determined by the predictive module 220 as being historically popular in incentivising the remote user to accept an alternative instance.

Optimisation Flowchart

Figure 6A:
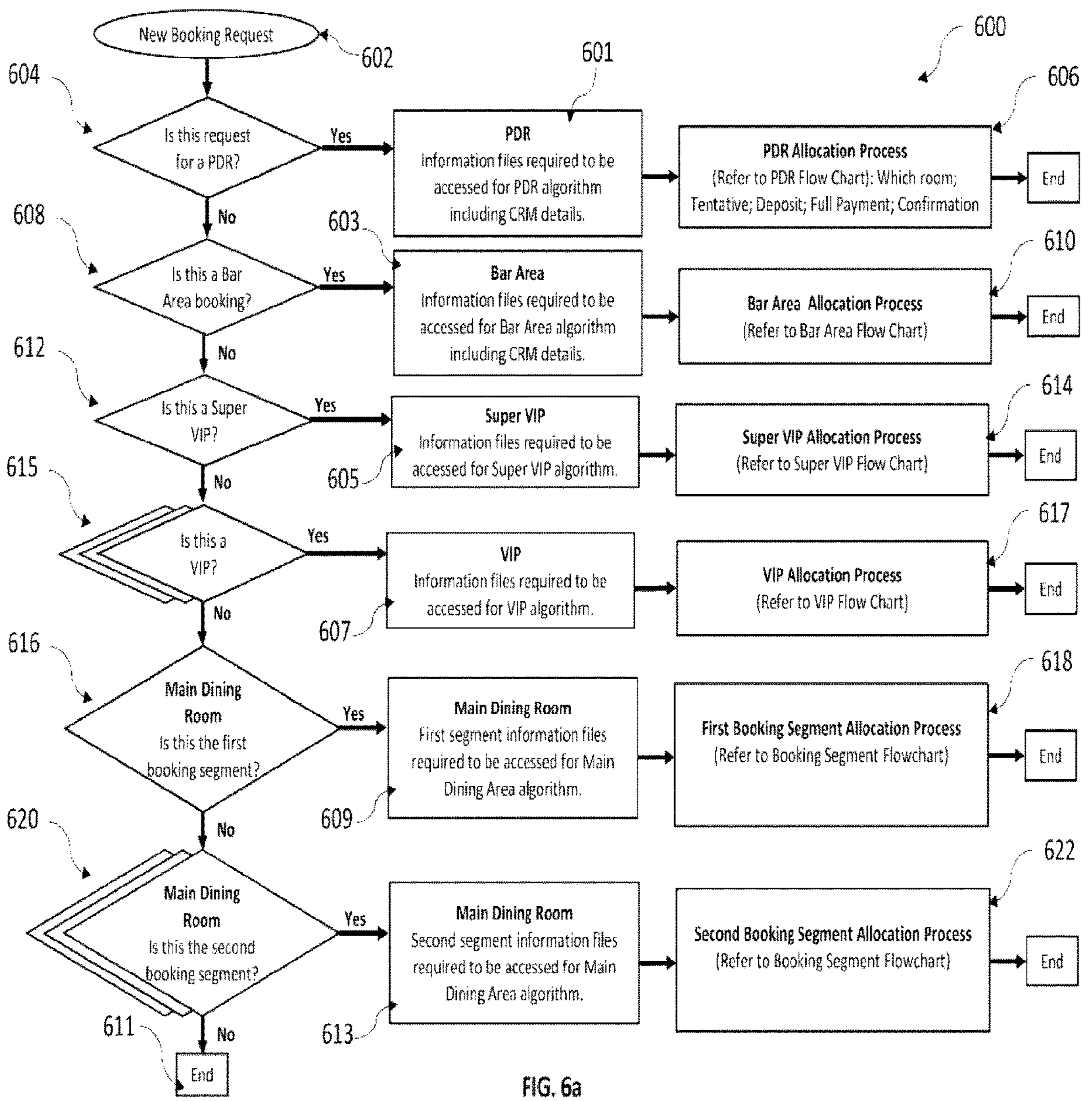
FIGS. 6*a* to 6*h* are flow charts illustrating booking allocation rules and a user interface screen in accordance with an embodiment of the invention.

Referring to FIG. 6*a*, there is shown a flow-chart 600 that describes the process of accommodating different types of spaces within a venue. In this embodiment, the venue is a restaurant and the objects are tables.

A new booking request is made by a requestor via the user interface 602. The user interfere may receive a private dining room request ("PDR request") 604, that is a request to use a self-contained and private room within the restaurant. As such, the skilled addressee would understand that a private dining room may not form part of the normal restaurant area and may be defined as a separate space, subspace or section. If the remote user makes a PDR request, the user interface may require further requestor constraint information 601 and may be specifically configured to query for information from the requestor. Further requestor constraint information may include but is not limited to, the particular room selection, planning the room layout, tools to amend the room layout, menus, seating positions, customer CRM details, whether the room has been tentatively booked or confirmed, whether a deposit has been paid or whether the room has been paid for in full. The booking is then allocated using the PDR allocation process 606.

Alternatively, the requestor may make a request for a bar area booking 608 and the user interface may query the requestor for additional information from the user relating to the particular booking type, offer additional services and access CRM details 603. The booking is then allocated using the Bar Area allocation process 610

Alternatively, the user interface may query the status of the requestor 612 and 615, to determine whether they are a Very Important Person ("VIP") or "super" VIP and may be specifically configured to undertake special actions 605 if the requestor is identified as a super VIP or action 607 if a VIP. The booking is then allocated using the Super VIP or VIP allocation process 614 or 617 respectively.

Alternatively, the requestor may make a request for the main dining area booking in the first booking segment, or first dinner sitting 616 (if a service has been divided into booking segments or seating periods), and the interface may query the requestor for any additional information relating to the particular booking type and time 609. The booking is then allocated using the First Booking segment allocation process 618.

Alternatively, the requestor may make a request for the main dining area booking in the second booking segment, or second dinner sitting 620, and the interface may be specifically configured to query the requestor for additional information relating to the particular booking type and time 613. At any point in receiving the additional information, a request can be allocated, or an alternative offered, in a dynamic process of allocation. The booking is then allocated using the Second booking segment allocation process 622.

Alternatively, the booking process terminates 611.

Figure 6B:
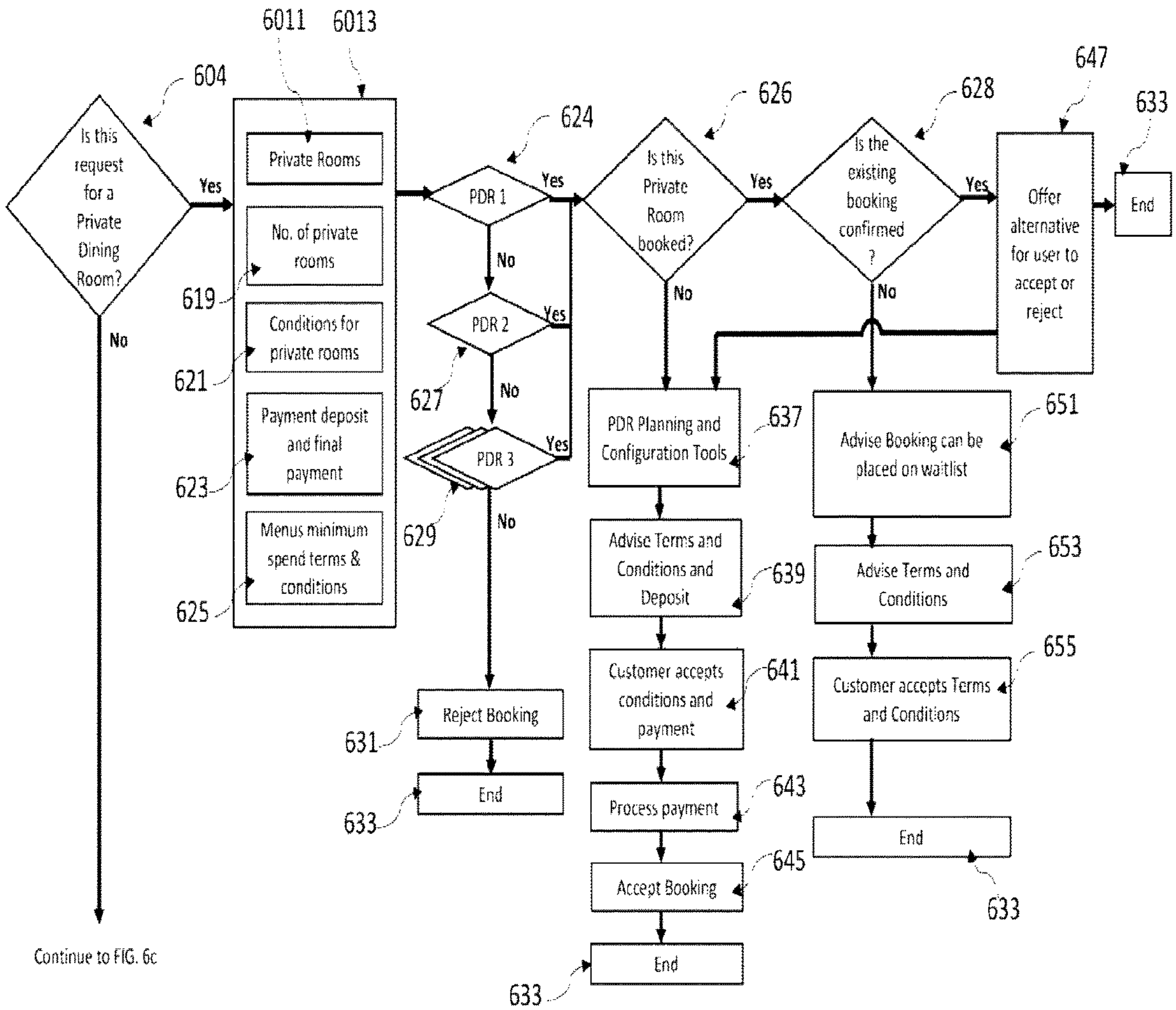

Referring now to FIG. 6*b*, by way of example, the user interface may receive a private dining room request ("PDR request") 604. That is, a request to use a self-contained and private room within the restaurant. In order to allocate the request, the user interface displays various information types 6003 on the private rooms screen (displayed to the booking requestor) 6001, including the number of rooms 619, the conditions of the private rooms 621 the requirement for deposit and or final payment 623, and terms and conditions regarding menu and spend 625. In allocating the request, the optimisation module queries whether the PDR request is made in respect of a specific room 624, 627, 629, etc. If no specific room is booked, the request is rejected 631 and process ends 633. If a specific room has been chosen, for example the request is made for private dining room number 1 ("PDR 1"), the process continues. The optimisation module determines whether the rooms are already booked 626, where if it is available, then PDR request is provided further information to complete the booking request, including providing a planning and configuration tool 637, advising terms and conditions 639, allowing the customer to accept the conditions and pay 641, process payment 643, accept the booking 645 and end the process 633. However, if the PDR is already booked but not confirmed 628, then the request can be placed on a wait list 651, at which time the customer accepts conditions and is advised of conditions with regard to being on the waitlist 653 and 655, and the process ends 633. Alternatively, the system offers an alternative room 647, which the customer may accept or reject, and, at the requestor choice if they do not accept an alternative the request is cancelled 633.

Figure 6C:
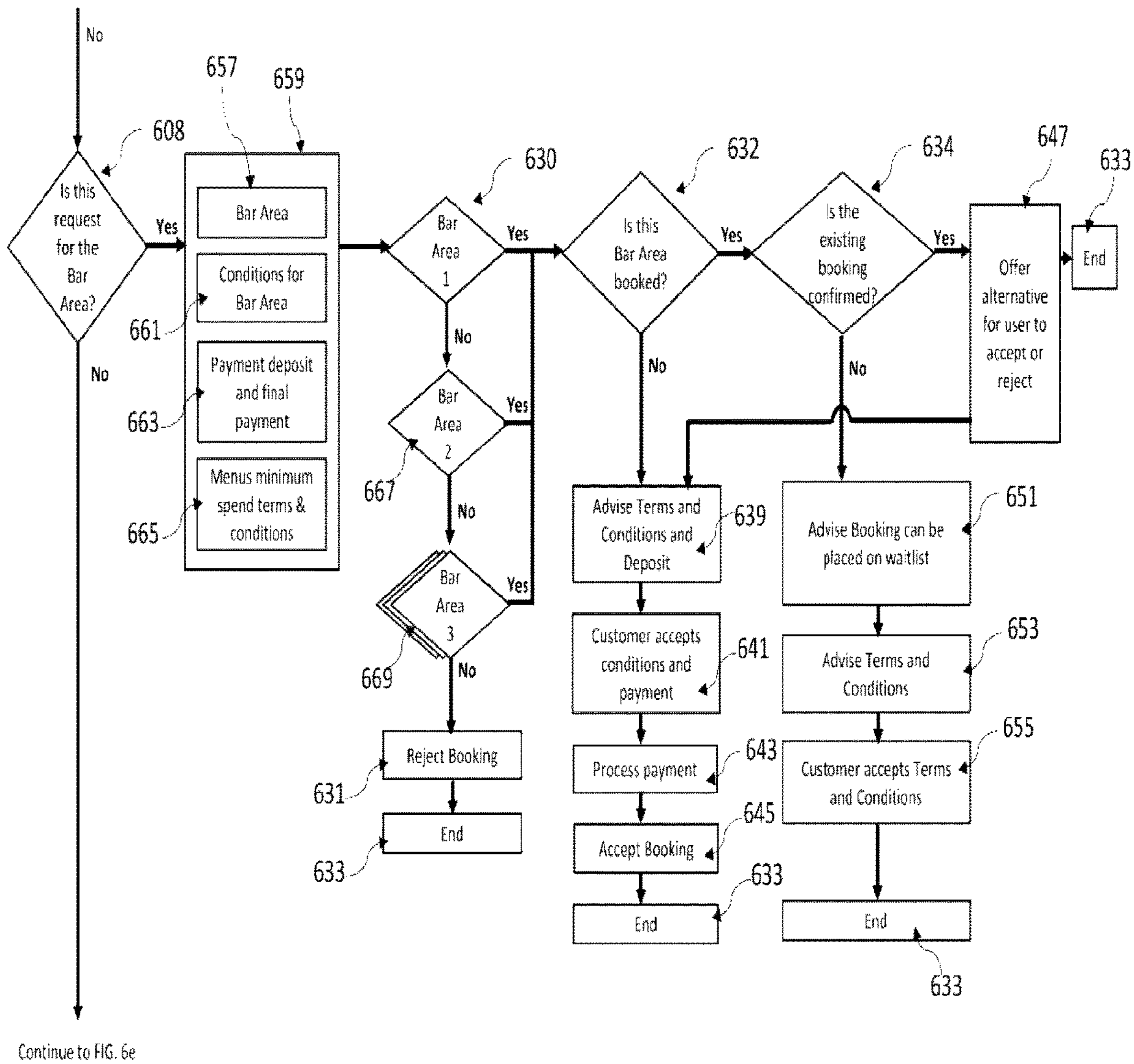

Referring to FIG. 6*c*, the user interface may receive a request to use a bar area booking 608. In order to allocate the request, the user interface displays various information types 659 on the bar area screen (displayed to the booking requestor) 657, including the conditions of the bar area 661, the requirement for deposit and or final payment 663, and terms and conditions regarding menu and spend 665. In allocating the request the optimisation module queries whether the request is made in respect of a bar area 1 630, 667, 669, etc., If no specific area is booked, the request is rejected 631 and process ends 633. If a specific area has been chosen, such as bar area 1, the optimisation module 632 determines whether the bar is already booked, where if it is available, then the request is provided further information to complete the booking including advising terms and conditions 639, allowing the customer to accept the conditions and pay 641, process payment 643, accept the booking 645 and end the process 633 and the bar area is booked in accordance with the request 645 and the process ends. However, if the bar area is already booked but not confirmed 634, then the request may be placed on a wait list 651, at which time the customer accepts conditions and is advised of conditions with regard to being on the waitlist 653 and 655, and the process ends 633. Alternatively, the system offers an alternative 647, which the customer may accept or reject at which time the process ends 633.

Figure 6D:
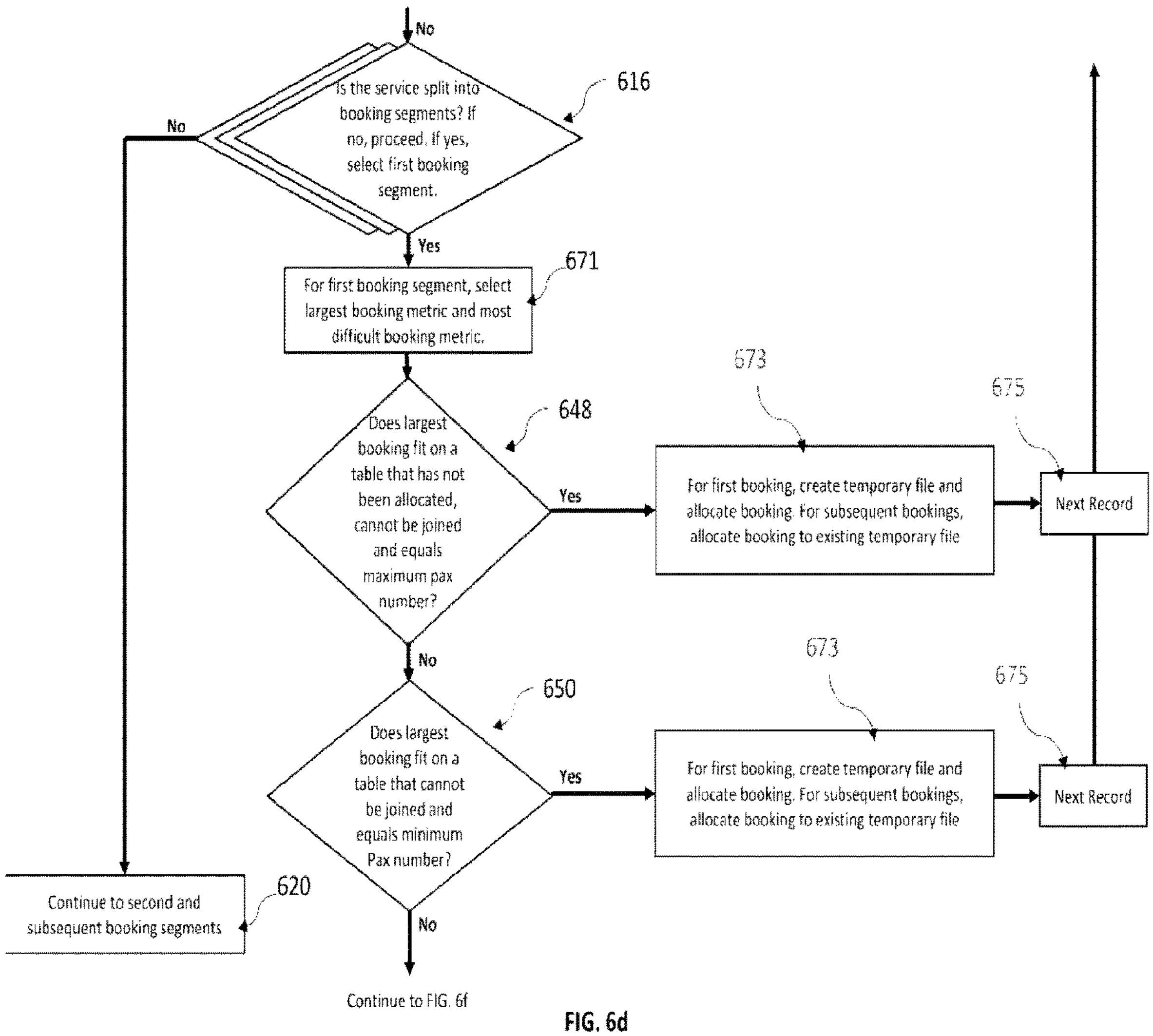
Figure 6E:
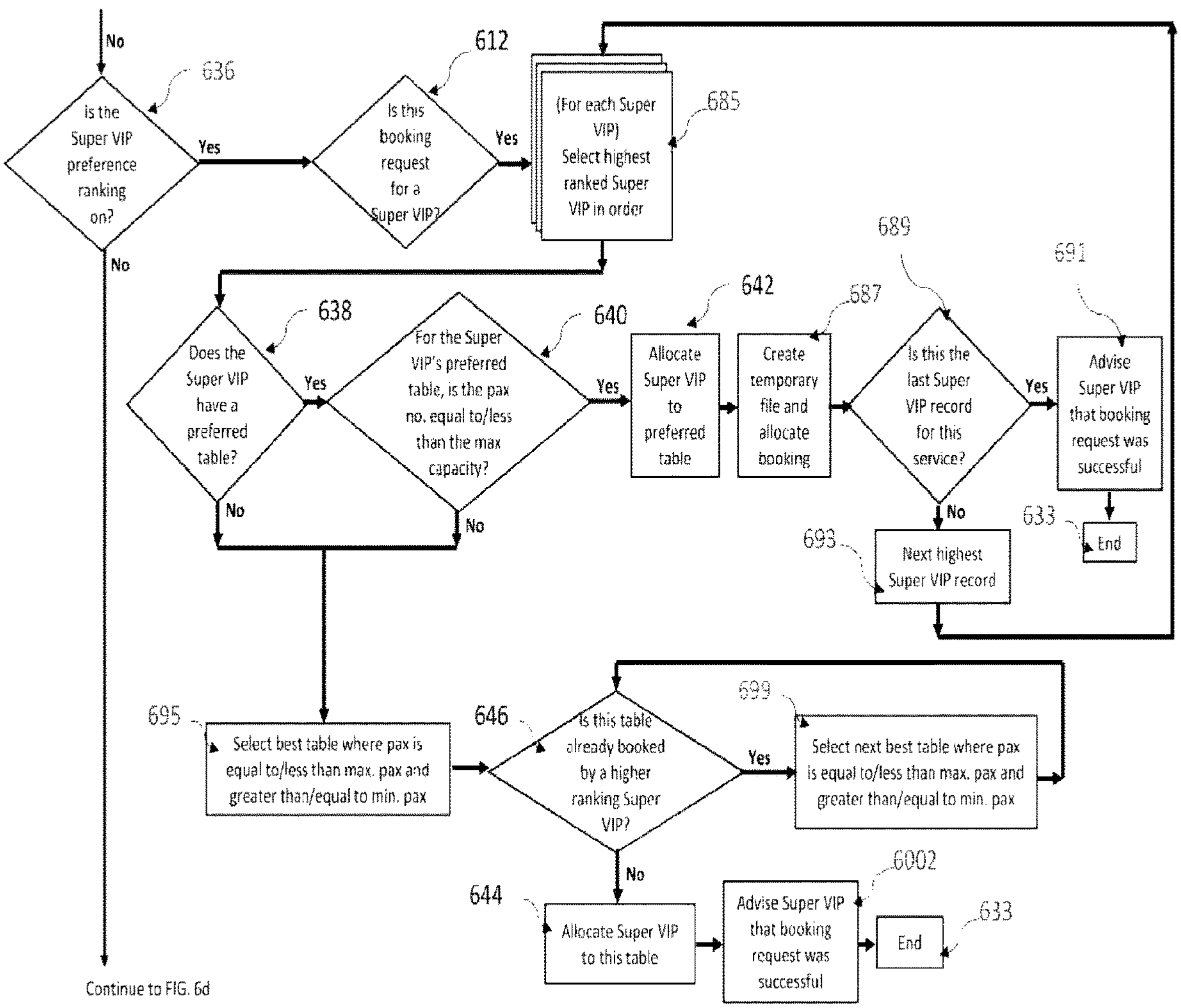

Alternatively, referring to FIG. 6*e*, the user interface may query the status of the requestor, to determine whether they are a Very Important Person ("VIP") 615 or super VIP 612. The optimisation module will attempt to determine if they have a preferred table 638 and if the table is available 640. If the table is available then allocate the table 642 in accordance with the request. However, if the VIP the does not have a preferred table and there is an available table where the number of seats is equal to or less than the maximum number of patrons and greater than the minimum number of patrons 644, then the table is allocated.

Otherwise, if there are one or more VIP requestors wishing to use a particular table 646, then the optimisation module allocates the next best table to each of the VIP requestors in the order of their ranking within the VIP status (as shown in FIG. 6*e*).

Alternatively, referring to FIG. 6*d*, the requestor may make a request for the main dining area booking in the first booking segment, or first dinner sitting 616. When allocating the pool of requests, the allocation module first attempts to allocate the first booking by allocating the largest booking metric and most difficult booking metric at 671, and subsequently allocate to a non-allocated table where the size of the booking request equals the maximum number of seats for a fixed table 648.

If the above request can be accommodated then the table is allocated, otherwise, the allocation module attempts to allocate the largest booking to a non-allocated table that cannot be joined ("fixed tables") where the patrons equal the minimum number of seats 650.

Figure 6F:
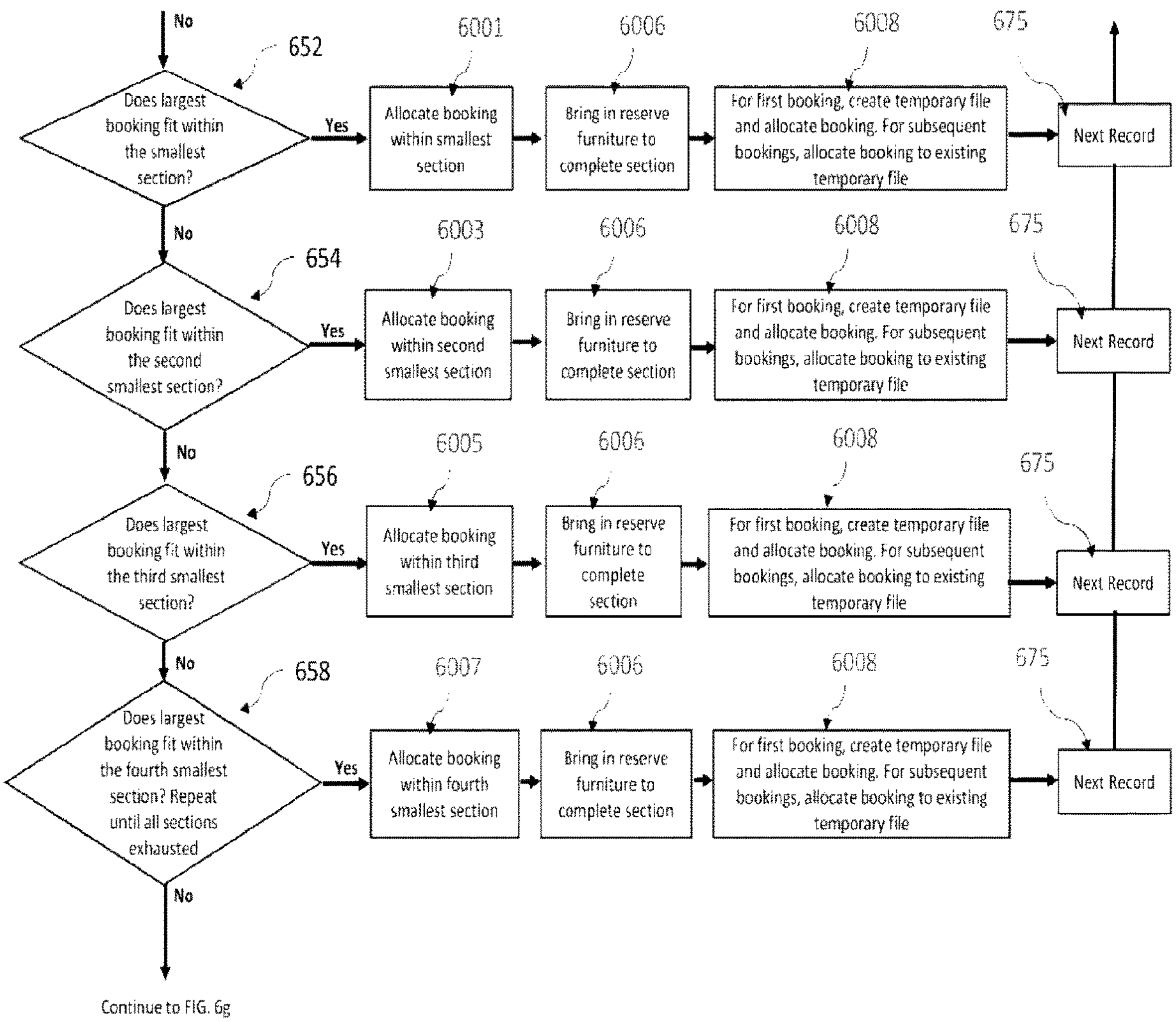

Referring to FIG. 6*f*, if the above request can be accommodated then the table is allocated, otherwise, the optimisation module attempts to allocate the largest booking to the smallest section ("flexible table" location) 652.

If the above request can be accommodated, then the table is allocated, otherwise, the optimisation module attempts to allocate the largest booking to the second smallest section 654.

If the above request can be accommodated, then the table is allocated, otherwise, the optimisation module attempts to allocate the largest booking to the third smallest section 656.

Referring to FIG. 6*f*, if the above request can be accommodated, then the table is allocated, otherwise, the optimisation module attempts to allocate the largest booking to the fourth smallest section or any subsequent smallest section until all sections are exhausted 658.

Figure 6G:
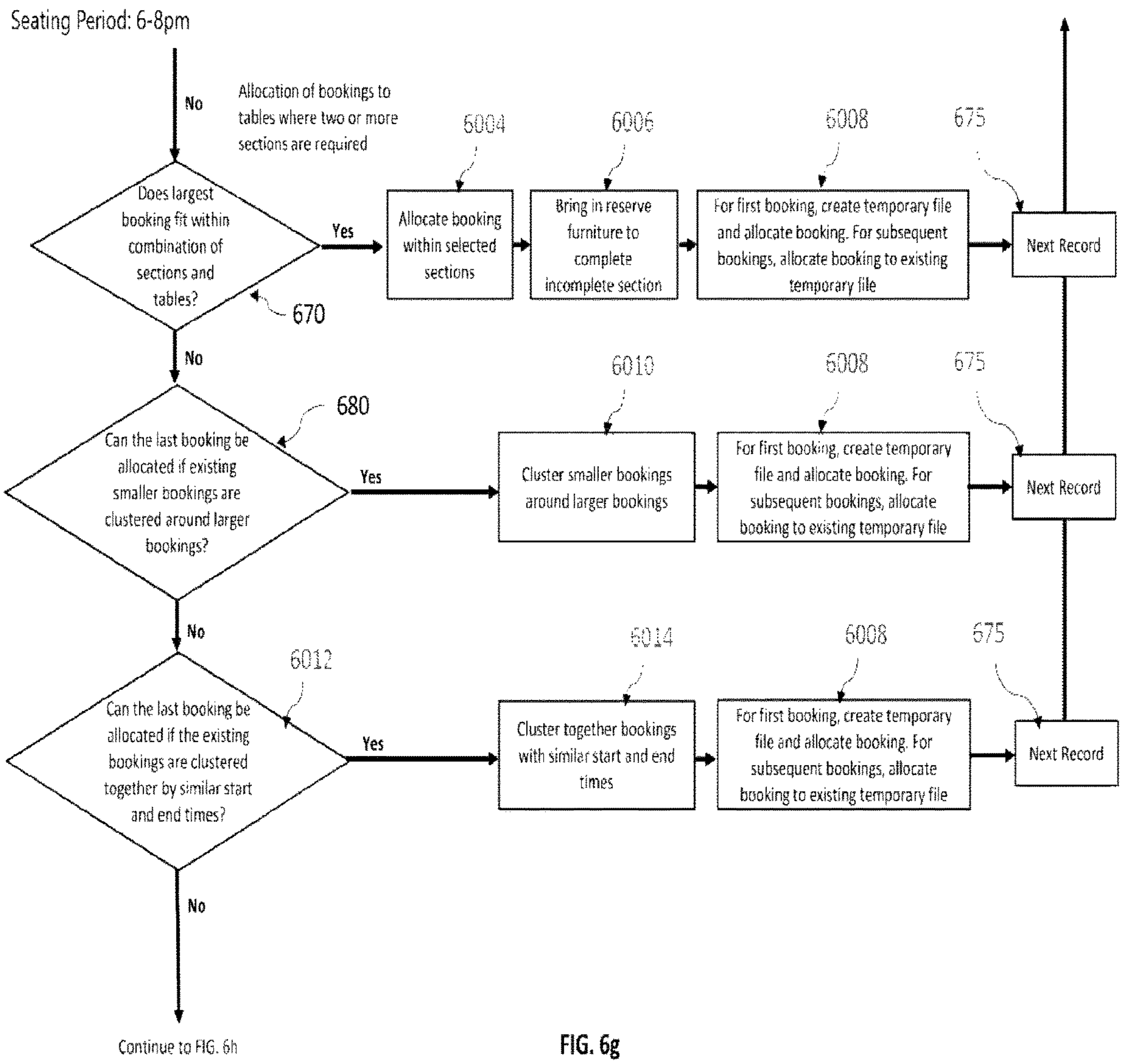

Referring to FIG. 6*g*, if the largest booking cannot be accommodated within a single section, the allocation module attempts to allocate the largest booking within the smallest combination of adjacent sections and fixed tables of a minimum size 670 and cluster smaller booking around larger bookings 680.

Figure 6H:
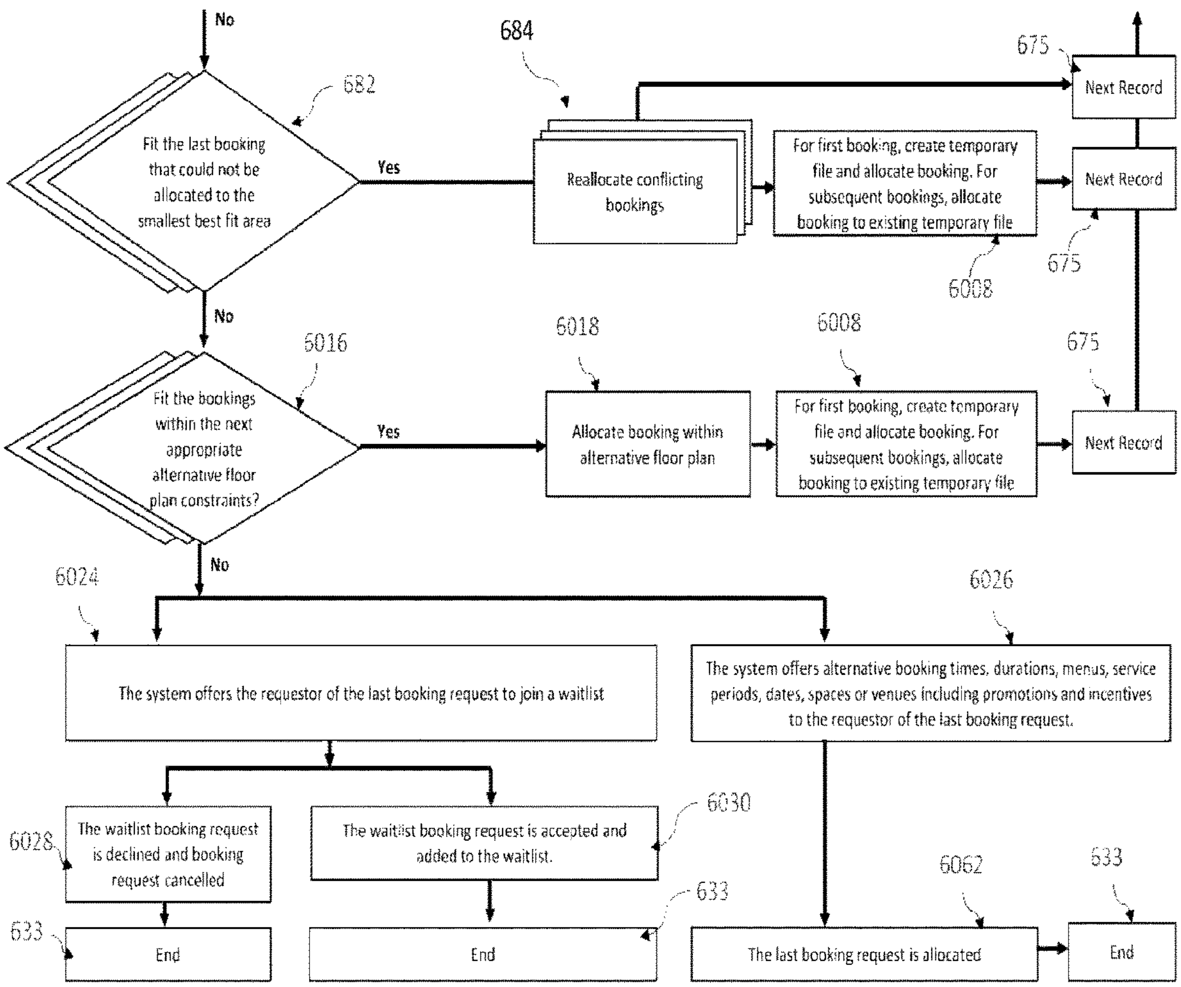

Referring to FIG. 6*h*, if the last booking being allocated from the pool of bookings cannot be allocated, then the embodiment allocates the last booking to the smallest possible joint floor space and displaces the previously allocated bookings to those tables and attempts to reallocate the displaced bookings 684.

User Interface Screens

One embodiment of the computer system includes a user interface providing module arranged to provide a user interface to at least one remote user via a communications network. The computer system may also include a user interface directed to one or more users associated with the venue.

Figure 7A:
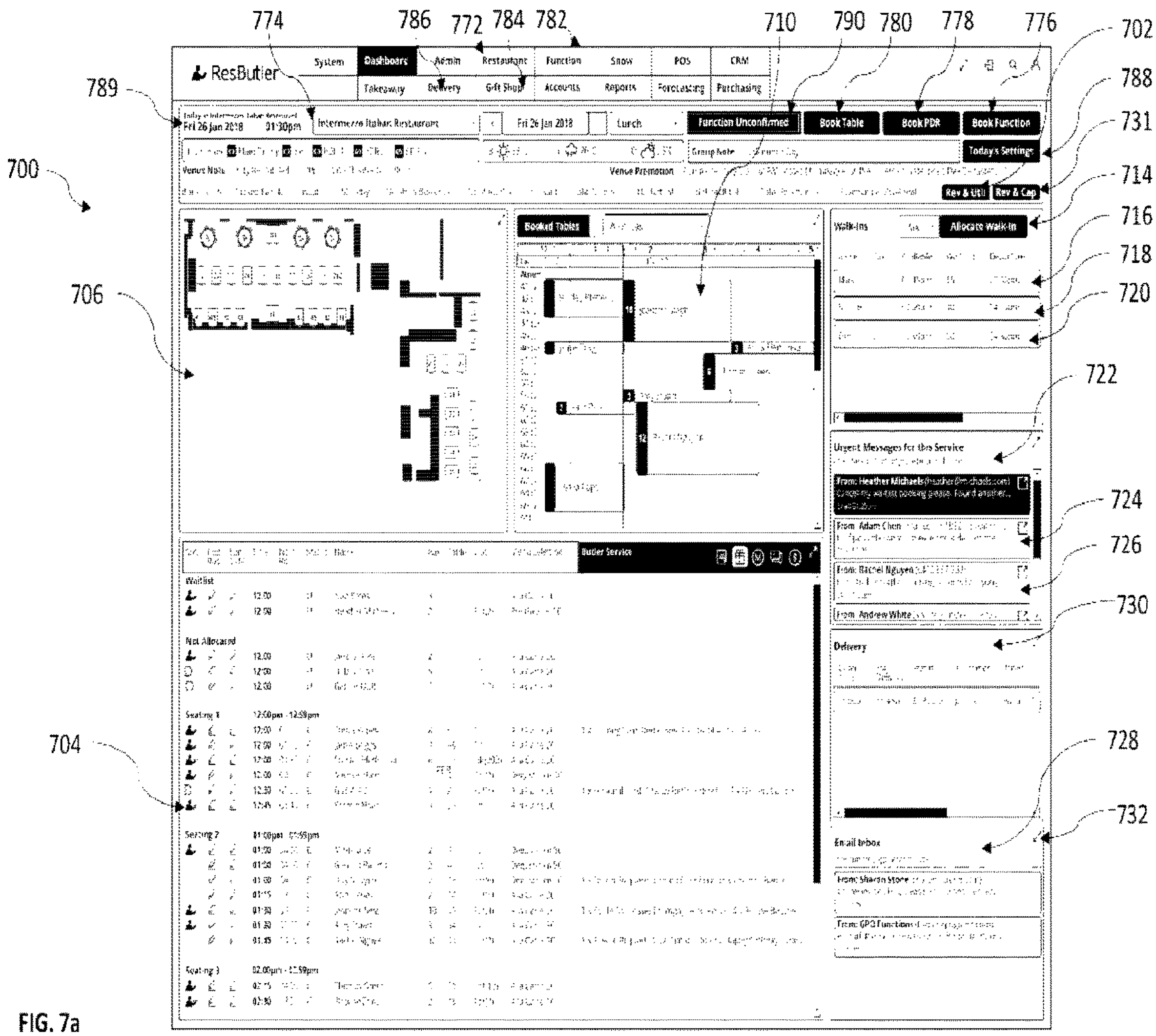
FIGS. 7*a* to 7*n* is a screenshot illustrating a user interface screen in accordance with an embodiment of the invention.
Figure 7B:
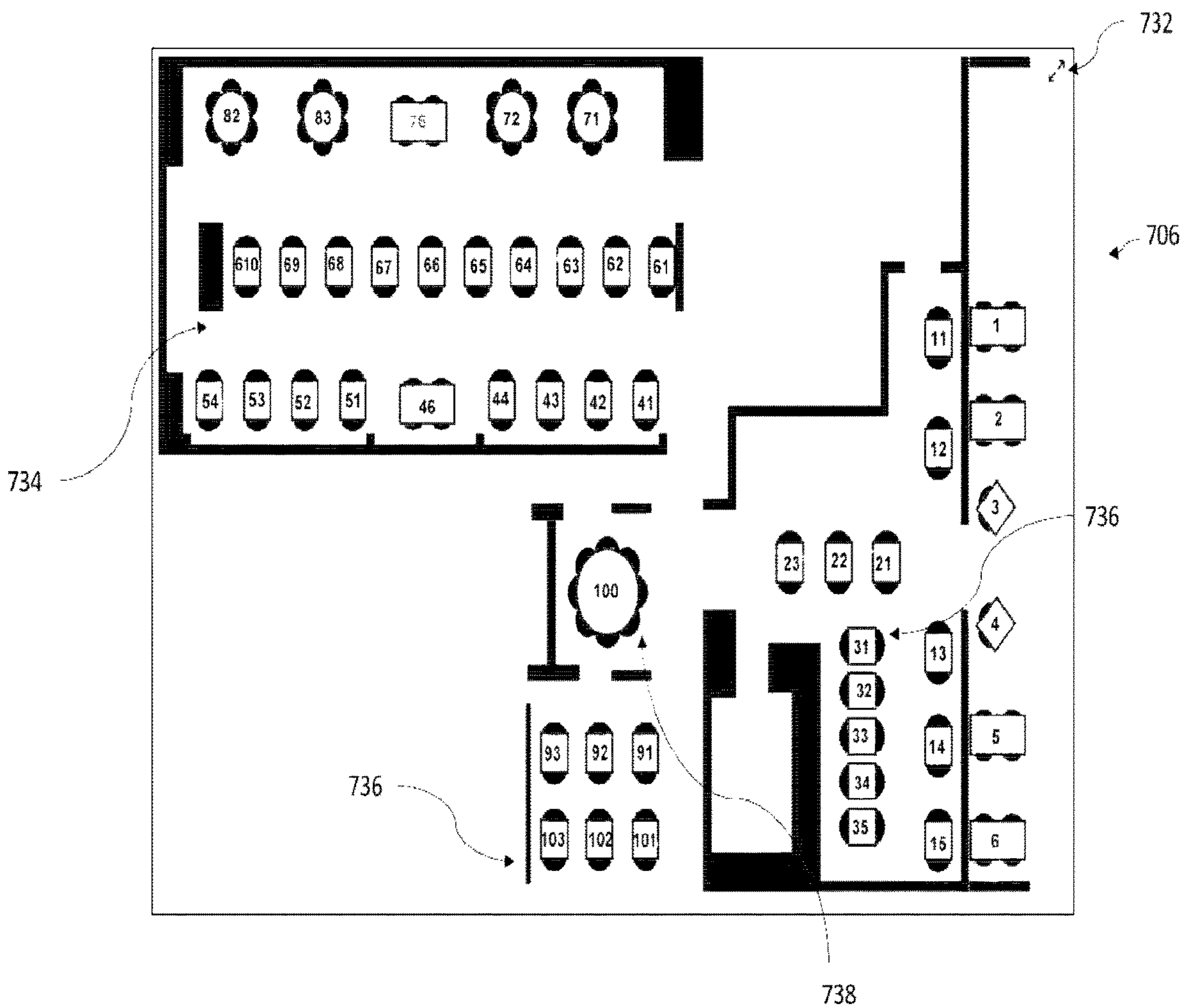
Figure 7C:
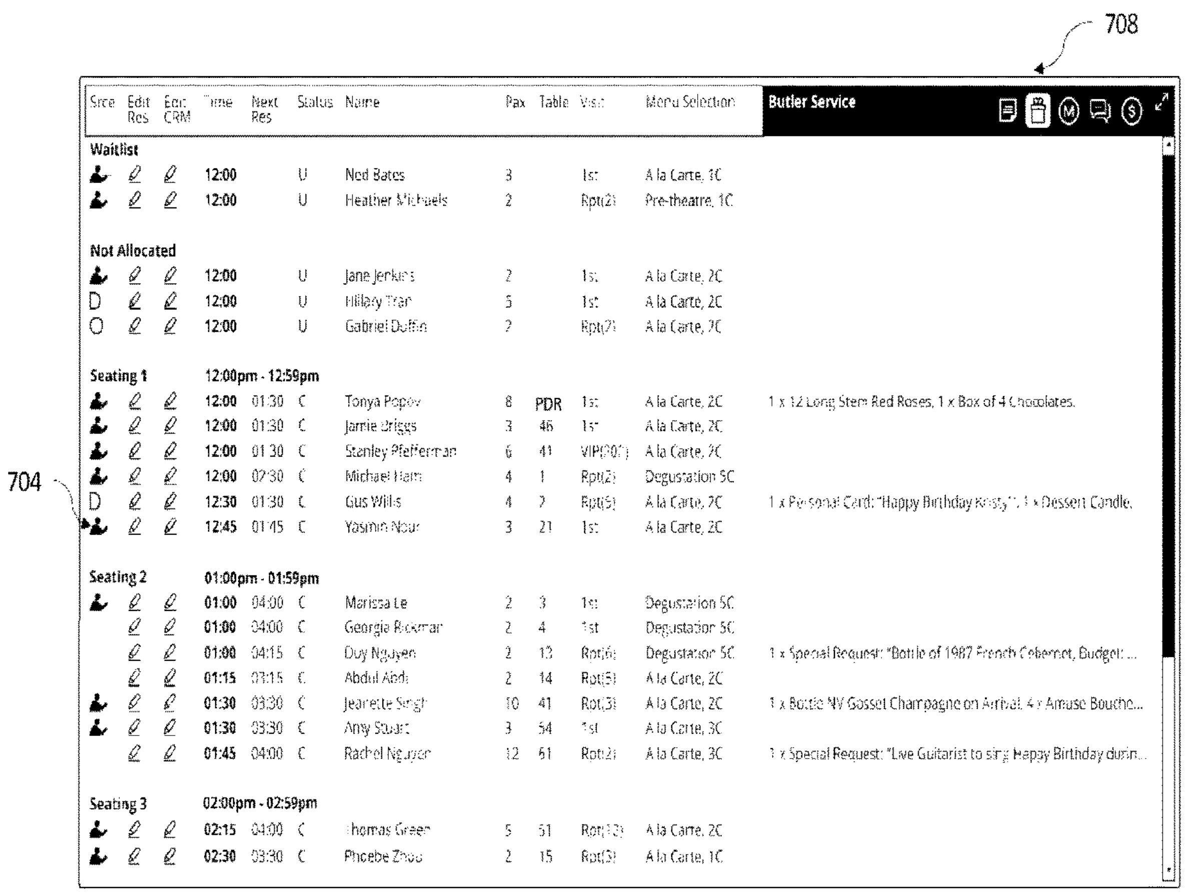
Figure 7D:
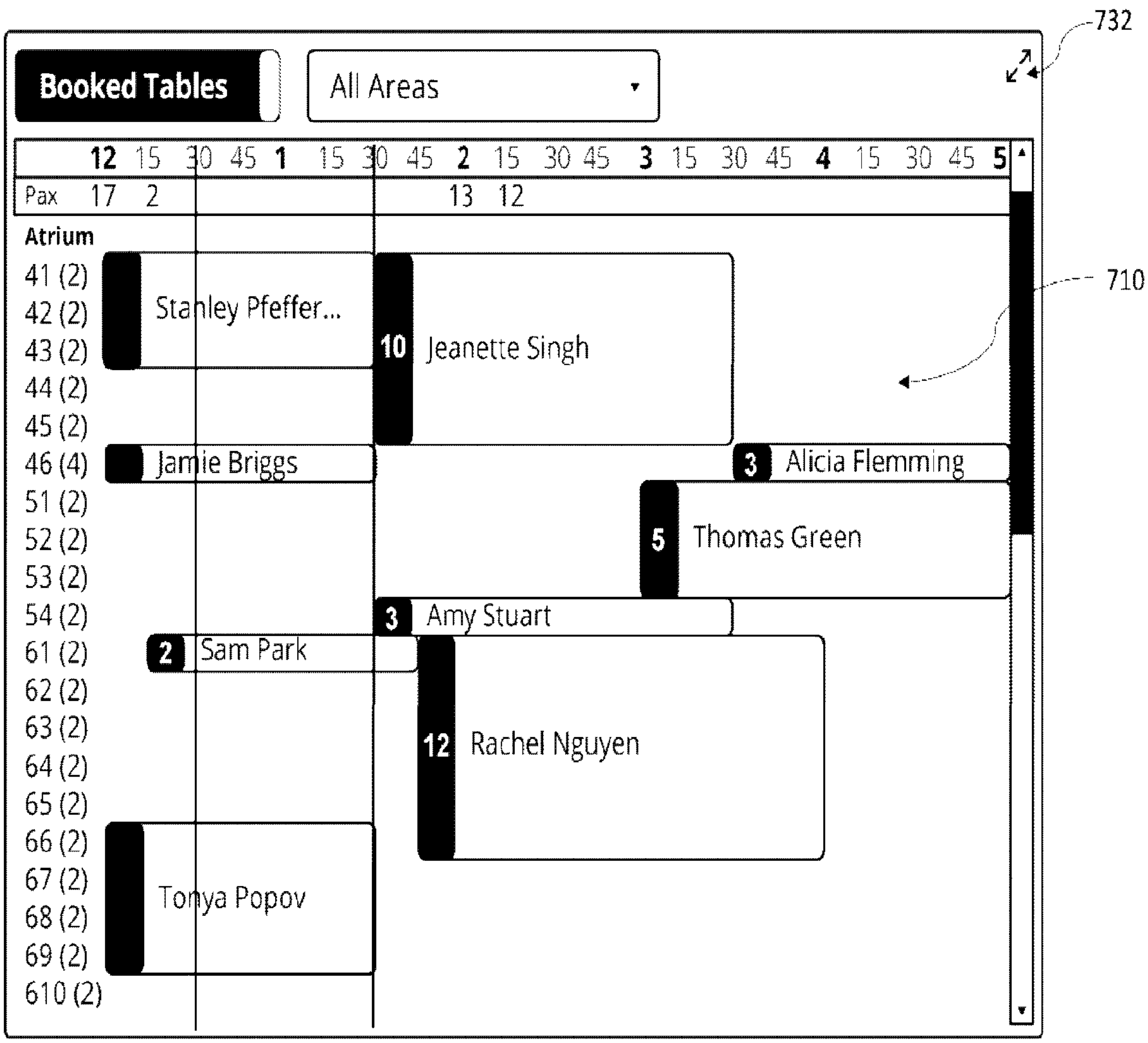
Figure 7E:
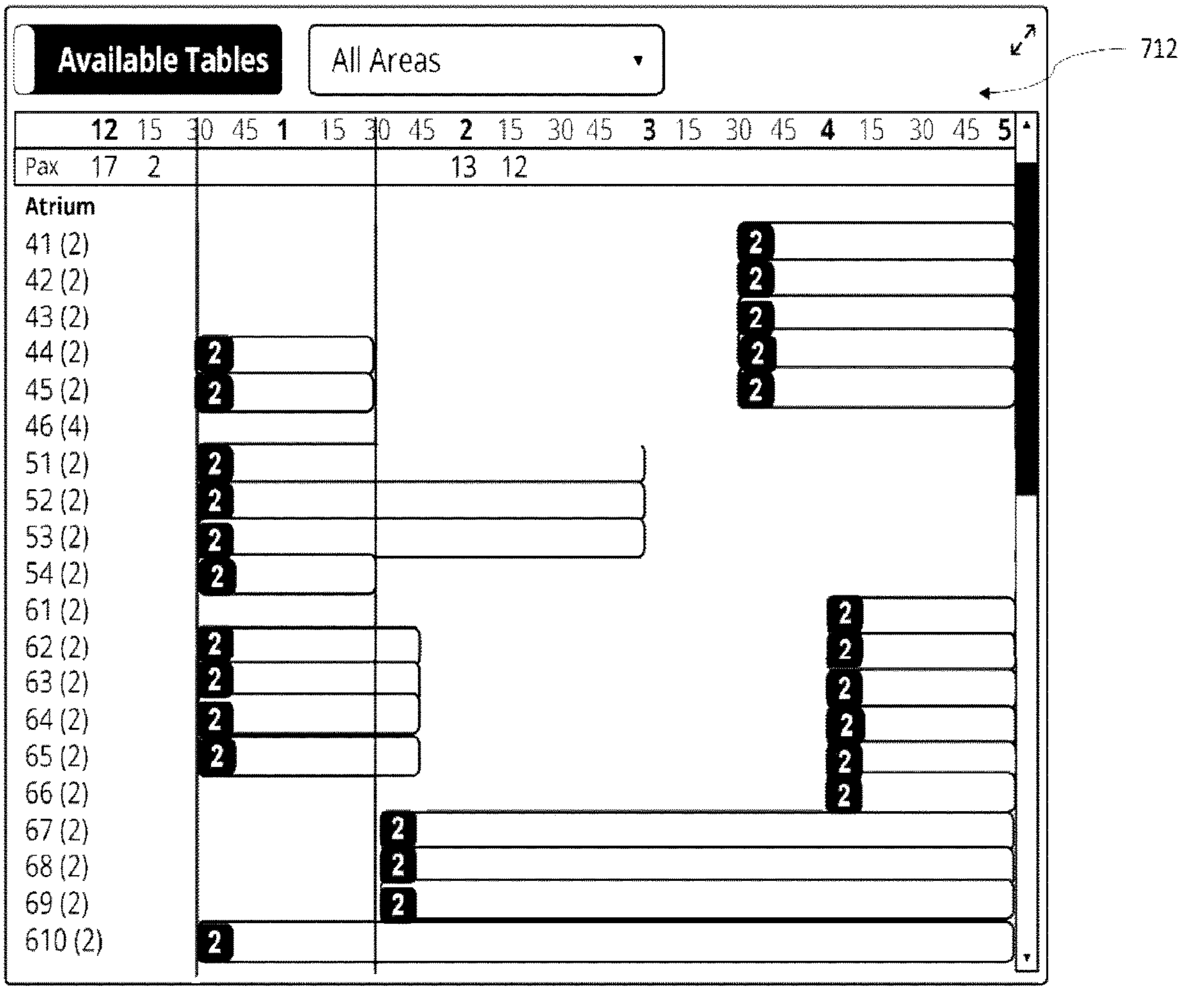
Figure 7F:
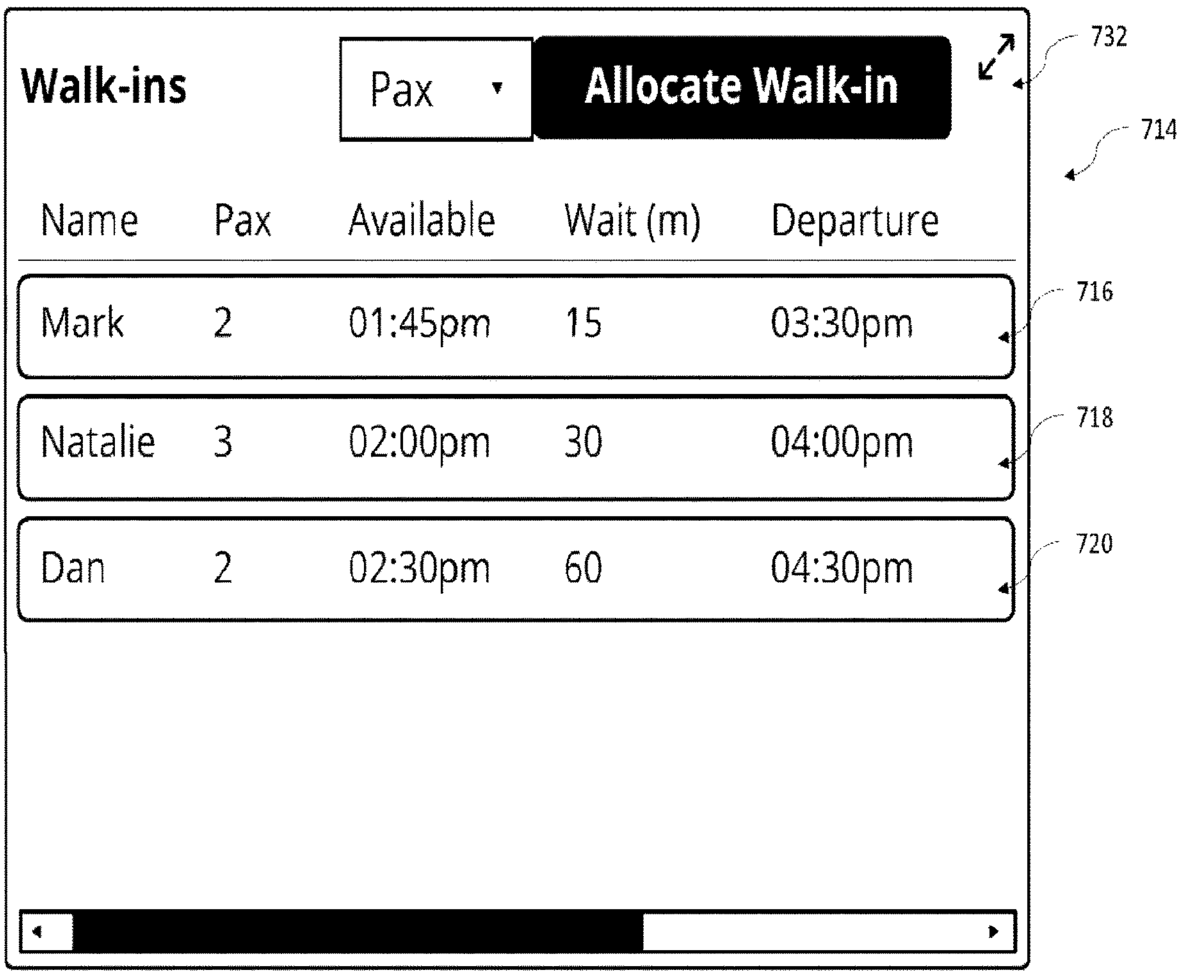
Figure 7G:
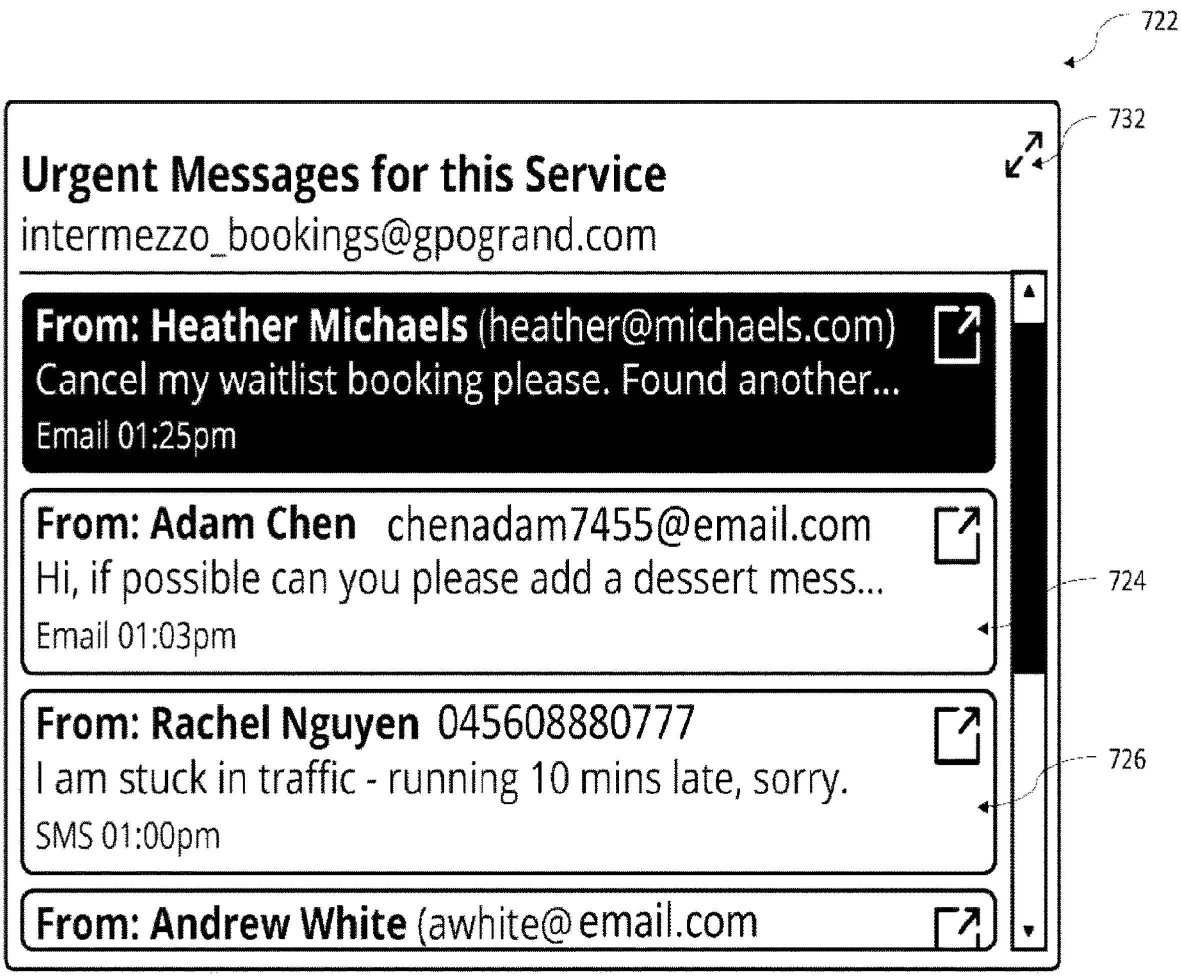
Figure 7H:
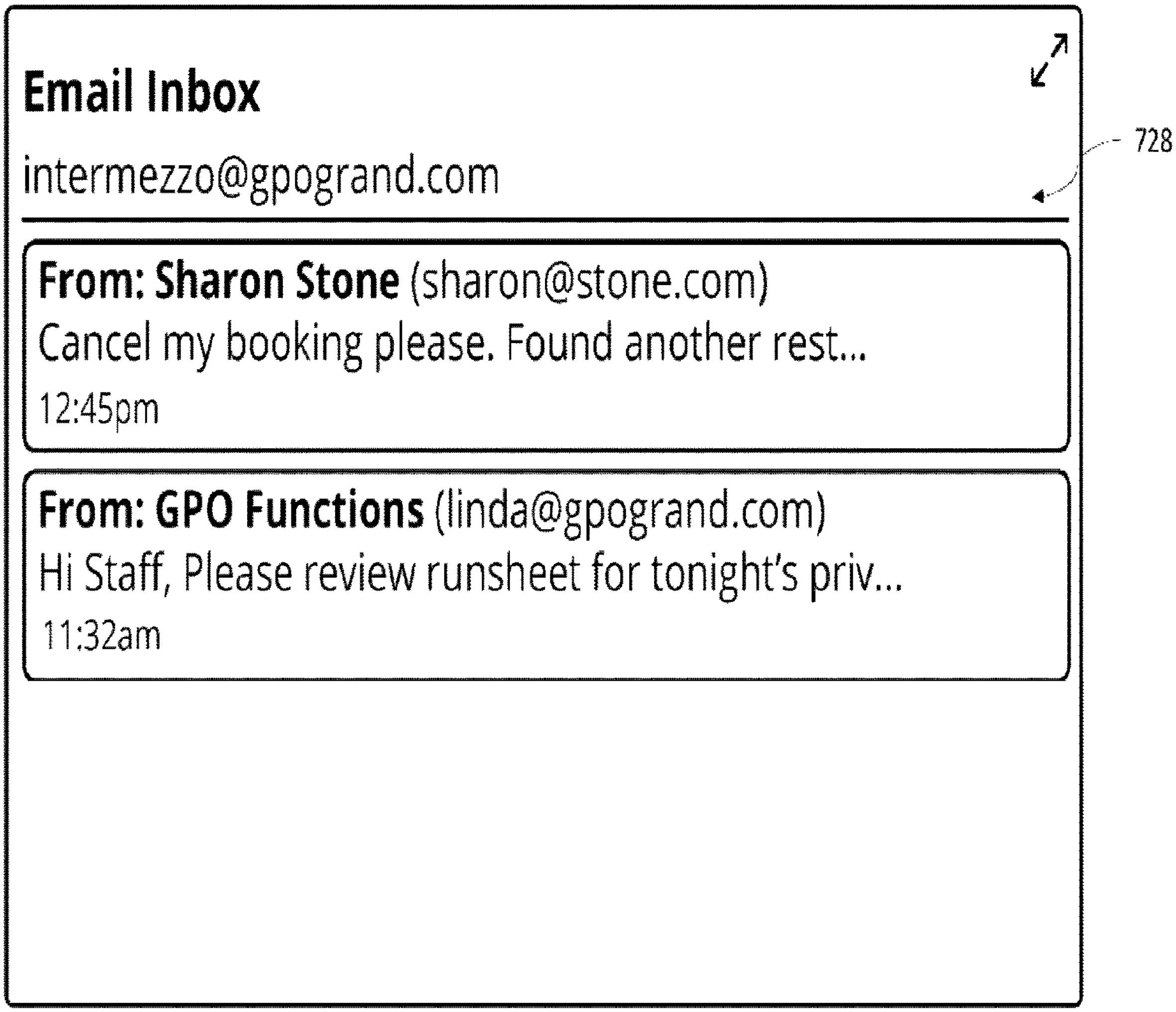
Figure 7I:
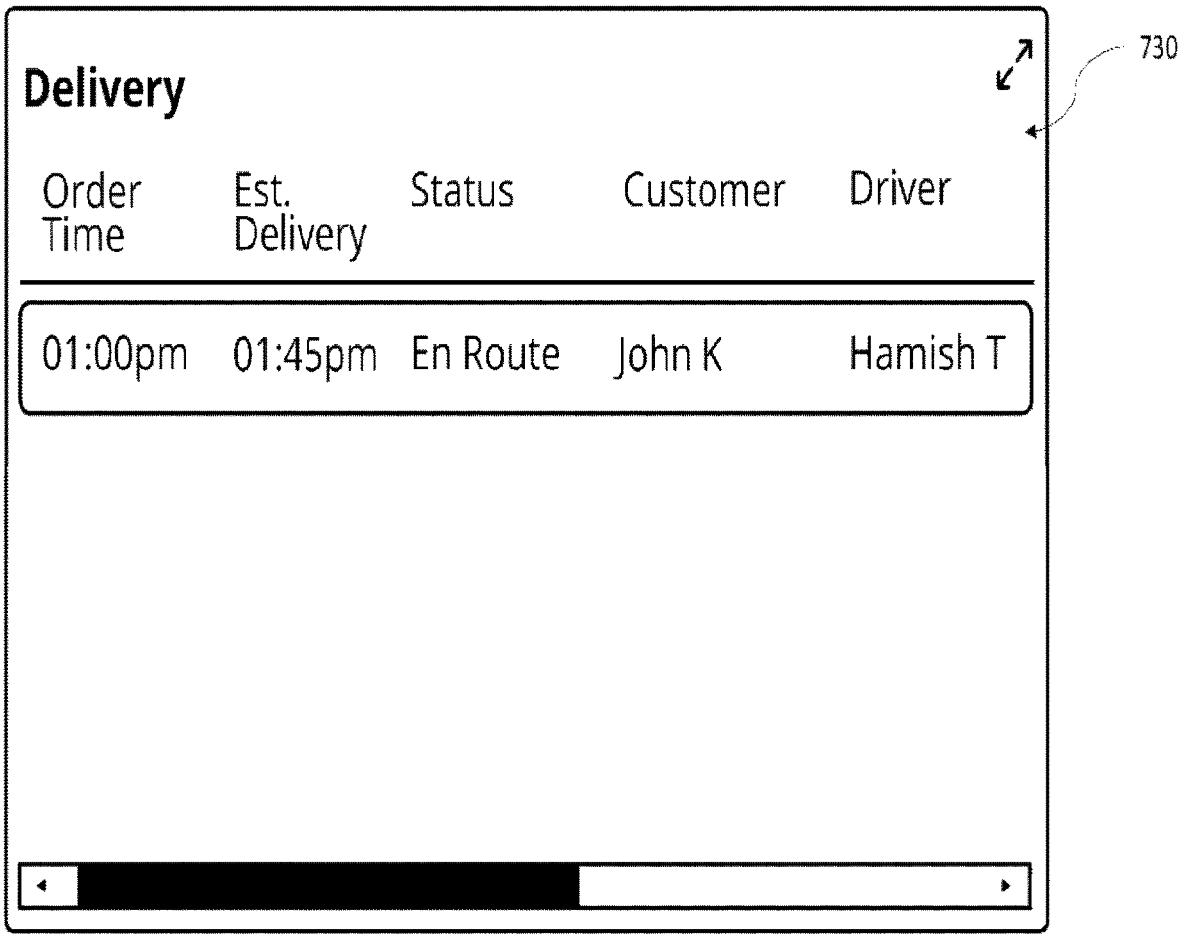
Figure 7J:
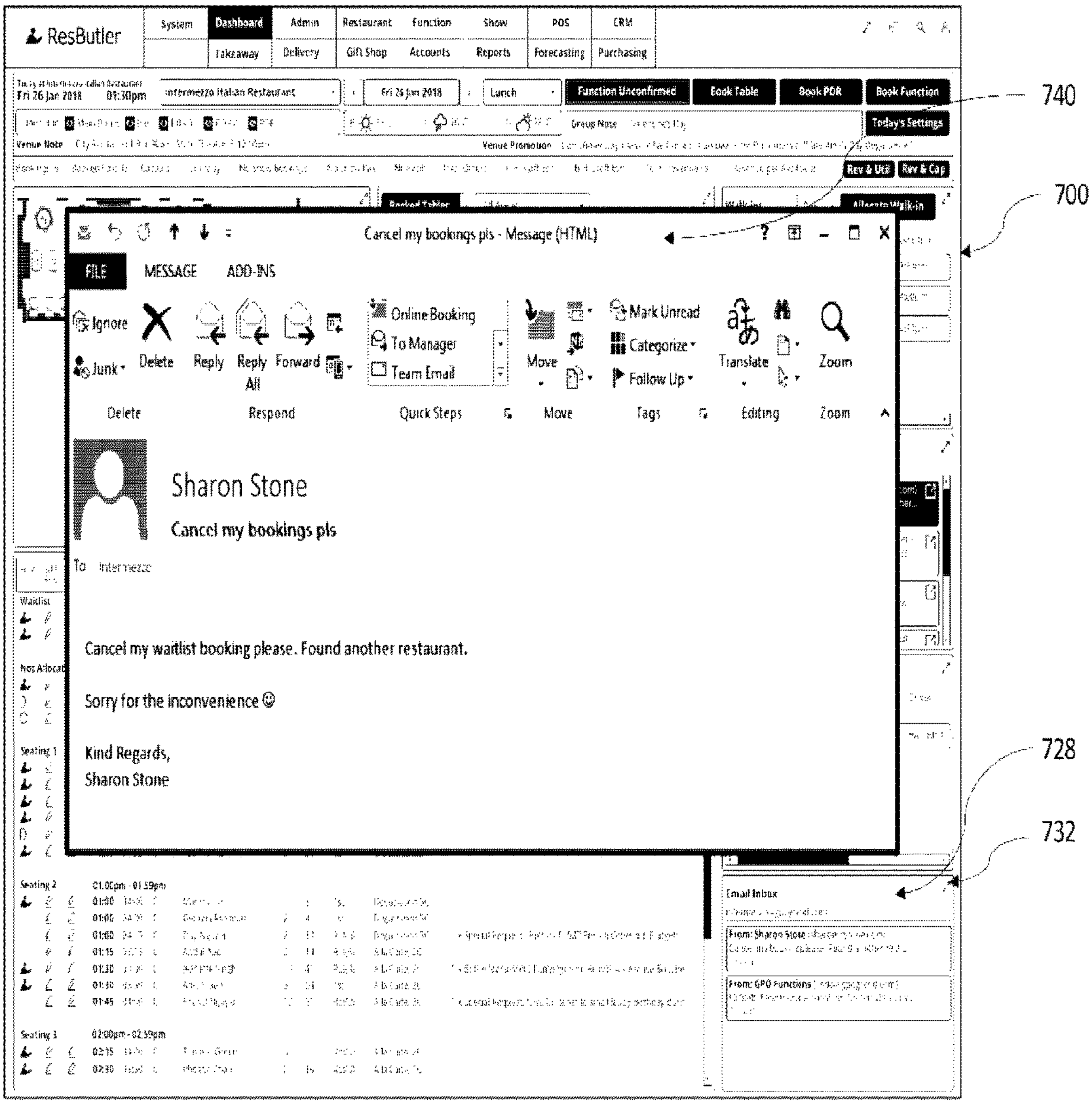
Figure 7K:
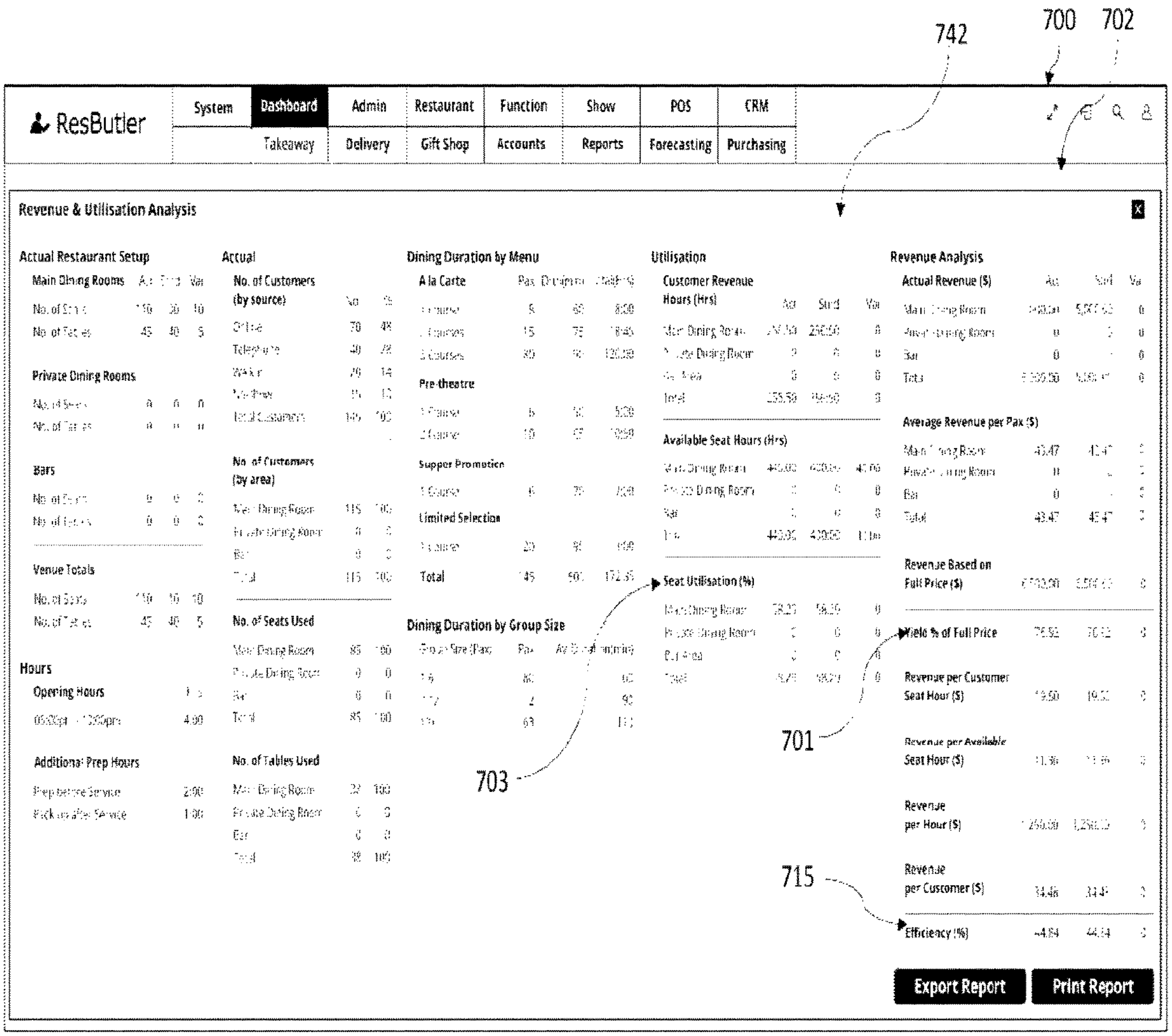
Figure 7I:
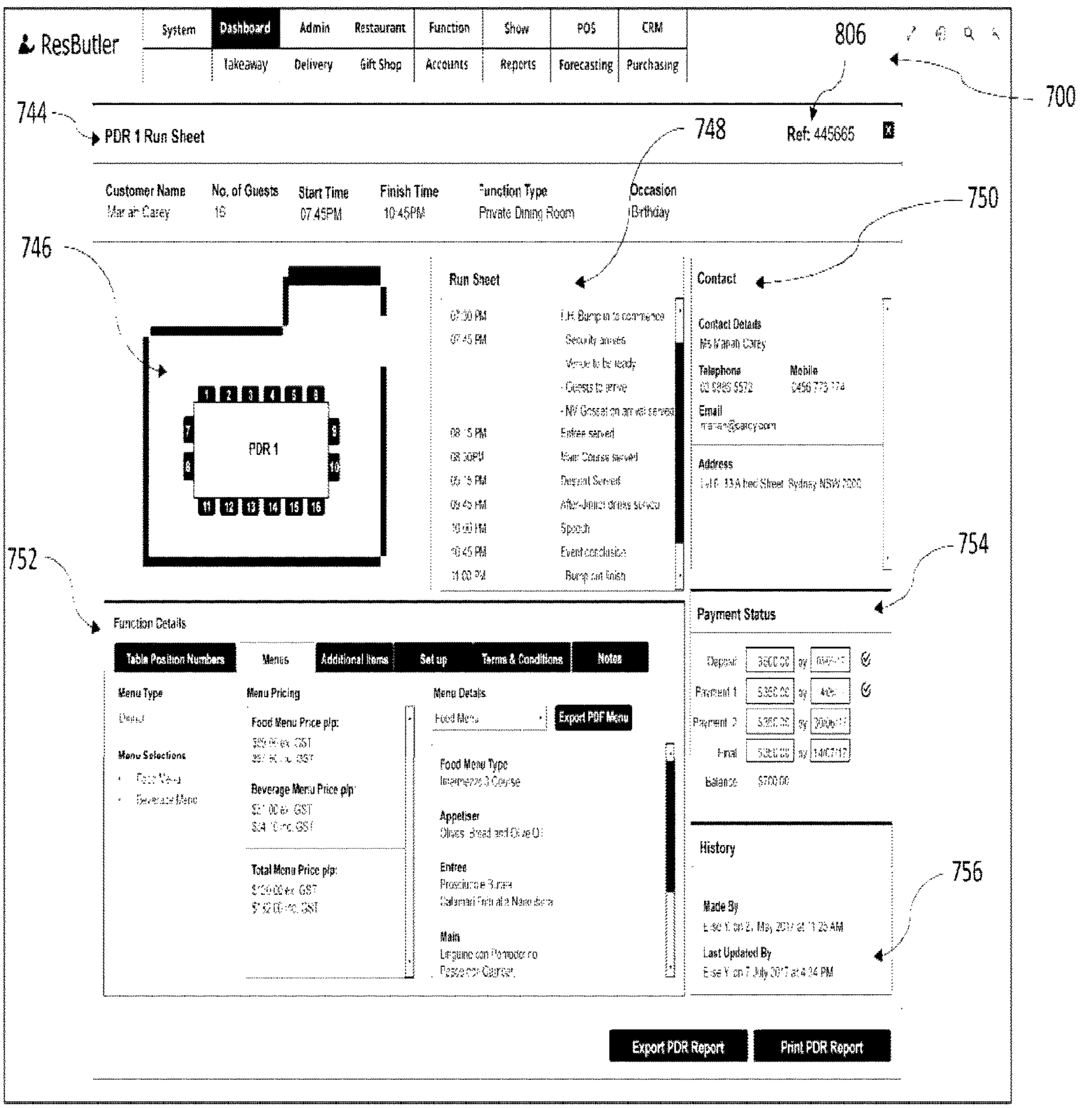
Figure 7M:
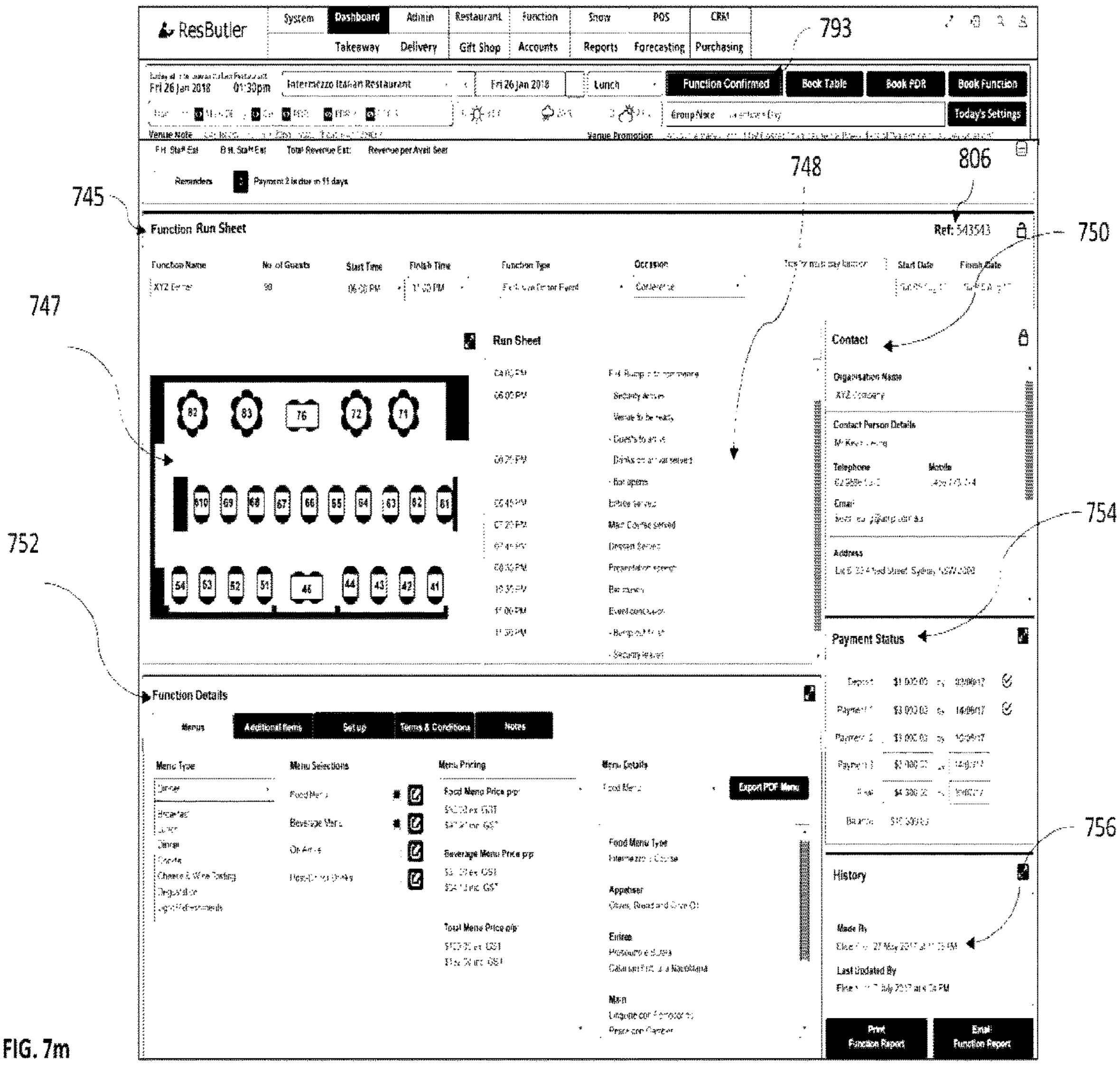
Figure 7N:
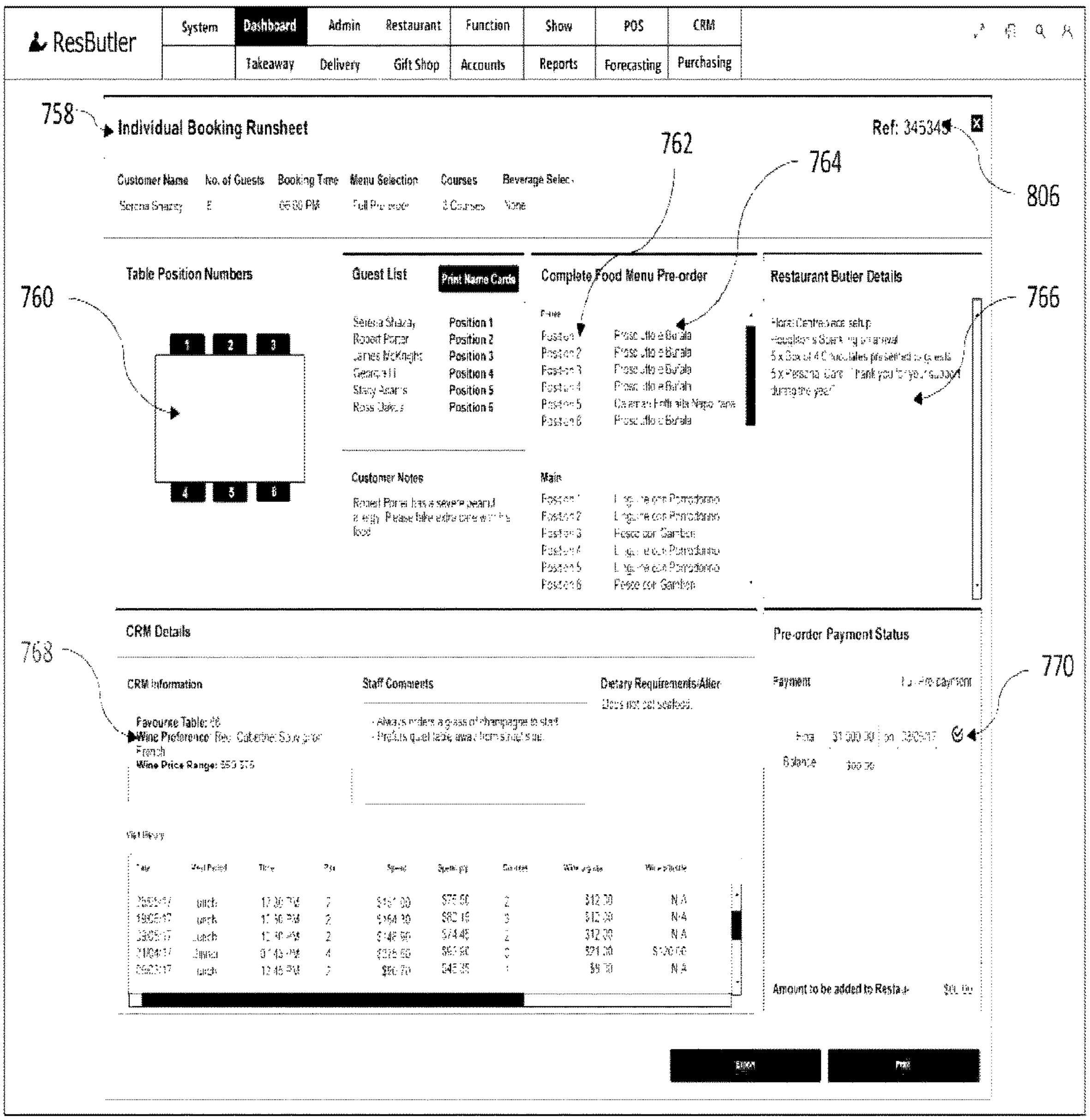

Referring to FIGS. 7*a* to 7*n*, a non-limiting example of one of the screens displayed on a user interface 700 directed to one or more users associated with the venue is shown. The user interface 700 may include one or more of the following user interface modules, which may be arranged in any number of ways to best suit the one or more operators. The screen 700 is a non-limiting example provided to illustrate the workings of the interface. The interface provides a "dashboard" or "cockpit", utilising a screen layout for use during a service period. The venue operator does not need to leave the screen to access or see all relevant information required during a service period including booking messages, home delivery orders, run sheets and emails.

For the following detailed description referring to FIGS. 7*a* to 7*n*, like numerals across different Figures refer to like features and/or integers.

The user interface 700 may include a restaurant summary and revenue module 702, which displays a number of general details of or related to the venue. Such details include, but are not limited to, the name of the venue, the date and the time at the location of the venue, the anticipated weather during the service times of the restaurant (indicated by B for breakfast, L for lunch and D for dinner, S for supper, or any alternative service the restaurant manager or operator wishes to create), the number of bookings, number of people, the number of people in the venue without bookings, the number of cancelled bookings or bookings that do not eventuate, the number of people who do not attend, total revenue and average revenue per person for a given time and date. The restaurant and revenue summary module 702 may also include the anticipated revenue measures (such as total revenue or revenue per available seat), details of any currently running promotions or notes regarding nearby or related events. There may also be provided a revenue and capacity module 731.

The user interface 700 where the venue is part of a multi-venue customer group to select the preferred restaurant from the drop down at 774 whereby the time shown at 789 will automatically change to show the correct time for that restaurant at its physical location such that screen 700 represents a multi-venue, multi-time diary and screen and will eliminate booking errors when bookings are taken at a time zone or location that is different to that of the physical location of the restaurant.

The user interface 700 may include a space allocation user interface module 706. The space allocation user interface 706 describes at least one optimised space allocation instruction set 734 to the operator in such a way as the operator can follow the instruction set to optimise the set out and functionality of the venue. The optimised space allocation instruction set 734 may be provided in a graphical manner (as shown in FIG. 7*b*) which shows a representation of the floor plan of the restaurant and the "to-scale" arrangement of furniture within the space and subspaces of the venue. Alternatively, the skilled addressee would readily understand that the optimised space allocation instruction set 734 may be alternatively codified in a set of written instructions (not shown) or in an interactive graphical "map" that allows the user to "drag and drop" the furniture in the space or subspace, or "click on" the pieces of furniture to bring up further information relating to the allocation or booking of that furniture of the venue to provide the operator with an understanding of how to best arrange the objects in a space to optimise the operation of the venue. To assist the operator in following the optimised space allocation instruction set 734, the computer system may identify the individual tables by assigning a unique number or other identifying means.

The space allocation user interface module 706 may further include one or more sub space allocation interface modules 736 which may display information relating to an optimised space allocation instruction set for objects in a sub-space 736. The space allocation user interface module 706 may further include one or more PDR allocation interface modules 738 which may display information relating to an optimised space allocation instruction set for a PDR 738.

The space allocation user interface module 706 may further include one or more object storage modules (not shown), which display information relevant to objects not currently on the floor of the venue and are stored in a storage space.

As appreciated by a person skilled in the art, any of the modules of the user interface 700 may be displayed as a number of graphical symbols illustrating the attributes of the furniture (such as the maximum number of seats, the shape of the table and accompanying chairs, etc.), or as a list or interactive graphical "map" that allows the user to "drag and drop" the furniture in or out of the storage space or "click on" the pieces of furniture to bring up further information relating to the furniture of the venue to provide the user associated with the venue the understanding of how to best arrange the objects in a space to optimise the running of the venue.

The user interface 700 may also include a diary module 708 which lists the booking details of one or more user requests 704. The diary module 708 may include a number of subcategories such as waiting "walk-in" users or customers, being users with no previous booking, on a "waitlist", unallocated bookings which are bookings that have not yet been accommodated by the optimisation module, or other seating times that compartmentalise the total service times into discrete meal periods. A request that falls under any of these subcategories may be included in the diary module 708 in a manner that displays the booking time, the status (being waitlisted "W", unallocated "U", or confirmed "C" or any other category determined by the operator), the name of the user making the request, the number of people in the booking, the table identification number (if applicable), the number of times the user has visited previously, the menu style (such as al a carte menu, specialised menu, or a theatre menu), the booking reference and any special requests.

The user interface 700 may also include a graphical diary module 710, which displays the booking details of the user requests across the service time period. The graphical diary module may be represented in a number of different ways. One example of the graphical diary module is shown at 710, which displays a Gantt-Chart style diary which illustrates different table bookings for each user across the service time period. A vertical line indicates the current time such that the operator is able to view current and future booking information at a glance and is time sensitive and moves within its "window".

The user interface 700 may also include an alternative form of a graphical diary module 712 in FIG. 7*e*, which is time sensitive and moves within its "window" and illustrates the sections of time which do not have an accommodated booking for each of the tables in the venue. This allows the operator to view sections of the service time period to easily determine when the next table is available. This is particularly useful in accommodating walk-in users who have not made a booking amongst user requests allocated by the computer system.

The user interface 700 may also include a customer walk-ins list 714, which displays a list of walk-in users. The module may display details of the walk-in, such as their name and contact details, the number of people in the booking, the time the walk-in arrived, the next available table that can accommodate the walk-in and the time that the table would be available. To assist the operator in managing the customer standby list, the lists may be ordered by the oldest walk-in arrival time and/or may be coloured coded to identify the relative urgency that the walk-in should be accommodated. For example, the first walk-in is indicated by red colouring 716, and later walk-in entries are shown in green colouring 718 or orange colouring 720. An embodiment of the invention includes the computer system directly contacting the walk-in when the table that have been allocated by the computer system is available. The walk-in may be contacted via Short Message Service (SMS) or may prompt the operator to contact the walk-in.

The user interface 700 may also include an urgent message for this service module 722, which may be remote user enquiries that may be received by the user interface in the form of an email 724, SMS 726, or voice-to-text translations from a phone message bank service received by the computer system from one or more remote users.

The user interface 700 may also include an email module 728, which may be configured to display emails addressed to the operator.

The user interface 700 may also include a home delivery orders taken during service module 730, which may be configured to display any bookings that are taken by the computer system during the service period at the venue. This is particularly useful in understanding wait times for food with respect to seated customers and potential walk-in customers. The combining of customer dine-in orders with home delivery orders also permits the system to notify customers of wait times, prioritise orders and co-ordinate the activities of kitchen staff and wait staff.

Any of the above modules described may include an expansion tab icon or button 732, which, if clicked on by the operator, can expand the size or functionality of the module as a "pop up window", where the pop up window may be a new screen on the user interface that is opened on top of any previous windows.

An example of a pop up window relating to the email module 728 of the user interface 700, is shown at FIG. 7*j*. When the operator clicks on the expansion icon or button 732 for the email module 728, a new email window 740 "pops up" over the user interface dashboard 700. The new email window 740 may have enhanced or additional functionality than is provided by the email module 728.

A further example of a pop up window relates to the restaurant summary and revenue module 702 of the user interface 700, is shown at FIG. 7*k*. When the operator clicks on the button "Rev & Util" for the restaurant summary and revenue module 702, a "new" restaurant summary and revenue window 742 "pops up" over the user interface dashboard 700. The new restaurant summary and revenue window 742 may have enhanced or additional functionality than is provided by the restaurant summary and revenue module 702.

The restaurant summary and revenue module 702 provides an advantageous insight into the operation of the venue. There are numerous metrics which are calculated within the embodiments of the system for yield management, forecasting and for the autonomous operations the system, examples of which are included within Annexure 2, with relevant prior art included as Annexure 1. However, in the embodiment, displayed on the user interface or dashboard of the system are revenue yield 701, seat utilisation 703 and efficiency 715. Each may be represented as:

$$\text{Revenue yield \%} = \frac{\text{actual revenue}}{\text{retail price of items sold and complimentary items provided}}$$

$$\text{Seat utilisation \%} = \frac{\text{revenue seat hours}}{\text{available seat hours}}$$

$$\text{Efficiency \%} = \text{revenue yield \%} \times \text{seat utilisation \%}$$

The revenue yield is the actual revenue generated divided by the retail price revenue (excluding discounts, promotional benefits or gifts) 701 at FIG. 7*k*. The seat utilisation is the revenue generated by each seat per hour divided by the number of hours the seat is in use 703. The Efficiency of the restaurant is calculated as the revenue yield multiplied by the seat utilisation. The calculation of efficiency as shown at 715 provides the user associated with the venue with a true measure of the efficiency of the operation of the restaurant across time.

A further embodiment includes a pop up window relating to a specific user request or booking 704 shown in the diary module 708, as shown at FIG. 7*l*. When the operator clicks on the user request or booking record 704, a new reservation window 744 "pops up" over the user interface dashboard 700. The new reservation window 744 may have enhanced or additional functionality compared to the diary module 708 and provides a detailed look at the details of the user request or booking.

For example, as shown at FIG. 7*l*, the reservation 704 is a request to use a private dining room (PDR) which includes a seating allocation plan for the table with corresponding seating or guest allocation 746, the "run sheet", which shows the timing of the venue experience 748, the remote user or a patron's contact details 750, the function details 752 including table and guest position numbers, the menus selected by the remote user, any additional items requested by the remote user, the details of what is required for the set up for the booking, the terms and conditions agreed to by the remote user, and any notes made by the operator. The new reservation window 744 also includes the payment status of the bookings 754 and a "log" history 756 of actions taken by any operators.

A further embodiment is provided where the use of the entire space of the venue is requested. A further embodiment of a pop up window relating to a specific remote user request or booking, is shown at FIG. 7*m*. A function window 745 is shown which includes an optimised space allocation instruction set seating allocation 747, the run sheet showing the timing of the venue experience 748, the remote user's or a patron's contact details 750, the function details 752 including table and guest position numbers, the menus selected by the remote user, any additional items requested by the remote user, the details of what is required for the set up for the booking, the terms and conditions agreed to by the remote user, and any notes made by the operator. The reservation windows 744 and 745 also include the payment status of the bookings 754 and a "log" history 756 of actions taken by any operators. There is also provided a "function confirmed" button at 793, which allows the operator to view all functions that have been confirmed.

A further embodiment of a pop up window relating to a specific individual user request or individual booking 704 shown in the diary module 708, is shown at FIG. 7*n*. When the operator clicks on the user request or booking record 704, a new reservation window 758 "pops up" over the user interface dashboard 700. The new reservation window 758 may have enhanced or additional functionality compared to the diary module 708 and provides a detailed look at the details of the individual user request or booking. For example, as shown at FIG. 7*n*, the reservation 704 is a request for a table of 6 people. The new reservation window 758 includes a seating allocation plan for the table with corresponding seating or guest allocation 760, the a guest list of patrons 762, the menus selected by each patron 764, any "restaurant butler" request 766, where restaurant butler request include the provision of any additional goods or services that a "butler" may provide to supplement the patron's experience, the customer relationship management (CRM) module including the remote user or patrons favourite experiences or foods, staff's (users associated with the venue) comments or feedback, dietary requirements and visit history. The new reservation window 758 also includes the payment status of the bookings 770.

In a further embodiment, the dashboard and diary user interface 700 in FIG. 7*a*, contain details of the exact time 789 of the restaurant using the time zone of the restaurant's location 774.

In a further embodiment, the dashboard and diary user interface 700 in FIG. 7*a*, contain a booking form for the booking of functions and events 776 which is linked in the data base with a corresponding function booking app and widget.

In a further embodiment, the dashboard and the diary user interface 700 in FIG. 7*a*, contain a booking form for the booking of a table 780 and also a booking form for the booking of private dining rooms or private spaces 778 which is linked to the data base with a corresponding private dining room app and widget. An unconfirmed function booking list may also be provided at 790.

In a further embodiment, the dashboard and the diary user interface 700 in FIG. 7*a*, includes a "pop up" that can immediately communicate to a restaurant user all the constraints that have been applied to that service 788.

In a further embodiment, the dashboard and the diary user interface 700 in FIG. 7*a* includes a function set up menu for all the constraints and details to be included and added to the data base 782.

In a further embodiment, the dashboard and the diary user interface 700 in FIG. 7*a*, includes a restaurant set up menu for all the constraints and details to be included and added to the data base 772.

In a further embodiment, the dashboard and the diary user interface 700 in FIG. 7*a*, includes a delivery set up menu for all the constraints and details to be applied to delivery orders which is linked to the data base with a corresponding app and widget 786.

In a further embodiment, the dashboard and the diary user interface 700 in FIG. 7*a*, includes a gift shop set up menu for all the constraints to be included for the sale of gift cards, gift packages and gift products which is linked to the data base and with a corresponding app and widget 784.

In further embodiments the dashboard and diary user interface 700 in FIG. 7*a*, includes integrated modules for cabaret show bookings, CRM information for seating allocation constraints and customer service, reporting, accounts, forecasting and predictive analysis and point of sale transactions and integration.

The computer system as claimed may also include the feature of a "restaurant butler" module which facilitates the provision of any additional goods or services that a "butler" may provide to supplement the patron's experience. For example, the user request may include a request for a dozen red roses to be included with a booking. The restaurant butler accesses a database containing supplier information relevant to the request, such as, the details of a florist.

An embodiment is provided where the restaurant butler automatically provides a prompt to the operator to contact the supplier and order the flowers, or the restaurant butler is configured to automatically order the roses via an email ordering system or other means. The database would also contain information relating to the estimated delivery times for the roses and other limitations (such as availability etc.), such that if a service or good was not available, the restaurant butler may suggest an alternative.

As would be readily understood by the person skilled in the art, the restaurant butler is not limited to flowers and may also include the provision of chocolates, musicians, magicians and other forms of entertainment. The restaurant butler may also be configured to communicate with external computer systems over a network, such as the Internet, for ordering or procuring the relevant goods or services within established supply chains or automated systems.

An embodiment of the computer system includes the functionality to enable both the remote user and the operator to make a booking. This functionality provides particular use when servicing walk-ins, such that the operator may request a booking on behalf of the walk-in.

User Booking Interface Screen

Referring to FIG. 8, a non-limiting example of one of the screens displayed and the information contained on a user interface 800 directed to a remote user or an operator. The user interface screen 800 displays a non-limiting example of the "Details" tab within the "make a booking" screen provided to a remote user and/or an operator. As would be well within the purview of a person skilled in the art, the data fields displayed or queried by the "make a booking" screen may vary depending on whether the user is a remote user or an operator. For the following detailed description referring to FIGS. 8*a* to 8*j*, like numerals across different Figures refer to like features and/or integers.

The user interface 800 may include one or more of the features of a booking time summary 802, which details the number of allocated remote users at each predetermined service period or meal periods and the total number of patrons and other metrics associated with achieving a specific turnover or number of patrons. Other features may include information that may be shown or queried from the remote user or operator, such as the patron's personal and contact details 804 (where the patron may be the walk in or remote user), the booking reference details 806, the booking request particulars 808, the allocated booking details 810, marketing details 812, payment details 814, and booking history for the particular requestor 816.

Figure 8A:
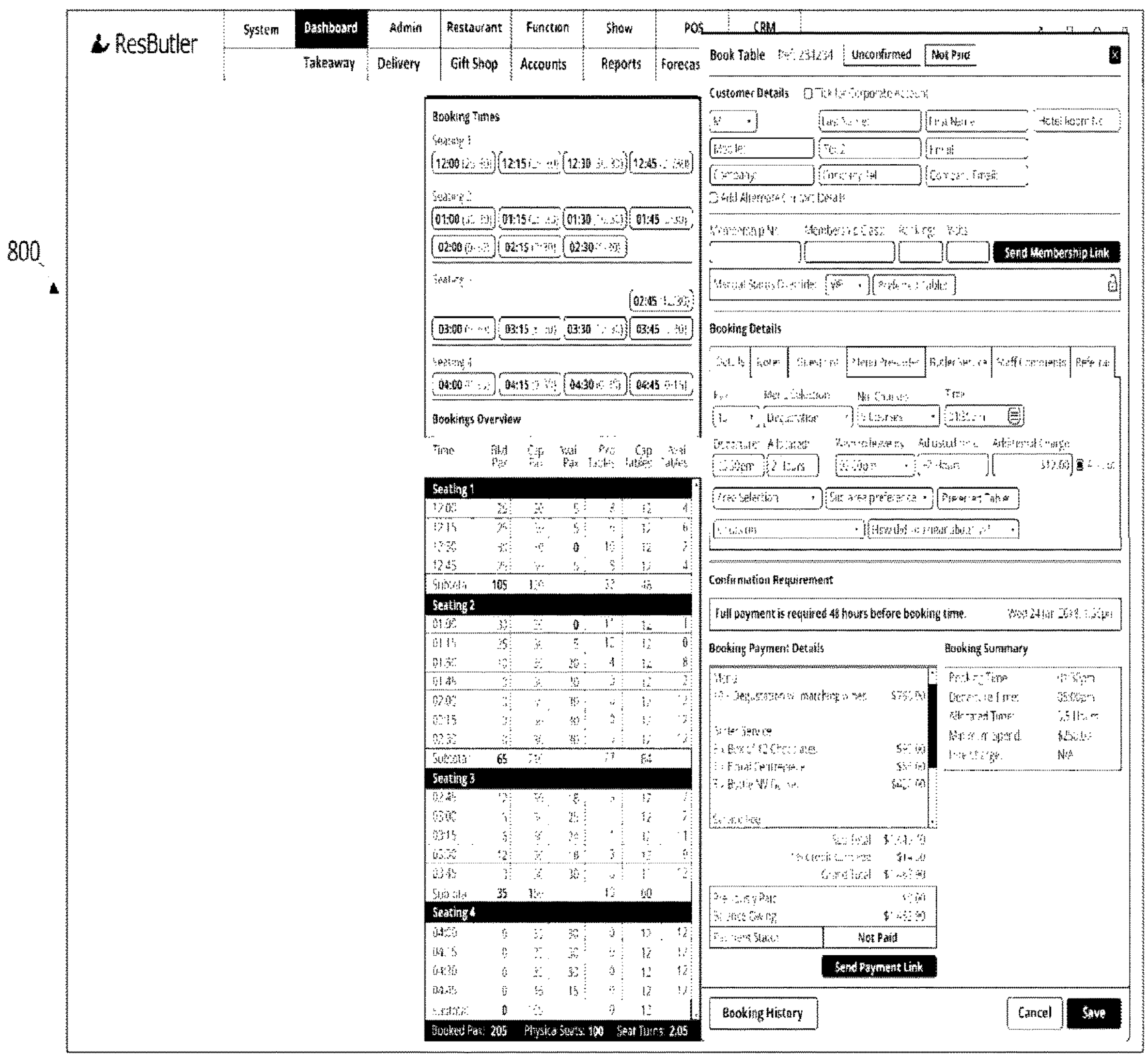
FIGS. 8*a* to 8*g* are screenshots illustrating a user interface screen in accordance with an embodiment of the invention.
Figure 8B:
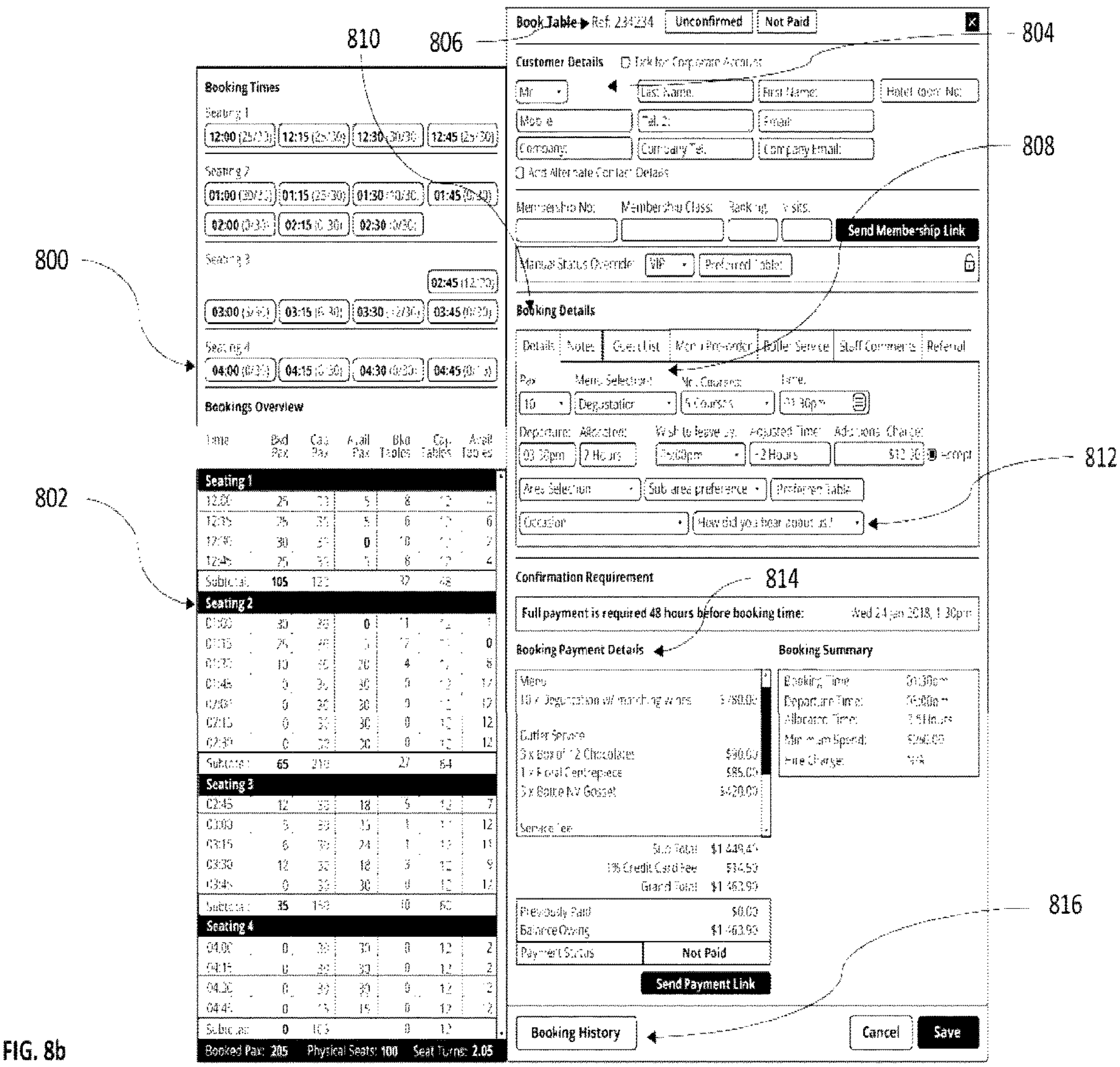
Figure 8C:
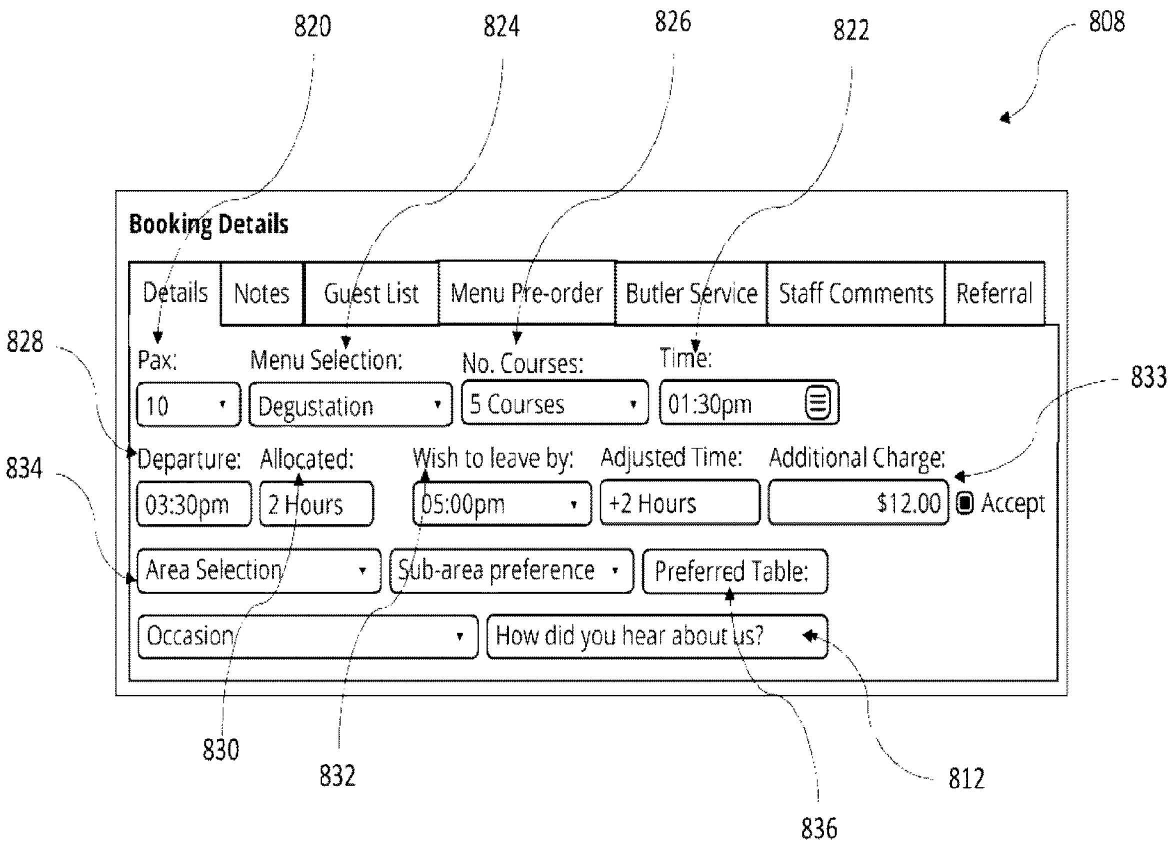

An embodiment of the computer system shown in FIG. 8*c* includes a user interface module 808 which allows a remote user to pre-select a number of the particulars of their request to use a space. The user preselect interface module 808 may include the number of people 820, the beginning time of the booking 822, the menu selection 824, the desired number of courses in the menu 826, the departure time 828 and the allocated time 830. Based on the information entered by the remote user into the preselect interface module 808, the user interface will automatically provide a departure time which accounts for the number of people in the booking and the number of courses selected. That is, the departure time will vary depending on the selection of request particulars by the remote user. Further, the preselect interface module 808 also includes an option that allows the remote user to change their departure time 832. The preselect interface module 808 automatically associates an additional charge 833 to the user associated with the later departure time in accordance with the opportunity cost of the space in the venue not being used by other patrons. That is, the computer system seeks to optimise the utilisation in respect of the time that the space is available.

The preselect interface module 808 may also include the option for the remote user to request an area or sub space of the venue 834, and a particular table within the sub space 836. As before, the computer system automatically varies the prices of the patron's experience at the venue dependant on the ranking of the requested seat or sub-space, the items selected in the menus, the number of courses selected, the furniture comfort level, and/or service standard in accordance with the ranking of that sub-space or table such that the remote user may choose to upgrade certain elements of their experience.

Figure 8D:
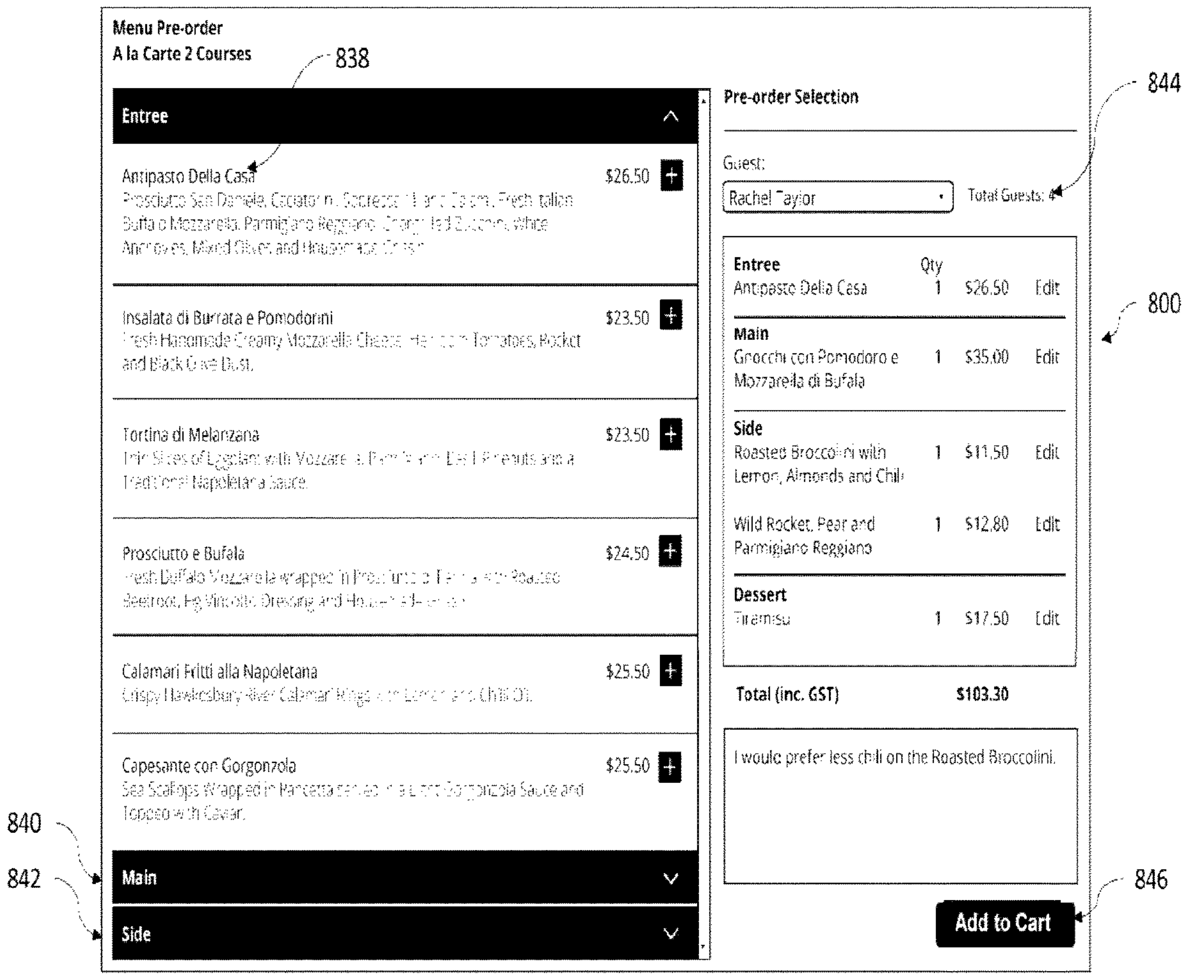
Figure 8E:
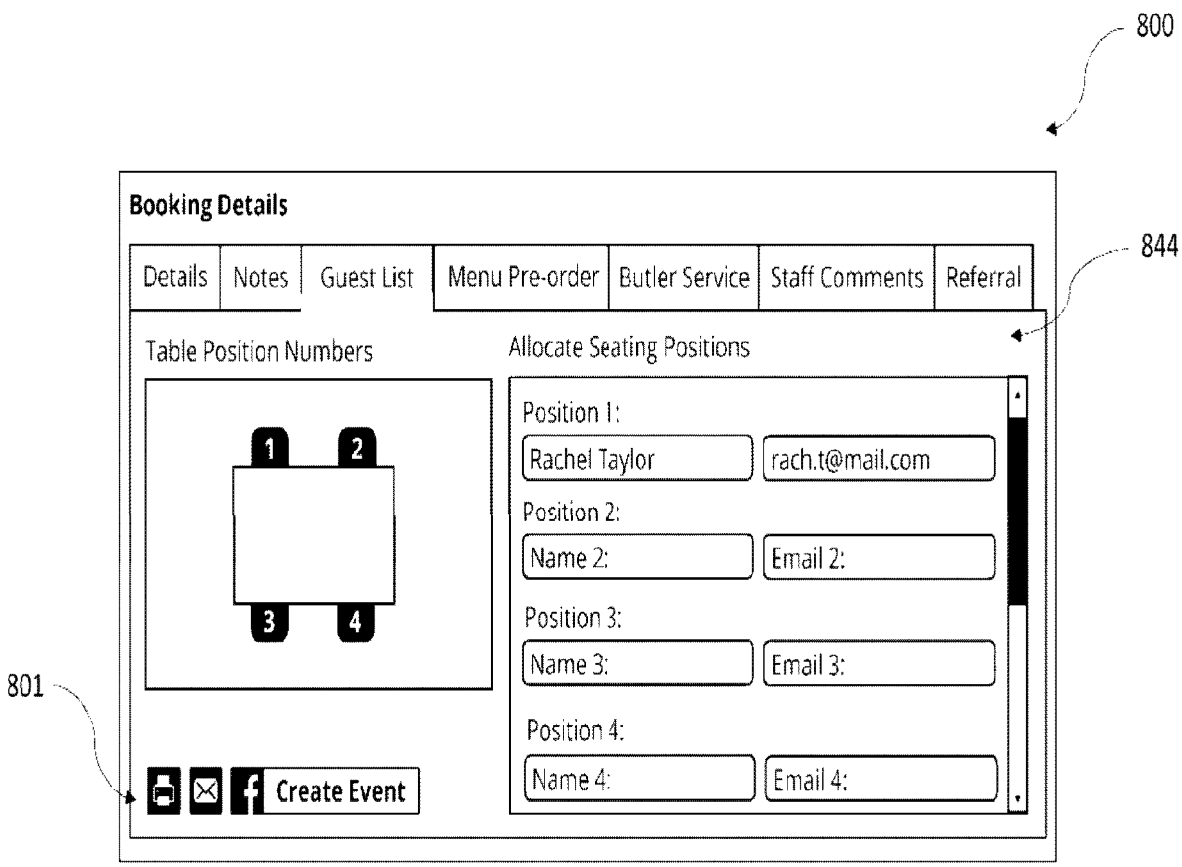
Figure 8F:
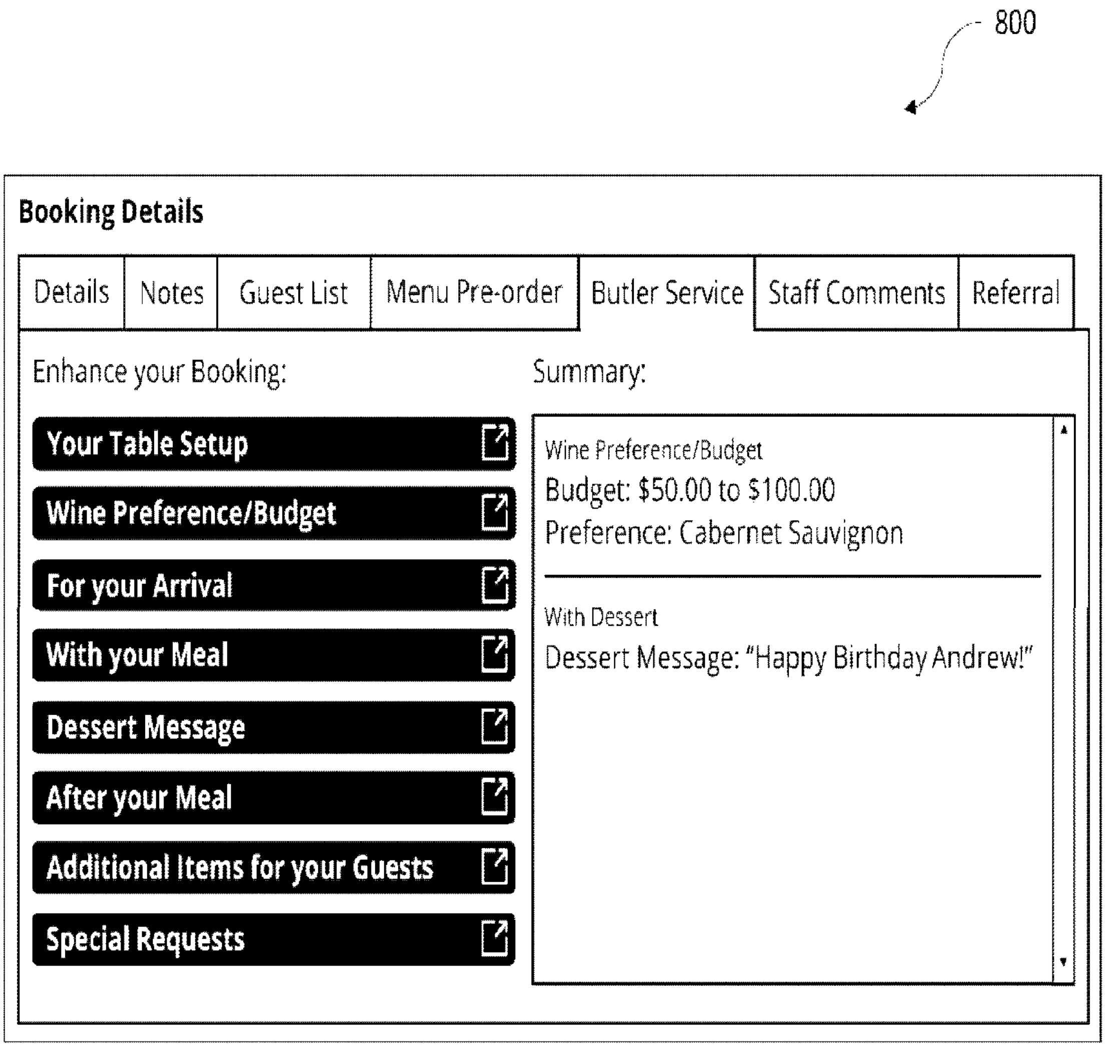

For example, a venue is a restaurant with an a la carte menu is shown in FIGS. 8*d* and 8*e*. A remote user has previously selected a two course menu at the preselect interface module 808 (shown in FIG. 8*c*) with an entrée course 838 and a main course 840 with accompanying side dishes 842. The remote user makes a booking for four patrons 844, where each of the patron's meal choices 844 for each course is pre-selected. Once the meals have been selected, the remote user can then proceed to pay for the meal by "adding to cart" by using button 846 and proceeding to pay in a payment screen (not shown).

An embodiment of the computer system shown in FIG. 8*c* illustrates the computer system including a Marketing CRM input field where the remote user may enter the details of how the remote user became aware of the venue. The Marketing CRM field may include any questions that relate to marketing or managing customer (patron) relationships. Furthermore, the computer system may also allow remote users to pay remotely using a secure payment gateway over a network such as the Internet. https://en.wikipedia.org/wiki/Payment gateway). Alternatively, the computer system 200 may be integrated with a Point of Sale (POS) system, which allows the user to pay after the conclusion of the meal.

Alternatively, if the remote user previously selected a three course menu at the preselect interface module 808 (shown in FIG. 8*c*), the computer system may provide an alternative menu. The alternate menu may be varied such that some of the meal items of the entrée course 838 and a main course 840 may be greyed out or removed entirely and an additional course, such as dessert may be added (not shown).

Figure 8G:
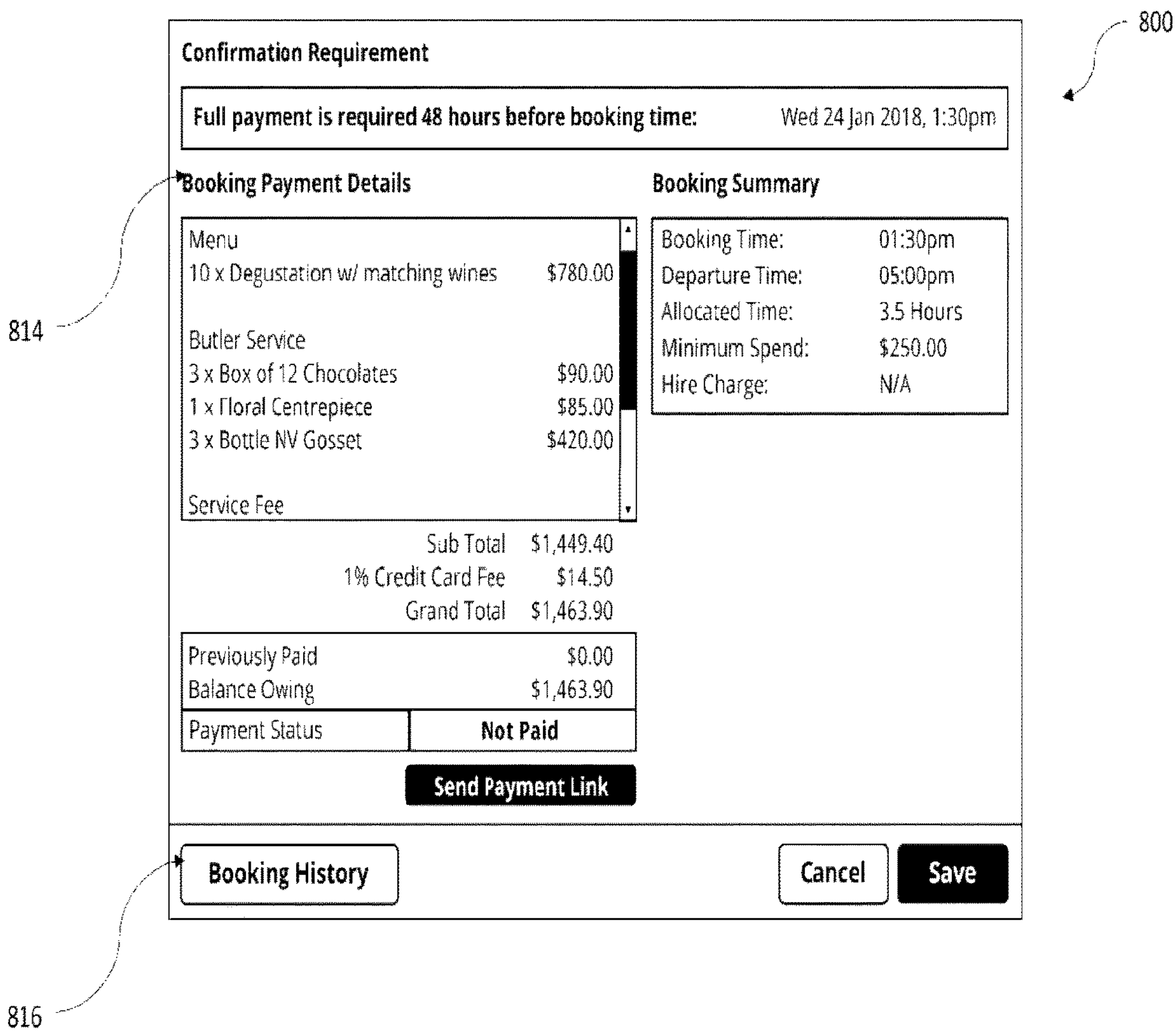

In one embodiment of the interface shown in FIG. 8*g* there is shown an interface screen 800 which allows a requestor to part pay a pre-payment requirement over a number of installments at the customers choosing at any time before the final payment is required to be paid for the booking to be secured and confirmed, including payment details 814 and a booking history button 816.

Payments and Pre-Payments

Figure 8H:
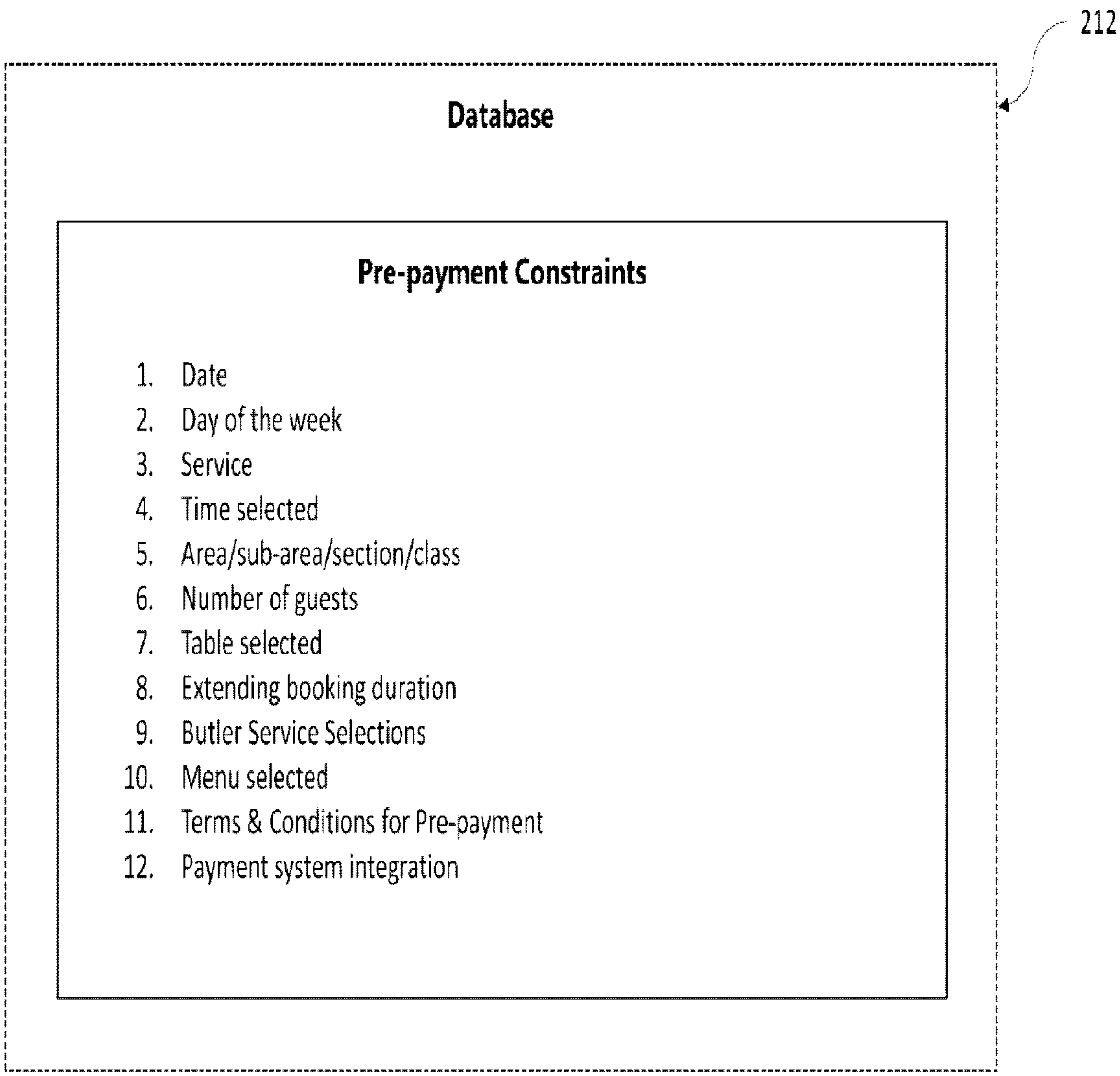
FIGS. 8*h* to 8*j* are constraints and flowcharts illustrating a computer enabled method for payment requirements and a pre-payment decision tree.

Referring to FIG. 8*h*, in one embodiment of the computer system is detailed an example of pre-payment constraints 212 that can be used to determine whether a prepayment is required to secure a booking.

Figure 8I:
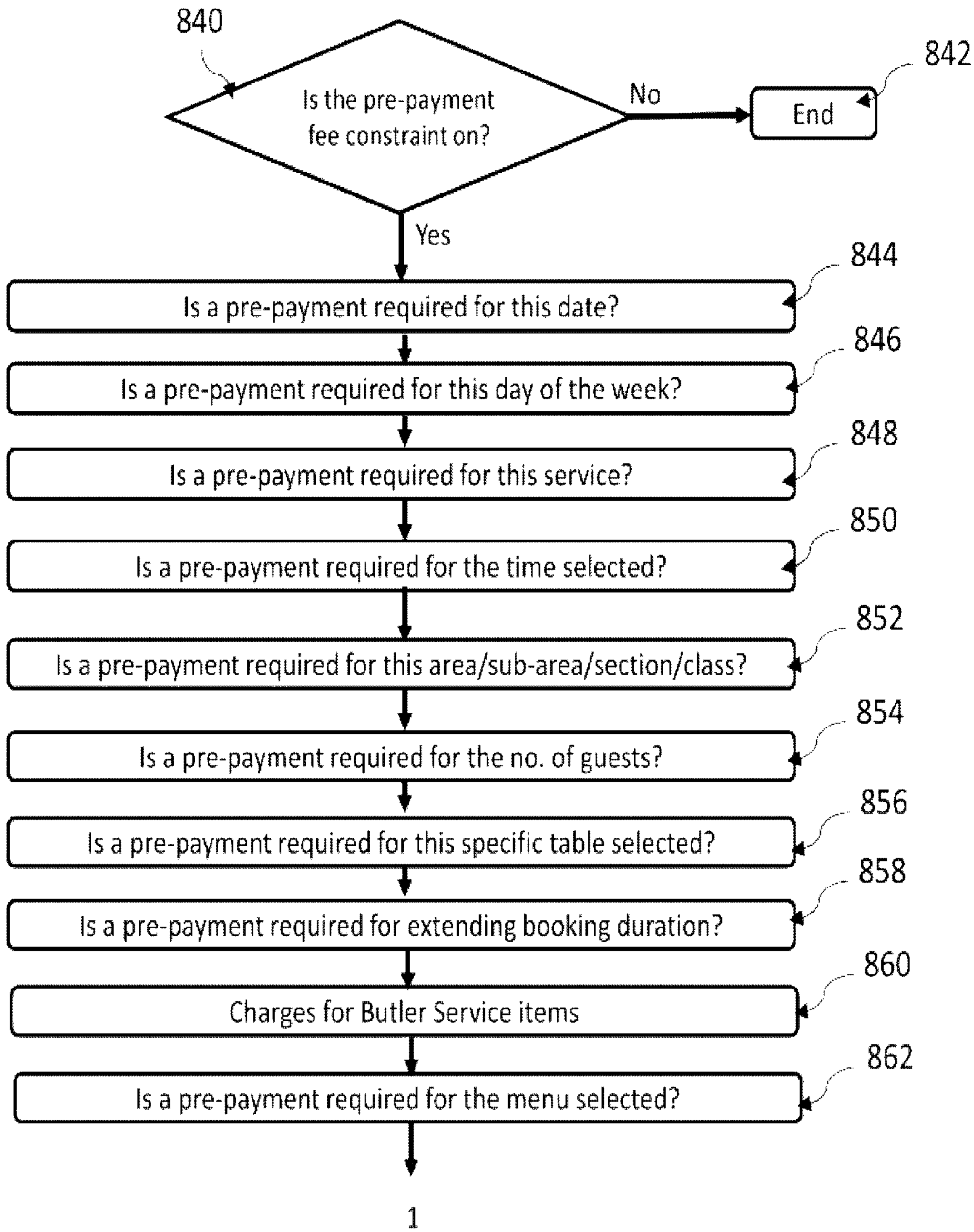
Figure 8J:
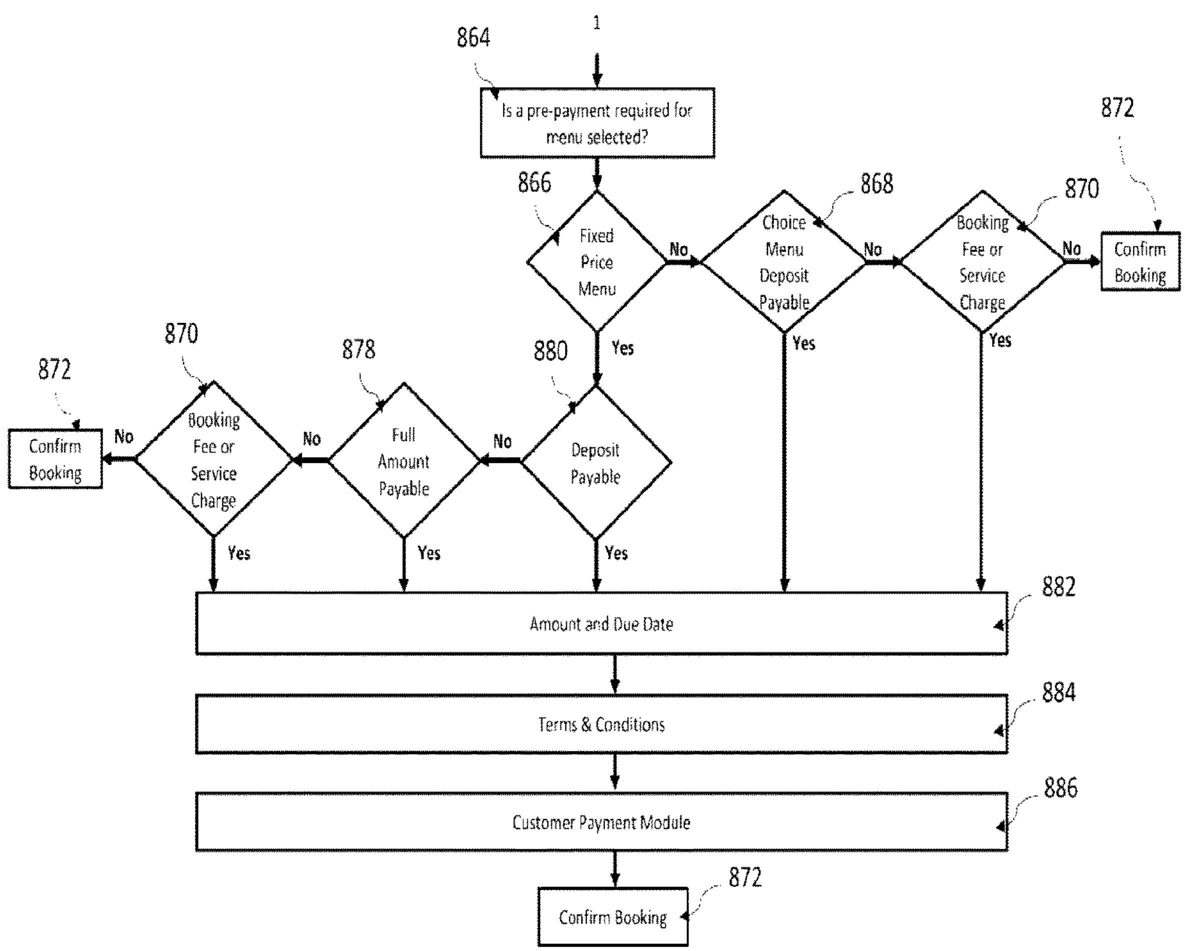

Referring to FIGS. 8*i* and 8*j* in one embodiment of the computer system is detailed an example of the pre-payments decision tree to determine if a booking request is required to make a pre-payment for the booking to be confirmed.

Referring in detail to FIG. 8*i*, the embodiment determines whether the pre-payment constraint is on at step 840. If not, the process ends at step 842. If yes, then a series of cascading criteria are determined utilising the constraint information, including whether pre-payment is required for the date 844, the day of the week 846, the service 848, the time selected 850, the space, sub-space, section or class 852, the number of guests 854, the specific table 856, the extended booking duration 858, additional services 860 or the menu selected 862.

Referring to FIG. 8*j*, which continues from flow arrow 1 of FIG. 8*i*, if the menu selected at step 864 is a fixed price menu 866, then the process determines if a deposit is payable 880, and if not, the process determines if a full amount is payable at 878, and if not, then the process determines if a booking fee is payable at 870, if not then at step 872 the booking is confirmed. If a deposit is payable at any one of steps 880, 878 or 870, then the amount and date due is communicated at step 882, the terms and conditions are communicated at step 884, and the requestor is directed to a customer payment module at step 886, after which the booking is confirmed at step 872.

Returning to step 866, if he menu is not a fixed price menu, the process determines whether a choice menu deposit is payable at step 868, and if not, the process determines whether a booking fee is payable at step 870 and if not, the booking is confirmed at step 872. If a deposit is payable at steps 868 and 870, then the amount and date due is communicated at step 882, the terms and conditions are communicated at step 884, and the requestor is directed to a customer payment module at step 886, after which the booking is confirmed at step 872.

System Constraint Examples

Figure 9A:
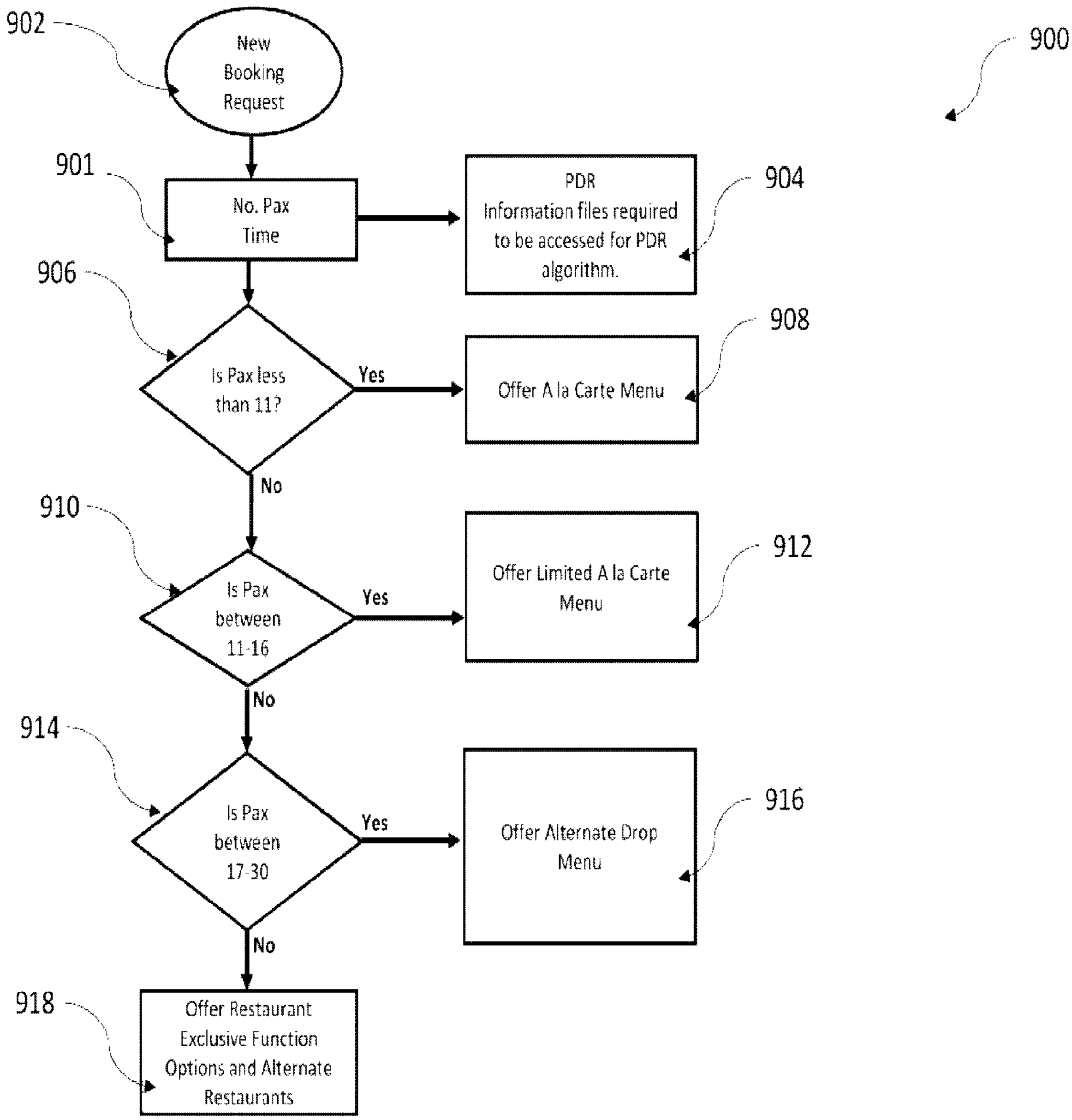

A further alternative is provided where the embodiment automatically varies the menu selection depending on the number of guests (pax). Referring to FIG. 9*a*, which shows a flow diagram 900 illustrating the automatic decision making of the user interface in deciding which menu is provided to a requestor making a booking, depending on the number of guests. When receiving a new request or booking 902, the number of guests (pax) and time are assessed at time 901, to assess the request for whether it is a request for a private dining room (PDR) 904. If it is not a request for a private room, and there are less than eleven pax 906, then the user interface provides the requestor with the full a la carte menu 908. If the number of pax is between 11-16 (910), then the user interface provides the requestor with a limited a la carte menu 912. If the number of pax is between 17-30 (914), then the user interface provides the requestor with an alternate drop menu 916. If the number of pax is over 30, exclusive function options are offered at 918. An example of a full a la carte menu is shown in FIG. 8*d*.

Alternatively, if the number of patrons is between eleven and sixteen 910, then the user interface provides the remote user with a limited a la carte menu 912. An example of an interface for a limited a la carte menu 903 is shown in FIG.

9*b*, wherein a smaller range of available dishes is provided to the remote user to select from.

Alternatively, if the number of patrons is between seventeen and thirty 914, then the user interface provides the remote user with an alternative drop menu 916. An "alternate drop menu" is a where the venue offers a limited selection and the remote user chooses two dishes per course which are served in an alternating manner for each guest.

Alternatively, if the number of patrons exceeds thirty patrons, the user interface provides a list of exclusive function options and/or a list of alternate venues that would be able to accommodate the booking 918. As would be readily understood by the skilled addressee, the limitation of the number of patrons per menu type is determined based on the capacity of the venue and the exemplary values listed were provided to assist in understanding the claimed invention. As such, it would be understood that a user interface may provide the remote user with any number of menus depending on any number of patrons in the booking.

In determining which menu to provide to the remote user, the user interface, may access relevant constraint information or other information, stored in one or more databases. Such information is shown in FIG. 9*c*, and the rules guiding the menu decision process 920 includes but is not limited to the start and end of service times, the booking intervals, the latest time a booking would be accepted, and the maximum number of patrons, tables, walk-ins, and number of people per menu type.

Figure 9D:
Figure 9E:
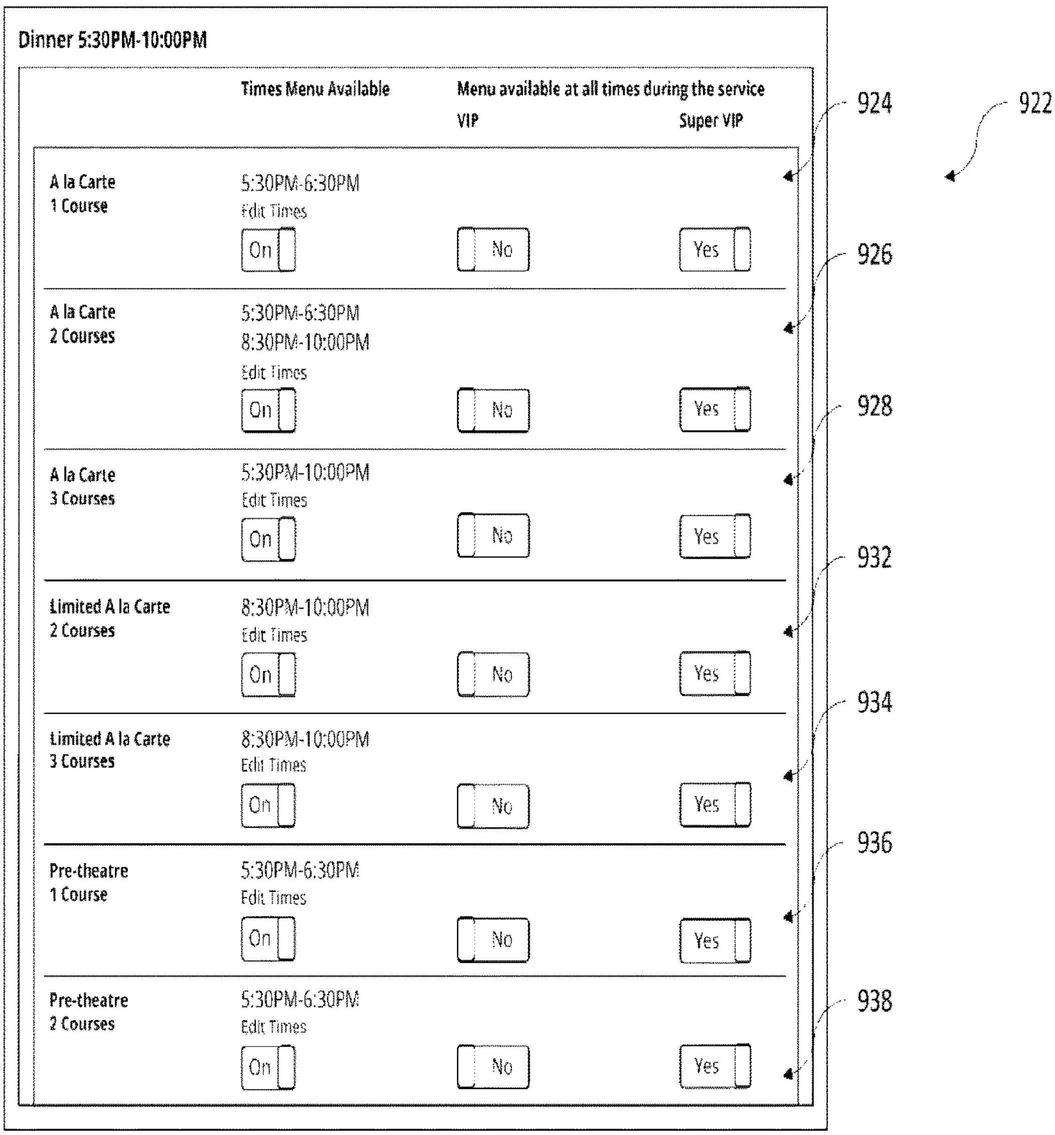

Further, the user interface may also access manually estimated (estimated and entered by the operator) or predicted (by the predictive module) times required per course for a number of patrons. For example, referring to FIGS. 9*d* to 9*f*, the user interface which includes the input interface 905 of the various menus and number of courses involved FIG. 9*d*, and then may rely on the rules 922 FIG. 9*e* which include the times for a first menu style (a la carte) for one course 924, two courses 926 and three courses 928.

Alternatively, the user interface may rely on the rules 922 which include the times for a second menu style (limited a la carte) for two courses 932 and three courses 934. Alternatively, the user interface may rely on the rules 922 which include the times for a third menu style for one course 936, two courses 938.

Figure 9F:
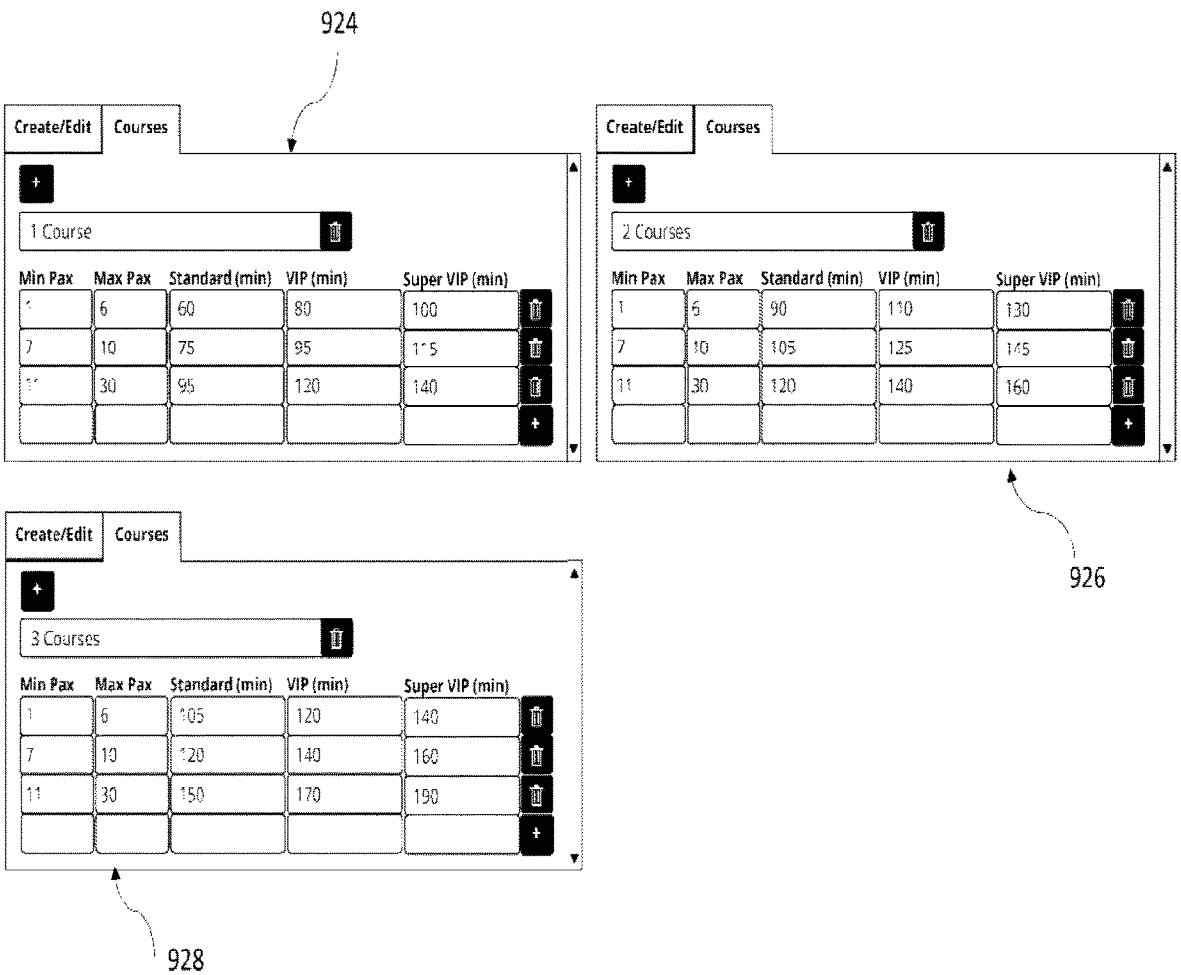

In one embodiment, the user interface relies on the duration times set by courses and/or by requestor status as shown in FIG. 9*f*, where input screens for the time allocated to one, two and three course menus are displayed at 924, 926 and 928 respectively.

Figure 9G:
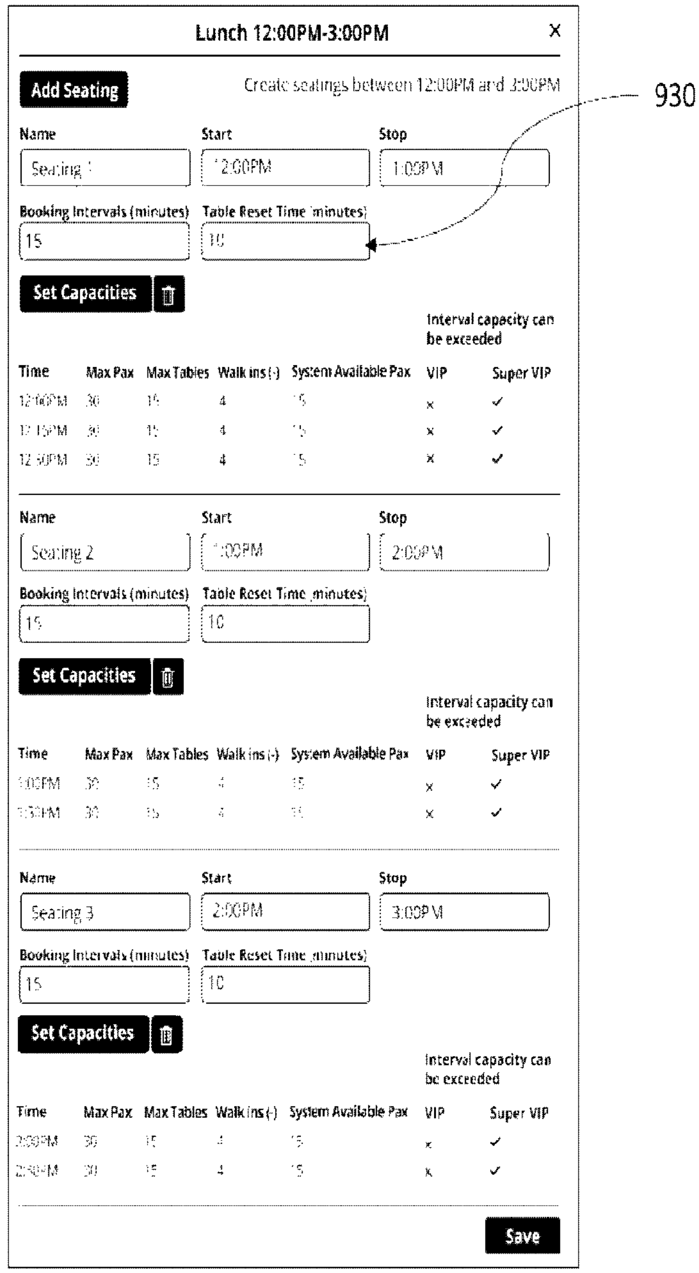

In one embodiment, the user interface groups all booking requests in accordance with the seating periods determined for a service as created and shown in FIG. 9*g*, including the setting of a table reset time at 930.

The automation of the menu selection allows for larger bookings to be appropriately and automatically allocated without disrupting the normal service of the venue by reducing the time and effort required to cater to large parties of patrons. As such, the embodiment addresses one of the problems identified in the prior art by providing a complete restaurant management system that transparently and autonomously manages the relationship with the client from the beginning of the booking to payment and end of service.

Figure 9H:
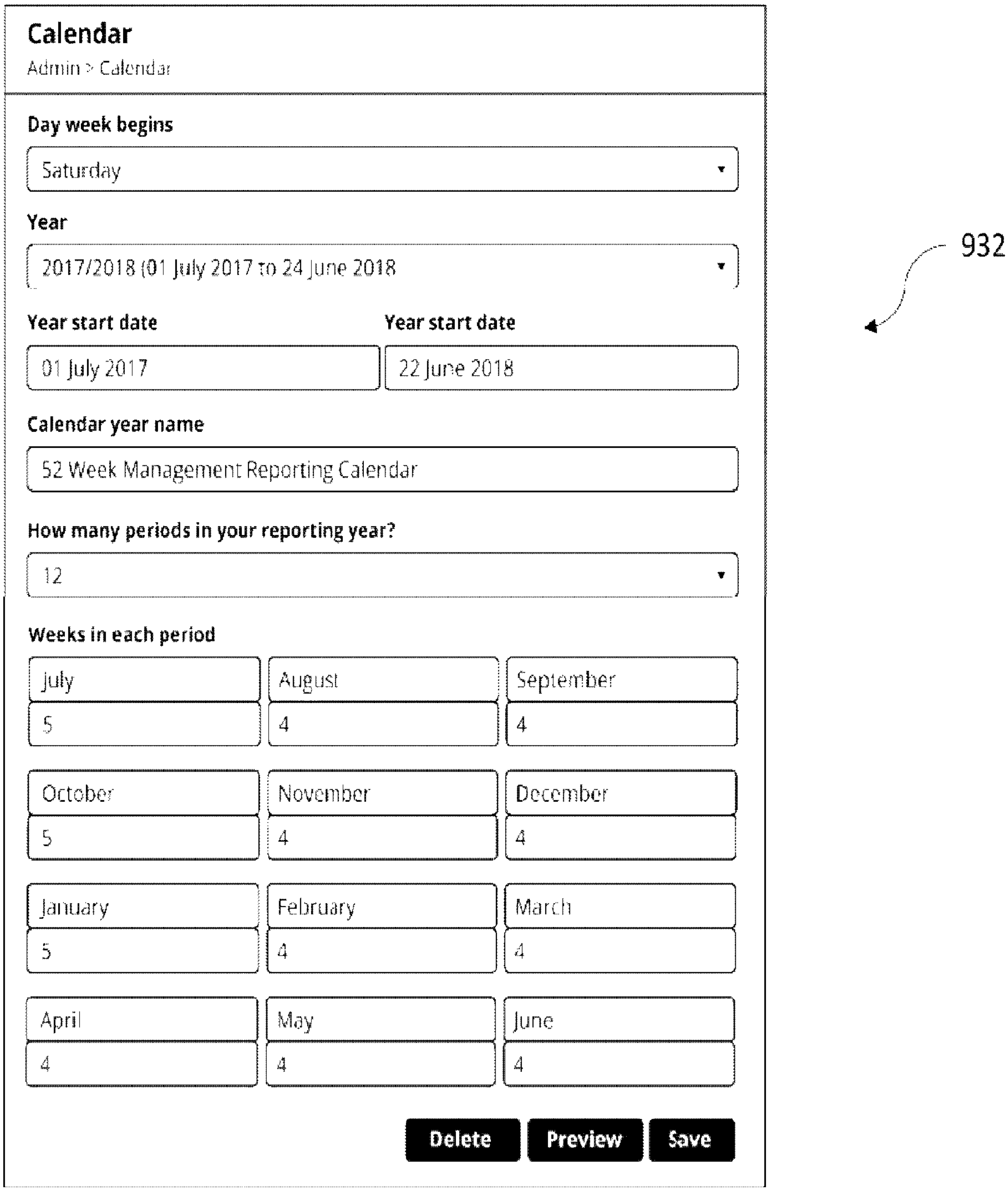

In one embodiment, the computer system allows the venue operator to define customised and non-standard financial and reporting calendar in accordance with the constraints in FIG. 9*h* generally shown at 932. The outcome of the constraints set in FIG. 9*h* are shown in FIG. 9*i* at 934.

Figure 10A:
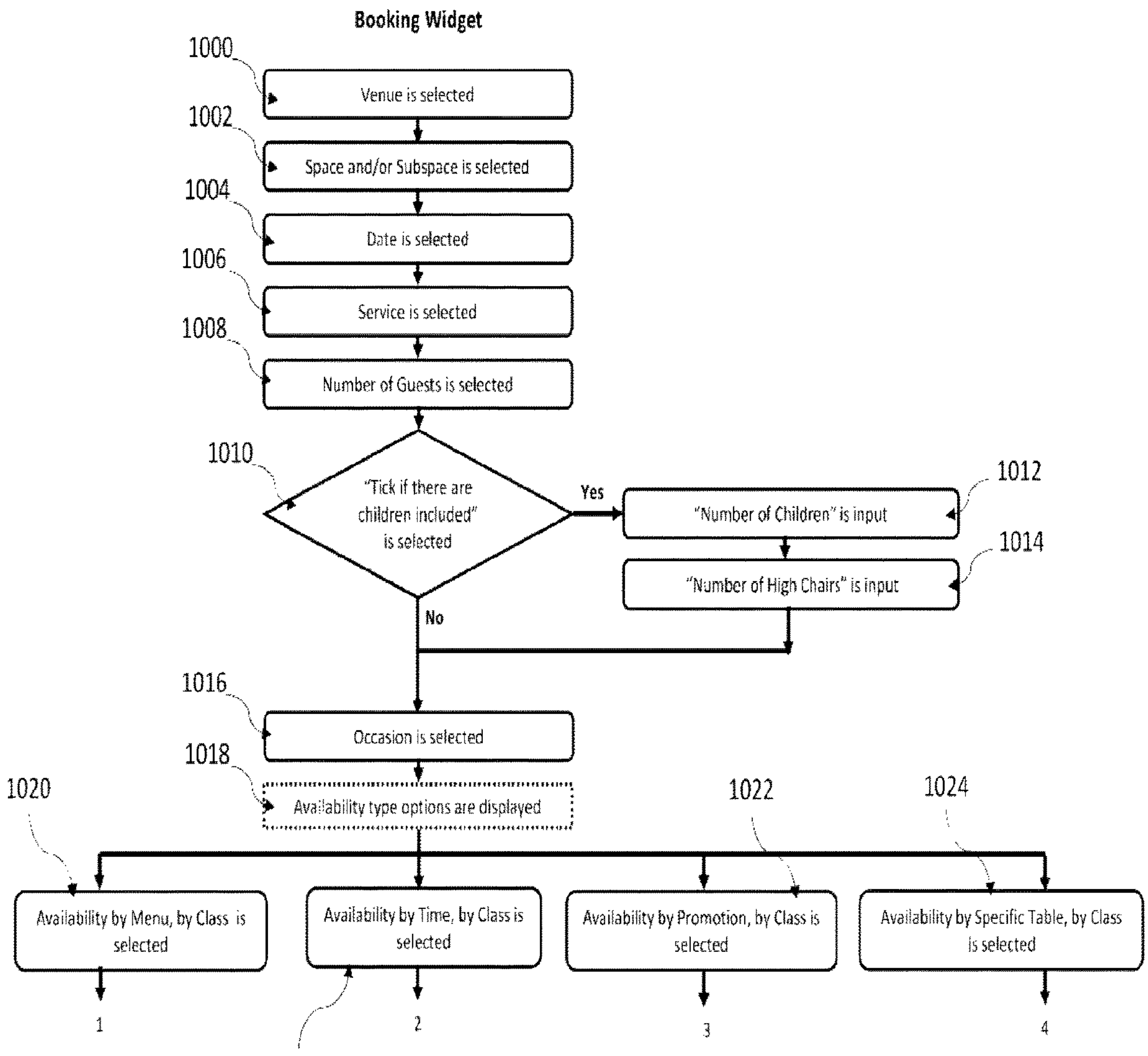
FIGS. 10*a* to 10*f* are flowcharts illustrating a computer enabled process flow and interaction of the booking widget and/or app of the booking process in accordance with an embodiment of the invention.

Referring now to FIG. 10*a*, there is shown a flowchart illustrating a process flow for a widget arranged to operate with an embodiment of the invention. At step 1000, a venue is selected, and subsequently at step 1002 a space and/or sup-space is selected. At step 1004, a date is selected. At step 1006, a service is selected and the number of guests is selected at step 1008. At step 1010, an option to include children in the booking may be selected, and if so, the process proceeds to step 1012, where the number of children is input, and step 1014 where the number of high chairs required is inputted. Consequently, the method moves to step 1016, where the type of occasion is selected, and the availability of type options is displayed at step 1018. The availability of type options displayed in accordance with the embodiment is one of four options.

Figure 10B:
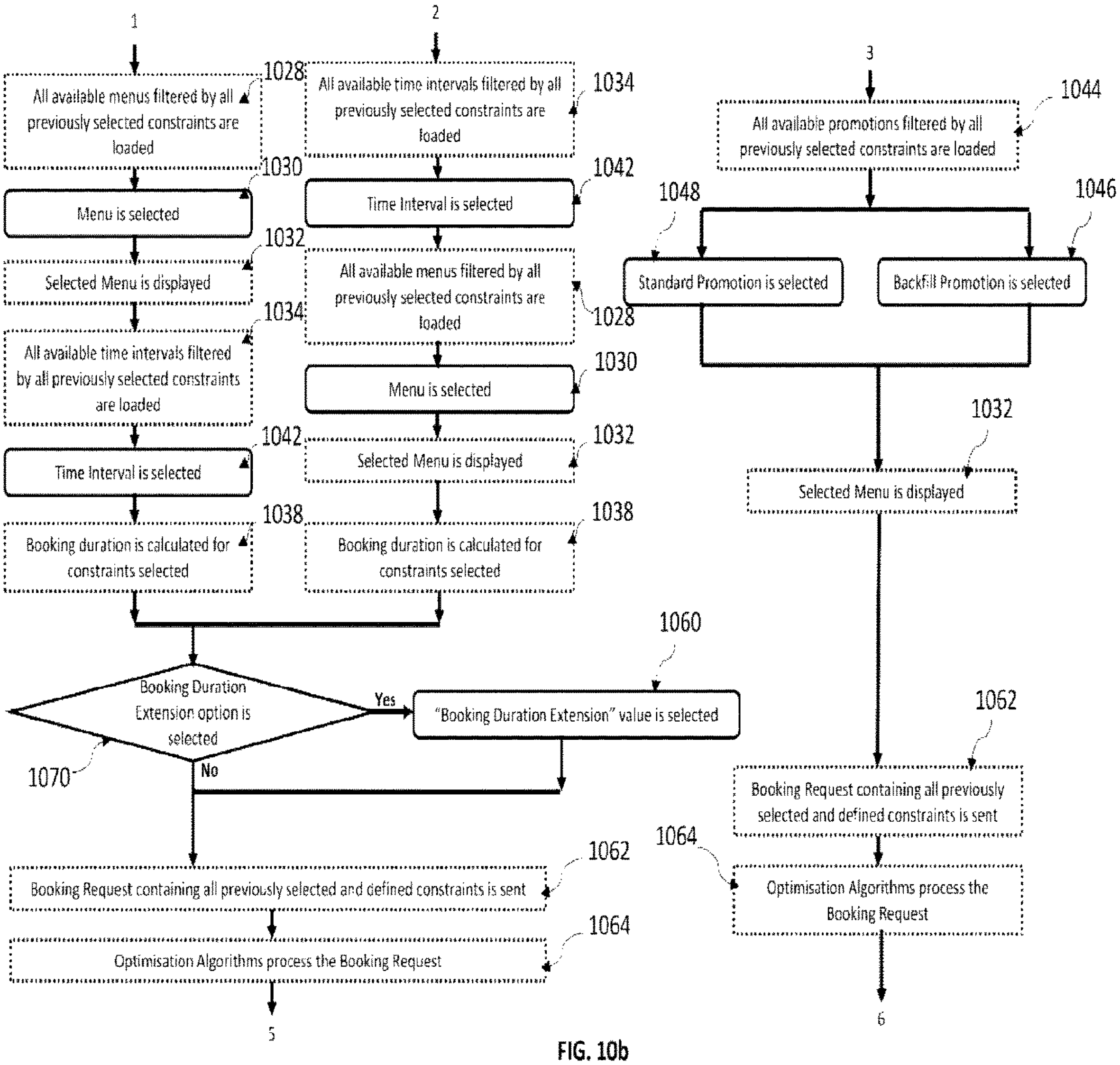

Firstly, availability by menu and class is shown at step 1020 and is described in more detail in FIG. 10*b*.

Secondly, availability by time by class is shown at step 1026 and is described in more detail with reference to FIG. 10*b*.

Thirdly, availability by promotion by class is shown at step 1022 and is described in more detail with reference to FIG. 10*b*.

Fourthly, availability by specific table by class is shown at step 1024 and is described in more detail with reference to FIG. 10*c*.

Turning to FIG. 10*b*, there is shown a continuation of a flowchart illustrating a process flow for a widget arranged to operate with an embodiment of the invention. Following from step 1020 of FIG. 10*a*, all available menus are filtered by previously selected constraints are loaded at 1028, the requestor selects a menu at step 1030 and the menu is displayed at 1032. Dependent on the menus selected, all available time intervals are filtered at step 1034, utilising all previously elected constraints. The requestor selects a time interval at 1042, and a booking duration is calculated for the selected constraints at 1038. The requestor must then decide whether to select the booking duration extension option at 1070. If not, the booking request containing all previously elected and defined constraints is sent to the allocation module at step 1062 and the optimisation algorithm processes the booking request at 1064.

Alternatively, following from step 1026 of FIG. 10*a*, all available time intervals (time periods for a booking) are filtered by previously selected constraints are loaded at 1034 and the requestor selects a time interval at step 1042. Dependent on the time interval selected, all available menus are filtered at step 1028, utilising all previously elected constraints. The requestor selects a menu at 1030, and the selected menu is displayed at 1032. A booking duration is calculated for the selected constraints at 1038. The requestor must then decide whether to select the booking duration extension option at 1070. If not, the booking request containing all previously elected and defined constraints is sent to the allocation module at step 1062 and the optimisation algorithm processes the booking request at 1064.

Alternatively, following from step 1022 in FIG. 10*a*, all available promotions are filtered according to previously selected constraints and are displayed to the requestor at step 1044. The requestor may select a standard promotion 1048 or a backfill promotion 1046, depending on the availability of either option. Irrespective of which promotion is chosen, an associated menu is displayed at step 1032 and the booking request containing all previously elected and defined constraints is sent to the allocation module at step 1062 and the optimisation algorithm processes the booking request at 1064.

Figure 10C:
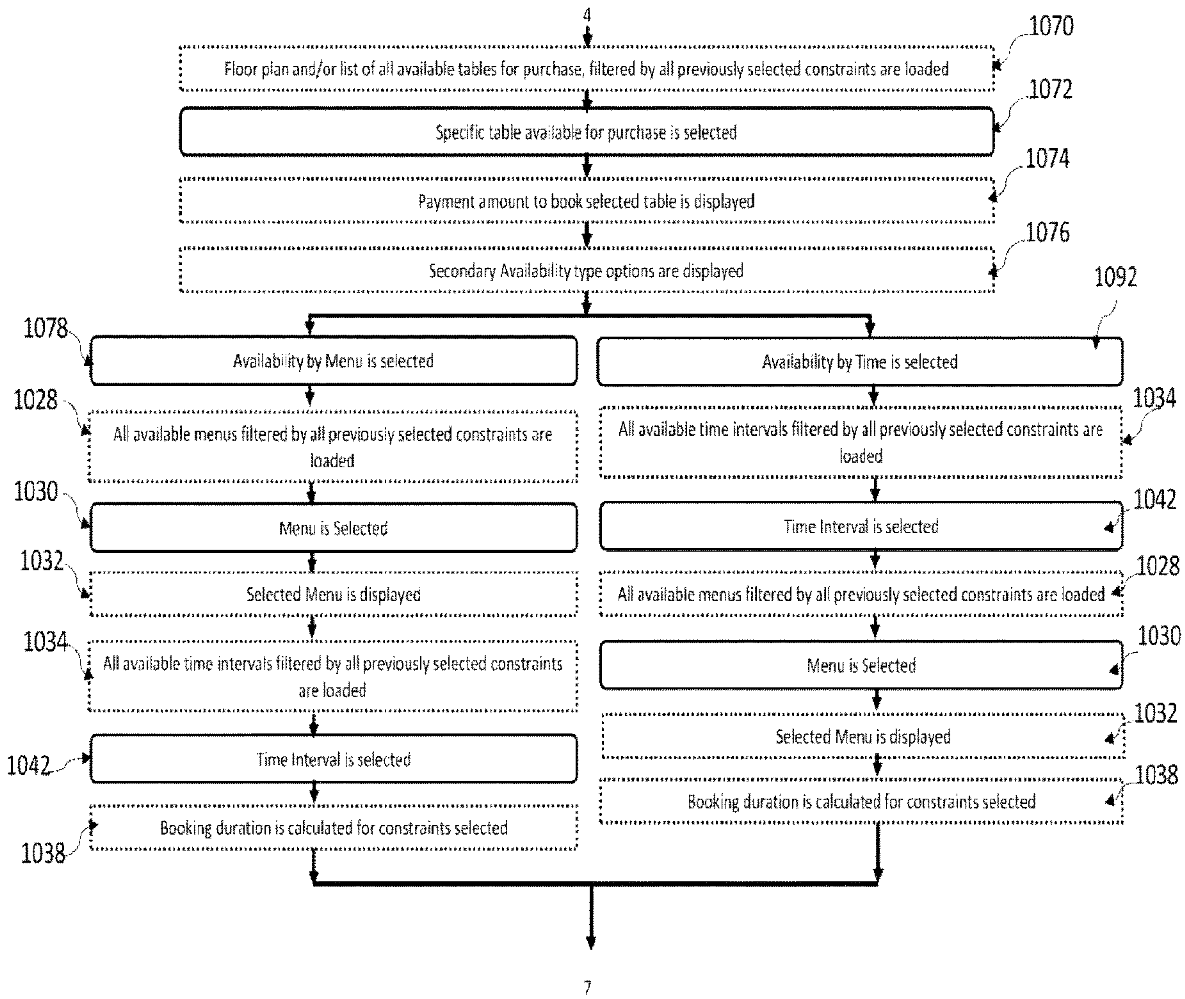

Referring to FIG. 10*c*, there is shown a continuation of the flowchart of FIG. 10*a* illustrating a process flow for a widget arranged to operate with an embodiment of the invention. Following from step 1024 in FIG. 10*a*, a floor plan illustrating all available tables, filtered by the previously selected constraints is loaded at step 1070. The requestor selects a table at step 1072, a payment amount is displayed at step 1074 and secondary availability options are also displayed at step 1076. The requestor may select a specific table and firstly select availability based on menu 1078 or by time at step 1092.

If the requestor chooses step 1078, then all available menus are filtered at step 1028, utilising all previously elected constraints. The requestor selects a menu at 1030, and the selected menu is displayed at 1032. Available time intervals are loaded 1034 and requestor selects a time interval 1042. A booking duration is calculated for the selected constraints at 1038.

If the requestor chooses step 1092, then all available time intervals are filtered at step 1034, utilising all previously elected constraints. The requestor selects a time interval at 1042, all available menus are filtered at step 1028, utilising all previously elected constraints. The requestor selects a menu at 1030, and the selected menu is displayed at 1032. A booking duration is calculated for the selected constraints at 1038.

Figure 10D:
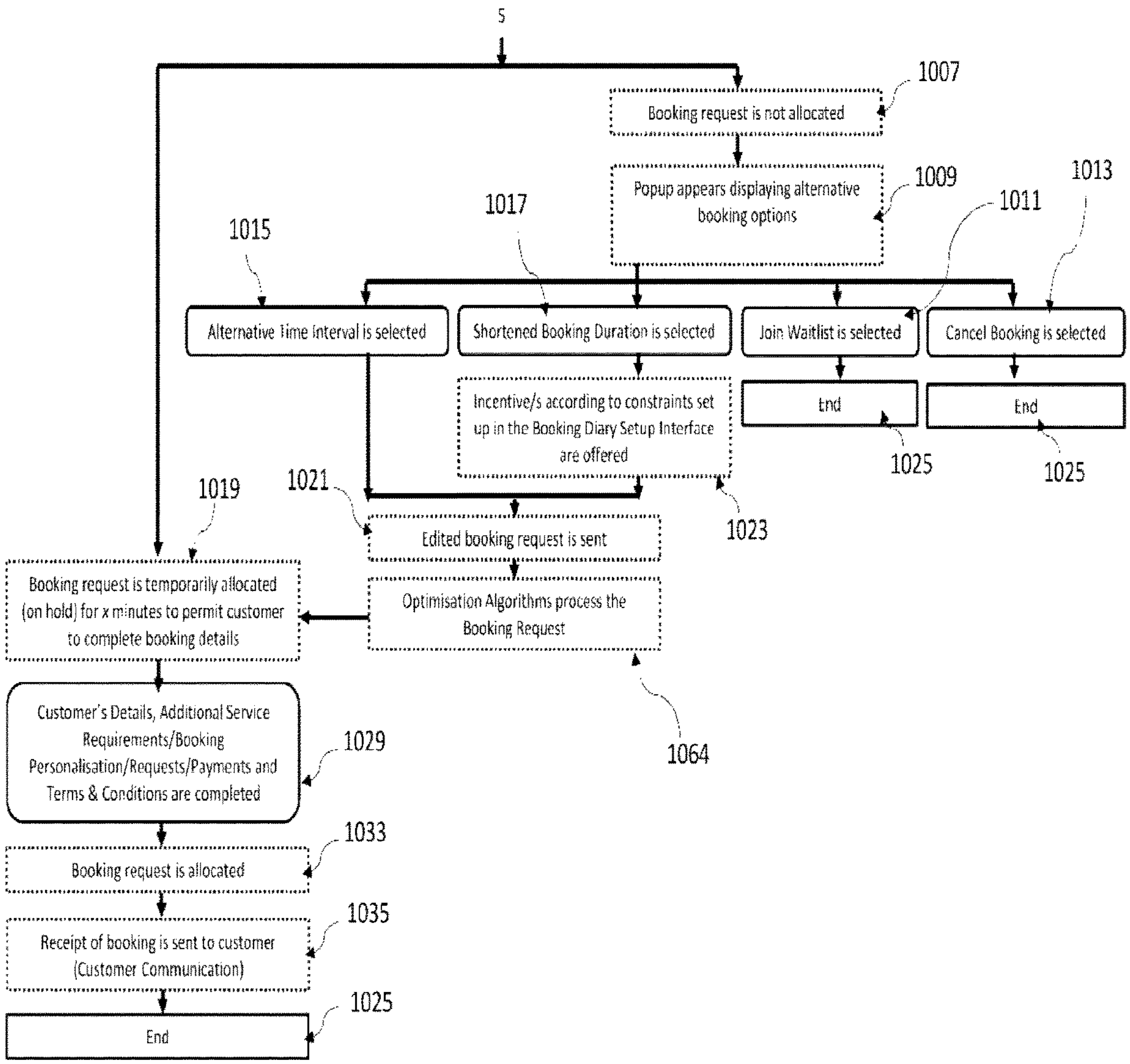

Referring to FIG. 10*d*, there is shown a continuation of the flowchart of FIG. 10*b* illustrating a process flow for a widget arranged to operate with an embodiment of the invention. The requestor may hold the booking request temporarily at step 1019 or the booking request may not be allocated at step 1007.

If the booking request is held temporarily, the requestor (customer) details and/or additional information are captured (either by the requestor entering information or autonomously from a customer database) at step 1029, the booking request is allocated at step 1033 and receipt of the booking is sent to the customer at step 1035 after which the process ends at step 1025.

Alternatively, following on from the booking not being allocated at step 1007, a popup will appear, displaying alternative booking options to the requestor at step 1009. The alternatives may be an alternative time interval at step 1015, a shortened booking duration at 1017, the ability to join a waitlist at 1011 or a cancellation of the booking request at step 1013. If the alternative time offered at step 1015 is accepted, the edited booking request is sent to the allocation module at step 1021 and at step 1064 the optimisation algorithm processes the booking request. Thereafter, the requestor may hold the booking request temporarily at step 1019. The requestor (customer) details and/or additional information are subsequently captured (either by the requestor entering information or autonomously from a customer database) at step 1029, the booking request is allocated at step 1033 and receipt of the booking is sent to the customer at step 1035 after which the process ends at step 1025.

If the shortened booking duration at step 1017 is chosen, incentives may be offered at step 1023 in order to induce the requestor to accept the booking. Thereafter, the edited booking request is sent to the allocation module at step 1021 and at step 1064 the optimisation algorithm processes the booking request. Thereafter, the requestor may hold the booking request temporarily at step 1019. The requestor (customer) details and/or additional information are subsequently captured (either by the requestor entering information or autonomously from a customer database) at step 1029, the booking request is allocated at step 1033 and receipt of the booking is sent to the customer at step 1035 after which the process ends at step 1025.

If the requestor either joins the waitlist at 1011 or cancels the booking request the process ends at step 1025.

Figure 10E:
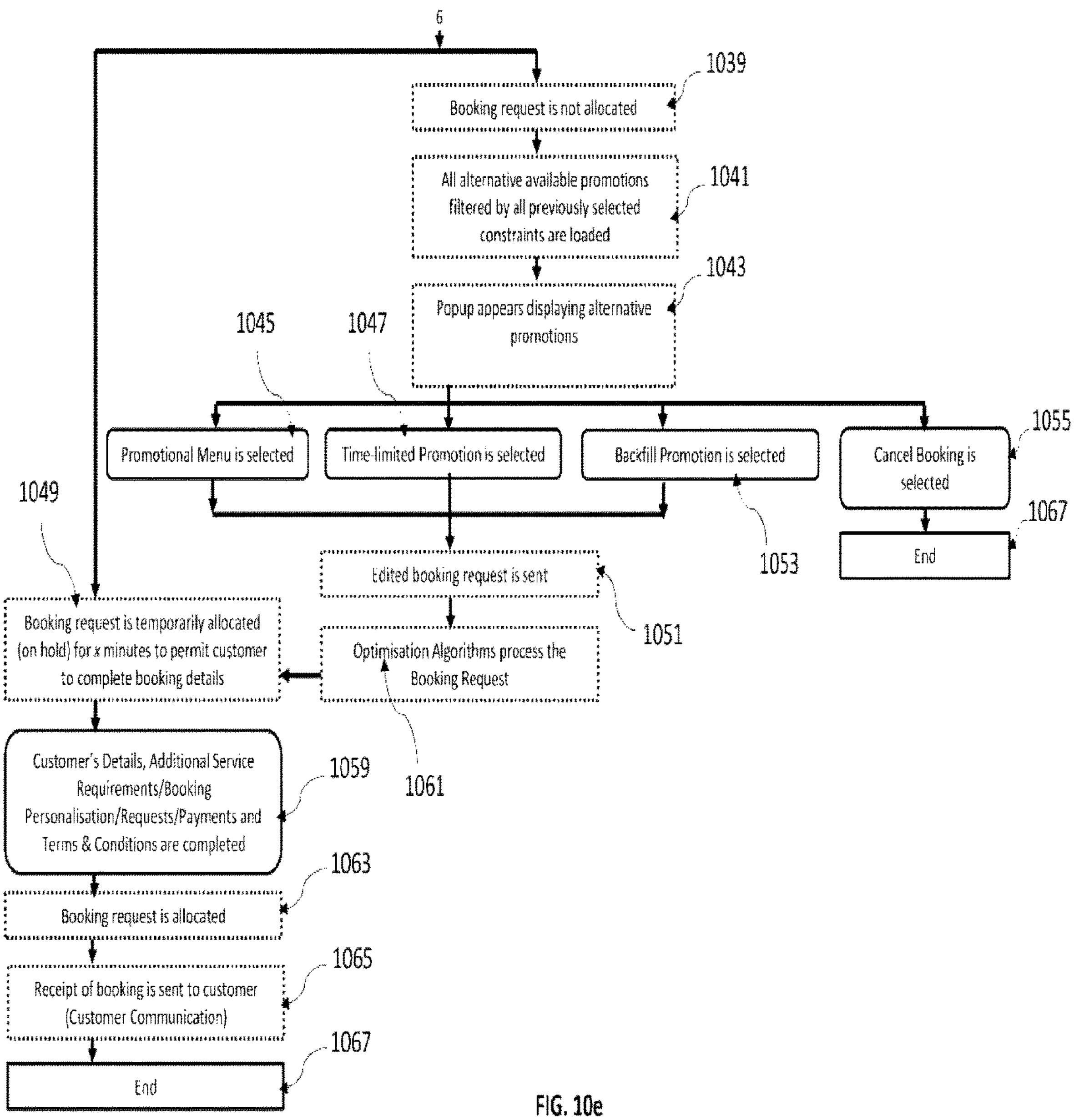

Referring to FIG. 10*e*, there is shown a continuation of the flowchart of FIG. 10*b* illustrating a process flow for a widget arranged to operate with an embodiment of the invention. Once the optimisation algorithm has processed the booking request at 1064 of FIG. 10*b*, the requestor may hold the booking request temporarily at step 1049 or the booking request may not be allocated at step 1039.

If the booking request is held temporarily, the requestor (customer) details and/or additional information are captured (either by the requestor entering information or autonomously from a customer database) at step 1059, the booking request is allocated at step 1063 and receipt of the booking is sent to the customer at step 1065 after which the process ends at step 1067.

Alternatively, following on from the booking not being allocated at step 1039, all alternative promotions available to the requestor are filtered according to constraint information at step 1041 and displayed at step 1043. The alternatives may be an alternative menu at step 1045, a time limited promotion at step 1047, a backfill promotion at 1053 or a cancellation of the booking request at step 1055. If the alternative menu at step 1045 is accepted, the edited booking request is sent to the allocation module at step 1051 and at step 1061 the optimisation algorithm processes the booking request. Thereafter, the requestor may hold the booking request temporarily at step 1049. The requestor (customer) details and/or additional information are subsequently captured (either by the requestor entering information or autonomously from a customer database) at step 1059, the booking request is allocated at step 1063 and receipt of the booking is sent to the customer at step 1065 after which the process ends at step 1067.

If the time limited promotion at step 1047 is chosen, the edited booking request is sent to the allocation module at step 1051 and at step 1061 the optimisation algorithm processes the booking request. Thereafter, the requestor may hold the booking request temporarily at step 1049. The requestor (customer) details and/or additional information are subsequently captured (either by the requestor entering information or autonomously from a customer database) at step 1059, the booking request is allocated at step 1063 and receipt of the booking is sent to the customer at step 1065 after which the process ends at step 1067.

If the backfill promotion at step 1053 is chosen, the edited booking request is sent to the allocation module at step 1051 and at step 1061 the optimisation algorithm processes the booking request. Thereafter, the requestor may hold the booking request temporarily at step 1049. The requestor (customer) details and/or additional information are subsequently captured (either by the requestor entering information or autonomously from a customer database) at step 1059, the booking request is allocated at step 1063 and receipt of the booking is sent to the customer at step 1065 after which the process ends at step 1067.

If the requestor cancels the booking request at step 1055 the process ends at step 1067.

Figure 10F:
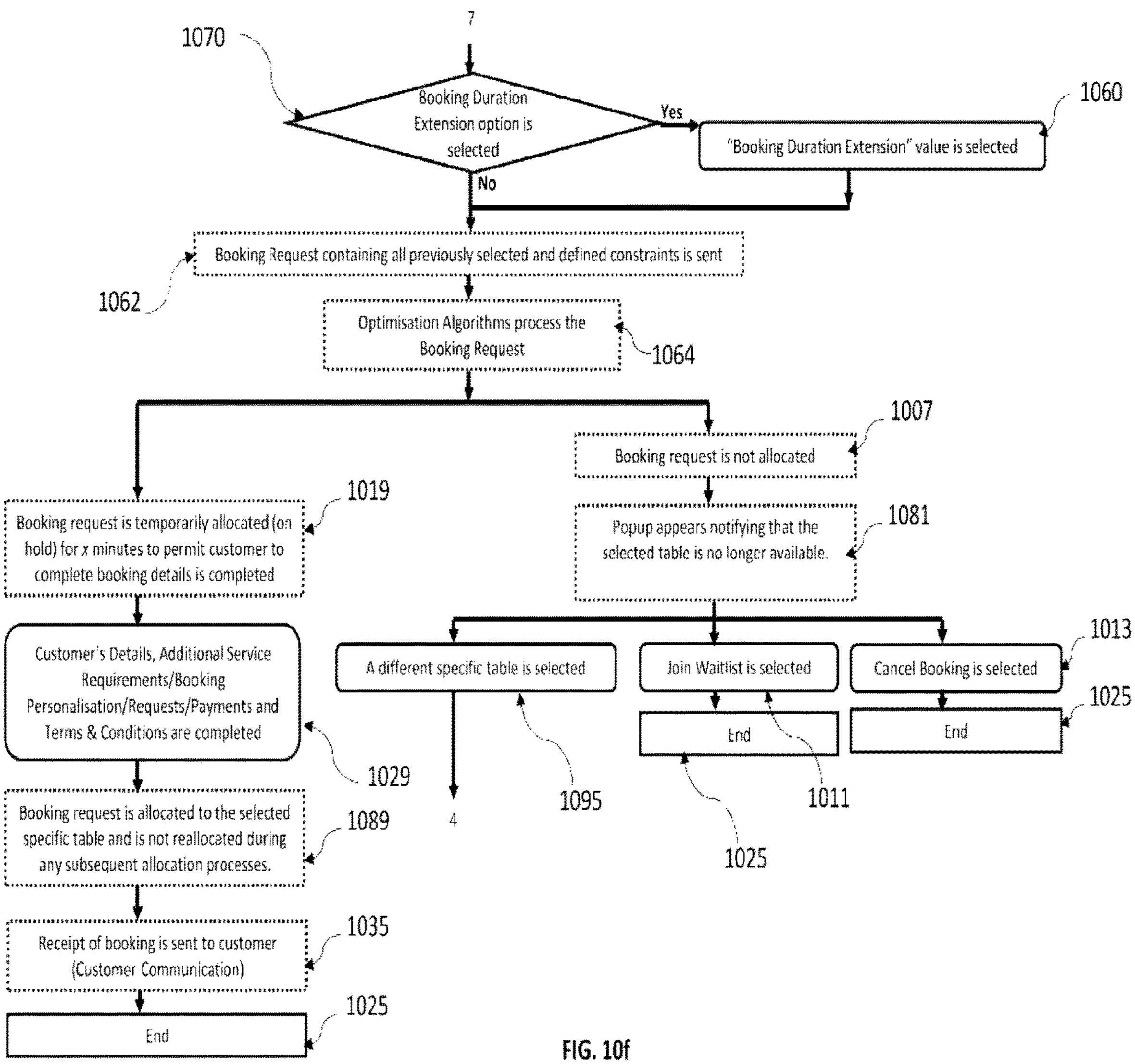

Referring to FIG. 10*f*, there is shown a continuation of a flowchart illustrating a continuation of the process flow from FIG. 10*c* for a widget arranged to operate with an embodiment of the invention. The requestor may select the booking duration extension option at step 1070. If so, the booking duration extension value is selected at step 1060 and the process continues to step 1062. If not, the process continues directly to step 1062.

At step 1062, the booking step containing all constraints is sent at step to the allocation module, and the optimisation algorithms process the booking request at step 1064. The booking request is either be held temporarily at step 1019 or not allocated at step 1007.

If the booking request is held temporarily, the requestor (customer) details and/or additional information are captured (either by the requestor entering information or autonomously from a customer database) at step 1029, the booking request is allocated permanently (i.e. cannot be altered by the algorithm in a future reallocation) at step 1089 and receipt of the booking is sent to the customer at step 1035 after which the process ends at step 1025.

Alternatively, following on from the booking not being allocated at step 1007, a popup will appear, stating that the requested table is not available at step 1081. The requestor can then request an alternative table at step 1095, in which case the process will loop back to process line 4 of FIG. 10*c*.

Alternatively, the requestor either joins the waitlist at 1011 or cancels the booking request at step 1013 and in both cases, the process ends at step 1025.

Figure 11A:
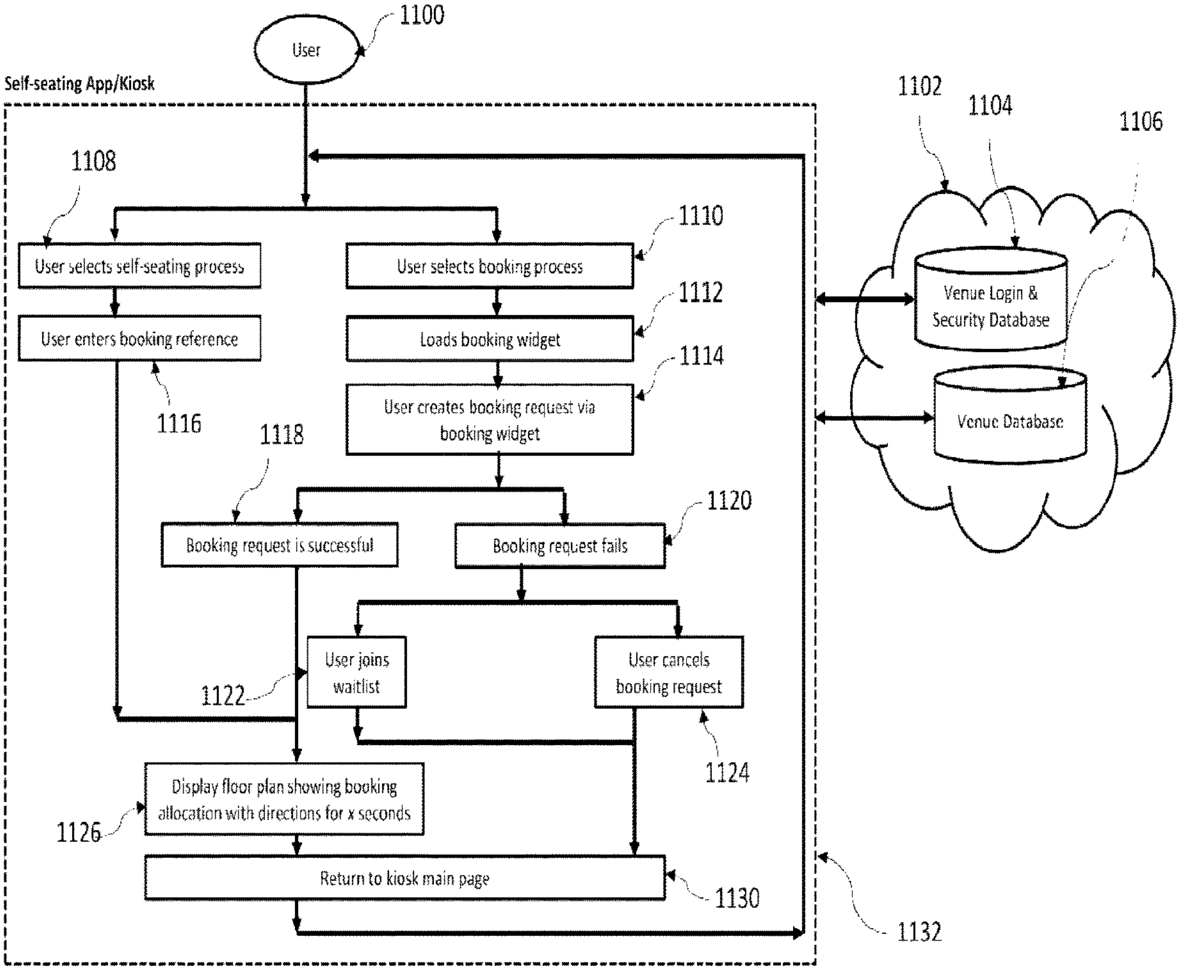
FIGS. 11*a* and 11*b* are flowcharts illustrating a computer enabled method of the self-seating process in accordance with an embodiment of the invention.

Referring to FIG. 11*a*, there is shown a process flow of a self-seating app 1132 interacting with a system in accordance with an embodiment of the invention. The app 1132 interacts with the ResButler system via the venue login database 1104 and the venue database 1106 in a remote computing system (generically referred to as the cloud 1102). A booking requestor (user 1100) can either select a self-seating process 1108 or a booking process 1110.

If the user selects the self-seating process the user enters a reference value for identification purposes at 1116 and a floor plan is displayed at 1126, after which a user may choose to return to the entry point at step 1130 at any time convenient to the user.

If the user selects the booking process at step 1110, the app loads a booking widget 1112 and the user can then create a booking at step 1114 (in accordance with the general process flows shown at FIGS. 10*a*-10*f*). If the booking request is successful at step 1118 the user proceeds to step 1126 at which time a floor plan is displayed at 1126, after which a user may choose to return to the entry point at step 1130 at any time convenient to the user.

If the booking request fails at step 1120 the user can either elect to join a waitlist at step 1122 or cancel the booking request at step 1124, after which a user may choose to return to the entry point at step 1130 at any time convenient to the user.

Figure 11B:
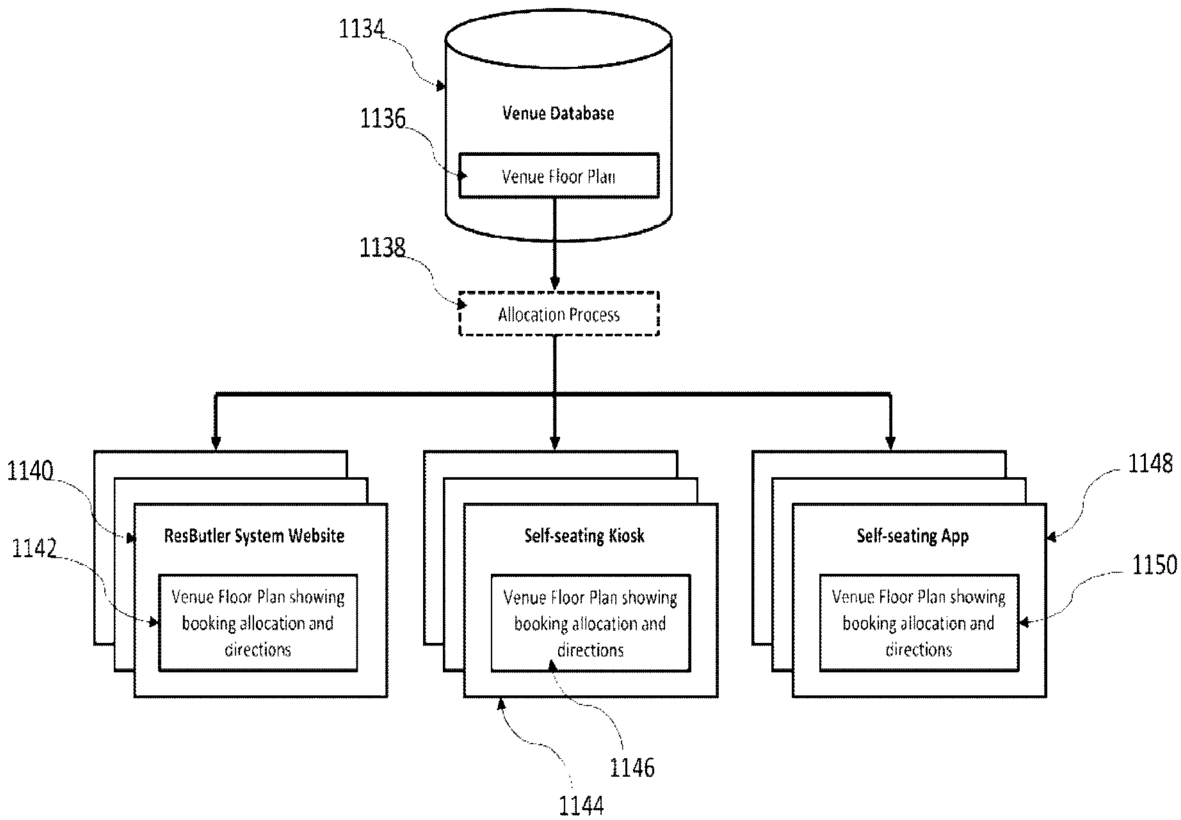

Referring to FIG. 11*b*, there is shown an architecture diagram of the system in accordance with an embodiment, as related to the relationship between the venue database 1134 and the website 1140, kiosk 1144 and self-seating app 1148. The general venue floor plan 1136, via the allocation process 1138, is communicated to website 1140, kiosk 1144 and app 1148, and respectively displayed on each device (1142, 1146 and 1150 respectively).

Figure 12A:
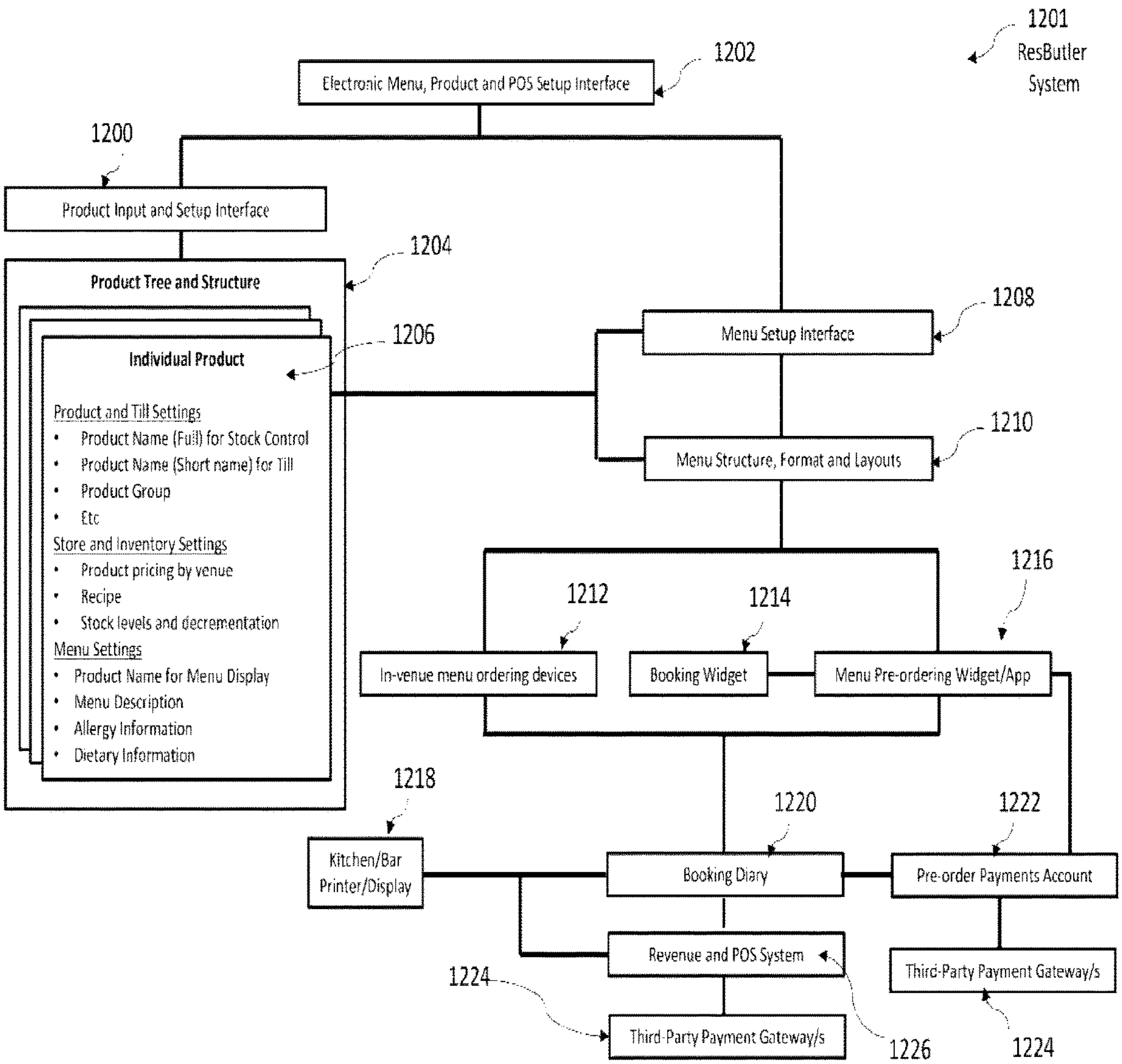
FIG. 12*a* is a flowchart illustrating a diagrammatic representation of a system in accordance with an embodiment of the invention.

Referring to FIG. 12*a*, there is shown an architecture diagram illustrating aspects of a product tree structure utilised in the allocation and yield determination algorithm in accordance with an embodiment of the invention. An aspect of the ResButler system 1201 is the product tree structure and associated logic which is arranged to determine yield and allocation. It is accessed via a user interface 1202, which includes a product input and set up interface 1200 which is arranged to modify information in the product tree and structure 1204, which includes a plurality of individual products 1206. The interface 1202 also allows access to a menu setup interface 1208 which includes a menu structure, format and layout section 1210, which allows for the desired display of menus on in-venue ordering devices 1212, the booking widget 1214 and the menu pre-ordering widget 1216. Each of devices 1212, 1214 and 1216 are also in communication with a kitchen/bar display 1218, a booking diary 1220 (which in turn is in communication with a revenue and POS system 1226 and a third-party payment gateway 1224. The pre-ordering app 1216 is also in communication with a pre-order payments account 1222 and a third-party payment gateway 1224.

Figure 12B:
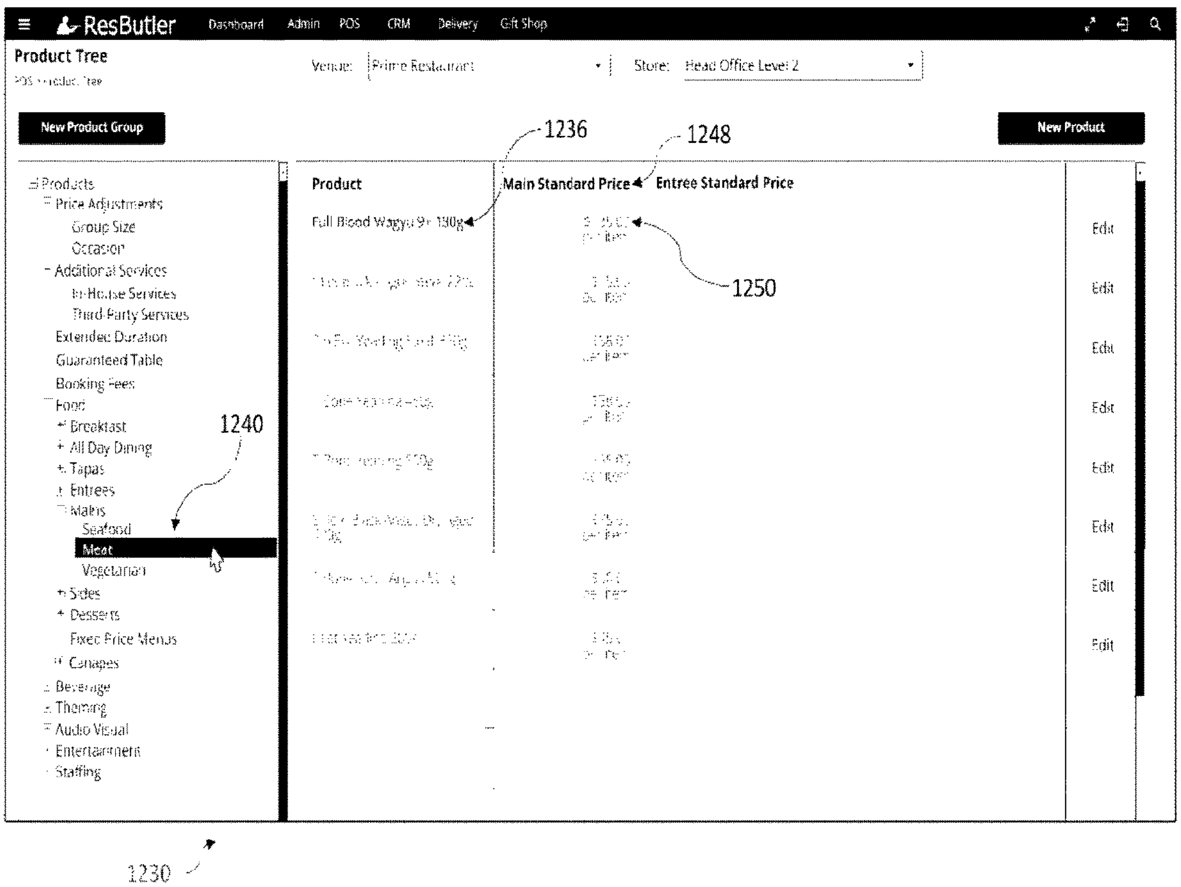
FIGS. 12*b* to 12*d* are screenshots illustrating the product tree and product set-ups in accordance with an embodiment of the invention.

Referring to FIG. 12*b*, there is shown an example screen of a listing of products, specifically a "leaf" 1240 of a branch of the tree representing a specific product group. The Product information includes a product name 1236, a listing of prices 1248, and a specific price 1250.

Figure 12C:
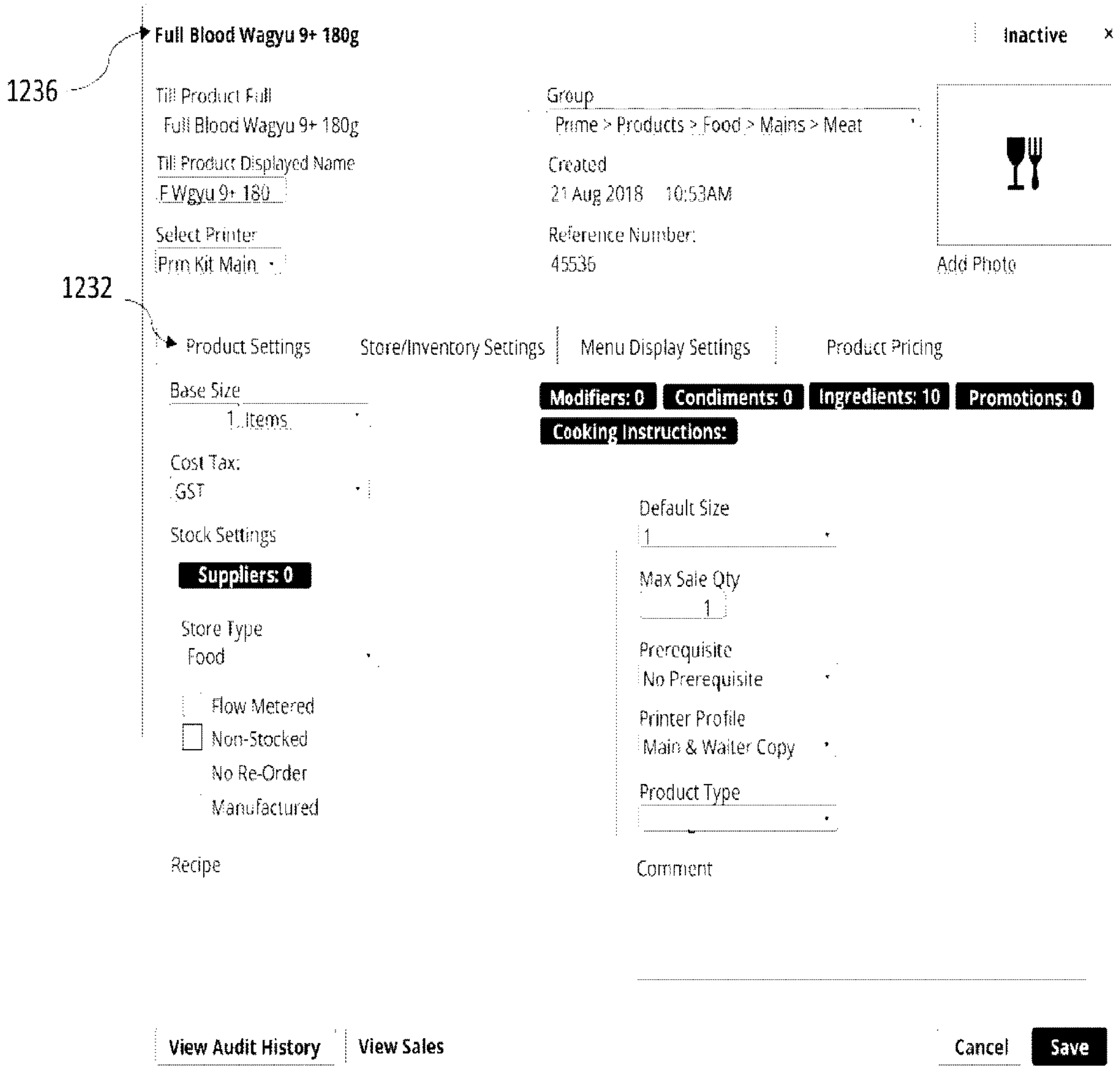

Referring to FIG. 12*c*, there is shown, in more detail, the product 1236 of FIG. 12*b*. The product includes a number of information items 1232, which allow the product to be costed and to be reordered as required.

Figure 12D:
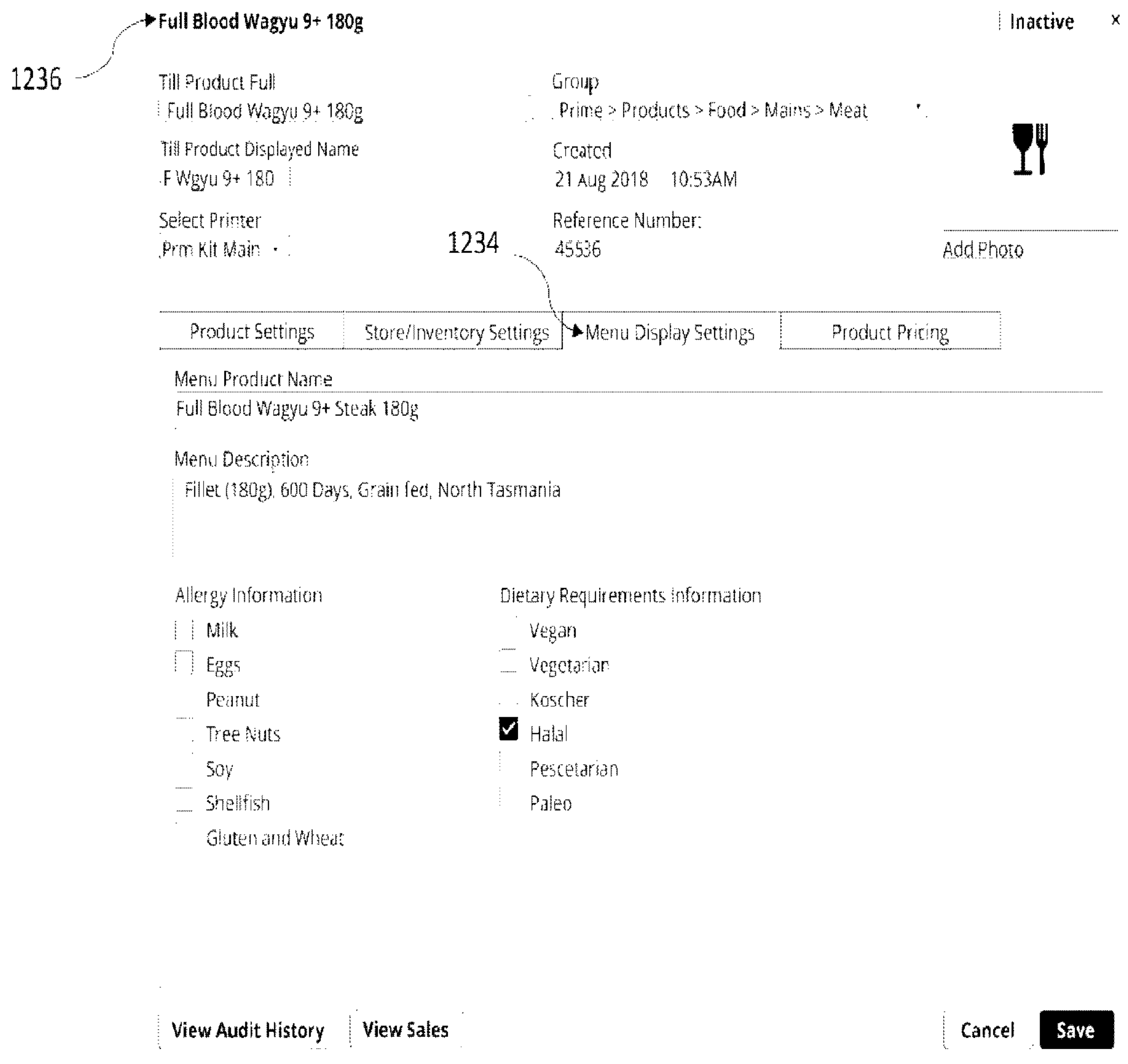

Referring to FIG. 12*d*, there is shown in more detail, the product 1236 of FIG. 12*b*. The product includes a number of menu display settings 1234, which allow the product to be displayed on a menu in the manner desired.

Figure 12E:
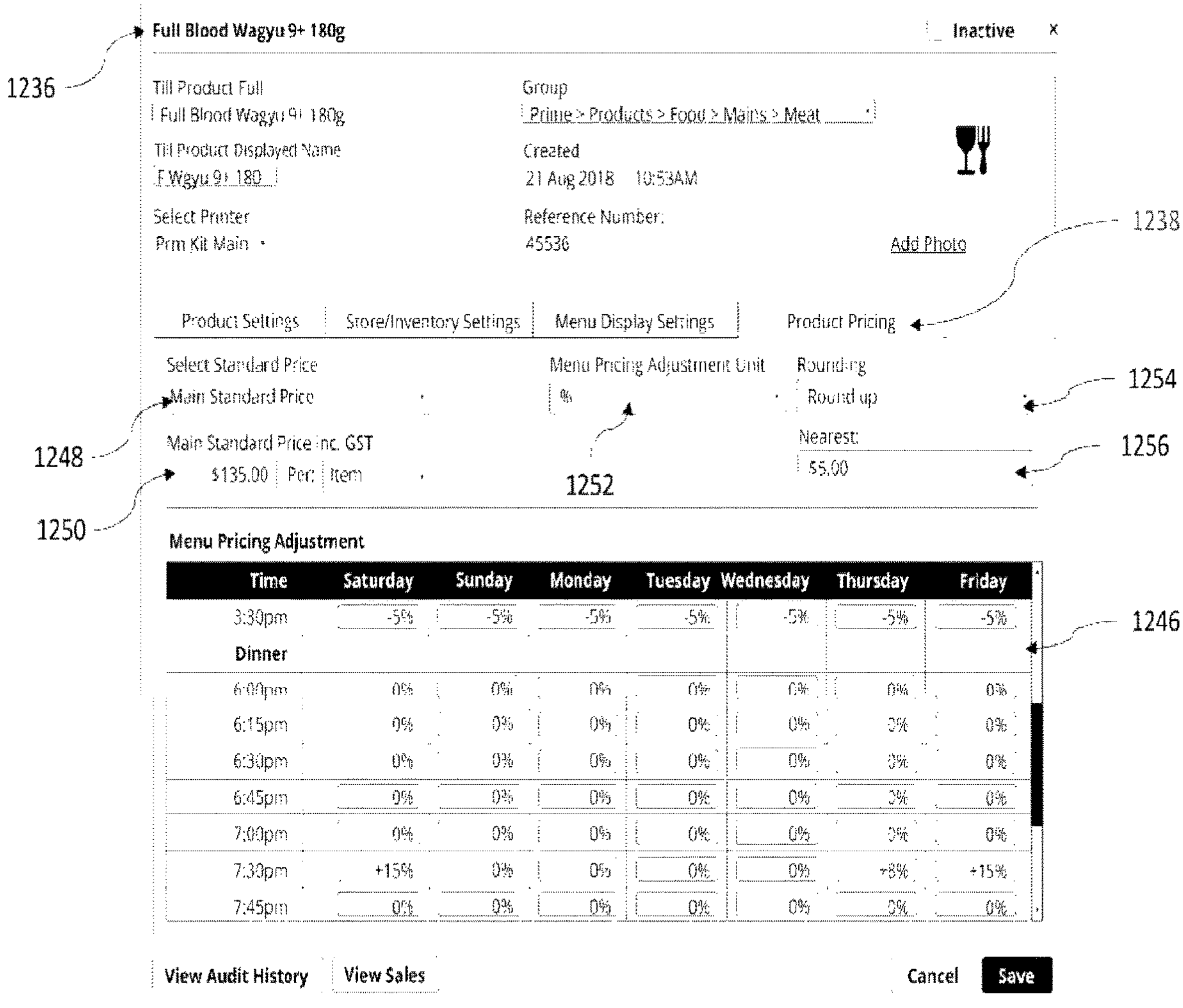

Referring to FIG. 12*e*, there is shown there is shown an input screen for constraint information relevant to a specific product. Menu item (1236) can be associated with a price structure 1248, including a specific price 1250, or a percentage adjustment 1252 from the pricing structure 1262. There may also be provided other options such as the ability to round a figure to a nearest whole dollar amount (1254 and 1256) and the ability to adjust prices dependent on a particular day of the week and time of the day (service period) by amending the values in table 1246.

Figure 12F:
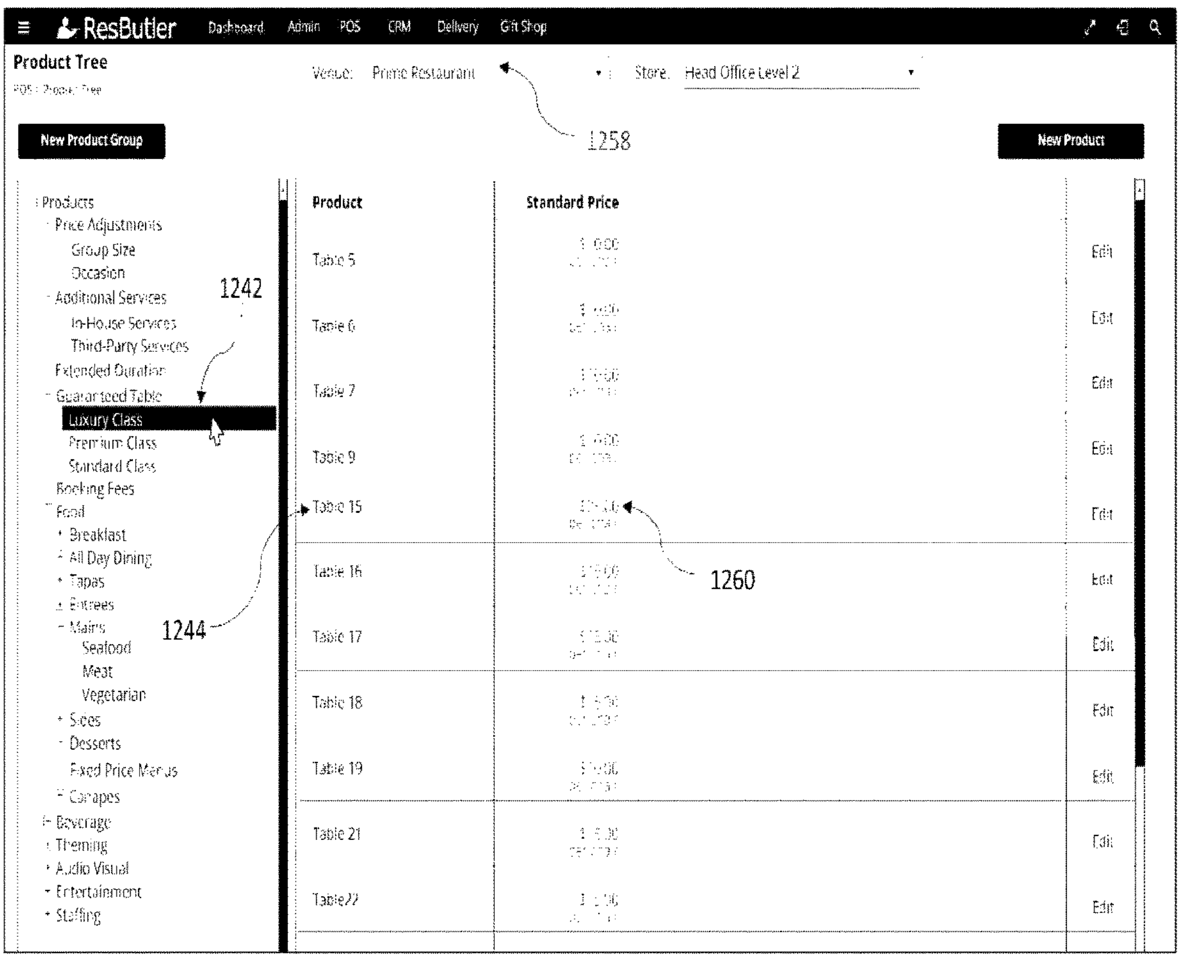

Referring to FIG. 12*f*, there is shown there is shown an example screen of a listing of tables in a class, specifically a "leaf" 1242 of a branch of the tree representing a specific table. The table information includes a description 1244 and a specific price 1260.

Figure 12G:
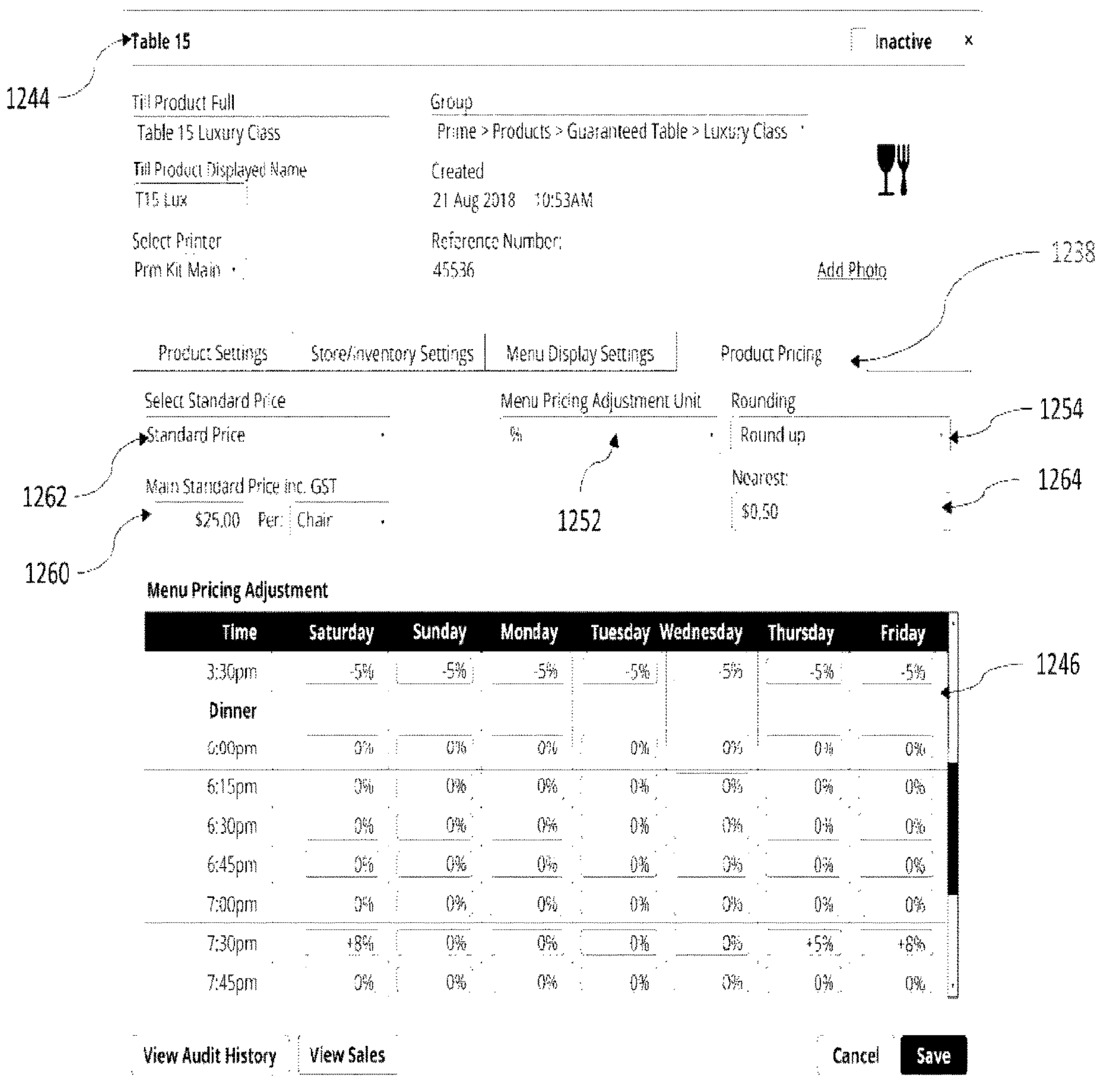

Referring to FIG. 12*g*, there is shown an input screen for constraint information relevant to a specific table. Table 15 (1244) can be associated with a price structure 1262, including a specific amount spend per chair 1260, or a percentage adjustment 1252 from the pricing structure 1262. There may also be provided other options such as the ability to round a figure to a nearest whole dollar amount (1254 and 1264) and the ability to adjust prices dependent on a particular day of the week and time of the day (service period) by amending the values in table 1246.

Advantages

The embodiment and broader invention described herein provides a number of advantages.

Firstly, the embodiment provides an optimised space allocation instruction set to a user associated with a venue. For example, if the venue is a restaurant, currently the space allocation and arrangement of tables within the space of the venue is currently performed by the restaurant staff, manager or maitre d'. Given the number of possible arrangements and permutations that are possible in a venue with multiple spaces and multiple tables, which can be arranged in multiple ways, any arrangement that is performed "manually" (i.e. a person decides how to arrange the tables) is statistically very likely to be sub-optimal, particularly since the number and size of bookings that will be received (or the time/order/rate at which they will be received) for a service period cannot be known precisely until a short time before the service time. Generally, any arrangement of the venue is based on the experience or preference of the person performing the space allocation and arrangement of tables, and is therefore solely dependent on the experience, knowledge, ingenuity and interest of the person performing the space allocation. Therefore, the computer system of the present invention provides a new, mathematically and logically rigorous means of optimising the use of a venue.

Furthermore, the embodiment also provides additional advantages as the optimisation of the use of the venue can be modified to maximise certain desired outcomes. For example, the rules of the iterative allocation process can be varied to maximise the number of bookings to maximise profits. Alternatively, the iterative allocation process in accordance with the embodiment can be varied to increase customer experience by allocating a specific use of space at a requestor's request or ensuring that the arrangement of space is optimal for user atmosphere and experience. As will be appreciated, the computer system in the present invention provides for a greater level of control over any individual variable or group of variables regarding the operation of the venue and such control is not possible without the ability to allocate bookings in an intelligent manner.

Moreover, as the optimised space allocation instruction sets and user data is retained in the database, the embodiment provides a further means to optimise the operation of the venue by retrospective data analysis. The prediction module disclosed in the present specification is capable of predicting the allocation of space within the venue based on past optimised space allocation instruction sets for the period of time under analysis.

The embodiment also provides an advantage over known online reservation systems, in that the embodiment can engage in a process of negotiation with the booking requestor to generate an allocated booking that balances the constraints of the booking requestor and the venue. In prior art systems, there no opportunity for the reservation system to interact with the booking requestor.

For example, for a venue utilising the invention, the venue has the ability to offer special deals or propose alternate requests in the event that a booking request cannot be accommodated at first instance. Therefore, the embodiment provides a fundamental and crucial advantage over the prior art by enabling a direct two-way connection between the venue and the booking requestor, in a manner that does not require any "manual" intervention by venue staff or management. Furthermore, as disclosed above, the embodiment is capable of determining effective incentives or additional elements that may be added to enhance the use of the space and present the incentives to a booking requestor in an autonomous manner. As a corollary, the incentives are not "pre-programmed"—that is, the embodiment does not merely select from a list of incentives in a sequential manner. Rather, the incentives are generated "on the fly" in response to a number of inputs, including but not limited to the venue constraint information and the requestor constraint information. In a technical sense, the embodiment acts as an intelligent agent, autonomously determining incentives that operate to balance and maximise both the utility of the booking requestor and the yield of the venue.

From another perspective, the embodiment described herein provides a user interface that permits a sophisticated and directed interaction between the embodiment, acting as an intelligent agent for the venue, and the booking requestor, to accommodate a booking request in a manner that maximises the interests of the venue and the booking requestor. This advantage is achieved, in part, through the use of an interface that is dynamically adaptive by, in response to venue constraint information and requestor constraint information, with the ability to generate multiple potential solutions utilising different menus, time durations, seats, tables, pricing levels based on different times and durations using dynamic pricing models, different rooms, and packages.

The user interface also permits food and beverage preorders which can be individually paid for by different patrons that comprise a booking request.

In more detail, the use of an algorithm in accordance with an embodiment allows a venue to be flexible in the manner in which to best accommodate the booking request, as distinct from prior art systems, which are only capable of offering a very small number of fixed capacity solutions with regard to the solutions offered to requestors, the solutions being limited by a small number of simplistic constraints, such as the number of bookings received, the size of bookings or the total number of customers that can be accommodated during a booking interval or time during a service period.

In another aspect, the user interface and allocation module use time as a capacity constraint of the venue, which is associated with dynamic pricing as a variable that provides the correct incentive (or disincentive) to cause the booking requestor to choose requestor constraints that strike a balance between the utility sought by the booking requestor, and the yield achieved by the venue.

As a corollary to the previous point, the algorithm eliminates unnecessary gaps between tables and wasted space floor space and allocates bookings by optimising space through an algorithm that reallocates previous bookings to ensure that the most recent booking request is likely to be accepted.

In one particular embodiment, the interface provides an integrated portal via which a booking requestor may personalise their experience within a venue through the concurrent booking of products and services not directly offered by the venue, but which are allowed by the venue. For example, the provision of a bucket of champagne next to table to be opened on arrival, the provision of flowers and a personalised card, a magician to entertain as part of the experience, a specialty cake, and/or a box of chocolates.

The embodiment also advantageously provides a reference number to the booking requestor to allow the booking requestor to alter and complete their booking request at a later time without manual intervention.

The embodiment also advantageously provides the ability to subdivide a space into sub-spaces and sections, to better segment the experiences offered to the booking requestor. Moreover, different classes of seating and menu options may be offered to different classes, with corresponding differential pricing for each of the classes. Moreover, a table ranking system allows for dynamic pricing for particular tables. The ability to atomise the venue and the experience provides, in turn, the ability to allocate higher ranked booking requestors to higher ranked tables (i.e. a "better" allocation) and the ability to provide preferential allocations to VIP customers or give SVIP's a specific preferred table.

The embodiment is capable of offering different menus at different booking times within a service period and for different durations with the ability to charge a premium for bookings that wish to be allocated to a peak period or to stay longer than the allocated time. Correspondingly, the embodiment is capable of offering a discount to booking requestors that occupy a table for a shorter period.

The embodiment also advantageously provides the ability to reallocate bookings within a venue to maximise qualitative outcomes, such as maximising ambience. For example, when a venue is substantially below capacity, allocated bookings may be evenly "spread" throughout the venue to maximise privacy and therefore maximise ambiance and experience.

The embodiment also advantageously provides an ongoing Performance Analysis function, including the calculation of the capacity of the venue as a measure of production time, performance measures such as yield, seat utilisation, and restaurant efficiency, and maintenance of historical plans and layouts for performance reporting and as a future forecasting input.

The embodiment also advantageously links to third party portals or third party websites to determine further venue or requestor constraint information which may have an impact on the allocation of the booking request. This may include, by way of example only, information obtained from external websites regarding the identity of a booking requestor as a potentially influential people that can bring additional benefits to the venue, and should therefore be accorded a "VIP" or "SVIP" status. In an alternate example, forecasting information such as the weather information may be accessed, to allow the system to determine whether an outdoor dining area should be allocated bookings, or whether it should be excluded from the allocation algorithm (for example, if rain is forecast).

The embodiment also allows for resource planning, comparisons and analysis, including the creation of rosters, staffing benchmarks etc., based on how the venue booking profile develops, plus reporting on the forecasted resources versus the actual resources allocated or utilised. This aspect of the embodiment also allows for forecasting bookings, booking patterns and using forecasted bookings and information to be automatically linked to future capacity allocations so as to create a "learning and adaptive system".

The embodiments described herein solve the restaurant capacity problem faced by a restaurant by focusing on the optimisation of the restaurant space available for bookings, rather than the optimisation of a pre-defined list of tables and table combinations, with no functional knowledge of the context in which the tables and table combinations are located.

In one embodiment, the invention, in the optimisation of a venue takes into consideration the scale of all objects within the space and is capable of accounting for any variation in the dimensions of any object (such as a table size or the spacing permitted between tables) "on the fly", thereby adjusting for any impact on the optimisation outcome.

In one embodiment, the invention is arranged to maximise, optimise and/or enhance the space within the venue while also managing the experience of the booking requestor and offering a booking requestor total flexibility in how to tailor their experience.

By comparison, previous systems provide little sophistication and no tangible "decision making" capacity in the manner in which reservation data is collected and used. Furthermore, previous systems create a barrier between the booking requestor and the venue manager.

The information and reporting abilities of prior art systems are limited to information regarding the "management of tables", such as, revenue per table, table turns and revenue per person and are incapable of reporting on more relevant measures such as the optimisation of the capacity, yield and revenue generated in a space. As discussed previously, the known prior art is based on theoretical combinatorial constraint programming and a simplistic practical static linear combinatorial priority list.

Embodiments of the present invention overcome limitations of the prior art, which is limited to utilising predefined tables and table combinations that do not allow for a booking request to be allocated based on qualitative constraints such as the maximisation of ambiance, the ranking of VIP's (Very Important Persons) and SVIP's (Super Very Important Persons), or the allocation of bookings to different classes of tables within a service period. Such parameters are incapable of being incorporated, from a technical perspective, into prior art booking systems as they are fundamentally at odds with the static linear combinatorial priority lists that are an essential feature of known prior art systems.

Embodiments of the invention overcome a limitation inherent in the prior art, which does not recognise or allow for a customer to preselect a specific space, sub-space, section, specific table or booking duration period.

Moreover, the prior art does not rank tables from "best" to "worst" (where the methodology used to rank tables is dynamic and changeable, taking into account a number of quantitative and qualitative aspects of the table and the venue), or divide a venue into different classes within a restaurant so as to offer the booking requestor the opportunity to customise their experience (and thereby maximise their utility) while simultaneously providing greater flexibility in the use of the space and the use of the venue's resources in a way that maximises yield (or any other desirable outcome).

Embodiments of the present invention allow for the incorporation of additional tables or removal of tables within a venue and can add or "swap" tables and table tops within a venue to be provided to a user so that the user can setup the venue for the commencement of a service period.

In the allocation of furniture or tables in a space an important aspect in the optimisation process is the allocation and management of time. That is, both the time/date of the booking and also the duration of the booking For example, a table of two consuming one course meal over a three hour period does not represent the same revenue, utility and maximisation for the restaurant or venue's resources or capacity as a table of two that consumes a three course meal over only a two hour period.

In the allocation of furniture or tables in a space another important aspect in the optimisation process is the recognition that different periods of time do not have the same utility or benefit due to inherently different demand profiles at different times/dates. For example, the demand for a table for two at 7:30 pm for dinner on a Saturday evening is in far greater demand than a table for two at 5:30 pm. As such, any allocation algorithm which cannot take into account the booking time and duration of a booking is unable to optimise the allocation of booking requests.

The prior art is incapable of managing time, even though time is a key determinant in the optimisation a restaurant's yield and also of a booking requestor's utility. Specifically, the prior art solutions have an inherent structure which precludes the ability to provide (or recommend) multiple time periods or time periods of varying lengths based on the menu and/or courses that will be selected, occasion or size of booking. For example, in the prior art, all bookings are generally set at an arbitrary "safe" time period, which represents the time that would be taken for the longest possible booking. This may be a hour or 2 hour duration or some other single, set unit of time. The introduction of a changeable "time" dimension into an applied static linear combinatorial priority lists as a methodology for allocating booking would create a situation where the computational time required to allocate some bookings would either be completely impractical, or alternatively, would simply result in the booking algorithm of the prior art being unable to allocate a booking, not due to the inherent physical limitations of the venue, but because the algorithm is simply unable to resolve the resultant equation.

Embodiments of the present invention make allowance for different products or a suite of products that a venue is capable of offering at different booking intervals during a service period. For example, to optimise revenue, a venue such as a restaurant must have information regarding the products and services the restaurant is capable of providing and make allowance for other constraints that may be affected as a result of a booking requestor requesting specific products and services. As a simple example, a restaurant can offer an a la carte menu from which diners can select one, two or three courses for their meal. Further, from historical knowledge of the restaurant's design, service standards, cooking techniques, the average time required to consume the food etc., determine that an appropriate duration for a one course meal is 1 hour, a two-course meal 1½ hours and a 3 course meal 2 hours. This knowledge allows the allocation module and the requestor user interface to allocate appropriate resources, but more importantly, allows the allocation module to determine whether a booking can be allocated and subsequently adequately serviced. The prior art is fundamentally incapable of performing such a sophisticated determination. In the known art, most restaurants choose an arbitrary "safe" meal duration time, the duration time being selected such that it encompasses the longest reasonable duration (e.g. two hours) so that the probability of conflicting bookings is minimised. However, this limitation incorporates an inefficiency into the booking process which disadvantages both the restaurant (as the restaurant is inherently limited in the number of allocations that can be offered) and the booking requestor, who is only able to make a booking within the limited constraints provided by the restaurant. The embodiment described herein ameliorates this problem by providing a system which is capable of "negotiating" an outcome that maximises the utility of the booking requestor while simultaneously maximising the yield of the restaurant.

Embodiments of the invention include the ability to offer alternatives to a booking requestor. For example, the embodiment is able to advise a booking requestor that a two hour period is not available for their booking preferred booking time a 1½ hour booking is available should they be satisfied with a two course meal. In other words, the system is capable of attempting to negotiate a suitable compromise position with the booking requestor, thereby increasing the likelihood of securing the booking, while also maximising the utility to the booking requestor, within the constraints of the venue and the requestor.

Embodiments of the invention are capable of differentiating between the times that are required or should be offered for different menus, different courses or different offerings so that the amount of time required by a booking can be optimised thereby optimising the use of the space.

Embodiments of the invention provide allowance for the time that would be taken to reset a table after use for the arrival of the next booking. For example, in a fine dining restaurant after a dining booking has completed its dinner paid the bill and left the table a wait person would take away the bill folder, used napkins, used table cloth, sugar and coffee cups, and then bring back a fresh table cloth, new napkins, new water and wine glasses, new cutlery etc., to set up the table before a new booking could be seated. This process varies for different restaurants and styles of restaurants and is a mandatory consideration in the process of reusing a table for a further seating. It may also vary for the same restaurant based on the staffing levels for the particular service.

Embodiments of the invention include a user defined dual calendar set up and permit the user to define the start and end dates for a week, and/or define what the start and end dates are for a period/"month", and/or how many periods/"months" there are in a year or what the start date and end dates are for the user defined "year" to coincide with a user's accounting year, user's fiscal year or other requirements. Further the prior art does not include a dual calendar which has the capacity to redefine start and end dates or to define arbitrary periods of time that have meaning to the end user, such as "current week" or "last week", last period/"month" or "current week versus "same week last year", which may not have a universal meaning but which are critical for specific use cases in specific industries, and allow for correct reporting, review and forecasting.

Embodiments of the invention include a multi-venue capability whereby each venue within a group of venues can be included in the same group. Where venues are located in different time zones, the venues correctly display the correct time to avoid confusion and errors in booking times when bookings are made for different venues in the same group.

Embodiments of the invention include all information and data utilised by multi-venue groups to be available to all venues within the group such that where a booking cannot be allocated to one venue in the group, the booking requestor can be offered a different nearby venue in the group. Similarly, booking constraint information utilised in booking one venue can be utilised in booking another venue.

Embodiments of the invention include the ability to change the diary page format to accommodate different activities that a restaurant may wish to undertake. For example the prior art cannot confirm a booking for a private room within a restaurant as; firstly the booking widget cannot cater for the booking request; secondly, the booking widget does not have the ability to request the right information; and third, the diary setup cannot cater for a function booking.

Embodiments of the invention include an interface referred to as a "restaurant manager's page" or a "dashboard" which is analogous to a pilot's cockpit where the interface layout is organised so that all relevant information is either visible or immediately accessible, thereby allowing greater efficiency during a busy service period due to minimal information being place on separate screens and/or pop-ups.

Embodiments of the invention review the actual revenue received against a calculated "maximum potential revenue" to determine the level of discounting (explicit or implicit) that was applied to achieve the actual revenue gained. This metric, termed the "revenue yield" is a measure of the revenue achieved versus the total possible revenue where all sales and complementary items are calculated at full price.

Embodiments of the invention calculate and monitor actual booking duration times (rather than utilising hypothetical or fixed booking during times) and the duration times can be analysed by menu, by courses selected, by occasion, by group size, wherein the resultant analysis can be used as an input to determine appropriate allocations for booking times and benchmarks for forecasting rather than a simplistic generalisation provided by the prior art.

Embodiments of the system advantageously allow for the forecasting of potential revenue, profit, etc., utilising algorithms that optimise for the best use of available resources, given a specific pool of booking requests (both historical and projected).

Moreover, embodiments of the invention are intuitive in that the algorithms encoded in the system assist in the forecasting of future events, demand and provide feedback which enables the further development of capacity and revenue generation.

Embodiments of the invention advantageously interrogate any unused or unallocated spaces or tables and automatically notify potential booking requestors of the availability, potentially applying a dynamic price to such promotions and thereby increasing yield and optimising use of available resources.

Embodiments advantageously allow a booking requestor to make one booking request to book two allocation portions within the same venue. For example, where the venue is a restaurant, the requestor may book a seat at the bar for 7 pm and a table in the main dining room for 7:30 pm.

Embodiments advantageously allow a booking requestor to book two venues through the one interface. For example, the interface allows the booking requestor to book a show or a theatre and book a table in a restaurant through the same booking request.

The embodiment, from a technical perspective, is able to utilise the size and floor space of the restaurant and its spatial characteristics to determine which tables or areas have a higher utility than others or where to place tables. Furthermore, the embodiment is capable of segmenting the restaurant into multiple areas (where an area can also comprise a separate room, a separate level and any venue can be split into multiple areas irrespective of physical barriers such as walls within the venue) which can then be further divided into subspaces, sections and or classes for the allocation of bookings. Specifically, the prior art is unable to recognise different areas beyond simple numbering or table referencing.

The embodiment advantageously allows for a variable number of tables to be included within a restaurant during the booking allocation process. The embodiment can add or remove any tables, as it is capable of defining the space.

The prior art requires the manual determination of a finite list of "tables and table Combinations" which are then required to be manually inputted into the system and which then form the total solution pool from which a booking can be allocated to. This means that there is no check and balance that all potential solutions have been manually identified and inputted into the system that forms the total solution pool. The embodiment creates a unique solution for each set of bookings for a service period based on the bookings received and the bookings expected from "walk-in" customers. The embodiment is not bound by a predetermined manually inputted list of tables.

The prior art is agnostic as to the difference between the different compositions of "tables" and "table combinations" and the concept of ("fixed tables") and ("flexible tables") in that the composition and ratio of fixed versus flexible tables impacts on the ability to organise tables and allocate bookings in the optimisation of the floor space of a restaurant.

The embodiment dynamically allocates bookings whereby all bookings can be considered together for a more efficient or dynamic allocation to be achieved. The prior art only considers dynamic booking allocation through the application of a "constraint programming" technique. This prior art technique, by definition, is incapable of optimising space, plus is computationally inefficient and not practical.

Constraint programming is similar to static allocation in that it cannot optimise a space as it suffers from the same limitations, specifically:

i. The solution is limited to a pre-determined fixed number of tables;

ii. From the fixed number of tables, a solution set is developed comprising a list of tables and table combinations;

iii. It cannot add or remove tables during the booking allocation process to optimise the number of booking that can be taken;

iv. It can merely search and select a table or table combination that is not utilised from which to allocate a booking; and v. The constraint program, by definition, is a search program and hence does not have the ability to create a solution.

The embodiment advantageously allocates bookings and, at a later time, reallocate the bookings received and allocated to tables to determine if additional tables can be incorporated within or removed from the solution set so that the total capacity offered is increased The embodiment is not restricted to the use of a define set of tables and table combinations—one set of tables and table combinations can be utilised before service and a different set of tables and table combinations with different priorities can be used during service.

There are computational inefficiencies inherent in linear and static allocation processes of the prior art which result in poor allocations, which in turn require considerable manual intervention to ensure prior bookings do not hinder subsequent booking requests from being allocated.

The static allocation process of the prior art cannot offer any acceptable or measurable level of maximisation or optimisation of restaurant floor space as the prior art has no mechanism or algorithm by which the relationship of furniture to floor space can be determined. At best the prior art can only allocate bookings within the selected and manually determined total population of "tables and table combinations". As such the prior art has no inherent technical character, in that no "determination" of an optimal allocation is performed, but rather there is simply a matching based on a simplistic lookup table. The embodiment is inherently technical because it is directed to solving a "real world" problem of how to arrange furniture to optimise a space, not simply allocate bookings to a random table.

The prior art cannot "create" or remove tables on a restaurant's floor plan as required by bookings. Again, the embodiment is capable of assessing the spatial limitations of the space and add or remove tables as necessary.

The prior art cannot take into account any characteristics of the booking requestor (customer) or of the physical space, and therefore cannot autonomously allocate a booking for a higher ranked customer to a higher ranked table, class, space, subspace or section.

As the prior art has no "spatial awareness", the prior art has no inherent ability to offer specific tables or class of tables with guaranteed seating at those tables or classes, with or without additional constraints. The embodiment is capable of guaranteeing an allocation to a specific table, even in circumstances when a specific table is allocated.

Moreover, as a corollary, the prior art cannot prioritise booking requests by areas (e.g. sub-spaces, sections, etc.) within a restaurant, cannot allocate bookings to multiple dining areas in a priority sequence or concurrently, nor is the prior art capable of dynamically changing table numbers in accordance with changes to the changes in table location and allocation.

The embodiment is capable of dynamically changing floor plans in real time for integration with other systems such as Point of Sale systems or for operational and planning purposes.

The embodiment permits self-seating through a widget, app, kiosk or any other device or computer.

The booking information requested and received by the embodiment is utilised to tailor the available options shown to a customer. For example, a person requesting to make a booking for two people for an anniversary may be shown a different menu and options to a person requesting to make a booking for 6 people and two children. Such variations are not provided based solely on the provision of multiple menus, etc., but on whether the restaurant is resourced to provide such options.

The prior art does not allow you to book two areas within the same restaurant within the same booking so that a person can have more than one experience within the one venue. For example, a seat at the bar followed by a table in the dining room.

The embodiment is capable of developing more than one floor plan or table orientation or table layout or modify constraints during the booking allocation process to optimise outcomes in accordance with selected constraints which define the strategy of the venue. The dynamic table allocation aspects of the prior art are theoretical and require bespoke theoretical solutions that also require expensive maintenance from specialised mathematicians and computer programmers. The embodiment described herein is a technical solution to a technical problem that has not been solved by the prior art.

The prior art does not permit or teach different optimisation solutions, algorithms or priority lists for different combinations of booking requests received to permit greater optimisation. The embodiment provides different optimisation rules and algorithms that take the availability of resources into account such as permitting some bookings to be reallocated while keeping other bookings fixed on allocation of a new booking request if it will permit a better outcome.

The embodiment is capable of limiting the size of bookings within a space, subspace, and/or section to ensure that the flexibility of an area, subarea or section to take additional bookings before or after that booking and the optimisation of that area, subarea, section or the whole venue is not compromised The embodiment is capable of "spreading" a booking over one or more tables, table combinations, spaces, subspaces or sections to ensure that the booking allocations within a venue are optimised.

The embodiment is capable of creating table allocation patterns or rules for greater efficiency to allow or permit a better utilisation or optimisation of the venue, space, subspace, section or class;

The prior art does permit the creation of different classes within a restaurant and does not permit those classes to be of flexible size, such that, the area, subarea, section which may comprise those different classes and the number of tables that can be allocated to these classes can remain variable and adjust during the booking allocation process based on the demand and requests for tables within those different classes.

The embodiment is capable of optimising for qualitative outcomes, such as for ambiance, for example by leaving an empty table between allocated tables when the restaurant is not full to offer greater privacy.

The embodiment advantageously is capable of discriminating between different circumstances and customers, such that the embodiment may autonomously determine which particular menus and/or courses are to be offered for a service period and for booking intervals within that service period.

The embodiment is capable of strategically controlling capacity within a venue, using any one of a number of resources/constraints, including menu, courses, occasion, time duration, subs-space or section, class, etc.

The embodiment, by tracking the use of tables and or areas to determine popular or sought-after areas, is capable of applying dynamic pricing.

The embodiment is capable of utilising information provided by a customer when making a booking request to provide recommendations to the person making the booking request. For example, if a customer were to advise the occasion for their booking was their anniversary and the booking was for two people, menu recommendations and table selections offered could be completely different to the menu and the table selection offered to a table for two having a business meeting on a time limit. The prior art cannot compare recommendations and autonomous settings by the system compared to manual settings and manual over-rides and evaluate which solution and outcome was better and make recommendations and further adjustments.

The prior art cannot calculate revenue yield as the actual price of items versus the recommended price for each item including the recommended price of the complementary items provided, and moreover, the prior art cannot determine the efficiency factor of each area, subarea and section. The efficiency factor being the revenue yield (actual revenue divided by possible revenue being the total revenue that could have been achieved if all items provided including any complimentary items were sold at their full recommended retail price) multiplied by the seat occupancy (time seats are utilised divided by the time seats are available for use) as a percentage.

The embodiment is capable of determining the optimum ratio of fixed versus flexible seating and updates the ratio based on historical information of unfulfilled booking requests in order to minimise future bookings that cannot be accepted.

The embodiment may include sensors associated with each table for each potential seating position so that the embodiment can detect when all guests have arrived and use that information to send pre-ordered food and drink orders to the kitchen and bar respectively so that preparation can begin.

The prior art does not permit a pre-order made in conjunction with a booking request to be completely integrated as part of the Point of Sale "product tree" for stock control and for printing or display of the orders in the kitchen or bar for preparation of those orders including stock decrementing.

The embodiment advantageously provides a dashboard, designed as a "cockpit" such that all relevant information is visible on the screen at all points in time including a communications panel including a dynamic floor plan and Gantt chart.

The embodiment is advantageously capable of delaying the first allocation of booking requests to the tables and table combinations as each individual booking request is allocated on receipt of that booking request. Specifically, the embodiment delays the first allocation process until a certain "threshold" target is reached. The process of allocating each booking as soon as it is received does not offer any benefits and creates "barriers" to the acceptance of subsequent bookings.

The embodiment advantageously capable of classifying tables and table combinations into different categories such that individual booking requests can be applied to different categories and a different priority and allocation process which may include the process of a guaranteed allocation to a specific table not permitted by the prior art.

The system advantageously provides a table configurator and simulator to determine the optimal size table, quantity of tables, orientation of seating, size and quantity of fixed versus flexible seating, to thereby be used in the planning of a restaurant or in the revision of a restaurant arrangement.

The embodiment advantageously allows for dynamic variations in capacity, thereby maximising efficient use of resources.

Dynamic variation may be coupled with yield management, as the system is capable of utilising yield management techniques to optimise bookings, and also to provide a better, more customised service to the booking requestor. Yield management is performed, in part, by an understanding of the products and services available to the requestor, wherein the system uses constraint information to optimise for various constraints while maximising yield.

Disclaimers

Throughout this specification, unless the context requires otherwise, the word "comprise" or variations such as "comprises" or "comprising", will be understood to imply the inclusion of a stated feature or group of features but not the explicit exclusion of any other feature or group of features.

Those skilled in the art will appreciate that the embodiments described herein are susceptible to obvious variations and modifications other than those specifically described and it is intended that the broadest claims cover all such variations and modifications. Those skilled in the art will also understand that the inventive concept that underpins the broadest claims may include any number of the steps, features, and concepts referred to or indicated in the specification, either individually or collectively, and any and all combinations of any two or more of the steps or features may constitute an invention.

Where definitions for selected terms used herein are found within the detailed description of the invention, it is intended that such definitions apply to the claimed invention. However, if not explicitly defined, all scientific and technical terms used herein have the same meaning as commonly understood to one of ordinary skill in the art to which the invention belongs.

Although not required, the embodiments described with reference to the method, computer program, computer interface and aspects of the system can be implemented via an Application Programming Interface (API), an Application Development Kit (ADK) or as a series of program libraries, for use by a developer, for the creation of software applications which are to be used on any one or more computing platforms or devices, such as a terminal or personal computer operating system or a portable computing device, a smartphone or a tablet computing system operating system, or within a larger server structure, such as a 'data farm' or within a larger computing transaction processing system.

Generally, as program modules include routines, programs, objects, components and data files that perform or assist in the performance of particular functions, it will be understood that the functionality of the method, computer program and computer interface defined herein may be distributed across a number of routines, programs, objects or components to achieve the same functionality as the embodiment and the broader invention claimed herein. Such variations and modifications are contemplated by the inventor and are within the purview of those skilled in the art.

It will also be appreciated that where methods and systems of the present invention and/or embodiments are implemented by computing systems or implemented across multiple computing systems then any appropriate computing system architecture may be utilised without departing from the inventive concept. This includes standalone computers, networked computers and dedicated computing devices that do not utilise software as it is colloquially understood (such as field-programmable gate arrays).

Where the terms "computer", "computing system", "computing device" and "mobile device" are used in the specification, these terms are intended to cover any appropriate arrangement of computer hardware for implementing the inventive concept and/or embodiments described herein.

Where the terms "software application", "application", "app", "computer program", "program" and "widget" are used in the specification when referring to an embodiment of the invention, these terms are intended to cover any appropriate software which is capable of performing the functions and/or achieving the outcomes as broadly described herein.

Where reference is made to communication standards, methods and/or systems, it will be understood that the devices, computing systems, servers, etc., that constitute the embodiments and/or invention or interact with the embodiments and/or invention may transmit and receive data via any suitable hardware mechanism and software protocol, including wired and wireless communications protocols, such as but not limited to second, third, fourth and fifth generation (2G, 3G, 4G and 5G) telecommunications protocols (in accordance with the International Mobile Telecommunications-2000 (IMT-2000) specification), Wi-Fi (in accordance with the IEEE 802.11 standards), Bluetooth (in accordance with the IEEE 802.15.1 standard and/or standards set by the Bluetooth Special Interest Group), or any other radio frequency, optical, acoustic, magnetic, or any other form or method of communication that may become available from time to time.

Annexure 1

Prior Art

RevPASH (Revenue Per Available Seat Hour)

CMPASH (Contribution Margin Per Available Seat Hour)

RevPASM (Revenue per Available Square Meter)

ProPASH (Profit per Available Seat Hour)

ProPASM (Profit per Available Square Meter)

RRM (Restaurant Revenue Management)

Time Per Table Turn

Times Table Turn

Cancelled/No Show/Covers as a % of Reserved Covers

Average revenue per person

Note:

The use of single measures applied to PASH and PASM do not offer information as to what inputs need to be changed, how they need to be changed or other information that would assist a person in their decision making process or provide the necessary information that could be used within an artificially intelligent system for the autonomous changing of constraints.

Annexure 2

Examples of Performance Indicators for Restaurant Management, Yield Management, Efficiency and Metrics for Forecasting and Artificial Intelligence for Autonomous Constraint Changes To date too much reliance has been placed on a few single dimension metrics such as table turns, average spend per customer and revenue per available seat hour, which, in themselves, do not offer any guidance as to what decisions a restaurant should take. This has resulted in restaurants being limited to and merely focusing on discounting prices during low demand periods.

Revenue Yield
- AR (Actual Revenue)—Used by prior art to calculate RevPASH
- PR (Potential Full Revenue—all items sold and free items provided at RRP)
- RY (Revenue Yield)

Seat Capacity (Production) and Utilisation

Capacity
- ASH (Available Seat Hours)—Capacity—Used by prior art to calculate RevPASH Revenue
- RSH (Revenue Seat Hours)—Equivalent to the prior art of RevPASH Utilisation
- SUF (Seat Utilisation Factor)

Efficiency
- SEF (Efficiency Factor—Revenue Yield (RY) multiplied by (SUF))

Costs
- Cost levels can be calculated by available seat capacity or revenue seat capacity Table Capacity (Production) and Utilisation Capacity
- ATH (Available Table Hours)

Revenue
- RTH (Revenue Table Hours)

Utilisation
- TUF (Table Utilisation Factor)

Efficiency
- TEF (Table Efficiency Factor)

Costs
- Costs levels can be calculated by available table capacity or revenue table capacity

UNITS OF CAPACITY

Units of Measure
- NOR (Number of Restaurants)
- NOT (Number of Tables)
- NOS (Number of Seats)

Hours Open
- HRO (Hours Restaurant Open)
- HKO (Hours Kitchen Open)

Service Periods Open
- SPO (Service Periods Open)
- BPO (Breakfast Periods Open)
- LPO (Lunch Periods Open)
- DPO (Dinner periods Open)
- SPO (Supper Periods Open)

Service Hours Open
- BSHO (Breakfast Service Hours Open)
- LSHO (Lunch Service Hours Open)
- DSHO (Dinner Service Hours Open)
- SSHO (Supper Service Hours Open)

Back of House (Kitchen) Hours
- HKP (Hours Kitchen Preparation)
- HKS (Hours Kitchen in Service)
- HKC (Hours Kitchen Clean-up)

Front of House (Dining Room) Hours
- HDRP (Hours Dining Room Preparation)
- HDRO (Hours Dining Room Open)
- HDRC (Hours Dining Room Clean-up)

RANKINGS
- Table and Stool ranking
- Ranking of areas
- Ranking of subareas within areas
- Ranking of sections within areas
- Ranking of classes
- Ranking of all tables within the venue
- Ranking by table characteristics; view, privacy, etc Fixed Versus Flexible Seating
- Number of Fixed table
- Percentage of Fixed Tables
- Number of Flexible Tables
- Percentage of Flexible Tables
- Usage of the fixed Tables
- Usage of the Flexible Table
- Usage of Alternate Floor Plans and Layouts
- Usage of additional Furniture by the optimisation algorithm
- Removal of Furniture shown on the Floor Plan by the optimisation algorithm
- Number of bookings that could not be accommodated by booking size and timing Bookings Booking Requests Allocated
- Booking requests by time, date, etc, made that could be accommodated by booking size by occasion, by service, by area, subarea, section, class, specific table Booking Profile
- Booking lead time profile
- Booking group size
- Booking occasion
- Booking composition by adults, by children, by high chairs, by etc.,
- By duration
- By menu
- By time
- By Butler Service
- By table size
- By table requested
- By table preferred
- By postcode/address Booking Requests Rejected
- Booking requests by time, date, etc, made that could not be accommodated by booking size by occasion, by service, by area, subarea, section, class, specific table
- Booking requests by time, date, etc, made where a person took an alternate booking without an incentive by booking size by occasion, by service, by area, subarea, section, class, specific table
- Booking requests by time, date, etc, made where a person took an alternate booking with an incentive by booking size by occasion, by service, by area, subarea, section, class, specific table
- Booking Requests by time, date, etc, made that went on a waitlist by service by time by booking size by occasion, by service, by area, subarea, section, class, specific table
- Booking Requests by time, date, etc, that went on a wait list that could be accommodated by service by time by booking size by occasion, by service, by area, subarea, section, class, specific table
- Booking requests by time, date, etc, made that went on a wait list that could not be accommodated by service by time by booking size by occasion, by service, by area, subarea, section, class, specific table
- Booking lead time profile
- Booking source, by website, by third party, by app, by referral Source of Booking
- Booking source (Source of Revenue), by website, by third party, by app, by referral
- Cost of booking source and cost of referrals Performance Analysis Revenue Analysis
- RRSH (Revenue per Revenue Seat Hour)
- RASH (Revenue per Available Seat Hour)
- RRTH (Revenue per Revenue Table Hour)
- RATH (Revenue per Available Table Hour)
- Revenue per Chair
- Revenue per Table
- Revenue Per Person
- Revenue per person by courses, by class, by menu, by time booked, by booking duration
- Revenue by area, subarea, section, class and by their respective square meters (also prorata over the whole restaurant)
- Revenue by additional restaurant items, by area, subarea, section, class, table
- Revenue by supplementary items, by area, subarea, section, class, table
- Revenue by table type
- Revenue by Table number
- Revenue per Total Hours including prep and closing up
- Revenue per Kitchen Hour (Kitchen Hours—Open Hours)
- Revenue by Front of House Hours (Front of House Hours—Open Hours)
- Customer Retention rate (Total Customers—Total New Customers) divided by total Customers
- By time of Booking
- By seating
- By repeat versus new customers
- By type of Customer
- Revenue During peak Times
- Revenue During Non-Peak times
- Revenue During Shoulder Periods
- Average spend per customer by all metrics
- Times Tables Turn (total duration times divided by the number of people)
- Function Revenue (also as a 5 of total revenue)
- Home delivery as a % of total Revenue
- Take Away as a % of total Revenue Customer Analysis
- Customers per Service
- Customers by booking time, by service, by day
- Customers by menu, by course, by class, by area, by subarea, by section, by day
- Customers by occasion
- Customers by group size
- Customers with Supplementary Items and by Supplementary items
- Customers without Supplementary Items
- Customers by duration booked prior to the service requested
- Customers by booking source
- Customers by promotion
- Customers by Average Spend
- Loyalty Members Average Spend
- Average Spend by member type
- Repeat Customers by average spend
- New Customers by Average Spend
- Average spend by individual type, adult, child, high chair
- Total customers versus repeat customers versus new customers Duration Time Analysis
- Duration time by booking size
- Duration time by booking size by menu
- Duration time by booking size by menu by number of courses
- Duration time by booking size by customer type
- Duration time by booking size by day
- Duration time by booking time interval by day
- Duration times by booking size by menu, by time taken for each activity, being seated, taking food order, taking drink order, time taken for the first course to be prepared, time taken for the first course to be consumed, time taken for the second course to be delivered from time of seating and from time to being called away, time to consume the second course, time third course order taken, time before third course delivered, time to consume third course, other items ordered, time other items delivered, time bill given, time bill paid.
- Duration times by occasion using the same metrics as booking size
- Table reset times by table type by day of the week by time.

Product Mix Analysis

Food (by Time, by Service, by Day, by Server)
- A la Carte One Course
- Two Courses
- Three Courses
- Degustation Menu
- Pre Theatre Menu
- Post Theatre Menu
- Promotional Menus
- Take away revenue
- Home Delivery revenue Beverage (by Time, by Service, by Day, by Server)
- Alcoholic Beverage Revenue
- Non-Alcoholic Beverage Revenue
- Soft Drink Revenue
- Tea & Coffee revenue Supplementary (by Time, by Service, by Day, by Server)
- Window seat surcharge
- Preferred booking time surcharge
- Extended Time Surcharge
- Booking Fee
- Gift box
- Chocolates
- Roses
- Other retail items, books, oil,
- Room Hire Charges Tables
- Booking size mix by day by service, by area, by subarea, by section
- Booking size mix by occasion
- Booking size mix by product
- Requested tables
- Usage and Occupancy of Requested tables
- Rates of Requested tables versus other tables
- Revenue of Requested tables versus other tables
- Preferred Tables
- Usage and Occupancy of Preferred Tables
- Rates of Requested Tables versus other tables Staff Analysis and Roster Parameters
Staff Analysis and Ratios
- Kitchen staff per customer (ratio)
- Kitchen Staff Hours per customer
- Kitchen Hand per customer (ratio)
- Kitchen Hand Hours per customer
- Wait staff per customer (ratio)
- Wait staff hours per customer
- Food Runner per customer (ratio)
- Food Runner hours per customer
- Bar Staff per customer (ratio)
- Bar Staff hours per customer
- Food Runner per customer (ratio)
- Food Runner Hours per customer
- Reception staff per customer
- Reception Hours per customer
- Kitchen preparation times to tables and customer ratios
- Set-up times to tables and customer ratios Break Even and Cost Analysis
Break-Even Analysis
- BESUF (Breakeven Seat Utilisation factor)
- BERSH (Breakeven Revenue Seat Hours)
- BERPH (Breakeven Revenue per Hour)
- BERPP (Breakeven revenue per Person)
- BERPT (Breakeven Revenue per Table)
- BEASH (Break Even per Avaiable Seat Hour)
- BERY (Break Even Revenue Yield)

Cost Analysis Ratios and Percentages
- Menu Costings
- Mark-up per menu item as a percentage
- Mark-up per menu item as a dollar value
- Food COGS (Split by venues and courses)
- Alcohol Beverage COGS
- Non-Alcoholic Beverage COGS
- Tea and Coffee Beverage COGS
- BH Wages Gross (Wages split by preparation, by service and by clean-up)
- BH Wages On-Costs
- BH Wages Total Costs
- FH Wages Gross (Wages split by preparation, by service and by clean-up)
- FH Wages On-Costs
- FH Wages Total Costs
- Operational Costs
- Entertainment Costs
- Marketing Costs
- Utility Costs
- Premises Costs
- Ownership Costs
- Head Office Costs
- Inventory Turnover
- Overhead Rate per metric
- Customer Acquisition Cost (Marketing Variable Costs divided by Total New Customers)
- All cost categories by: (per Available Seat Hour)
  - (per Revenue Seat Hour)
  - (per Available Table Hour)
  - (per Revenue Table Hour)
  - (Opening Hours versus total kitchen Hours)
  - (Open Hours versus total Front of House Hours)

Supplier Pricing
- Pricing by suppliers for the same item
- Reliability of Suppliers
- System to select the cheapest supplier to send the order to Spacial Guidelines and Measures

| Floor Space Mix | |
|---|---|
| Total Floor Plan Area | (100%) |
| Kitchen Floor Plan Area | (30%) |
| Wash Up Store Room, Locker Room, Admin Floor Plan Area | (10%) |
| Dining Room and Bar Plan Area (includes toilets and waiters stations) | (60%) |
| **Dining Room Space (required to scale)** | |
| Dining Room Area 1 Floor Plan | |
| Dining Room Area 2 Floor Plan (etc) | |
| Private Dining Room Area 3 Floor Plan (etc) | |
| Dining Room Subarea 1 Floor Plan (etc) | |
| Dining Room Section 1 Floor Plan (etc) | |
| Bar Area Floor Plan | |
| **Area per Person Guide** | |
| Square meters per patron Fine Dining | 1.70 to 1.90 square meters |
| Square meters per patron Full Service Restaurant Dining | 1.10 to 1.40 square meters |
| Square meters per patron Counter Service | 1.70 to 1.90 square meters |
| Square meters per patron Fast Food Medium | 1.00 to 1.30 square meters |
| Square meters per patron Table Service, Hotel/Club | 1.40 to 1.70 square meters |
| Square meters per patron Banquet, Minimum | 0.90 to 1.10 square meters |
| **Table Top Size Guide** | |
| Minimum recommended table top size per person | 0.18 square meters |
| Minimum table top size (for two) | 600 mm by 600 mm |
| Table Top Fine Dining (minimum) | 750 mm by 750 mm |
| Table Top Full Service Restaurant Dining | 700 mm by 750 mm |
| Casual Restaurant Full Service Dining | 600 mm by 700 mm |
| Bar Area dining top | 300 mm by 500 mm |
| Round Top 1 to 2 people diameter | 600 mm |
| Round Top 2 to 4 people diameter | 800 mm |
| Round Top 4 to 5 people diameter | 1000 mm |
| Round Top 5 to 6 people diameter | 1200 mm |
| Round Top 6 to 7 people diameter | 1350 mm |
| Round Top 7 to 8 people diameter | 1500 mm |
| **Chair Size Guide** | |
| Minimum chair footprint | 450 mm by 450 mm |
| **Spacing between Tables** | |
| Space between rectangular tables including chairs | 1250 mm to 1550 mm |
| Space between table to table with chair only on one side | 1050 mm |
| Space between back to back chairs for movement | 460 mm |
| Space between diagonal chairs | 460 mm |
| Space between tables in row seating | 150 mm to 700 mm |
| Space between round tables | 1350 mm |
| Space allowed for chairs along a table | 600 mm |
| Walk way between table with no chairs | 600 mm |
| Walk way fire egress depends on regulations | 1000 mm |
| **Waiter Stations** | |
| Waiter Stations up to 20 chairs/diners | 0.50 to 1.00 square meters |
| Waiter Stations up to 60 chairs/diners | 2.25 to 3.75 square meters |
| **Bars Space and Bar stools** | |
| Bar Area Floor Plan | |
| Bar Stool seating Distances | 510 mm to 600 mm |

The invention claimed is:

1. A system for allocating space within a venue, comprising:

at least one processor; and at least one non-transitory, computer-readable medium containing instructions that, when executed by the at least one processor, cause the system to perform operations comprising:

providing a graphical user interface, the graphical user interface including:

a display of a time slice in a space and time volume of a venue, the volume generated at least in part by:

iteratively reallocating requests in a pool of unallocated requests for the venue, the pool including a new request and at least one previously allocated request, the requests in the pool having associated difficulty values, a first iteration comprising:

selecting, from unallocated requests in the pool and based on difficulty values for the unallocated requests, a highest difficulty value unallocated request;

identifying, in the volume, an available location for the highest difficulty value unallocated request, the available location based on a start time of the highest difficulty value unallocated request and at least in part on a space and time volume of the highest difficulty value unallocated request; and updating the volume to allocate the highest difficulty value unallocated request to the available location;

wherein iteratively reallocating the requests further comprises:

selecting multiple requests remaining in the pool of unallocated requests;

determining a potential request allocation for each of the multiple requests;

comparing clustering among the potential request allocations for the multiple requests;

selecting one of the potential request allocations based on the comparison; and updating the volume based on the selection of the one of the potential request allocations; and a time control specifying a time of the time slice;

detecting an interaction with the time control, the interaction specifying a new time; and automatically updating the display to depict a new time slice in the volume.

2. The system of claim 1, wherein:

a second iteration comprises:

selecting a second unallocated request;

determining that the second unallocated request cannot be allocated;

identifying a conflicting allocated request; and allocating the second unallocated request and un-allocating the identified conflicting request.

3. The system of claim 1, wherein:

the new request indicates a party size and a request duration; and generation of the volume further includes:

conversion of the party size and the request duration into a space and time volume for the new request; and generation of a difficulty value for the new request based at least in part on the space and time volume for the new request.

4. The system of claim 3, wherein:

the new request specifies conditions on locations in the volume; and the difficulty value for the new request is based at least in part on the conditions.

5. The system of claim 3, wherein:

the difficulty value for the new request is based at least in part on a start time of the new request and a peak time of the venue.

6. The system of claim 3, wherein:

the difficulty value for the new request is based at least in part on a priority status of a user that provided the new request.

7. The system of claim 1, wherein:

identifying the available location for the highest difficulty value unallocated request comprises:

selecting a subspace in the volume and determining that the space and time volume of the highest difficulty value unallocated request fits within an unallocated portion of the subspace.

8. The system of claim 7, wherein:

the venue includes multiple subspaces and the selected subspace satisfies a subspace constraint of the highest difficulty value unallocated request; or the venue includes multiple subspaces, each subspace having a relative priority, and the subspace is selected based on the relative priority of the subspace.

9. The system of claim 1, wherein:

identifying the available location for the highest difficulty value unallocated request comprises:

identifying an unallocated portion of the volume, the unallocated portion associated with furniture; and determining that the furniture satisfies a seating condition of the highest difficulty value unallocated request.

10. The system of claim 9, wherein:

the furniture comprises a furniture item, the furniture item satisfying the seating condition; or the furniture comprises multiple furniture items collectively configurable to satisfy the seating condition.

11. The system of claim 1, wherein:

generation of the volume further includes:

determining an unallocated portion of the volume is not associated with furniture; and determining available furniture fits within the unallocated portion of the volume; and identifying the available location for the highest difficulty value unallocated request comprises determining that the available furniture satisfies a seating condition of the highest difficulty value unallocated request.

12. The system of claim 1, wherein:

identifying the available location for the highest difficulty value unallocated request comprises:

preferentially searching unallocated portions of the volume:

contiguous in space to allocated portions of the volume; or contiguous in time to allocated portions of the volume.

13. The system of claim 1, wherein:

the multiple requests having matching difficulty values.

14. At least one non-transitory, computer-readable medium, the at least one non-transitory, computer-readable medium containing instructions that, when executed by at least one processor of a system, cause the system to perform operations comprising:

providing a graphical user interface, the graphical user interface including:

a display of a time slice in a space and time volume of a venue, the volume generated at least in part by:

iteratively reallocating requests in a pool of unallocated requests for the venue, the pool including a new request and at least one previously allocated request, the requests in the pool having associated difficulty values, a first iteration comprising:

selecting, from unallocated requests in the pool and based on difficulty values for the unallocated requests, a highest difficulty value unallocated request;

identifying, in the volume, an available location for the highest difficulty value unallocated request, the available location based on a start time of the highest difficulty value unallocated request and at least in part on a space and time volume of the highest difficulty value unallocated request; and updating the volume to allocate the highest difficulty value unallocated request to the available location;

wherein iteratively reallocating the requests further comprises:

selecting multiple requests remaining in the pool of unallocated requests;

determining a potential request allocation for each of the multiple requests;

comparing clustering among the potential request allocations for the multiple requests;

selecting one of the potential request allocations based on the comparison; and updating the volume based on the selection of the one of the potential request allocations; and a time control specifying a time of the time slice;

detecting an interaction with the time control, the interaction specifying a new time; and automatically updating the display to depict a new time slice in the volume.

15. The at least one non-transitory, computer-readable medium of claim 14, wherein:

the new request indicates a party size and a request duration; and generation of the volume further includes:

converting the party size and the request duration into a space and time volume for the new request; and generating a difficulty value for the new request based at least in part on the space and time volume for the new request; and the difficulty value for the new request is based at least in part on:

a start time of the new request and a peak time of the venue; or a priority status of a user that provided the new request.

16. The at least one non-transitory, computer-readable medium of claim 14, wherein:

identifying the available location for the highest difficulty value unallocated request comprises:

selecting a subspace in the volume and determining that the space and time volume of the highest difficulty value unallocated request fits within an unallocated portion of the subspace; and the venue includes multiple subspaces and the selected subspace:

satisfies a subspace constraint of the highest difficulty value unallocated request; or is selected based on a relative priority of the subspace.

17. The at least one non-transitory, computer-readable medium of claim 14, wherein:

identifying the available location for the highest difficulty value unallocated request comprises:

identifying an unallocated portion of the volume, the unallocated portion associated with furniture; and determining that the furniture satisfies a seating condition of the highest difficulty value unallocated request.

18. The at least one non-transitory, computer-readable medium of claim 17, wherein:

the furniture comprises a furniture item, the furniture item satisfying the seating condition; or the furniture comprises multiple furniture items and the multiple furniture items can be arranged to satisfy the seating condition.

19. The at least one non-transitory, computer-readable medium of claim 14, wherein:

generation of the volume further includes:

determining an unallocated portion of the volume is not associated with furniture; and determining available furniture fits within the unallocated portion of the volume; and identifying the available location for the highest difficulty value unallocated request comprises determining that the available furniture satisfies a seating condition of the highest difficulty value unallocated request.

20. The at least one non-transitory, computer-readable medium of claim 14, wherein:

identifying the available location for the highest difficulty value unallocated request comprises:

preferentially searching unallocated portions of the volume:

contiguous in space to allocated portions of the volume; or contiguous in time to allocated portions of the volume.

21. The at least one non-transitory, computer-readable medium of claim 14, wherein:

the multiple requests having matching difficulty values.

* * * * *